US012298681B2

United States Patent

Gamo et al.

(10) Patent No.: US 12,298,681 B2
(45) Date of Patent: May 13, 2025

(54) DEVELOPER SUPPLY CONTAINER AND DEVELOPER SUPPLYING SYSTEM

(71) Applicant: CANON KABUSHIKI KAISHA, Tokyo (JP)

(72) Inventors: Yohei Gamo, Abiko (JP); Tsukasa Mine, Tsukuba (JP); Akihito Kamura, Nagareyama (JP); Koji Katayama, Misato (JP); Masato Yamaoka, Kashiwa (JP); Yusuke Oizumi, Toride (JP); Manabu Jimba, Tsukuba (JP); Ayatomo Okino, Moriya (JP); Nobuyuki Yomoda, Kashiwa (JP); Keisuke Isobe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/504,385

(22) Filed: Nov. 8, 2023

(65) Prior Publication Data

US 2024/0069468 A1 Feb. 29, 2024

Related U.S. Application Data

(60) Division of application No. 17/972,708, filed on Oct. 25, 2022, now Pat. No. 11,852,991, which is a (Continued)

(30) Foreign Application Priority Data

Sep. 21, 2017 (JP) ................................ 2017-181802

(51) Int. Cl.

*G03G 15/08* (2006.01)
*G03G 21/16* (2006.01)

(52) U.S. Cl.

CPC ..... *G03G 15/0879* (2013.01); *G03G 15/0865* (2013.01); *G03G 15/0886* (2013.01); *G03G 21/1647* (2013.01)

(58) Field of Classification Search

CPC .......... G03G 15/0879; G03G 15/0865; G03G 15/0886; G03G 21/1647; G03G 15/0872

See application file for complete search history.

(56) References Cited

U.S. PATENT DOCUMENTS

| | | | |
|---|---|---|---|
| 4,660,823 | A | 1/1987 | Sato |
| 5,765,059 | A | 6/1998 | Kosuge et al. |

(Continued)

FOREIGN PATENT DOCUMENTS

| | | |
|---|---|---|
| CN | 1210997 | 3/1993 |
| CN | 1572511 | 2/2005 |

(Continued)

OTHER PUBLICATIONS

May 14, 2024 Office Action in Chinese Patent Application No. 202210997831.5 (with English translation).

(Continued)

*Primary Examiner* — David J Bolduc
(74) *Attorney, Agent, or Firm* — Venable LLP

(57) ABSTRACT

With a mounting operation of a supply container, a supported portion 11*b* of a developer receiving portion 11 is supported by a receipt supporting portion 30*c* of a lifting portion 30. With further mounting operation, a shutter sliding portion 30*b* of the lifting portion 30 slides on a shutter inclined portion 4*f* of a shutter 4. The developer receiving portion 11 is displaced so as to bring a receiving opening into communication with a discharge opening by operating, using the shutter 4, the lifting portion 30 supporting the supported portion 11*b* of the developer receiving portion 11. By this, a load required for movement of the developer receiving portion 11 is reduced to achieve smooth mounting of the supply container.

17 Claims, 72 Drawing Sheets

Related U.S. Application Data division of application No. 17/746,012, filed on May 17, 2022, now Pat. No. 11,526,098, which is a division of application No. 16/923,400, filed on Jul. 8, 2020, now Pat. No. 11,392,056, which is a division of application No. 16/354,333, filed on Mar. 15, 2019, now Pat. No. 10,725,400, which is a continuation of application No. PCT/JP2018/036623, filed on Sep. 21, 2018.

(56) References Cited

U.S. PATENT DOCUMENTS

| | | | |
|---|---|---|---|
| 6,122,469 | A | 9/2000 | Miura et al. |
| 6,879,789 | B2 | 4/2005 | Yamada et al. |
| 6,920,298 | B2 | 7/2005 | Yamada et al. |
| 7,050,728 | B2 | 5/2006 | Minagawa et al. |
| 7,127,193 | B2 | 10/2006 | Yamada et al. |
| 7,469,113 | B2 | 12/2008 | Yamada et al. |
| 7,647,012 | B2 | 1/2010 | Yamada et al. |
| 7,881,645 | B2 | 2/2011 | Yamada et al. |
| 7,890,027 | B2 | 2/2011 | Yamada et al. |
| 7,965,963 | B2 | 6/2011 | Yamada et al. |
| 7,970,321 | B2 | 6/2011 | Yamada et al. |
| 8,000,614 | B2 | 8/2011 | Okino et al. |
| 8,045,901 | B2 | 10/2011 | Yamada et al. |
| 8,290,394 | B2 | 10/2012 | Yamada et al. |
| 8,909,094 | B2 | 12/2014 | Yamada et al. |
| 9,046,820 | B1 | 6/2015 | Yamada et al. |
| 9,256,163 | B2 | 2/2016 | Izumi et al. |
| 9,348,261 | B2 | 5/2016 | Enokuchi et al. |
| 9,354,549 | B1 | 5/2016 | Okino et al. |
| 9,529,299 | B2 | 12/2016 | Okino et al. |
| 9,535,369 | B2 | 1/2017 | Kamura et al. |
| 9,588,461 | B2 | 3/2017 | Kamura et al. |
| 9,720,349 | B2 | 8/2017 | Yamaoka et al. |
| 9,811,024 | B2 | 11/2017 | Yomoda et al. |
| 10,088,773 | B2 | 10/2018 | Yamaoka et al. |
| 10,088,775 | B2 | 10/2018 | Kamura et al. |
| 10,133,211 | B2 | 11/2018 | Yomoda |
| 10,209,667 | B2 | 2/2019 | Jimba et al. |
| 10,295,956 | B2 | 5/2019 | Enokuchi et al. |
| 10,303,086 | B2 | 5/2019 | Jimba et al. |
| 10,747,167 | B2 | 8/2020 | Enokuchi et al. |
| 11,067,918 | B2 | 7/2021 | Jimba et al. |
| 2002/0025183 | A1 | 2/2002 | Murakami et al. |
| 2002/0034404 | A1 | 3/2002 | Kojima et al. |
| 2002/0164179 | A1 | 11/2002 | Hosokawa |
| 2004/0190945 | A1 | 9/2004 | Yamada |
| 2004/0246304 | A1 | 12/2004 | Takahashi et al. |
| 2004/0265010 | A1 | 12/2004 | Otani |
| 2005/0147428 | A1 | 7/2005 | Yamada |
| 2006/0029418 | A1 | 2/2006 | Ishii et al. |
| 2007/0147902 | A1 | 6/2007 | Taguchi et al. |
| 2007/0196136 | A1 | 8/2007 | Yamamoto et al. |
| 2007/0280743 | A1 | 12/2007 | Nakajima et al. |
| 2008/0124105 | A1 | 5/2008 | Okamoto et al. |
| 2009/0060570 | A1 | 3/2009 | Mizuno et al. |
| 2009/0129825 | A1 | 5/2009 | Okino et al. |
| 2009/0232546 | A1 | 9/2009 | Yamada et al. |
| 2009/0297211 | A1 | 12/2009 | Kanno et al. |
| 2009/0297226 | A1 | 12/2009 | Nagashima et al. |
| 2010/0067957 | A1 | 3/2010 | Tazawa |
| 2010/0202803 | A1 | 8/2010 | Sato et al. |
| 2010/0278564 | A1 | 11/2010 | Nagashima et al. |
| 2011/0052266 | A1 | 3/2011 | Yoon et al. |
| 2012/0014713 | A1 | 1/2012 | Murakami et al. |
| 2012/0033988 | A1 | 2/2012 | Itabashi |
| 2012/0057905 | A1 | 3/2012 | Itabashi |
| 2012/0057906 | A1 | 3/2012 | Itabashi |
| 2012/0219330 | A1 | 8/2012 | Kikuchi et al. |
| 2013/0077994 | A1 | 3/2013 | Takiguchi |
| 2013/0209140 | A1 | 8/2013 | Murakami et al. |
| 2014/0153974 | A1 | 6/2014 | Jimba et al. |
| 2014/0169835 | A1 | 6/2014 | Nakajima |
| 2014/0348551 | A1 | 11/2014 | Yamabe et al. |
| 2014/0348552 | A1 | 11/2014 | Iwatsuki et al. |
| 2015/0043944 | A1 | 2/2015 | Yamoto |
| 2015/0063875 | A1 | 3/2015 | Oshima et al. |
| 2015/0248102 | A1 | 9/2015 | Nakajima |
| 2016/0004186 | A1 | 1/2016 | Jimba et al. |
| 2016/0004188 | A1 | 1/2016 | Kamura et al. |
| 2016/0033897 | A1 | 2/2016 | Eto |
| 2016/0131997 | A1 | 5/2016 | Murakami |
| 2016/0154375 | A1 | 6/2016 | Kamizato et al. |
| 2016/0223981 | A1 | 8/2016 | Enokuchi et al. |
| 2016/0261876 | A1 | 9/2016 | Nakagima |
| 2016/0313670 | A1 | 10/2016 | Eto |
| 2017/0242367 | A1 | 8/2017 | Jimba et al. |
| 2017/0351212 | A1 | 12/2017 | Enokuchi et al. |
| 2018/0024465 | A1 | 1/2018 | Yomoda et al. |
| 2019/0018340 | A1 | 1/2019 | Yamaoka et al. |
| 2019/0018341 | A1 | 1/2019 | Yamaoka et al. |
| 2019/0204777 | A1 | 7/2019 | Yamaoka et al. |
| 2019/0204778 | A1 | 7/2019 | Gamo et al. |
| 2019/0212674 | A1 | 7/2019 | Anno et al. |
| 2019/0212693 | A1 | 7/2019 | Okino et al. |
| 2019/0212694 | A1 | 7/2019 | Katayama et al. |
| 2019/0212695 | A1 | 7/2019 | Makino |

FOREIGN PATENT DOCUMENTS

| | | | |
|---|---|---|---|
| CN | 1680886 | A | 10/2005 |
| CN | 1737696 | A | 2/2006 |
| CN | 1954269 | A | 4/2007 |
| CN | 101107576 | | 1/2008 |
| CN | 201054075 | | 4/2008 |
| CN | 201130299 | Y | 10/2008 |
| CN | 2008-292729 | A | 12/2008 |
| CN | 101776857 | A | 7/2010 |
| CN | 102221809 | A | 10/2011 |
| CN | 102955398 | A | 3/2013 |
| CN | 103733141 | | 4/2014 |
| CN | 103853010 | A | 6/2014 |
| CN | 104423216 | A | 3/2015 |
| CN | 104460266 | A | 3/2015 |
| CN | 204536728 | U | 8/2015 |
| CN | 104880926 | A | 9/2015 |
| CN | 204631445 | | 9/2015 |
| CN | 105103056 | A | 12/2015 |
| CN | 105122146 | A | 12/2015 |
| CN | 105164589 | A | 12/2015 |
| CN | 105301933 | A | 2/2016 |
| CN | 105589311 | A | 5/2016 |
| CN | 105850134 | | 8/2016 |
| CN | 106019897 | | 10/2016 |
| CN | 107111265 | A | 8/2017 |
| EP | 0 251 823 | | 1/1988 |
| EP | 2 913 719 | A | 9/2015 |
| EP | 2 913 719 | A1 | 9/2015 |
| JP | S61-119529 | | 6/1986 |
| JP | H08-297452 | | 11/1996 |
| JP | H09-160366 | A | 6/1997 |
| JP | H11-272052 | A | 10/1999 |
| JP | H11-316479 | A | 11/1999 |
| JP | 2000-039764 | A | 2/2000 |
| JP | 2001-066869 | A | 3/2001 |
| JP | 2003-107892 | A | 4/2003 |
| JP | 2003-345117 | A | 12/2003 |
| JP | 2004-226659 | A | 8/2004 |
| JP | 2005-092100 | A | 4/2005 |
| JP | 2008-015106 | A | 1/2008 |
| JP | 2008-0292729 | A | 12/2008 |
| JP | 2009-015056 | A | 1/2009 |
| JP | 2010-175804 | A | 8/2010 |
| JP | 2011-064835 | A | 3/2011 |
| JP | 2011-076062 | A | 4/2011 |
| JP | 2012-093735 | A | 5/2012 |
| JP | 2013-015826 | A | 1/2013 |
| JP | 2014-134660 | A | 7/2014 |
| JP | 2014-149334 | A | 8/2014 |
| JP | 2015-161898 | A | 9/2015 |
| JP | 2016-102987 | A | 6/2016 |
| JP | 2017-062515 | A | 3/2017 |
| JP | 2017-126093 | A | 7/2017 |

(56) References Cited

FOREIGN PATENT DOCUMENTS

| | | | |
|---|---|---|---|
| KR | 2007-0036442 | A | 4/2007 |
| KR | 10-2010-0132084 | A | 12/2010 |
| KR | 2014-0041599 | A | 5/2014 |
| WO | 2006/093362 | A1 | 9/2006 |

OTHER PUBLICATIONS

Apr. 13, 2024 Office Action in Chinese Patent Application No. 202210997880.9 (with English translation).
May 1, 2024 Office Action in Chinese Patent Application No. 202210998181.6 (with English translation).
Huapeng et al., Production of Single Coated Glossy Inkjet Paper Using Conventional Coating and Calendering Methods, Dec. 15, 2012.
Young et al., Electrofax Direct Electrophotographic Printing on Paper, RCA Review (1954).
Jul. 1, 2024 Notice of Allowance in Korean Patent Application No. 10-2023-7019651.
Jul. 18, 2024 Extended Search Report in European Patent Application No. 24 158 308.7.
International Search Report and Written Opinion for International Patent Application No. PCT/JP2018/036623, mailed Nov. 13, 2018.
Nov. 15, 2020 Office Action in Eurasian Patent Application No. 202090804 (with English translation).
Aug. 19, 2020 Office Action in Australian Patent Application No. 2018335800.
Dec. 24, 2020 Office Action in Korean Patent Application No. 10-2020-7010289.
Mar. 31, 2021 Office Action in Indian Patent Application No. 2020047015872.
May 28, 2021 Office Action in Canadian Patent Application No. 3,076,609.
Jun. 7, 2021 Extended Search Report in European Patent Application No. 18 859 213.3.
Aug. 18, 2021 Office Action in German Patent Applicaiton No. 11 2018 005 367.9 (with English translation).
Oct. 1, 2021 Notice of Allowance in Korean Patent Application No. 10-2020-7010289.
Jan. 13, 2022 Office Action in Chinese Patent Application No. 201880060301.X (with English translation).
Aug. 3, 2021 Office Action in Japanese Patent Application No. 2017-181802 (with English translation).
Dec. 15, 2021 Decision on Grant in Russian Patent Application No. 2020114151 (with English translation).
Oct. 22, 2020 Office Action in Russian Patent Application No. 2020114151 (with English translation).
Jun. 6, 2022 Notice of Allowance in Chinese Patent Application No. 201880060301.X.
Sep. 3, 2024 Office Action in Canadian Patent Application No. 3,076,609.
Oct. 8, 2024 Office Action in Japanese Patent Application No. 2024-027068.
Oct. 7, 2024 Office Action in Malaysian Patent Application No. PI2020001410.
Sep. 29, 2024 Office Action in Chinese Patent Application No. 202210595657.1 (with English translation).
Sep. 29, 2024 Office Action in Chinese Patent Application No. 202210595610.5 (with English translation).
Oct. 17, 2024 Notice of Allowance in Chinese Patent Application No. 202210595972.4.
Mar. 20, 2025 Notice of Allowance in Korean Patent Application No. 10-2024-7031560 (with English).

(a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

DEVELOPER SUPPLY CONTAINER AND DEVELOPER SUPPLYING SYSTEM

TECHNICAL FIELD

The present invention relates to a developer supply container dismountably mountable to a developer receiving apparatus and a developer supplying system.

BACKGROUND ART

Conventionally, a developer such as fine powder toner is usable with an electrophotographic image forming apparatus such as a copying machine. In such an image forming apparatus, the developer is consumed as the image is formed, and therefore, the developer is supplied from the developer supplying device. In the developer supplying device, a developer supply container (hereinafter, simply referred to as a supply container) containing the developer is mounted on a developer receiving apparatus provided in the image forming apparatus to supply the developer. There, a structure has been proposed (Japanese Laid-open Patent Application No. 2013-015826) in which the developer receiving portion of the developer receiving device is moved (displaced) toward the discharge opening of the supply container in accordance with the mounting operation of the supply container dismountably provided in the developer receiving apparatus.

In the device described in Japanese Laid-open Patent Application Publication No. 2013-015826, the developer receiving portion is guided by a guide (engaging portion) provided in the supply container and moves so as to approach the supply container with the mounting operation of the supply container. When the mounting of the supply container is completed, the discharge opening of the supply container and the receiving opening of the developer receiving portion are in a connected state (a state in which both the openings are in communication with each other). In addition, the developer receiving portion is guided by the guide and moves so as to be separated from the supply container in accordance with the release operation of the supply container. In this manner, the discharge opening and the receiving opening are separated from each other (the two openings are not in communication).

In the apparatus described in Japanese Laid-open Patent Application Publication No. 2013-015826, in order to move the developer receiving portion to the supply container side in accordance with the mounting operation of the supply container, the guide is inclined so as to be higher toward the supply container from the front side toward the upstream side in the mounting direction of the supply container. This is to move an engaged portion (portion to be engaged) of the developer receiving portion in contact with the guide by using the force applied to the supply container at the time of mounting and dismounting. However, in this case, especially when mounting supply container, a force for displacing the developer receiving portion (specifically, an engaged portion) in the mounting direction and a force for displacing the developer receiving portion in the vertical direction are applied at the same time, and therefore mounting force is required.

SUMMARY OF THE INVENTION

Problems to be Solved by Invention

The present invention relates to a structure in which a developer receiving portion including a receiving opening for receiving a developer is moved and the receiving opening is connected to a discharge opening of a supply container, and it is an object of the present invention to provide a smooth mounting of a supply container by reducing mounting force required by the movement of the developer receiving portion.

Means for Solving the Problem

According to one aspect of the present invention, there is provided a developer supply container detachably mountable a developer receiving apparatus including a developer receiving portion provided with an receiving opening for receiving a developer, and a supported portion integrally displaceable with the developer receiving portion, said developer supply container comprising a developer accommodating portion accommodating the developer a discharging portion provided in a bottom side thereof with a discharge opening for discharging the developer accommodated in said developer accommodating portion; a supporting portion provided at said discharging portion and capable of supporting the supported portion, said supporting portion being movable relative to said discharging portion; and a moving mechanism for moving said supporting portion upwardly relative to said discharging portion while supporting said supported portion to move the developer receiving portion toward said developer supply container so as to bring said receiving opening into communication with said discharge opening with a mounting operation of said developer supply container to the developer receiving apparatus.

Effect of the Invention

According to the present invention, the supporting portion capable of supporting the supported portion of the developer receiving portion is moved by the moving mechanism so as to displace the developer receiving portion such that the receiving opening communicates with the discharge opening, and therefore, it is possible to reduce the load for the movement of the developer receiving portion and accomplished smooth mounting of the supply container.

Figure 3:
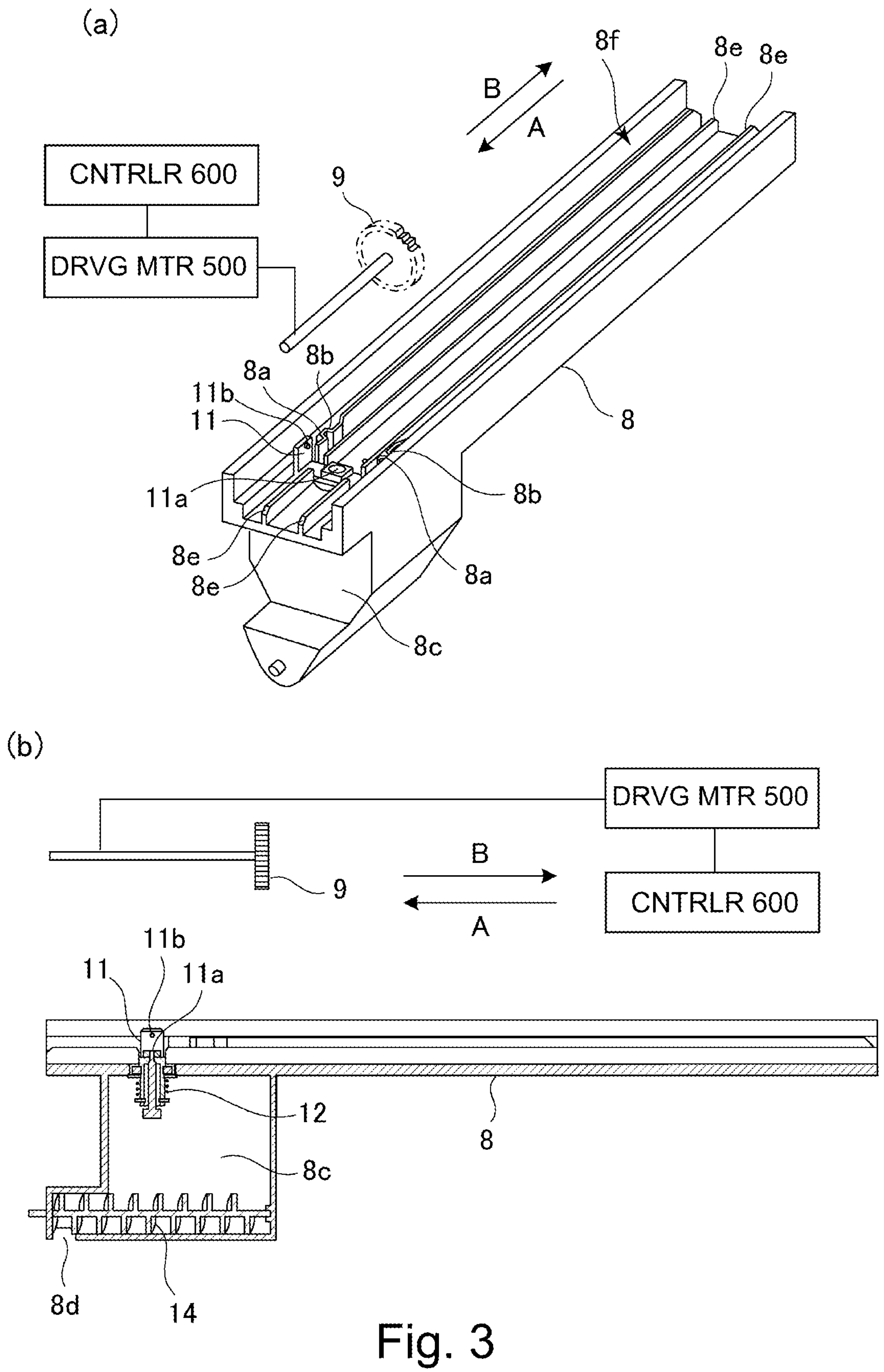

Part (a) and (b) of FIG. 3 show the developer receiving apparatus, (a) is a perspective view, and (b) is a sectional view.

Figure 4:
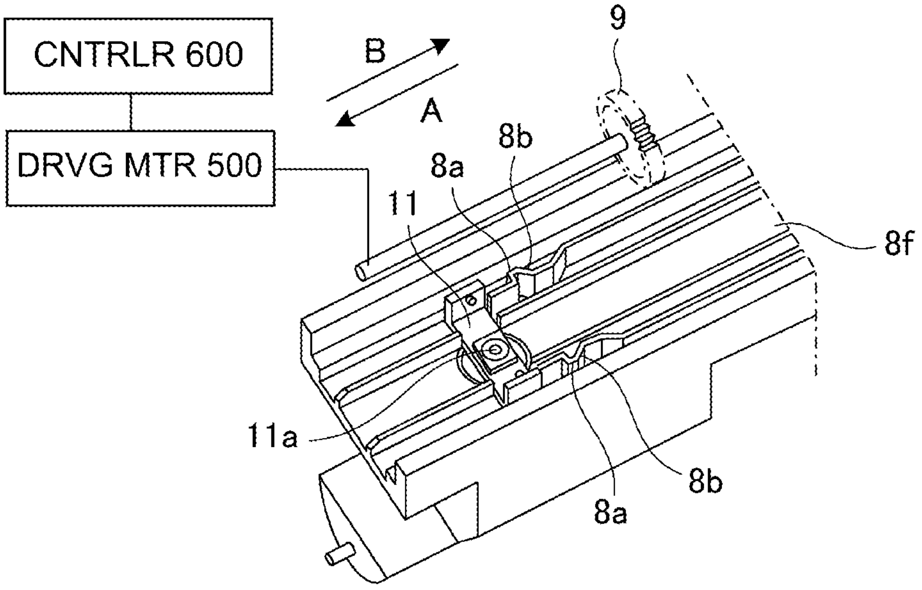
Figure 4:
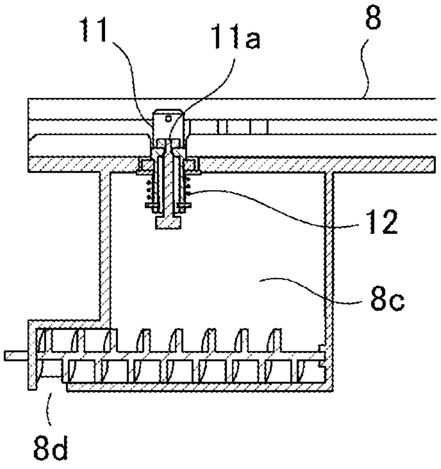
Figure 4:
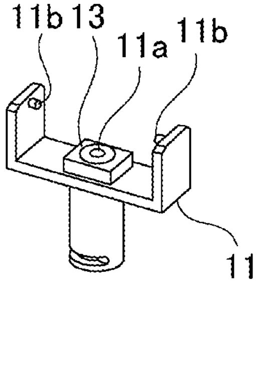

Parts 4 (*a*), (*b*) and (*c*) of FIG. 4 show the developer receiving apparatus, wherein part (a) of FIG. 4 is a partially enlarged perspective view thereof, part (b) of FIG. 4 is a partially enlarged sectional view thereof, and part (c) of FIG. 4 is a perspective view of the developer receiving portion.

Figure 5:
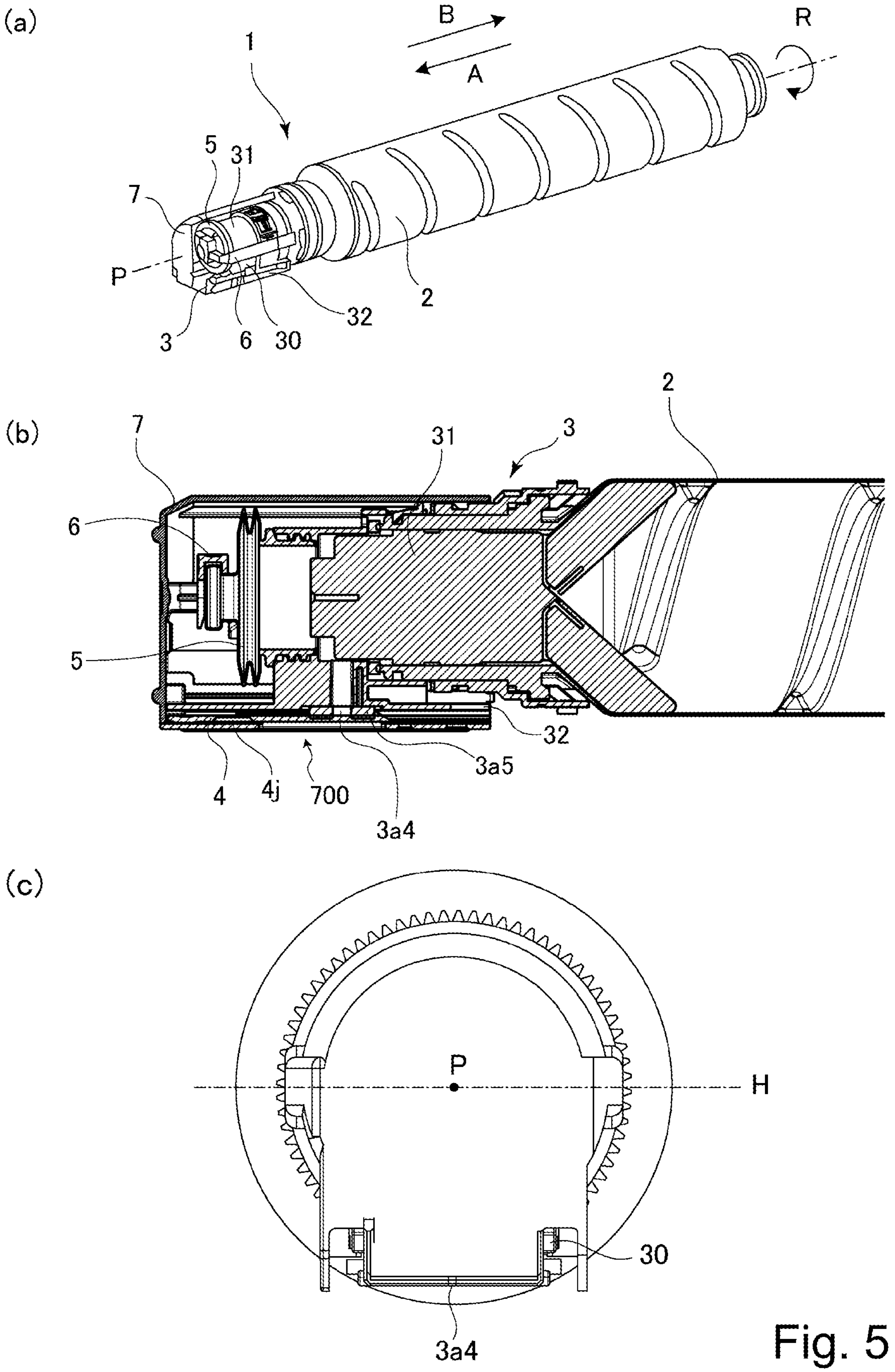

Parts (a), (b) and (c) of FIG. 5 show a supply container of Embodiment 1, in which (a) is a perspective view, (b) is a partially enlarged sectional view, (c) is a front view as seen from a downstream side in a mounting direction.

Figure 6:
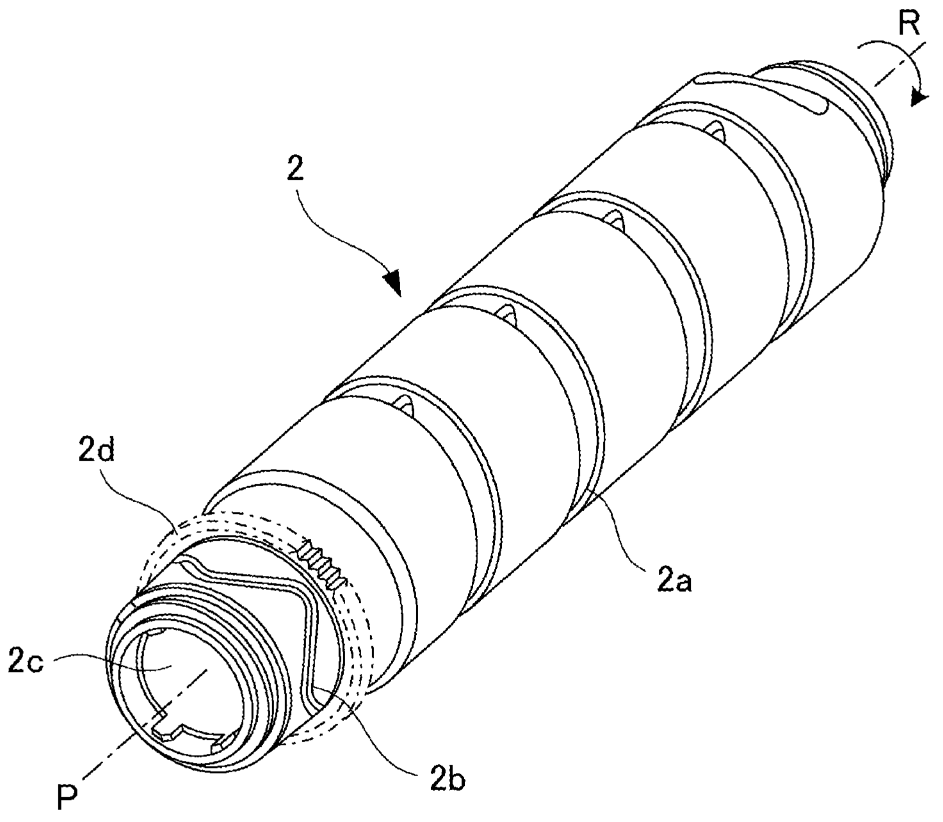

FIG. 6 is a perspective view illustrating a container body.

Figure 7:
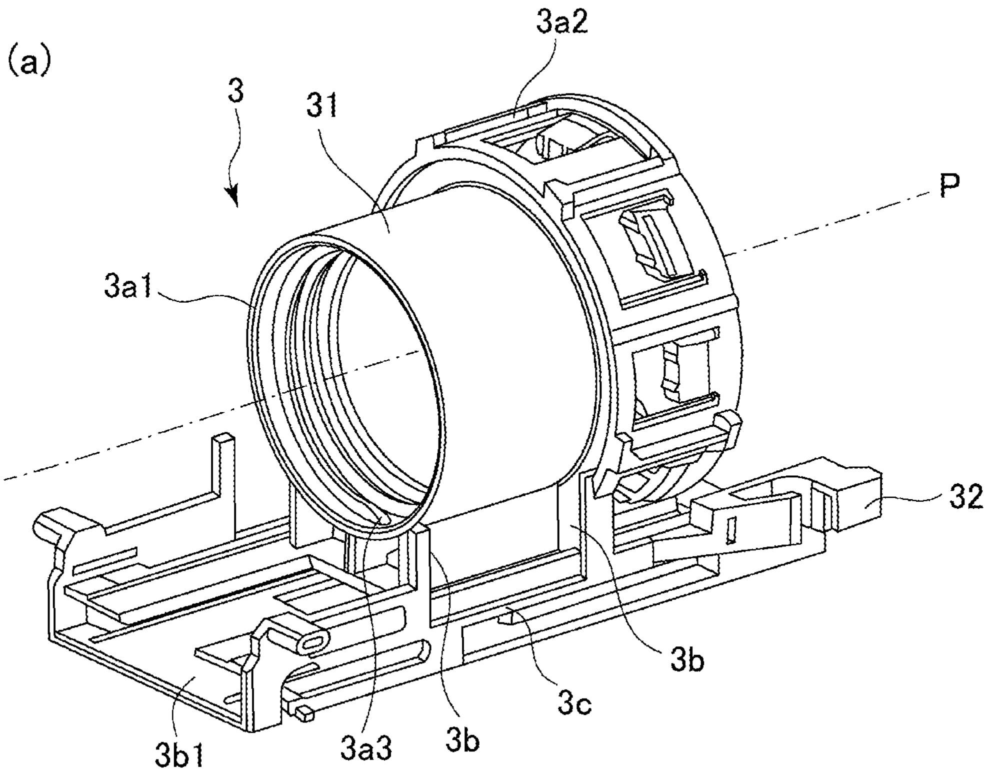
Figure 7:
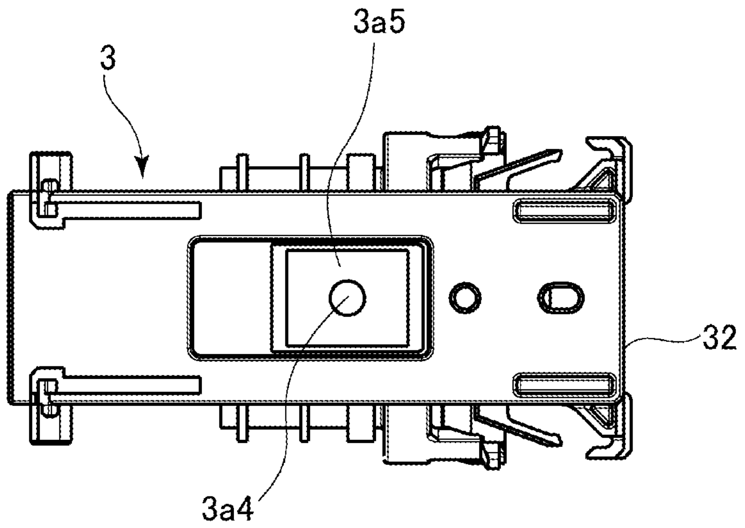

Parts (a) and (b) of FIG. 7 show the flange portion in Embodiment 1, in which (a) is a perspective view and (b) is a bottom view.

Figure 8:
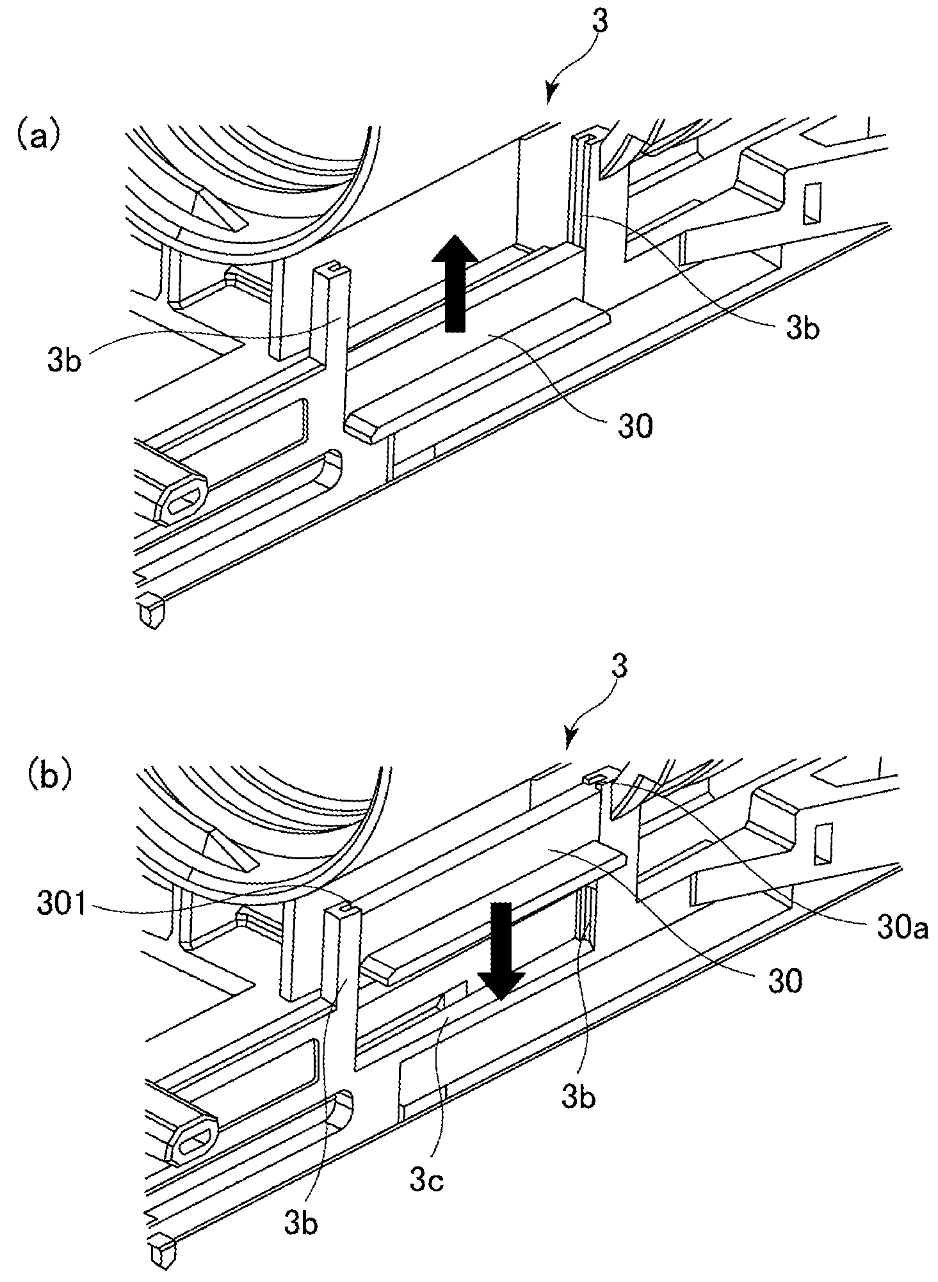

Parts (a) and (b) of FIG. 8 are partially enlarged perspective views of the flange portion in Embodiment 1, in which (a) shows a state at the beginning of mounting, and (b) shows the state at the completion of mounting.

Figure 9:
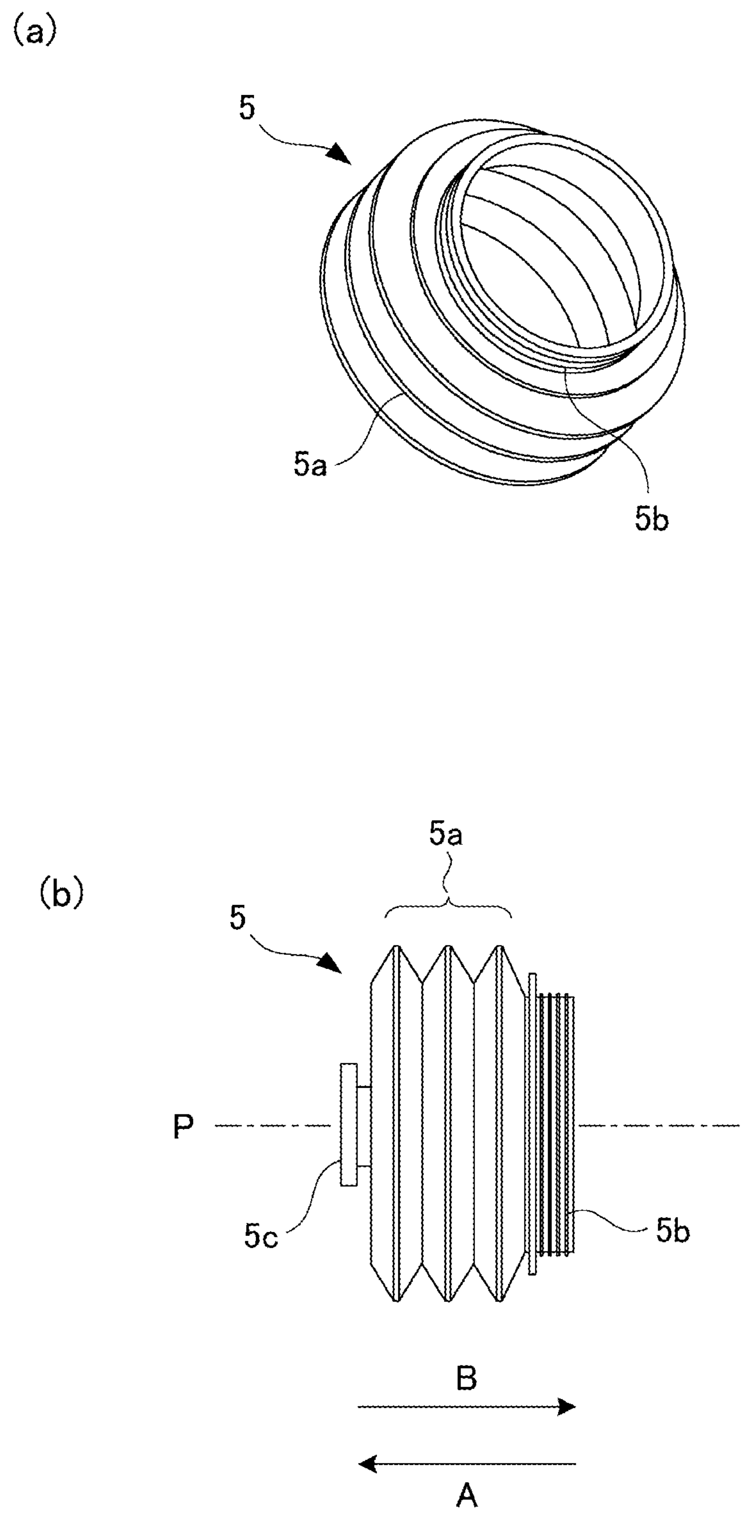

Parts (a) and (b) of FIG. 9 show a pump section, in which (a) is a perspective view, and (b) is a side view.

Figure 10:
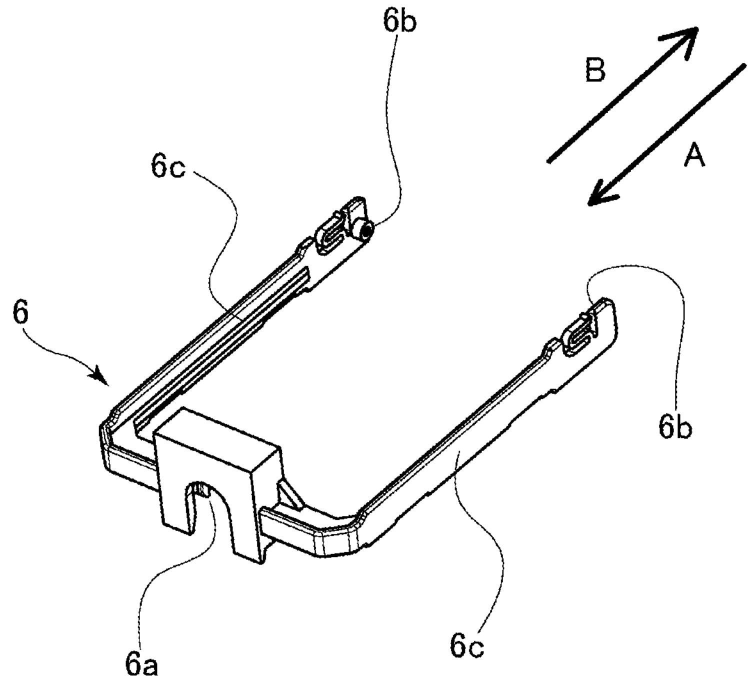
Figure 10:
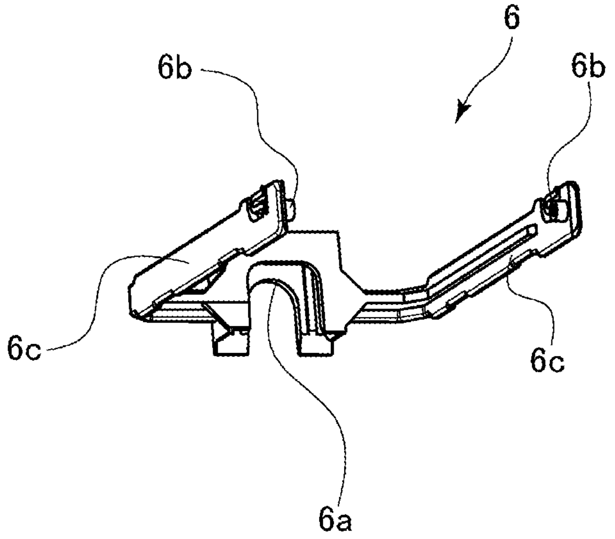

Parts (a) and (b) of FIG. 10 show a reciprocating member, in which (a) is a perspective view, and (b) is a perspective view as seen in a different angle.

Figure 11:
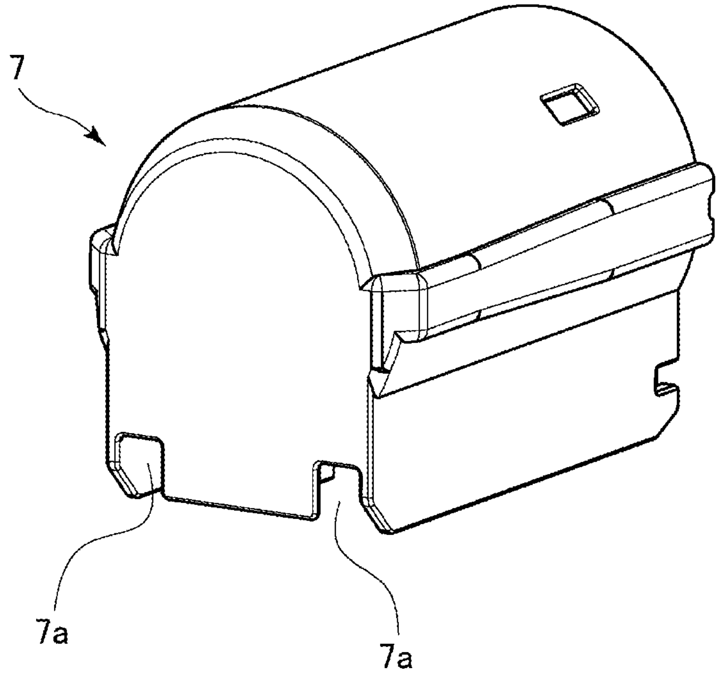
Figure 11:
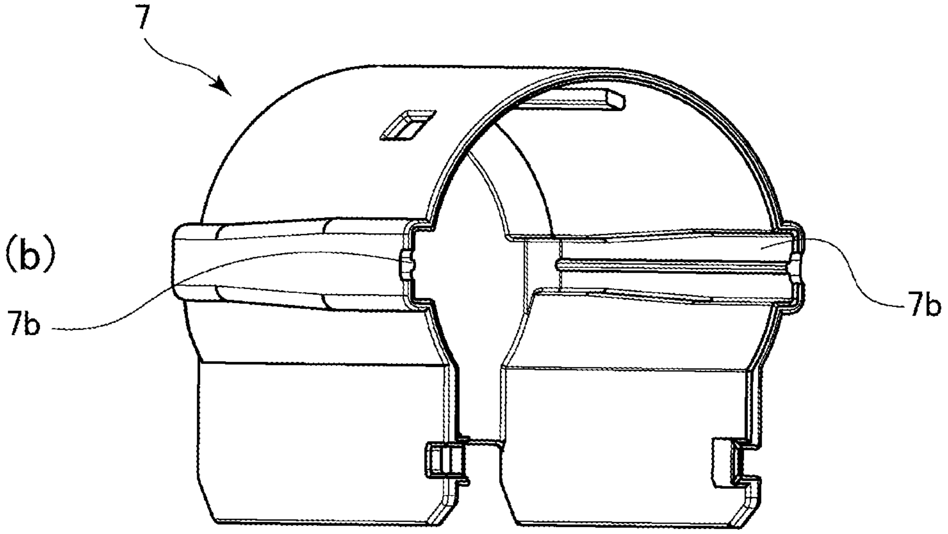

Parts (a) and (b) of FIG. 11 show the cover, in which (a) is a perspective view, and (b) is a perspective view as seen from the opposite side.

Figure 12:
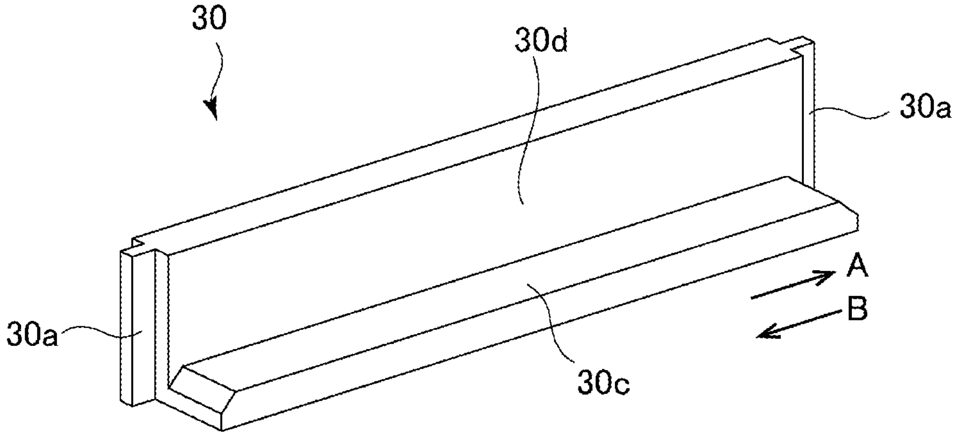
Figure 12:
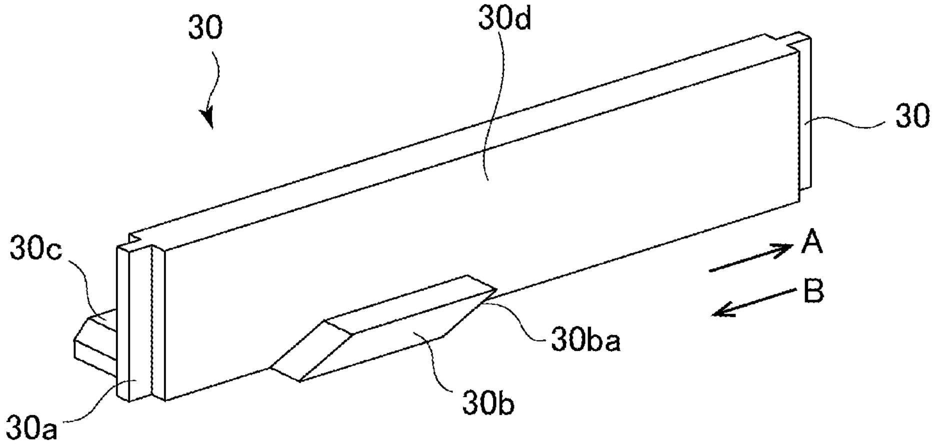

Part (a) and (b) of FIG. 12 show a lift portion in Embodiment 1, in which (a) is a perspective view, and (b) is a perspective view on the opposite side.

Figure 13:
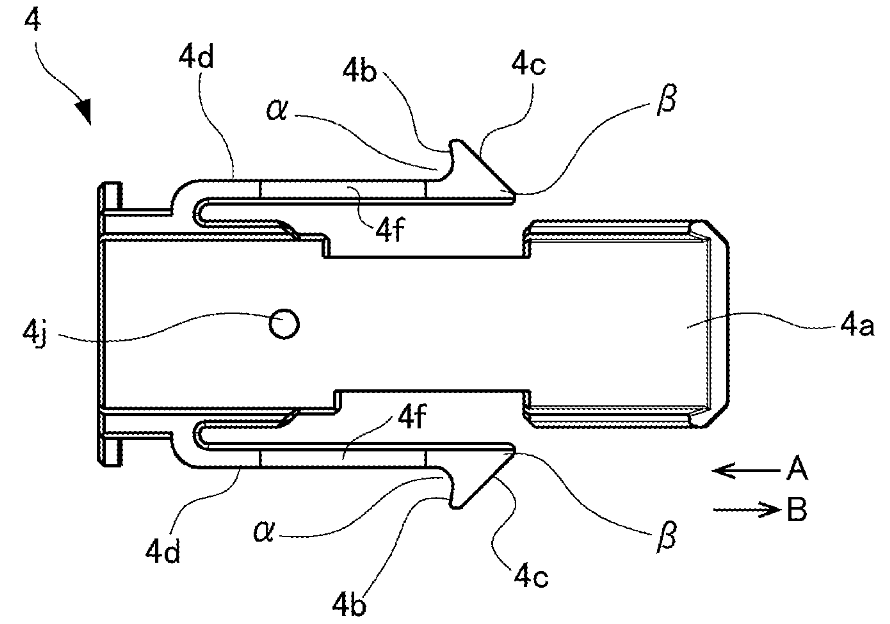
Figure 13:
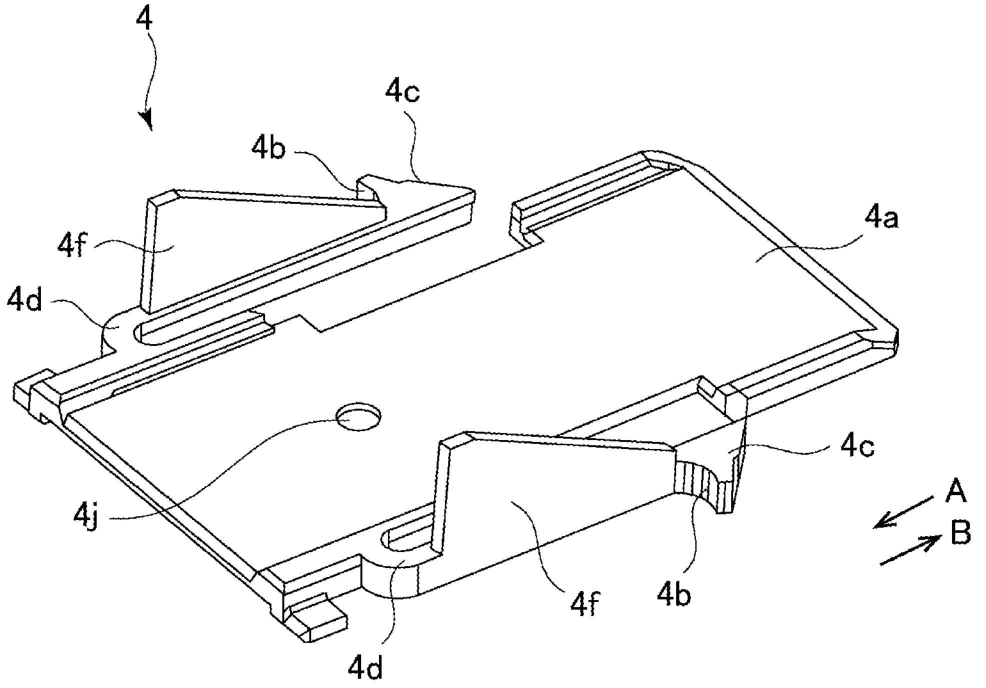

Parts (a) and (b) of FIG. 13 show a shutter in Embodiment 1, in which (a) is a top view, and (b) is a perspective view.

Figure 14:
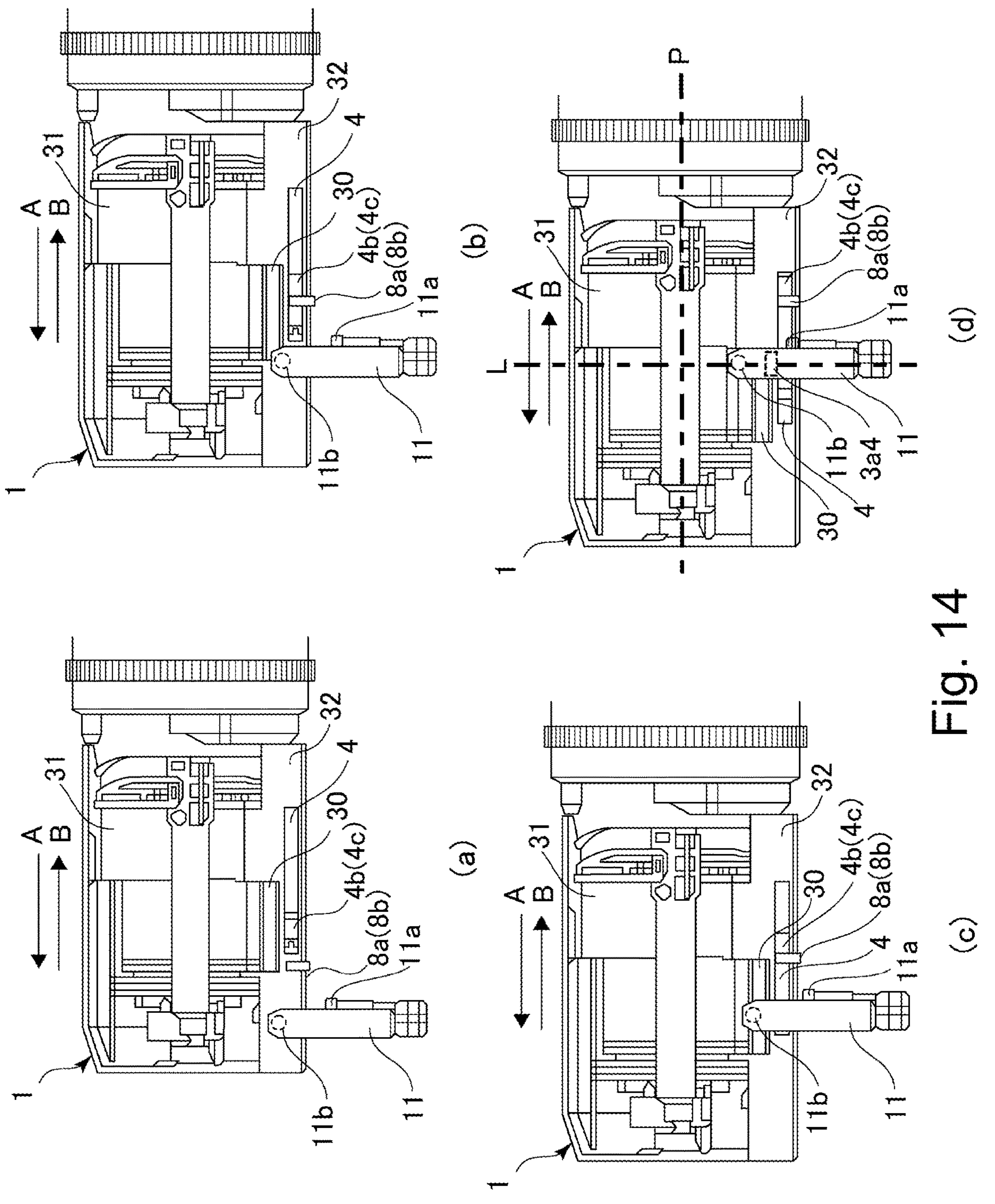

Parts (a), (b), (c) and (d) of FIG. 14 are side views illustrating the operation of the developer receiving portion in accordance with the mounting operation of the supply container, in which (a) shows a state at the beginning of the mounting, (b) shows the state after start of rising, (c) shows the state during the rising, and (d) shows a state when the mounting is completed.

Figure 15:
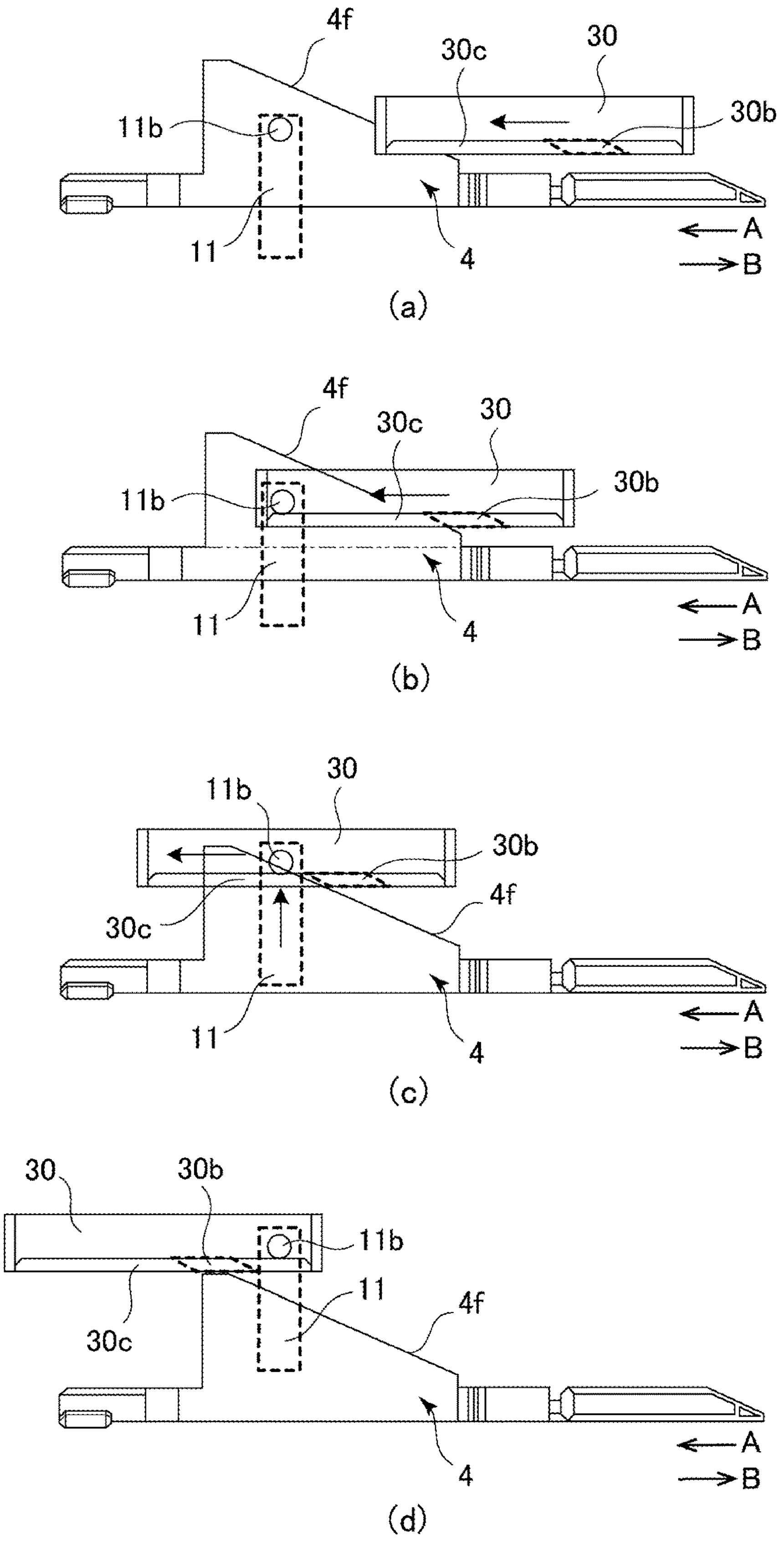

Parts (a), (b), (c) and (d) of FIG. 15 are schematic views illustrating the operation of the lift portion in Embodiment 1, in which (a) shows a state at the start of mounting, (b) a state at the beginning of the rising, (c) shows a step during the rising, and (d) shows a state when the mounting is completed.

Figure 16:
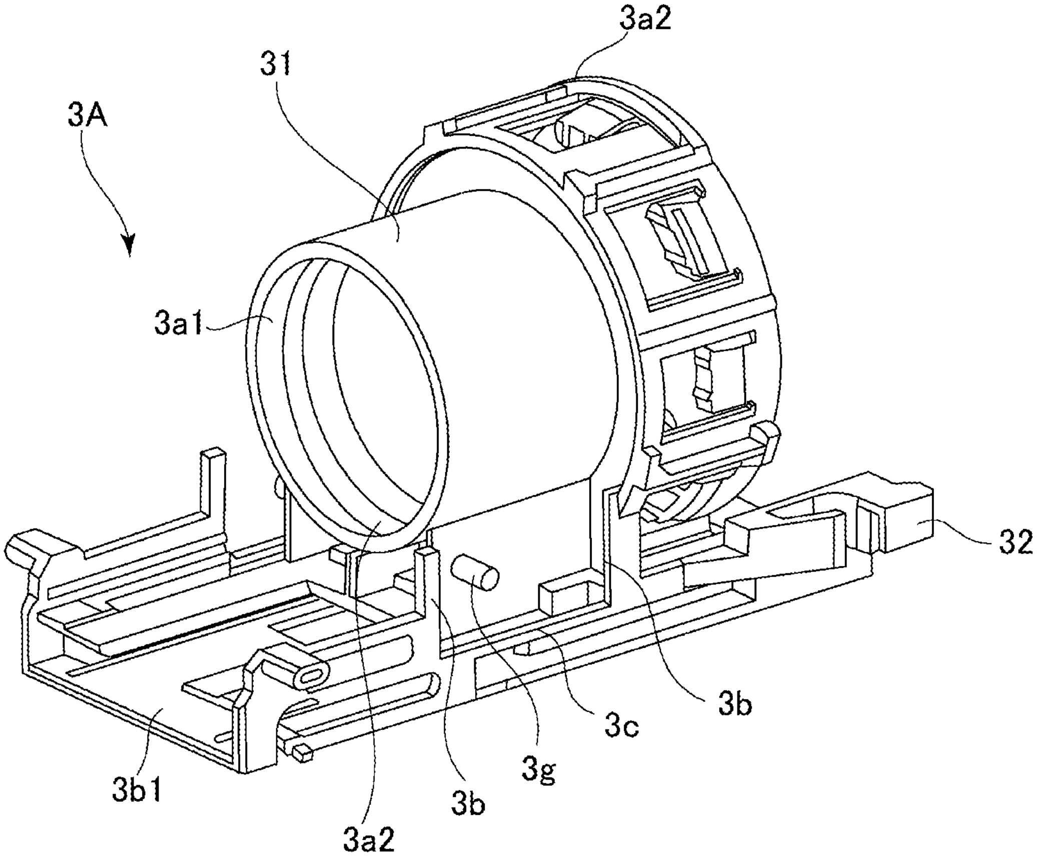

FIG. 16 is a perspective view illustrating a flange portion of Embodiment 2.

Figure 17:
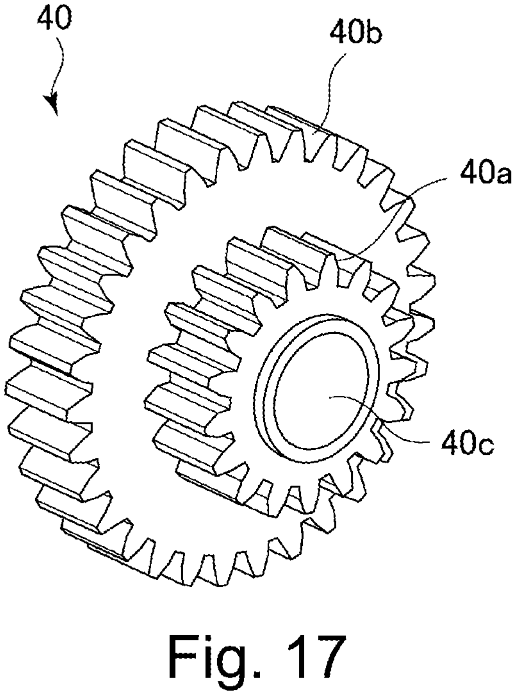

FIG. 17 is a perspective view illustrating a pinion gear.

Figure 18:
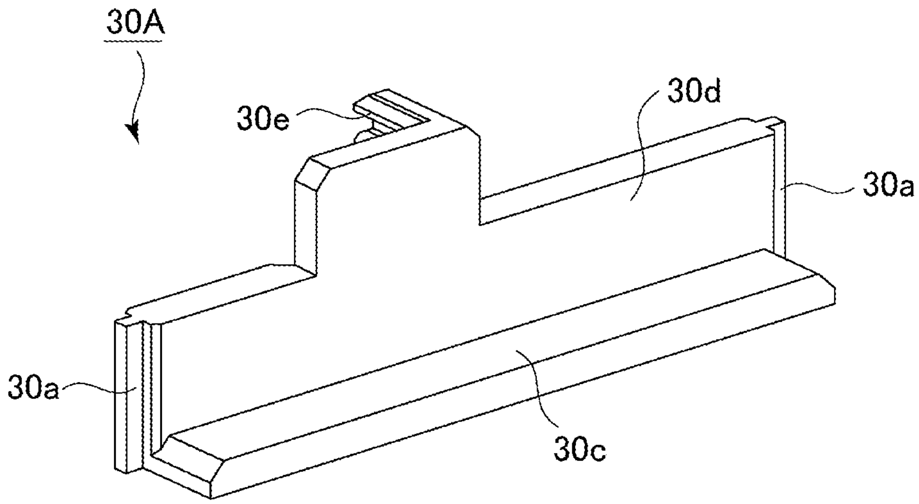
Figure 18:
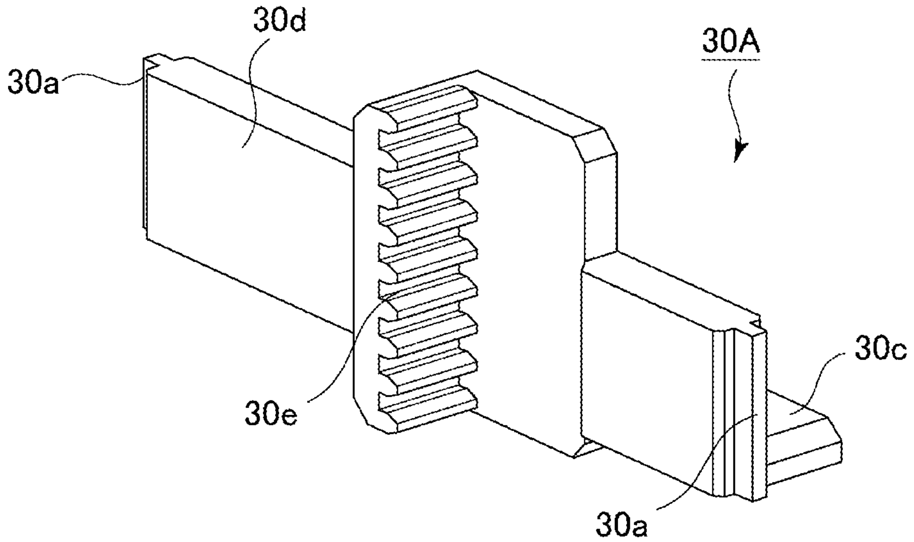

Part (a) and (b) of FIG. 18 show the lift portion in Embodiment 2, in which (a) is a perspective view, and (b) is a perspective view on the opposite side.

Figure 19:
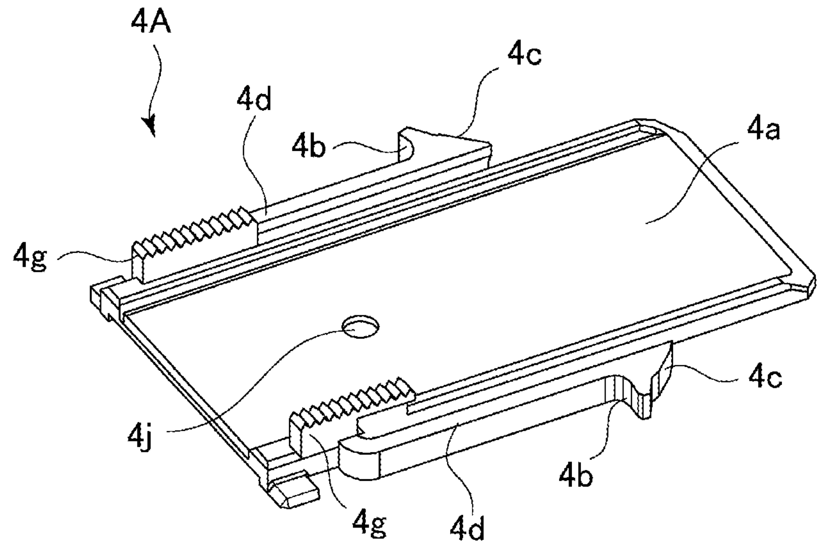

FIG. 19 is a perspective view illustrating a shutter in Embodiment 2.

Figure 20:
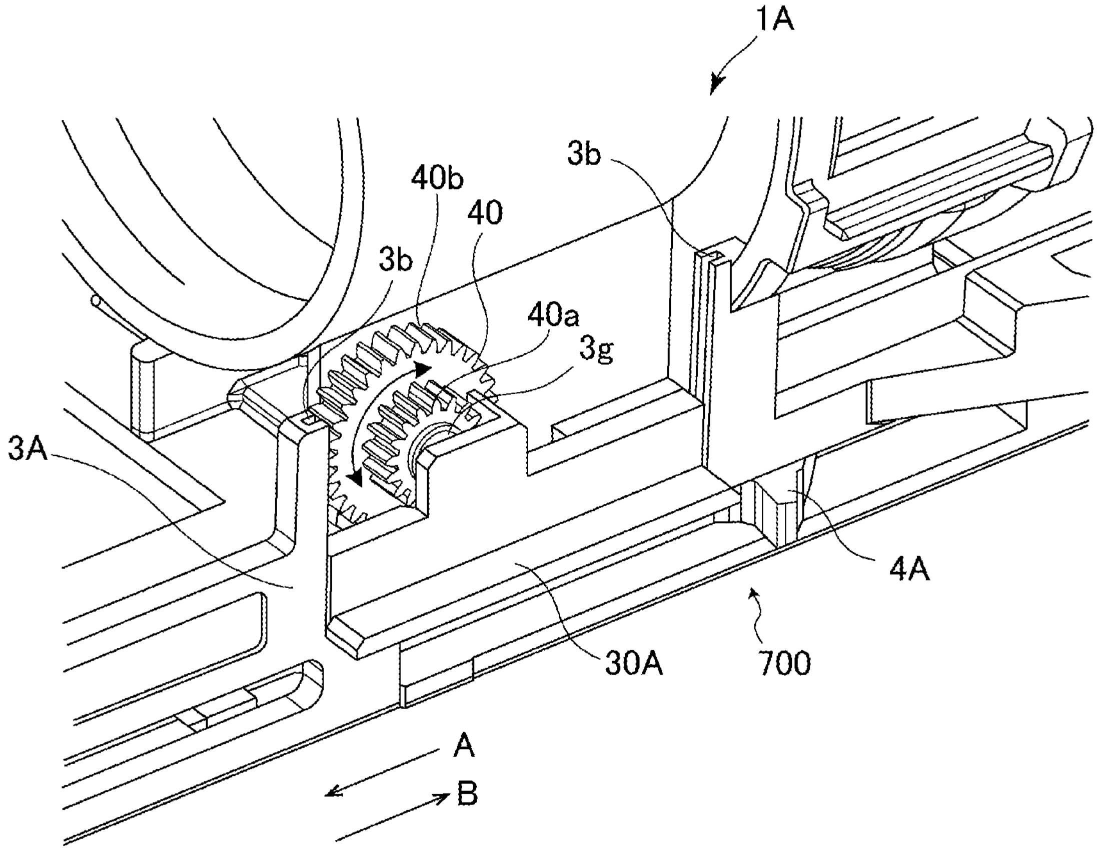

FIG. 20 is a partially enlarged perspective view of a flange portion of Embodiment 2.

Figure 21:
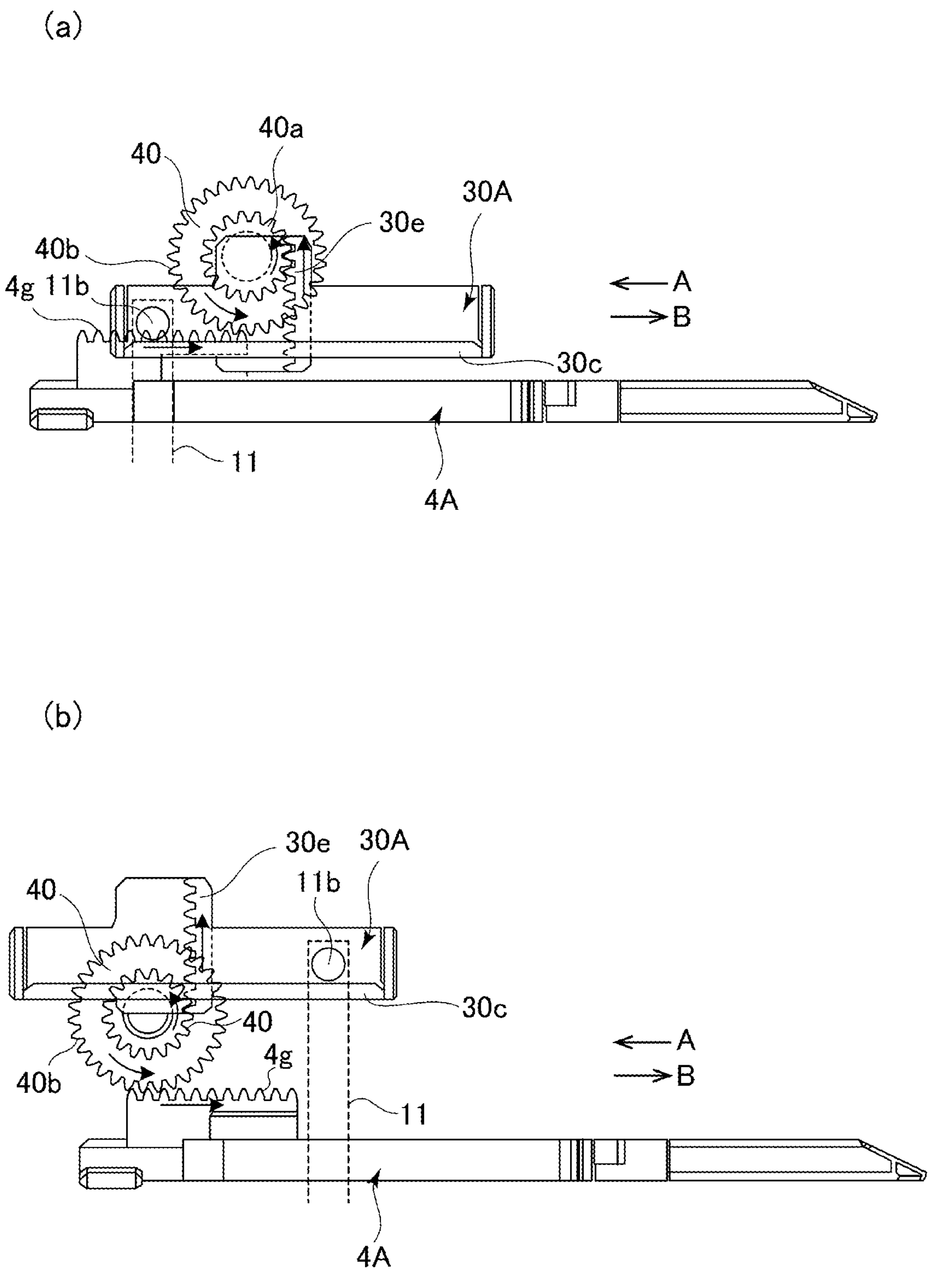

Parts (a) and (b) of FIG. 21 are schematic views illustrating the operation of the lift portion in Embodiment 2, in which (a) shows a state at the beginning of rising, and (b) shows a state when the mounting is completed.

Figure 22:
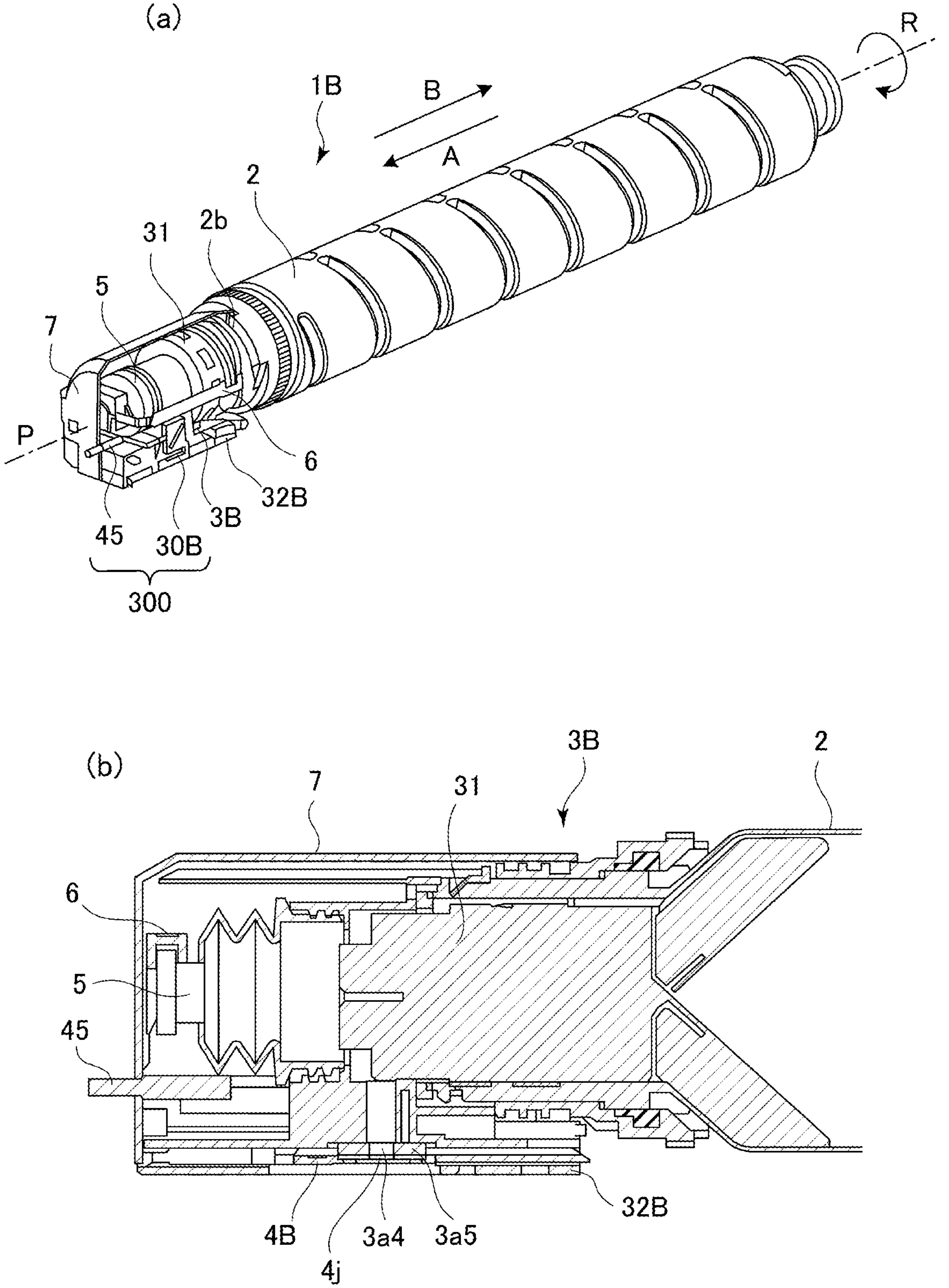

Parts (a) and (b) of FIG. 22 show the supply container in Embodiment 3, in which (a) is a perspective view, and (b) is a partially enlarged sectional view.

Figure 23:
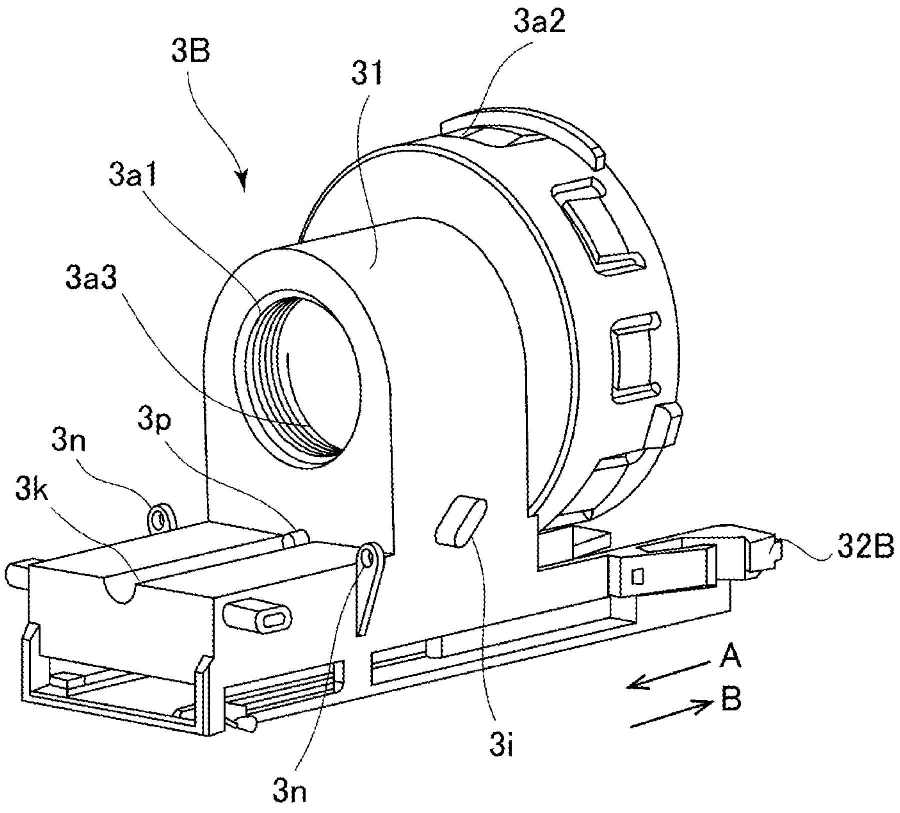

FIG. 23 is a perspective view illustrating a flange portion In Embodiment 3.

Figure 24:
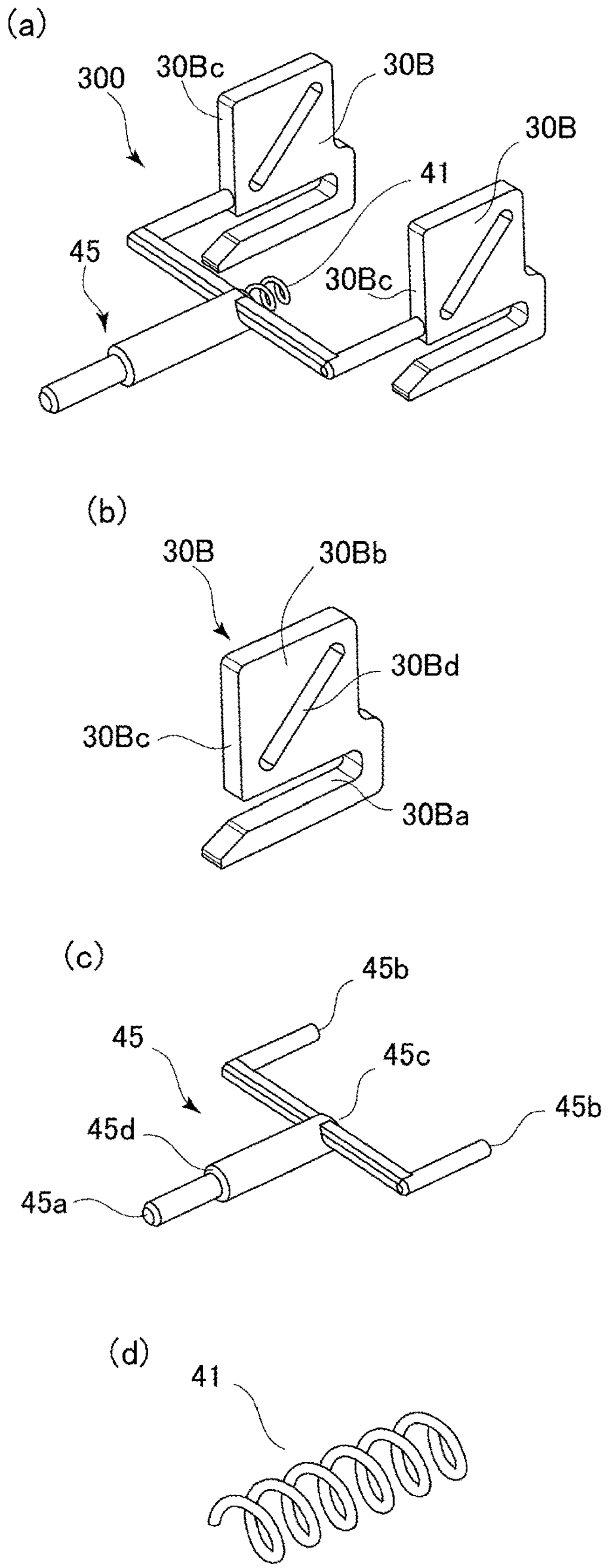

Part (a), (b), (c) and (d) of FIG. 24 show a lift unit portion in Embodiment 3, image (a) is an overall perspective view, (b) shows a lift portion, (c) shows a lifting operation arm, and (d) shows an urging member.

Figure 25:
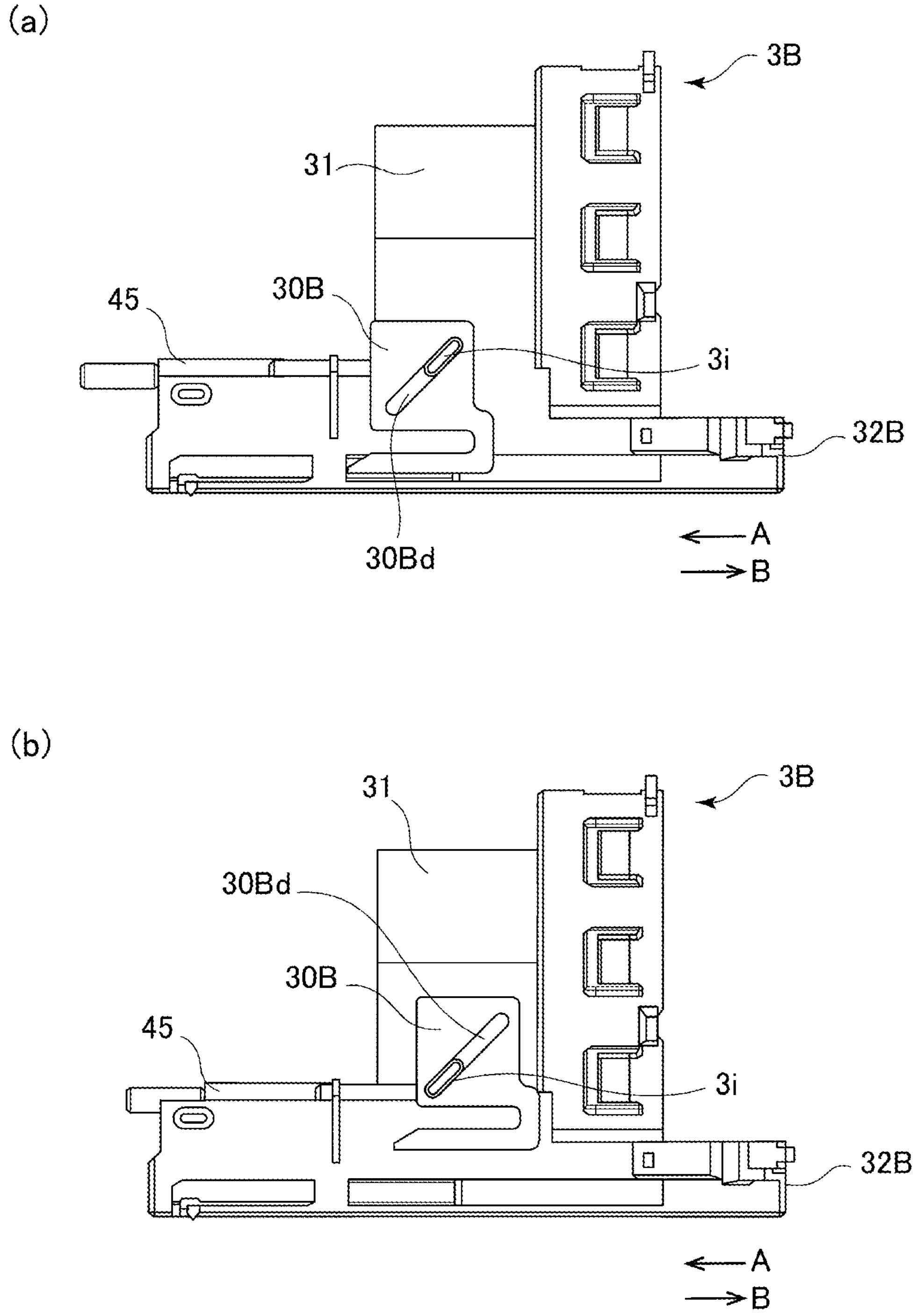

Part (a) and (b) of FIG. 25 are partial enlarged side views of a flange portion of Embodiment 3, in which (a) shows a state at the time of starting mounting, and (b) shows a state at the time of mounting completion.

Figure 26:
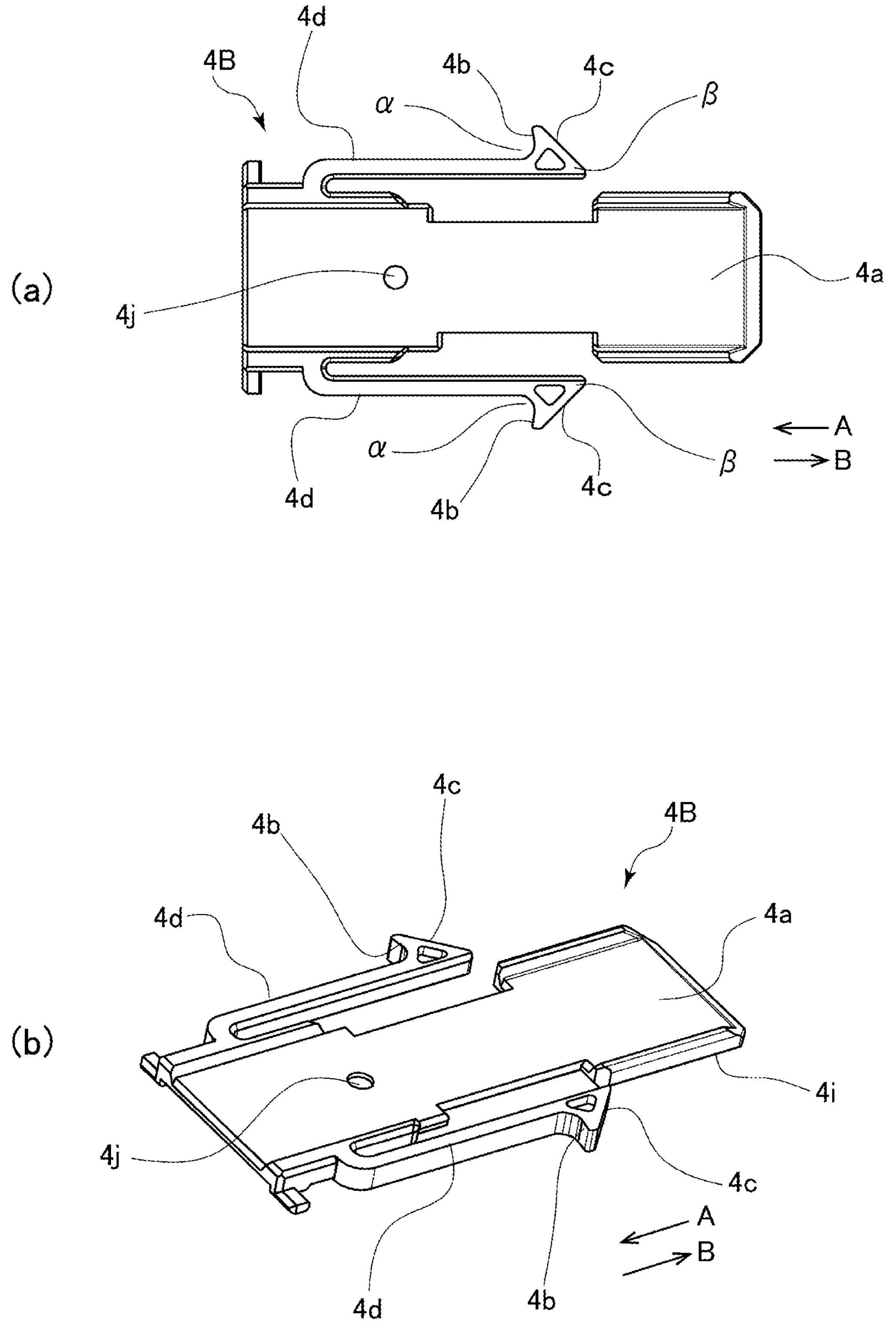

Part (a) and (b) of FIG. 26 show a shutter sound of Embodiment 3, in which (a) is a top plan view and (b) is a perspective view.

Figure 27:
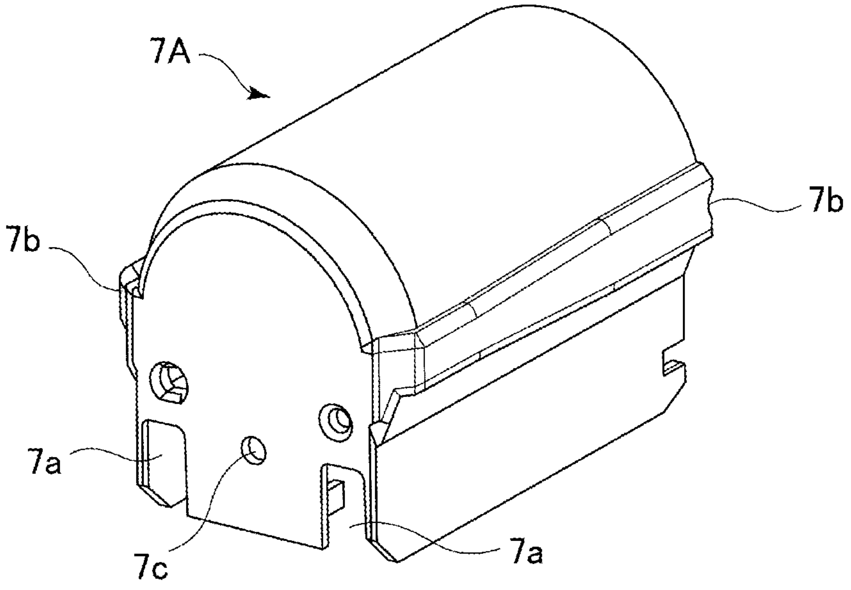

FIG. 27 is a perspective view illustrating a cover of Embodiment 3.

Figure 28:
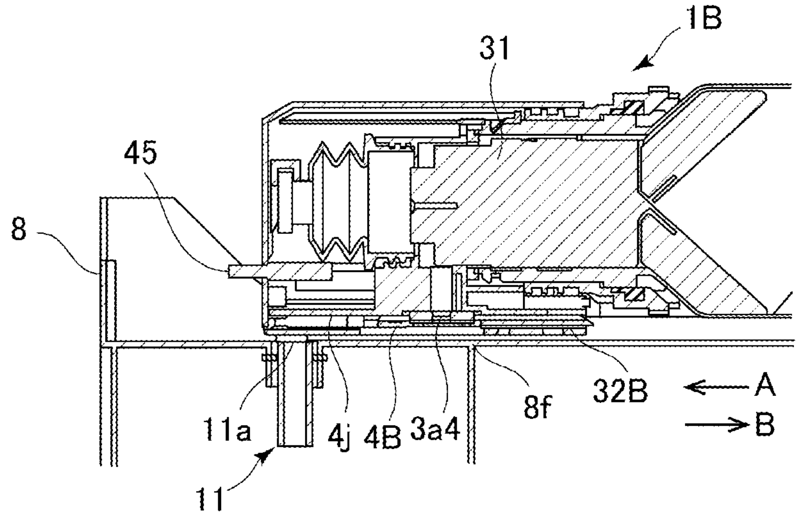
Figure 28:
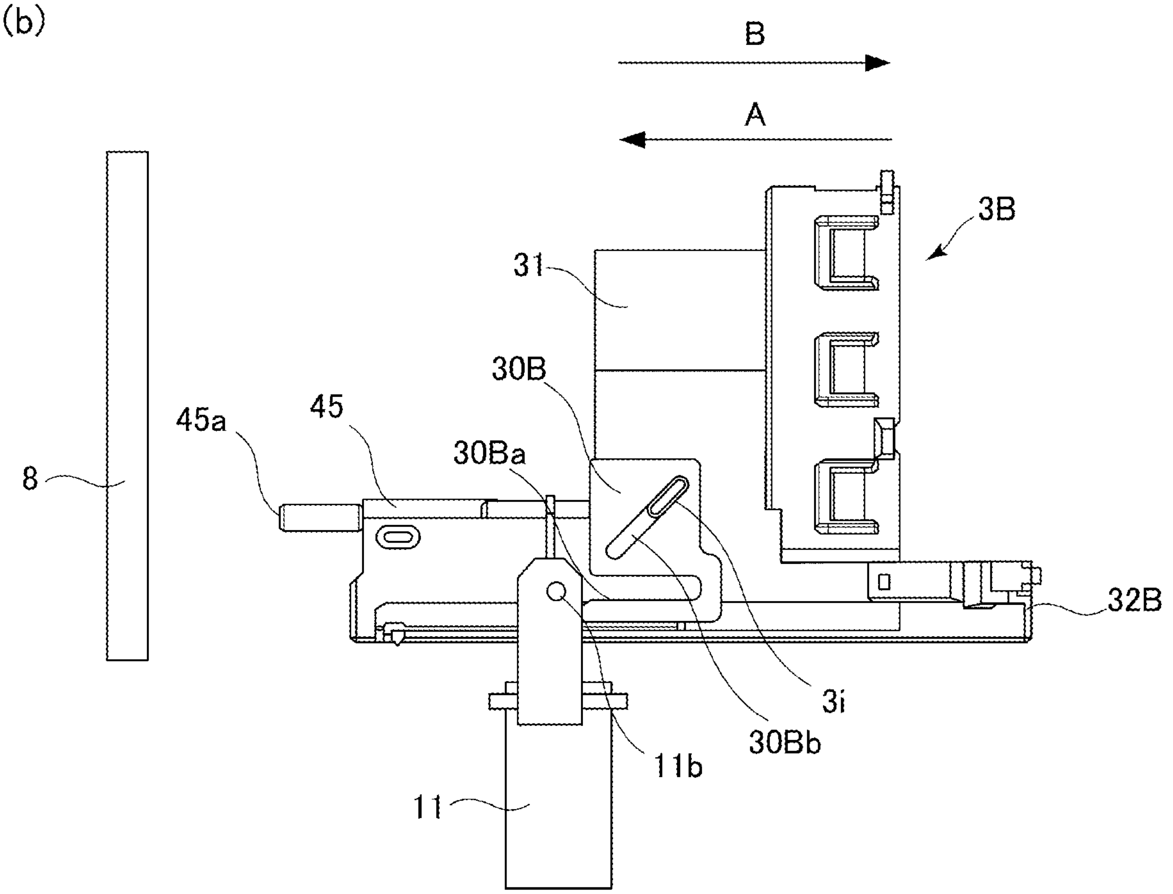

Parts (a) and (b) of FIG. 28 show the state at the time of starting the mounting operation, in which (a) is a sectional view illustrating positions of a supply container and a developer receiving portion, and (b) is a schematic view illustrating the positions of the lift portion and the developer receiving portion.

Figure 29:
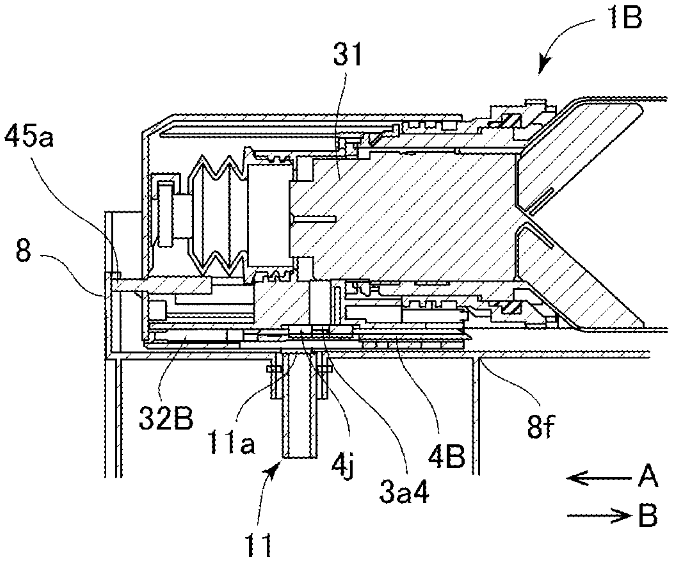
Figure 29:
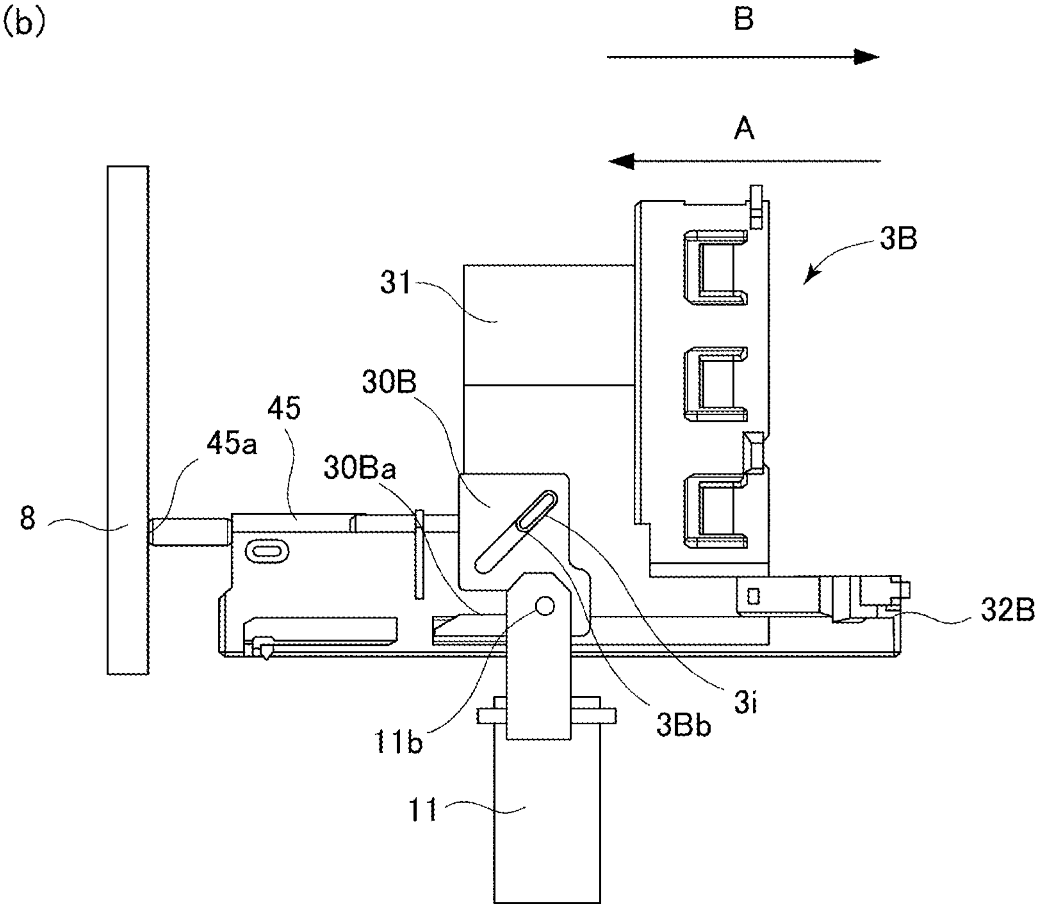

Parts (a) and (b) of FIG. 29 show the state at the start of rising, in which (a) is a sectional view illustrating positions of a supply container and a developer receiving portion, and (b) is a schematic view illustrating the relationship between the lift portion and the developer receiving portion.

Figure 30:
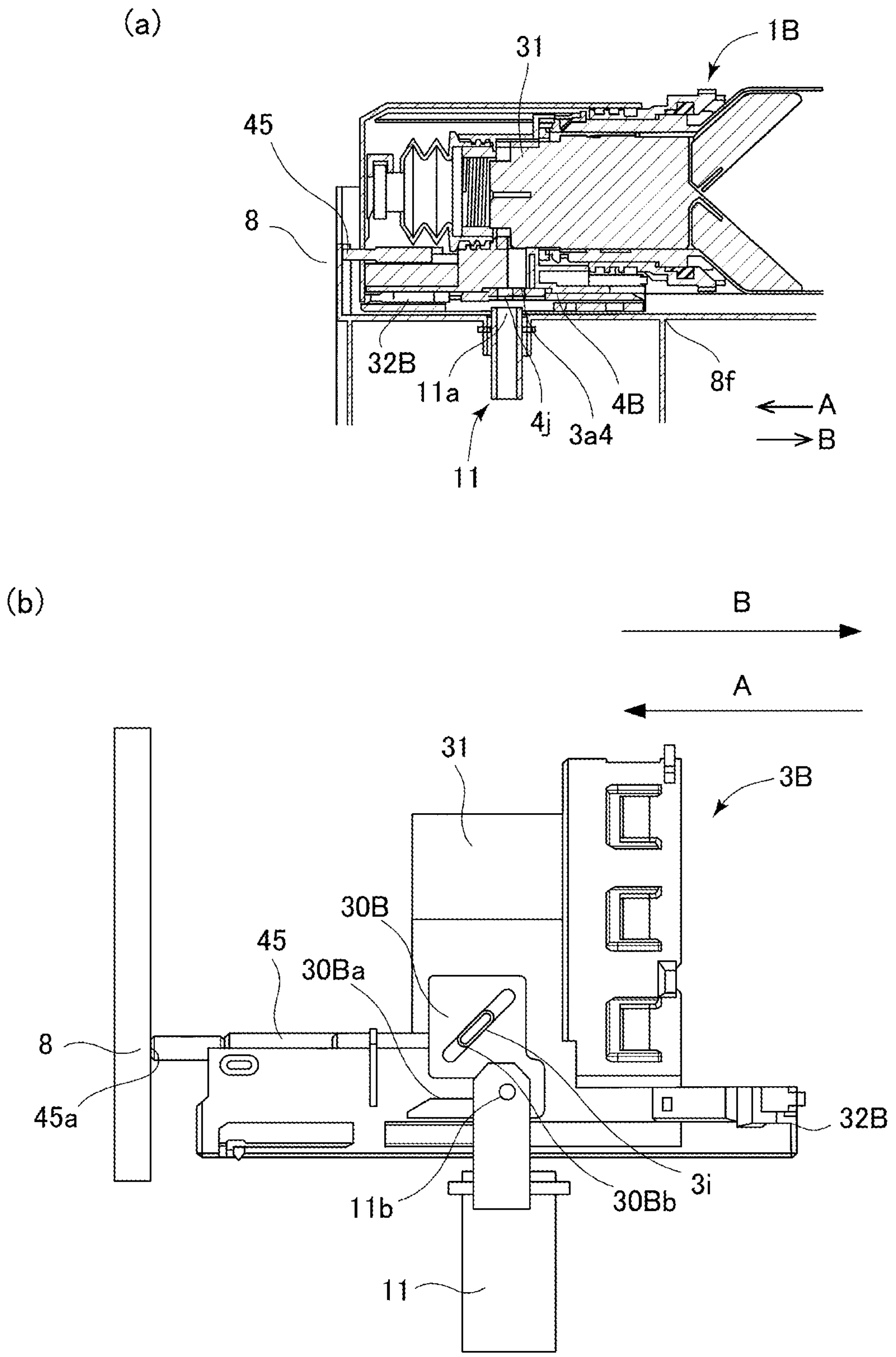

Parts (a) and (b) of FIG. 30 show a state in the middle of rising, and (a) is a sectional view illustrating positions of a supply container and a developer receiving portion, and (b) is a schematic view illustrating the relationship between the lift portion and the developer receiving portion.

Figure 31:
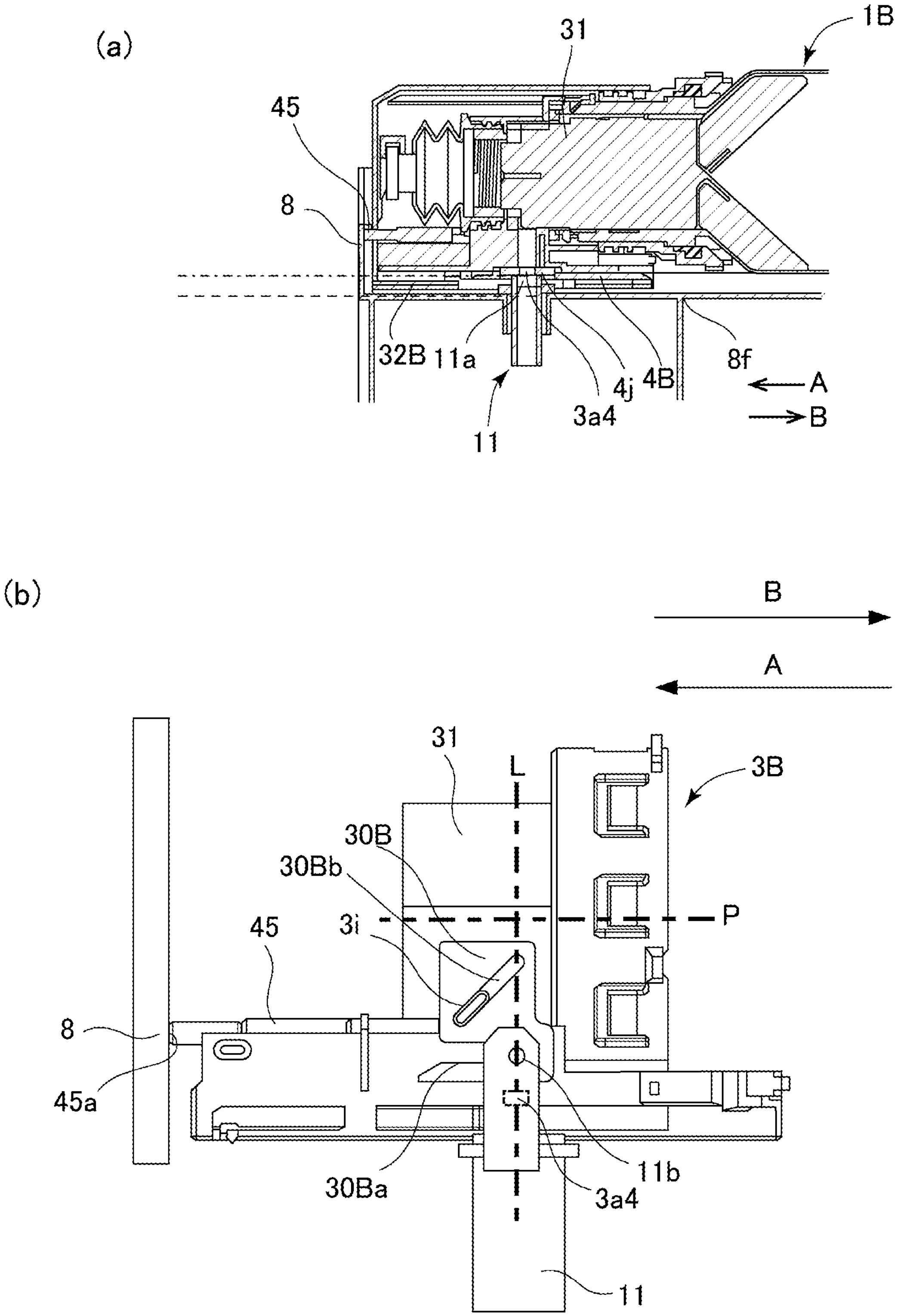

Parts (a) and (b) of FIG. 31 show a state at the time of completion of mounting, in which (a) is a sectional view illustrating positions of a supply container and a developer receiving portion, and (b) is a schematic view illustrating a positions of the lift portion and the developer receiving portion.

Figure 32:
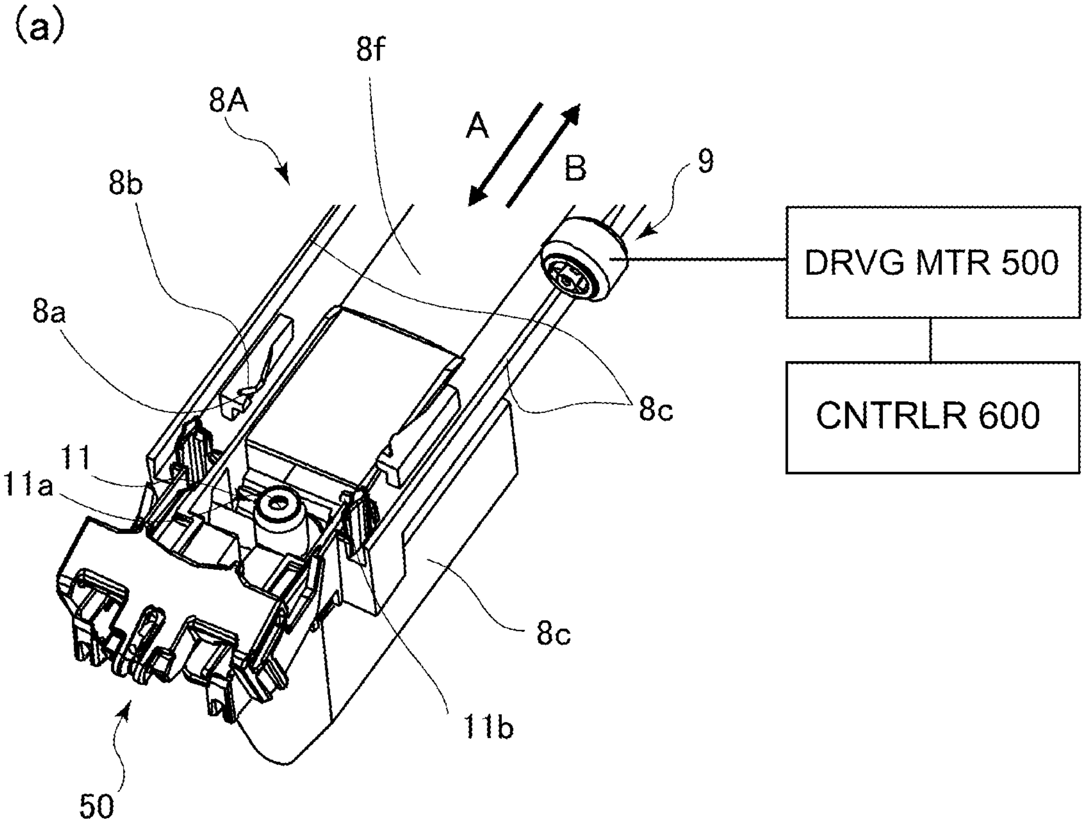
Figure 32:
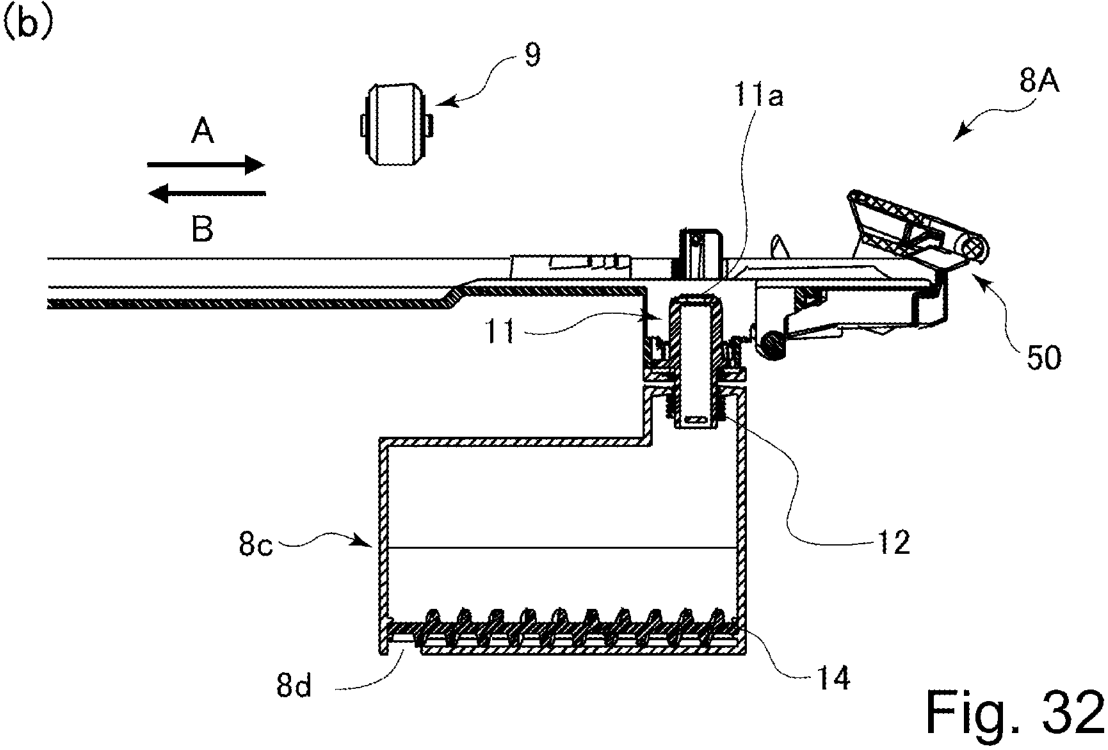

FIG. 32 shows a developer receiving apparatus in Embodiment 4, in which (a) is a partially enlarged perspective view, (b) is a partially enlarged sectional view.

Figure 33:
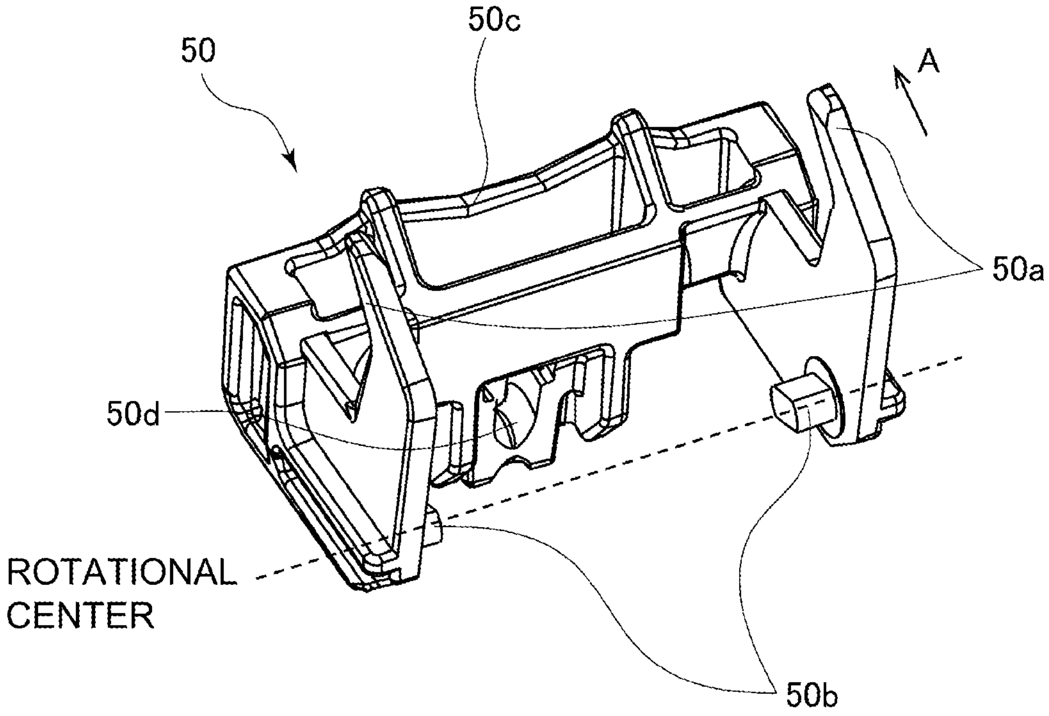

FIG. 33 is a perspective view illustrating a retracting member.

Figure 34:
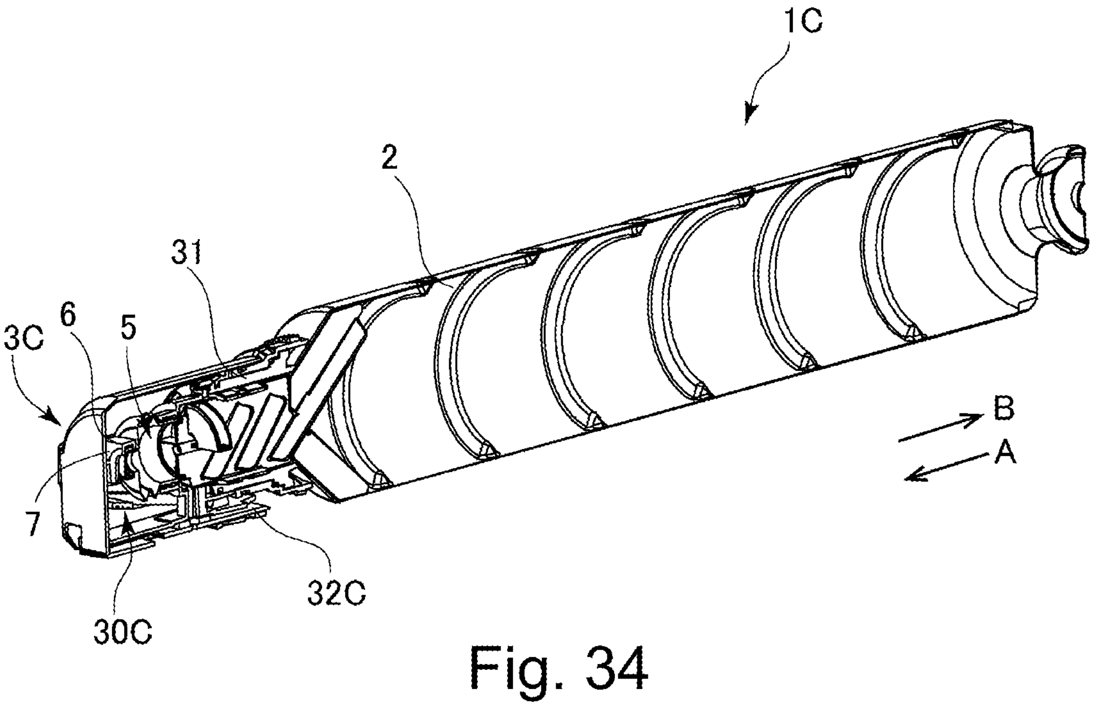

FIG. 34 is a sectional perspective view illustrating a supply container of Embodiment 4.

Figure 35:
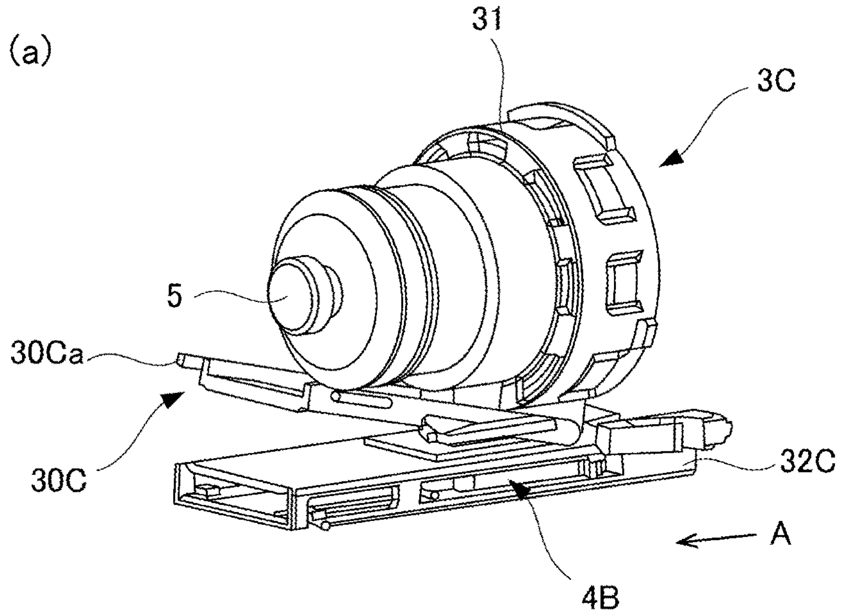
Figure 35:
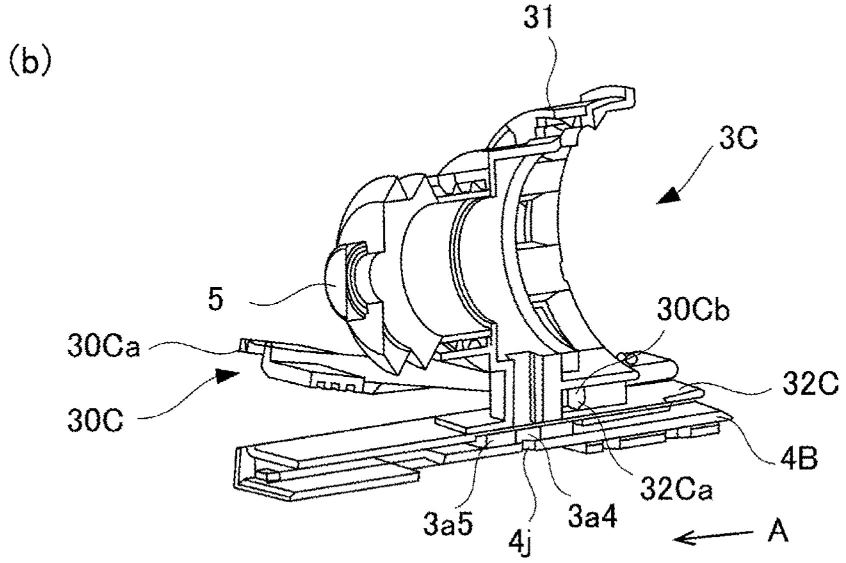
Figure 35:
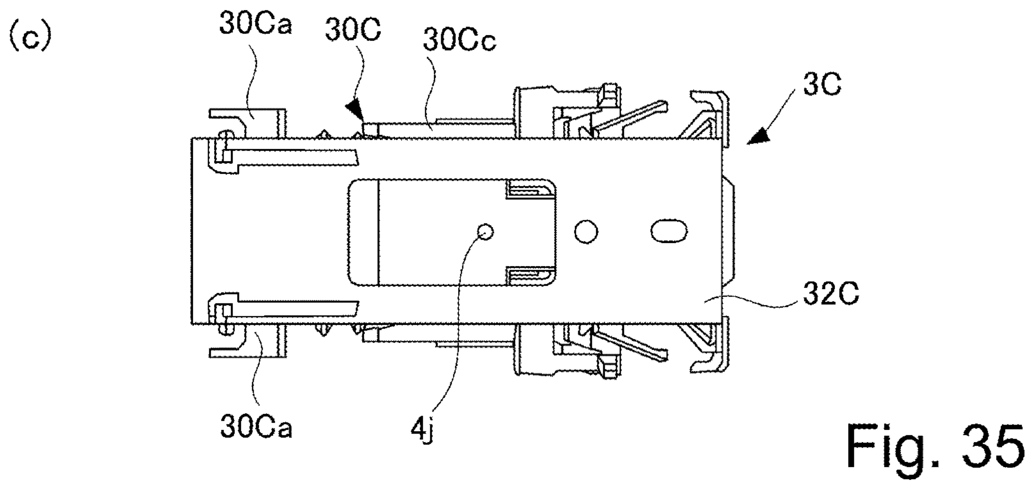

Parts (a), (b) and (c) of FIG. 35 show the flange portion in Embodiment 4, in which (a) is a perspective view thereof, (b) is a cross-sectional perspective view thereof, and (c) is a bottom view thereof.

Figure 36:
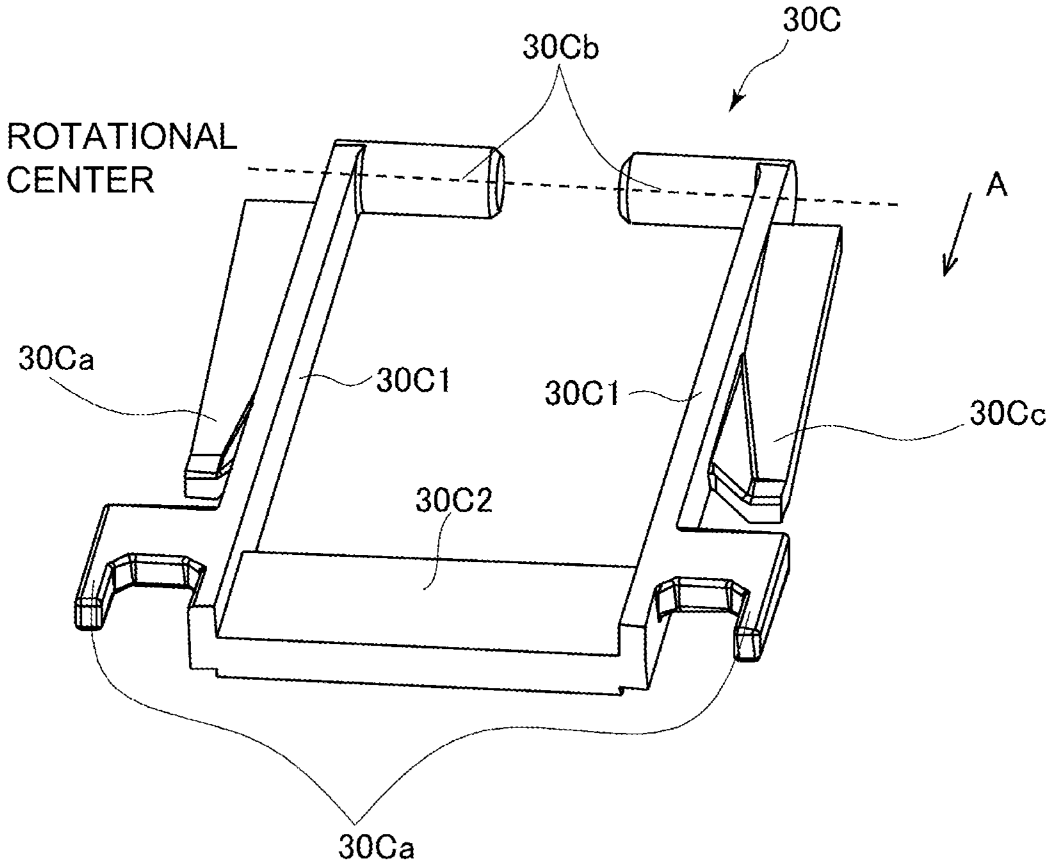
Figure 36:
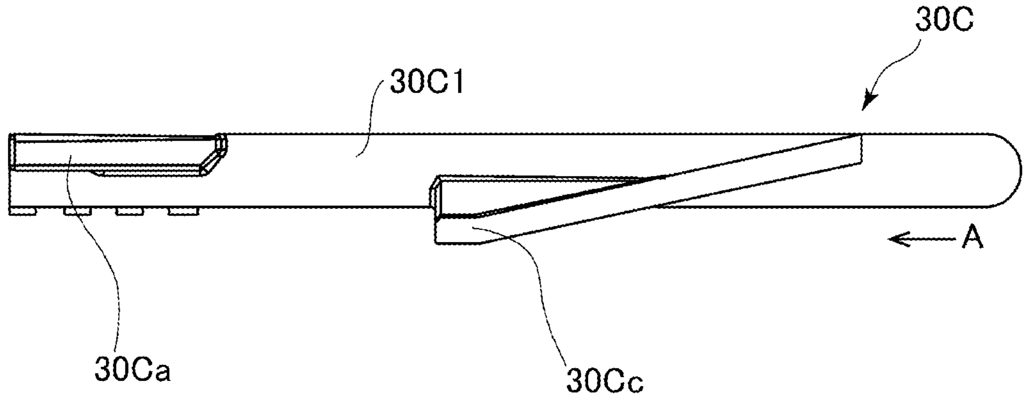

Part (a) and (b) of FIG. 36 show a lift portion in Embodiment 4, in which (a) is a perspective view thereof, and (b) is a side view thereof.

Figure 37:
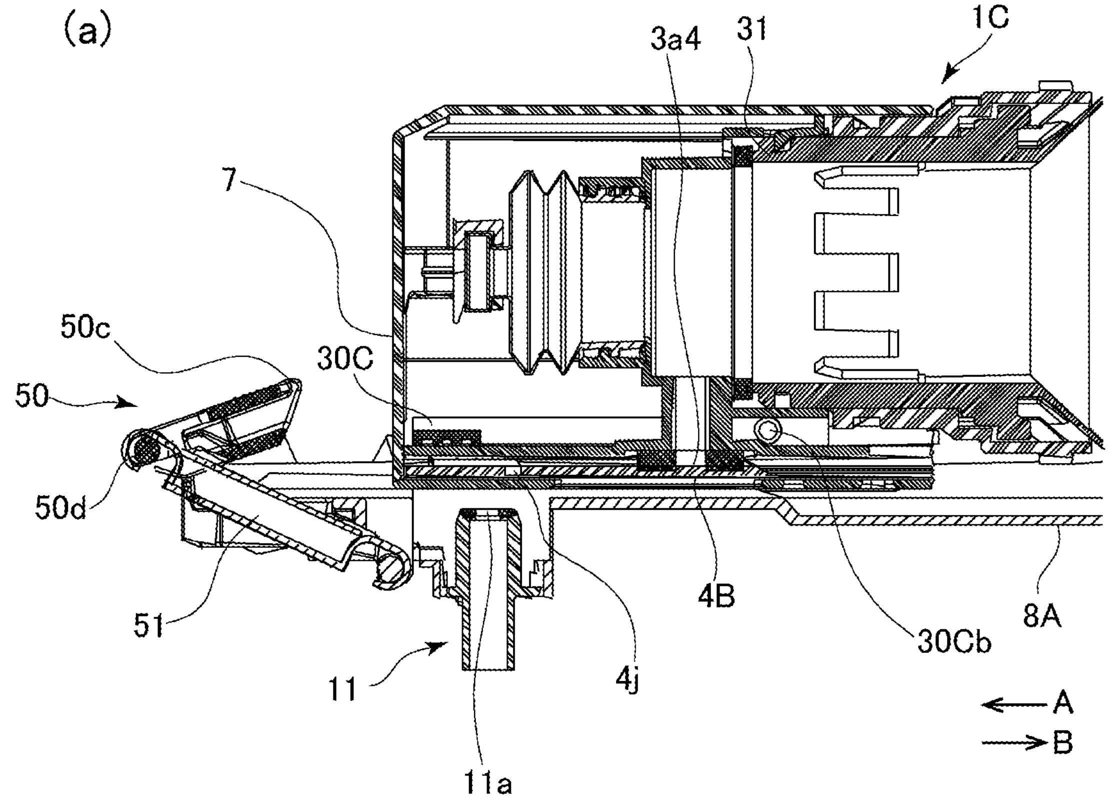
Figure 37:
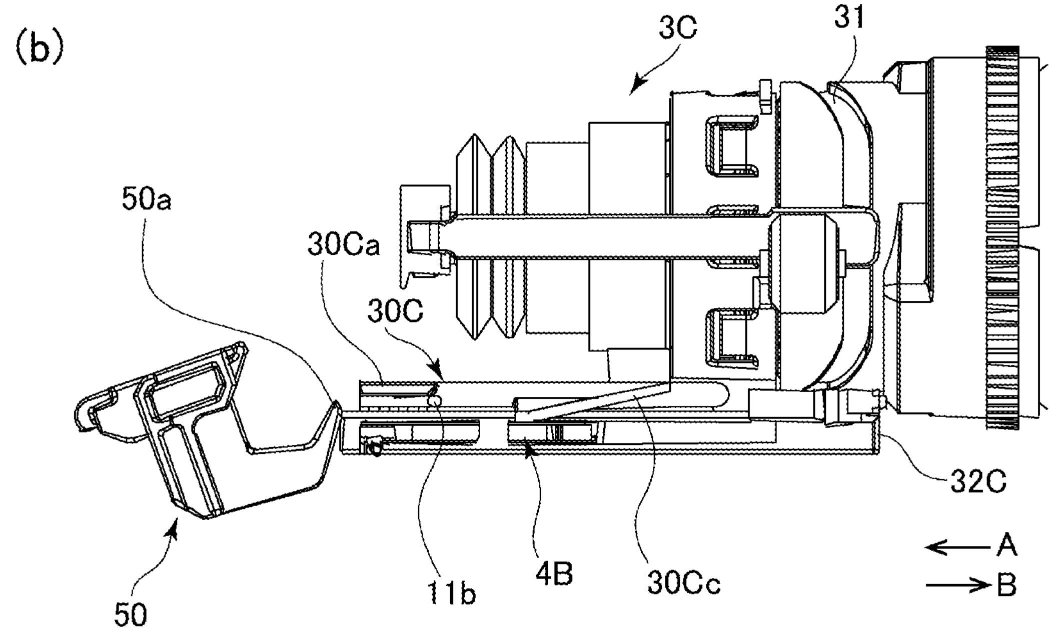

Parts (a) and (b) of FIG. 37 show a state at the time of starting the mounting operation, in which (a) is a sectional view illustrating positions of a supply container and a developer receiving portion, and (b) is a schematic illustration showing positions of the retracting member and the lift portion.

Figure 38:
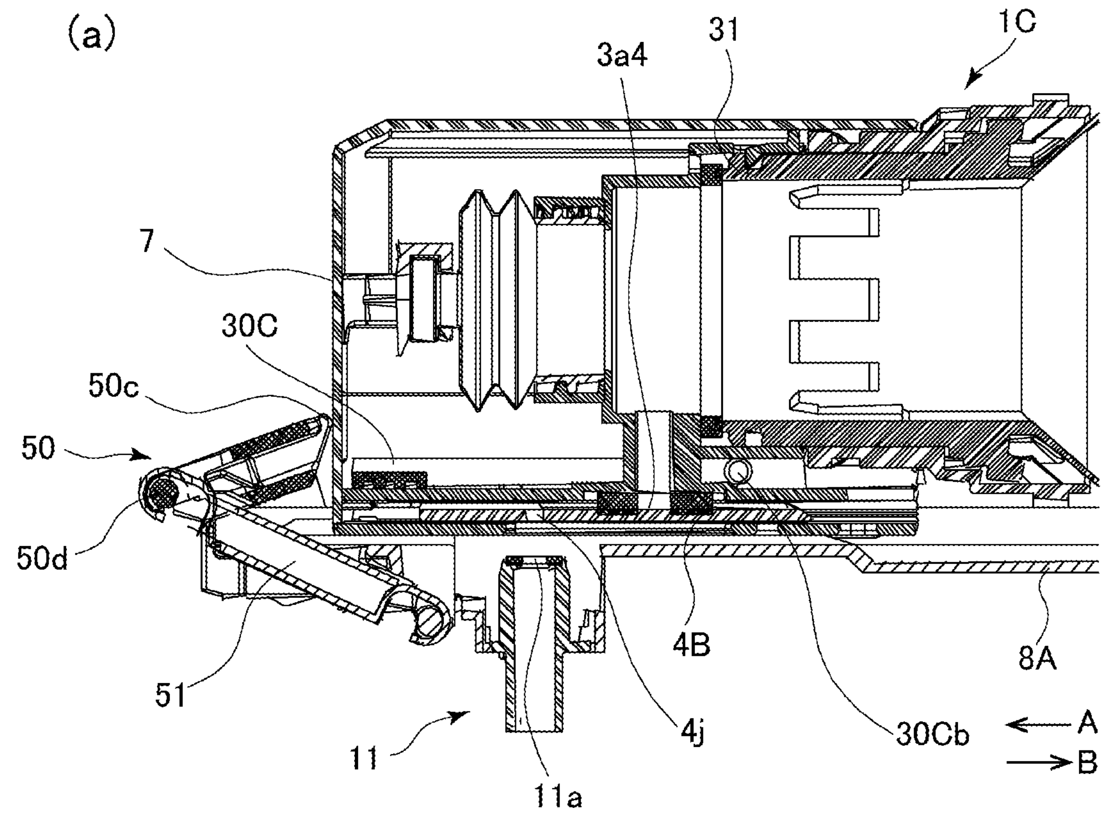
Figure 38:
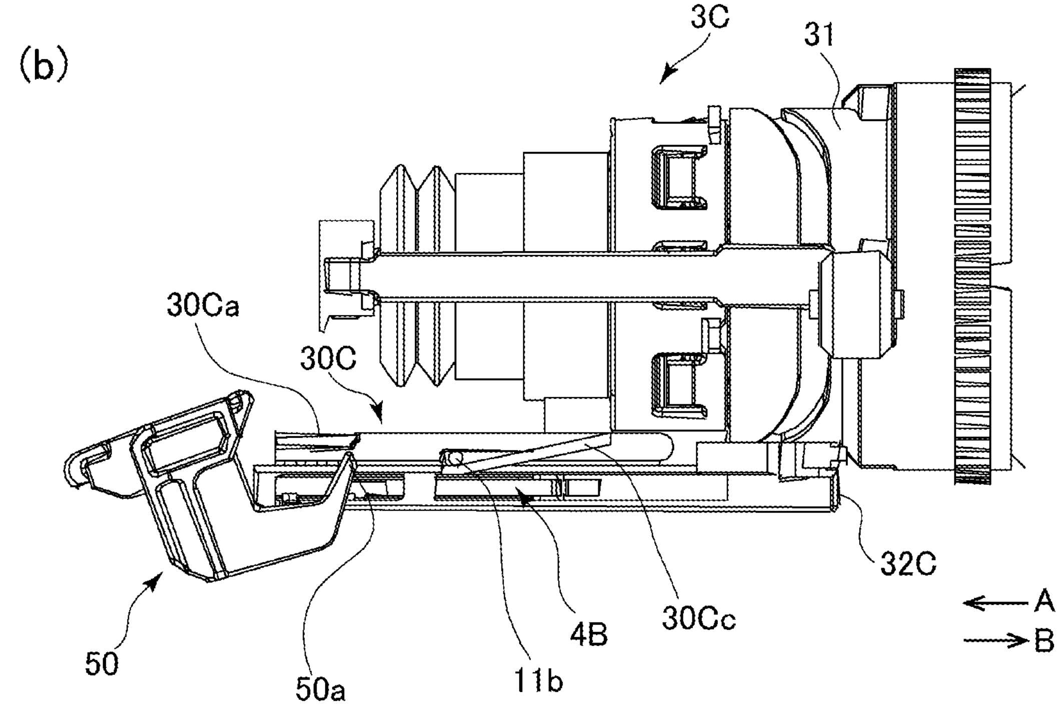

Parts (a) and (b) of FIG. 38 show a state at the start of rotation, in which (a) is a sectional view illustrating positions of a supply container and a developer receiving portion, and (b) is a schematic illustration showing positions of the retracting member and the lift portion.

Figure 39:
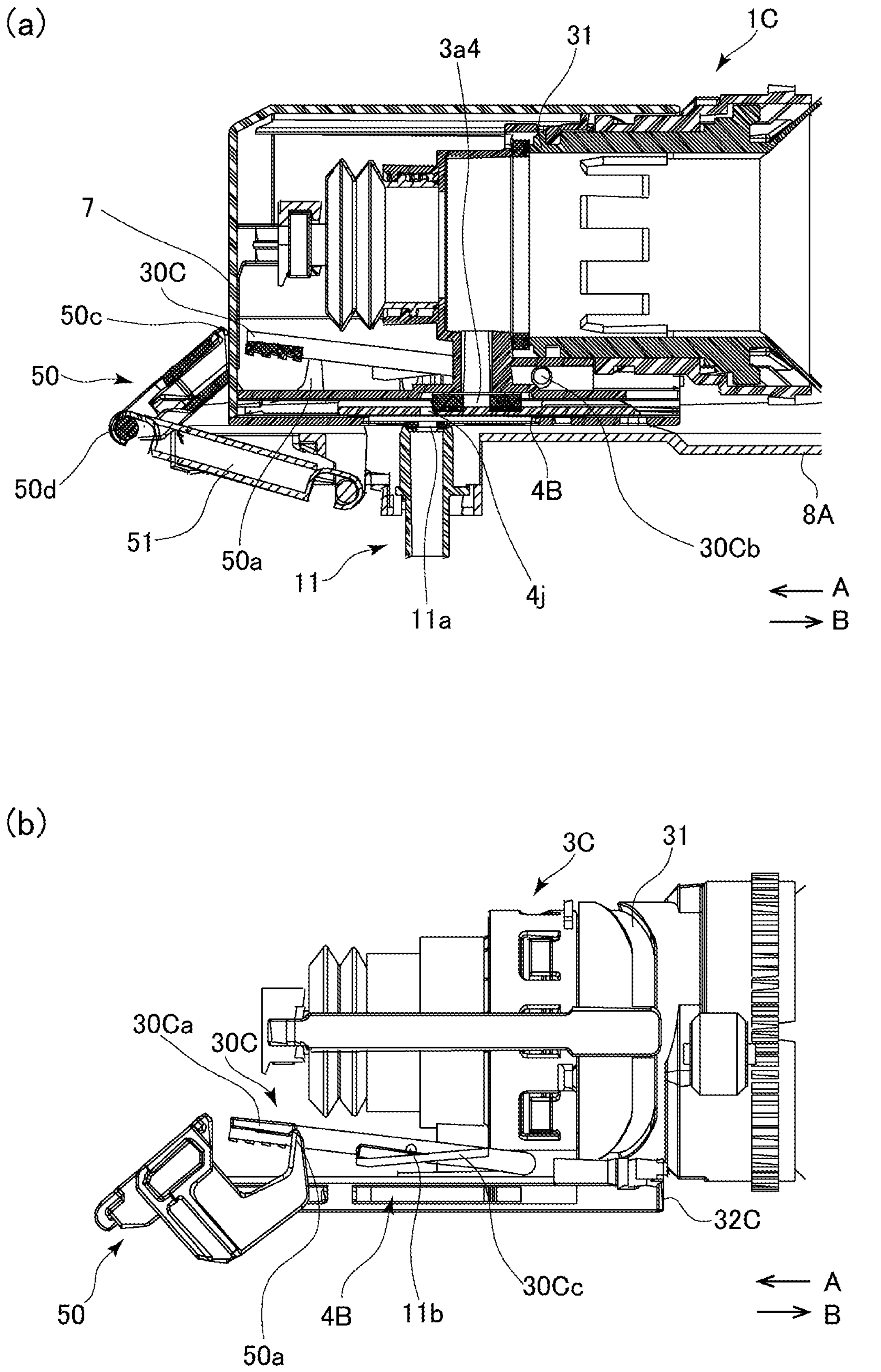

Parts (a) and (b) of FIG. 39 show a state during rotation, in which (a) is a sectional view illustrating positions of a supply container and a developer receiving portion, and (b) is a schematic illustration showing positions of the retracting member and the lift portion.

Figure 40:
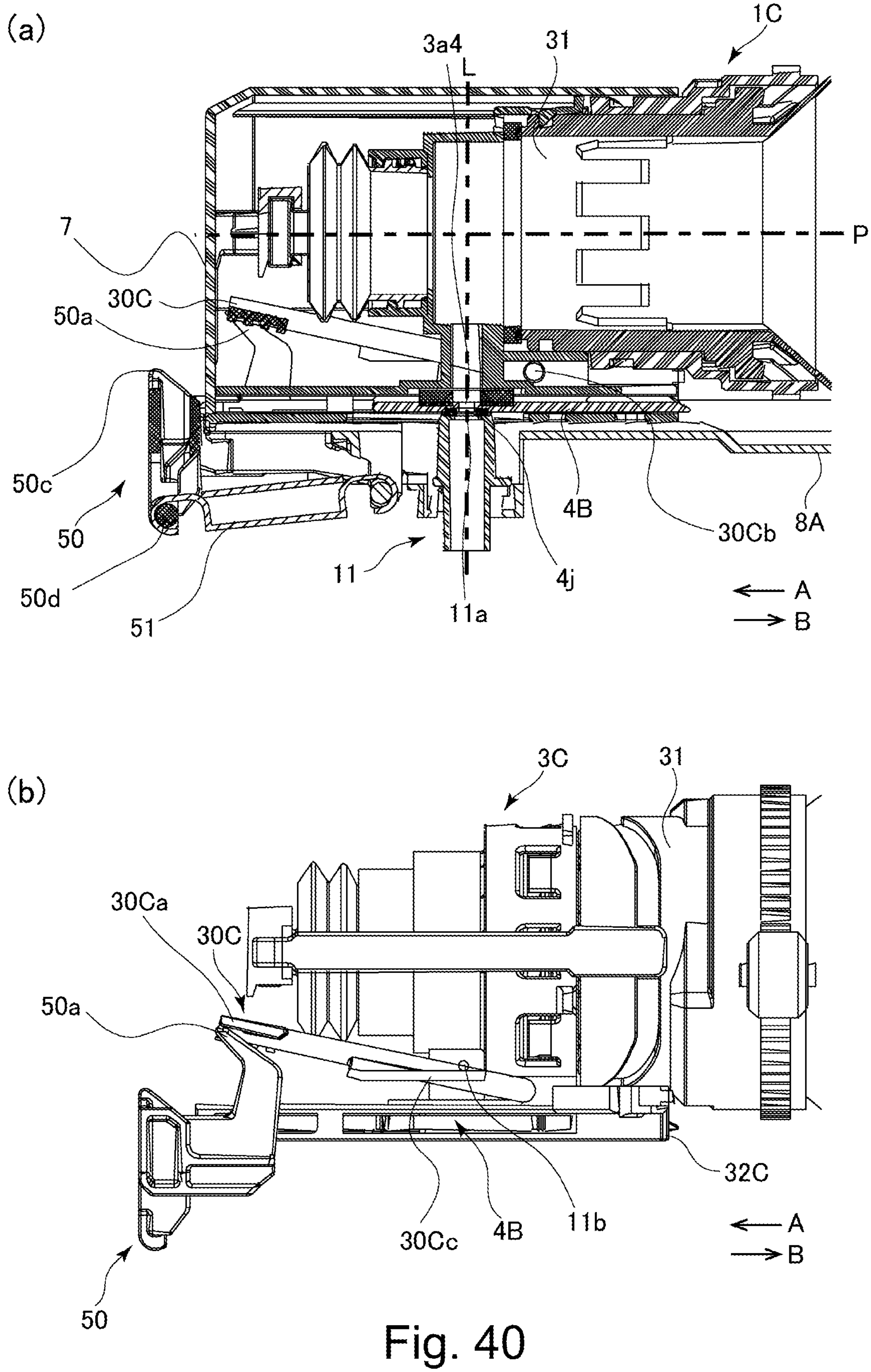

Parts (a) and (b) of FIG. 40 show a state at the time of completion of mounting, in which (a) is a sectional view illustrating positions of a supply container and a developer receiving portion, and (b) is a schematic illustration showing a position of a retracting member and a lift portion.

Figure 41:
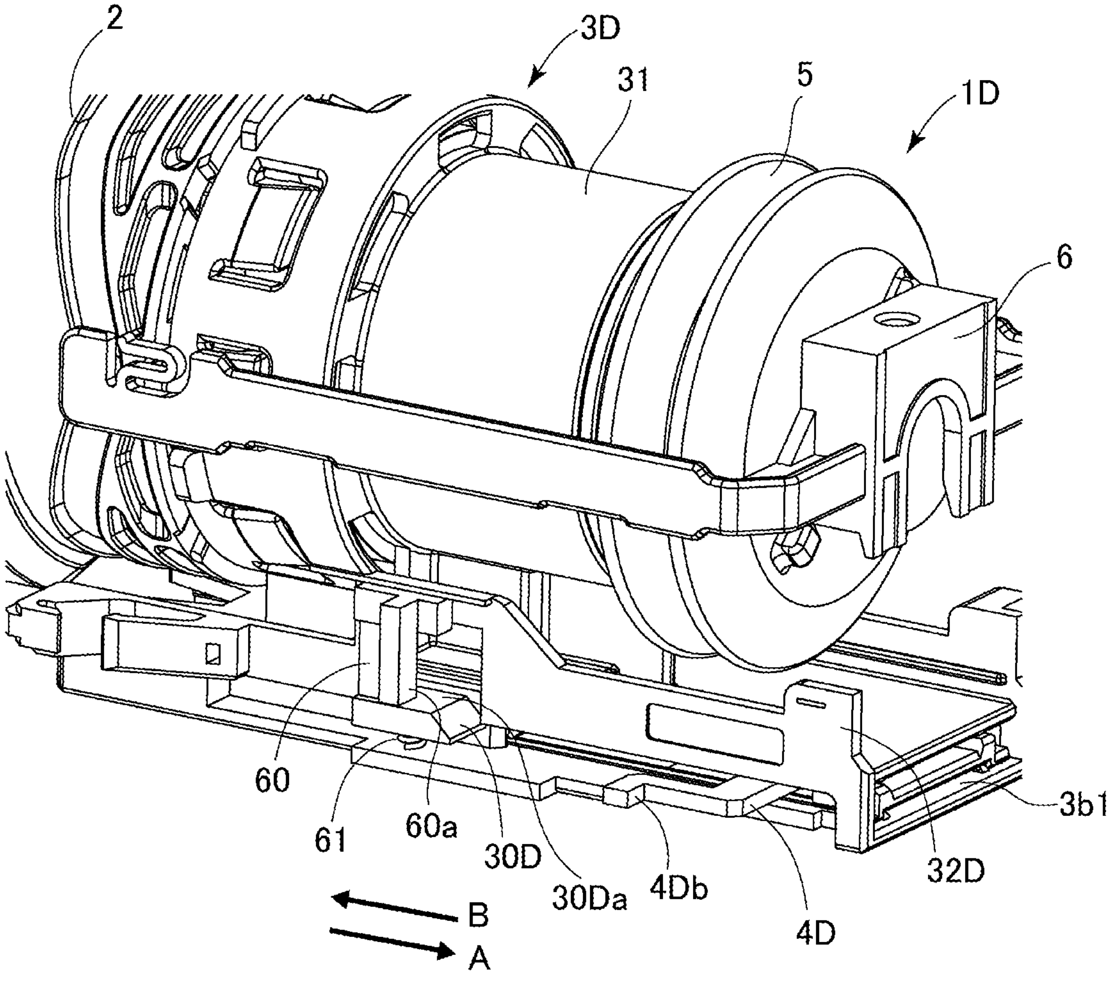

FIG. 41 is a partially enlarged perspective view illustrating flange portion in Embodiment 5.

Figure 42:
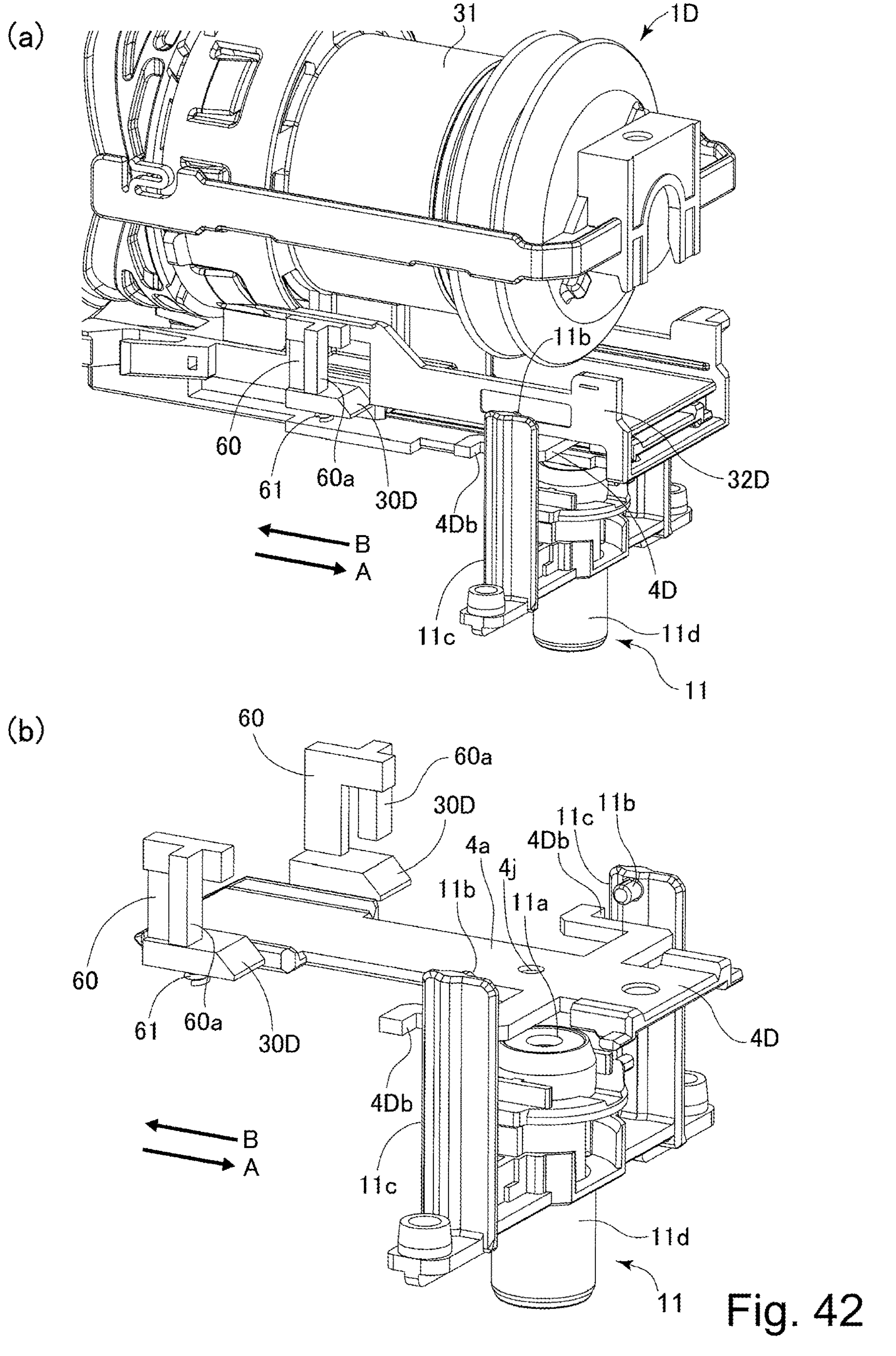

Parts (a) and (b) of FIG. 42 show positions of the lift portion and the regulating member at the start of mounting, in which (a) is a perspective view, (b) is a partially enlarged perspective view.

Figure 43:
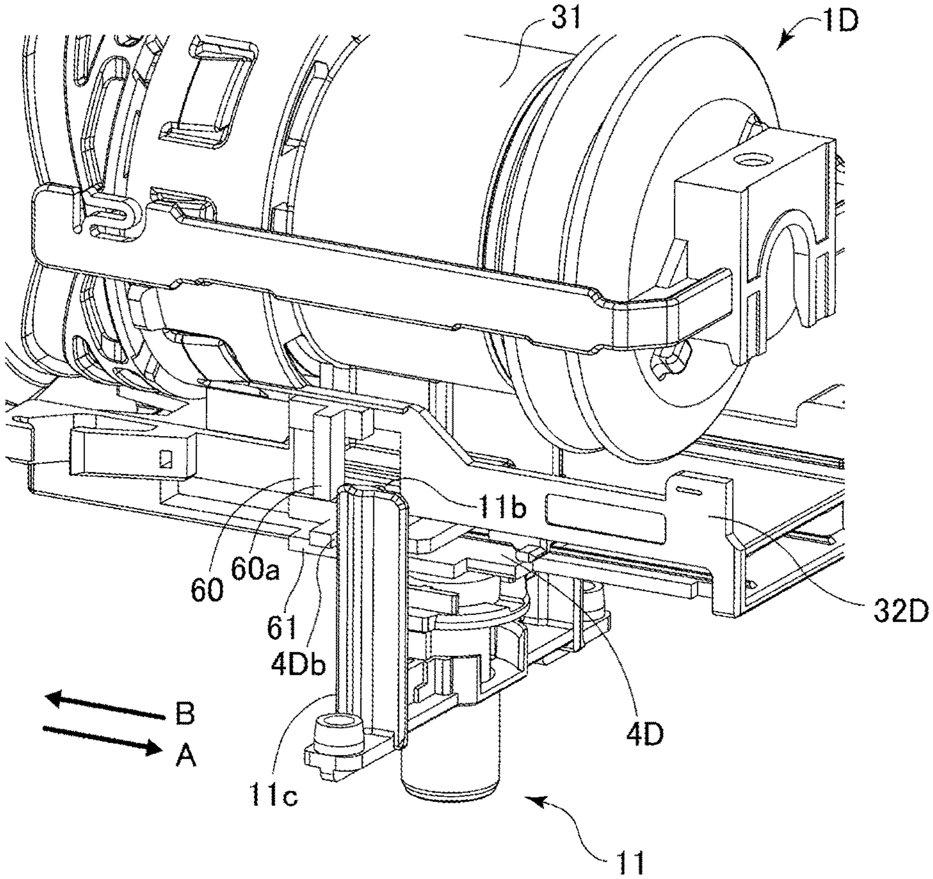
Figure 43:
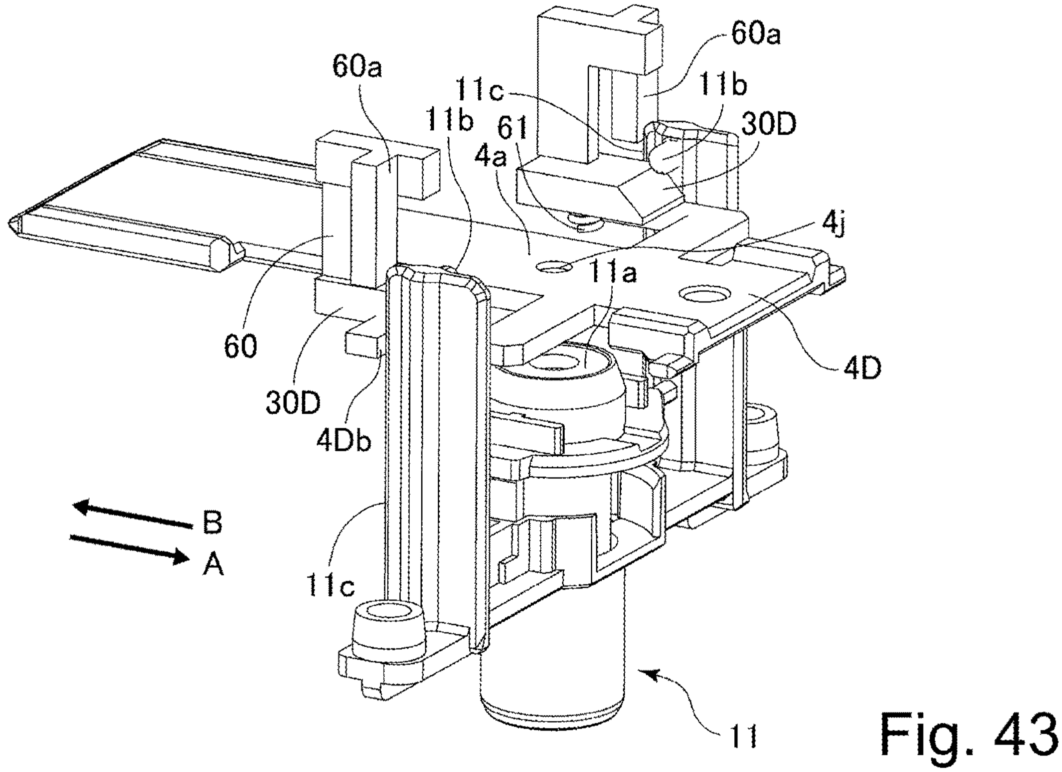

Parts (a) and (b) of FIG. 43 show positions of the lifting portion and the regulating member during the movement, in which (a) is a perspective view, and (b) is a partially enlarged perspective view.

Figure 44:
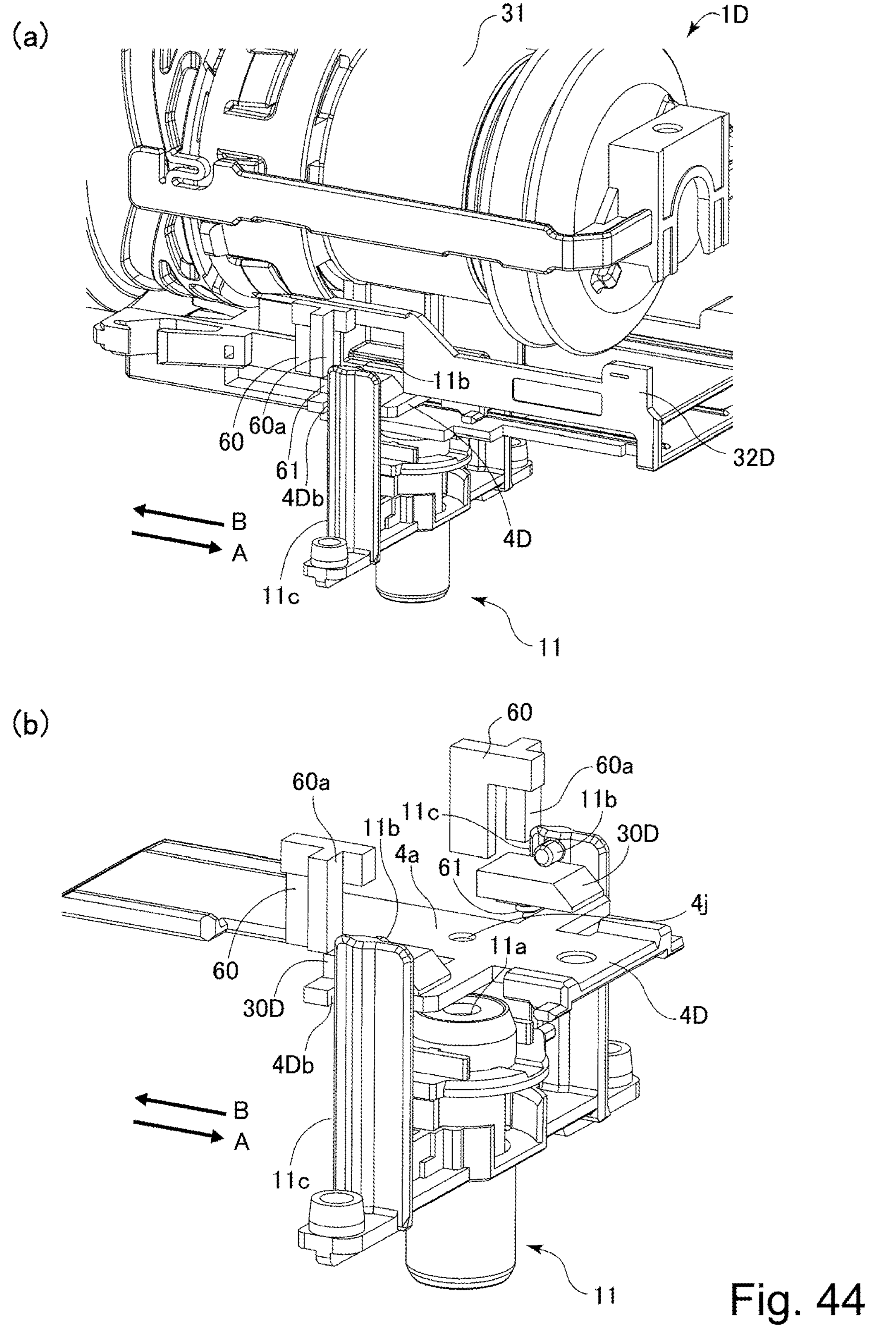

Parts (a) and (b) of FIG. 44 show positions of the lift portion and the regulating member at the start of rising, in which (a) is a perspective view thereof, and (b) is a partially enlarged perspective view thereof.

Figure 45:
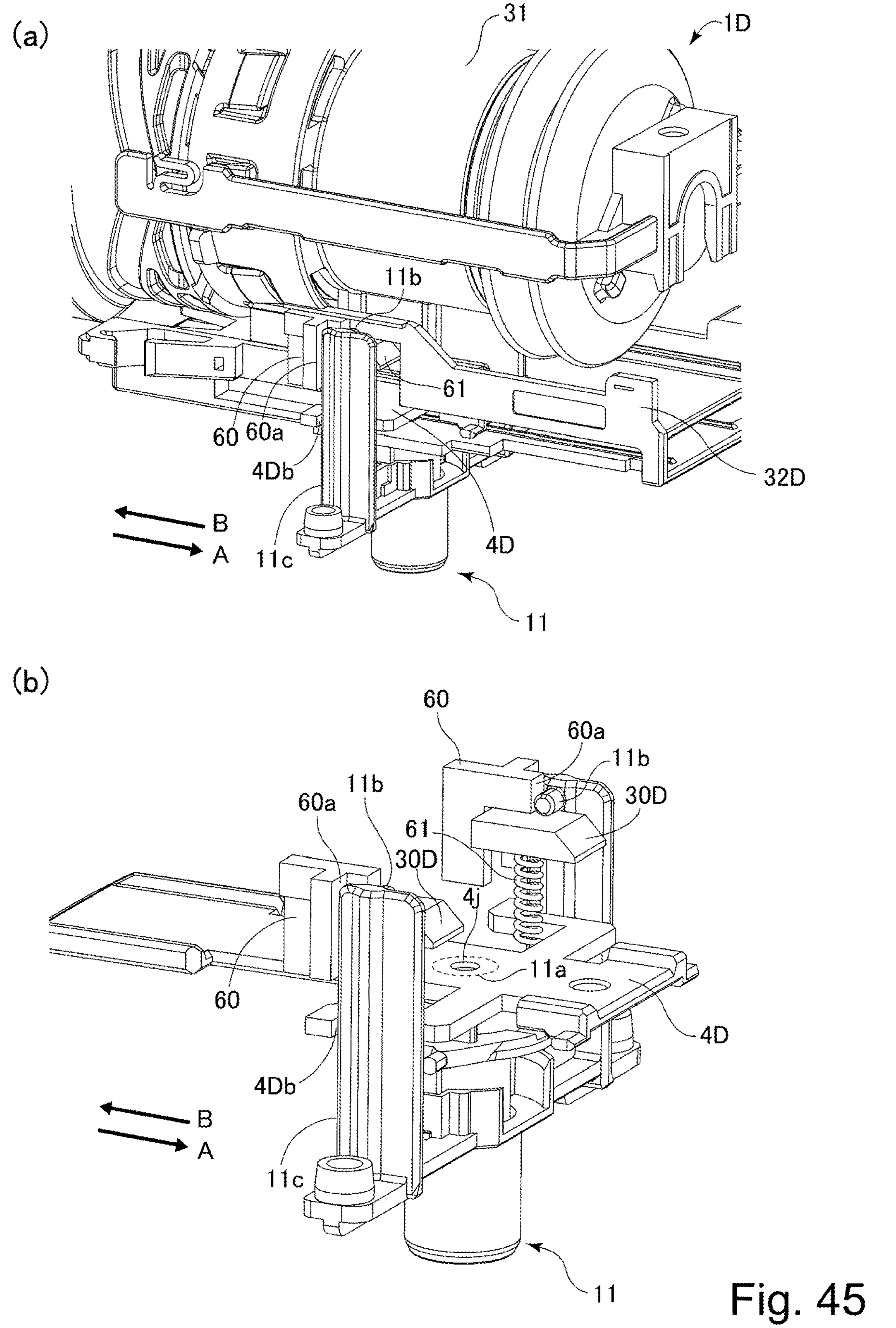

Part (a) and (b) of FIG. 45 show positions of the lift portion and the regulating member at the completion of mounting, in which (a) is a perspective view thereof, and (b) is a partially enlarged perspective view thereof.

Figure 46:
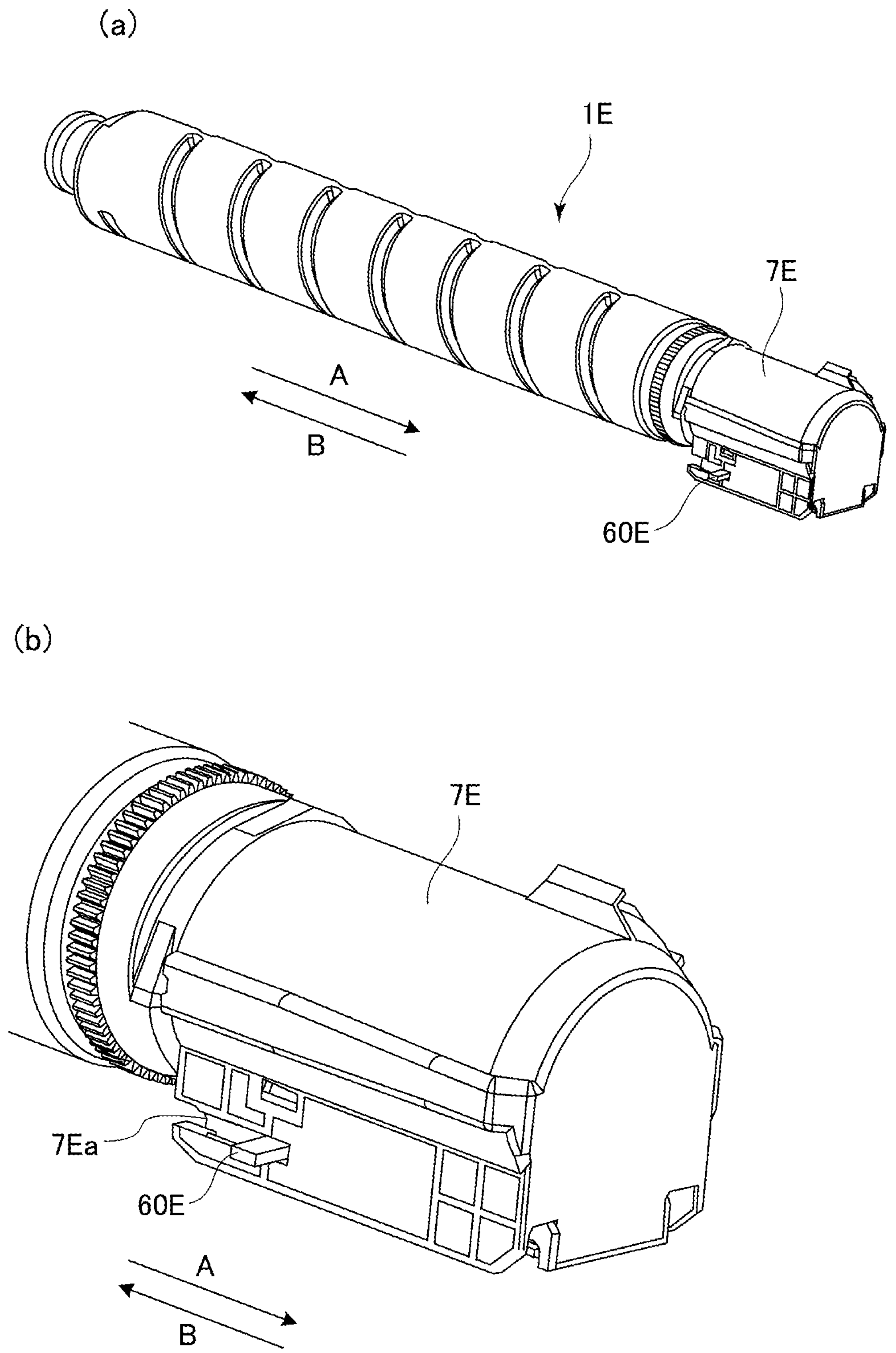

Parts (a) and (b) of FIG. 46 show the supply container according to Embodiment 6, in which (a) is a perspective view, and (b) is a partially enlarged perspective view.

Figure 47:
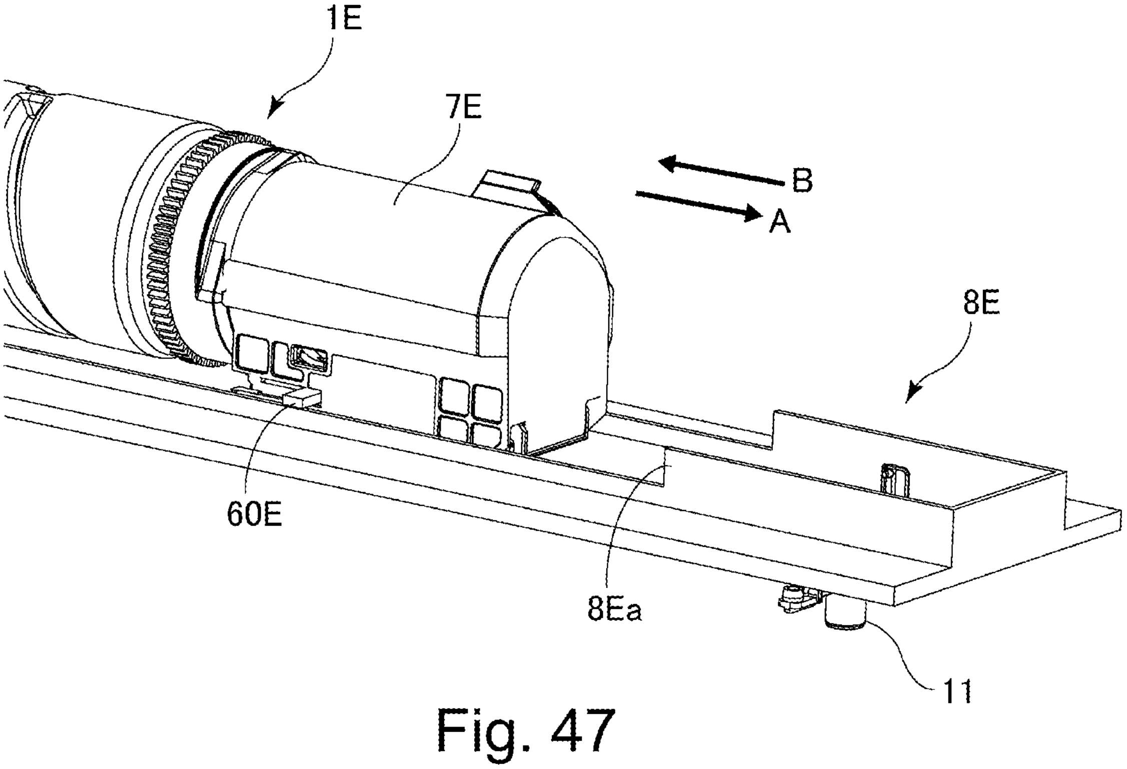

FIG. 47 is a partially enlarged perspective view illustrating the developer receiving apparatus in Embodiment 6.

Figure 48:
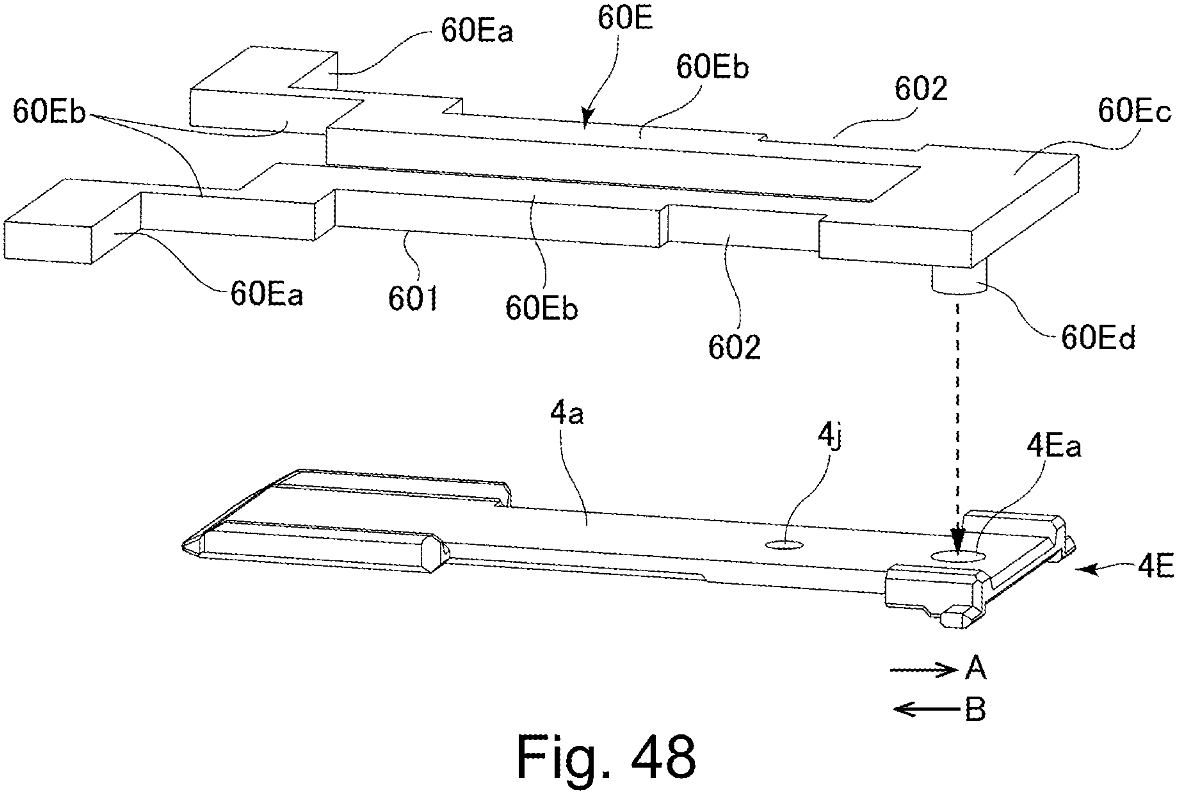

FIG. 48 is a perspective view illustrating a regulating member and a shutter in Embodiment 6.

Figure 49:
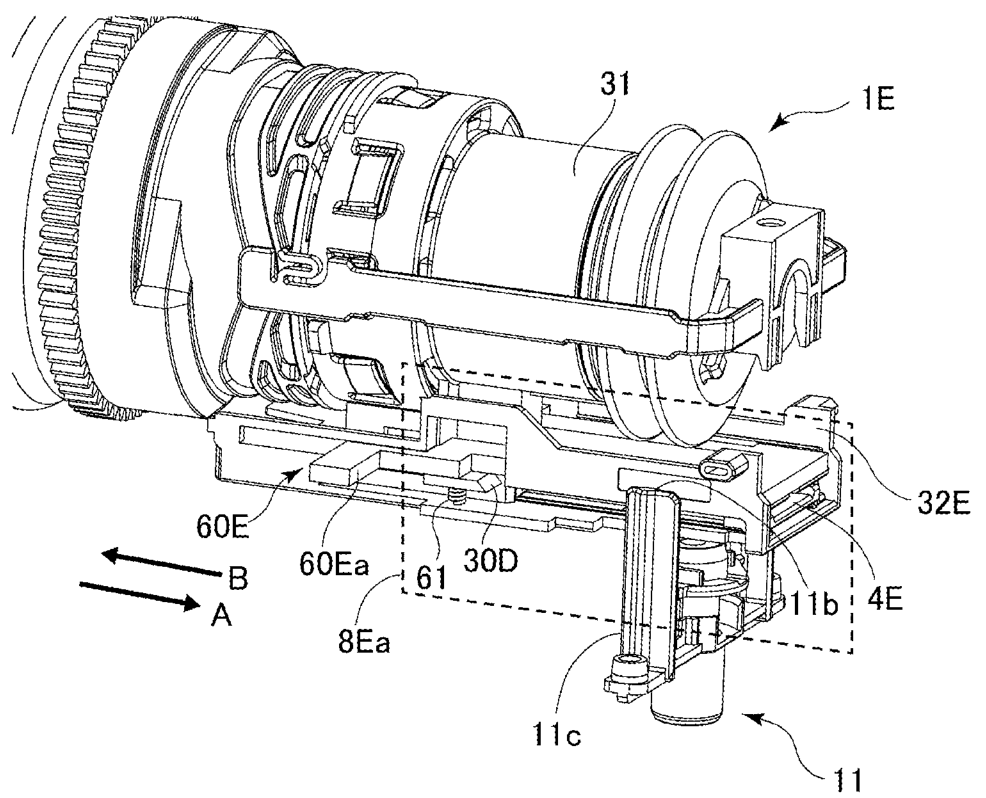
Figure 49:
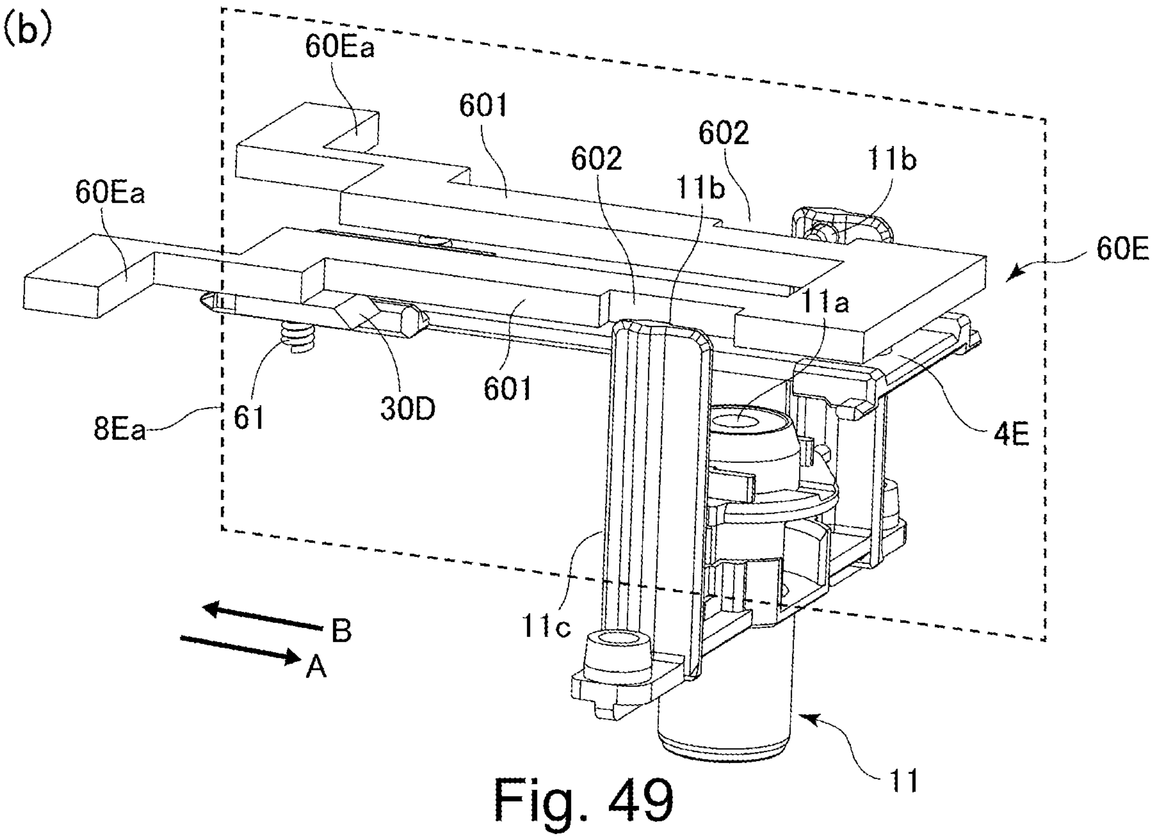

Parts (a) and (b) of FIG. 49 show positions of a lift portion and a regulating member at the start of mounting, in which (a) is a perspective view, and (b) is a partially enlarged perspective view.

Figure 50:
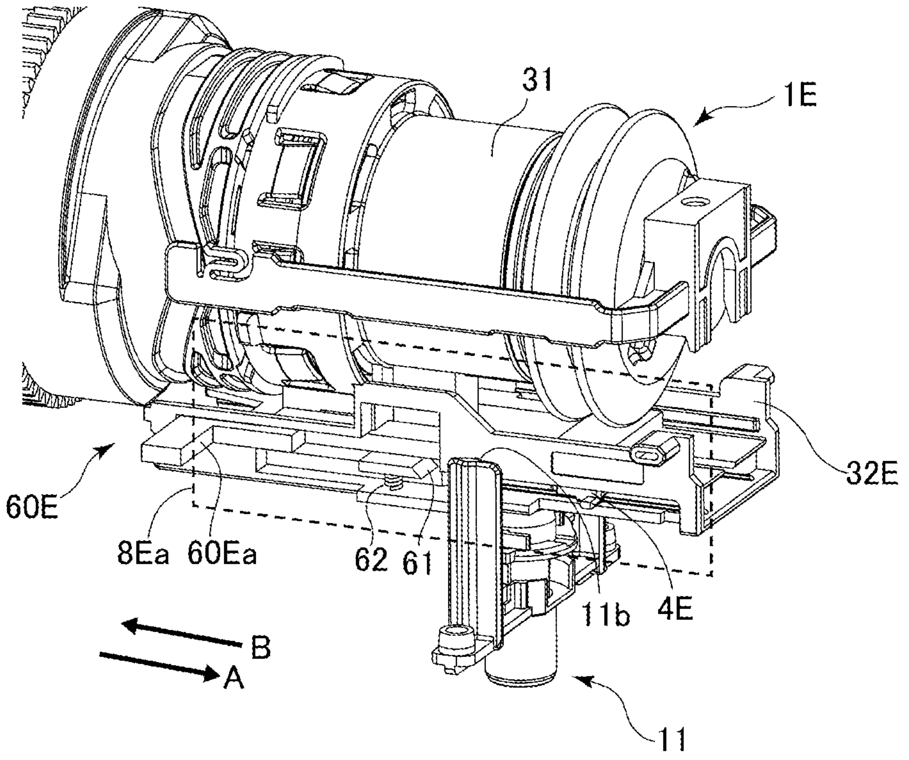
Figure 50:
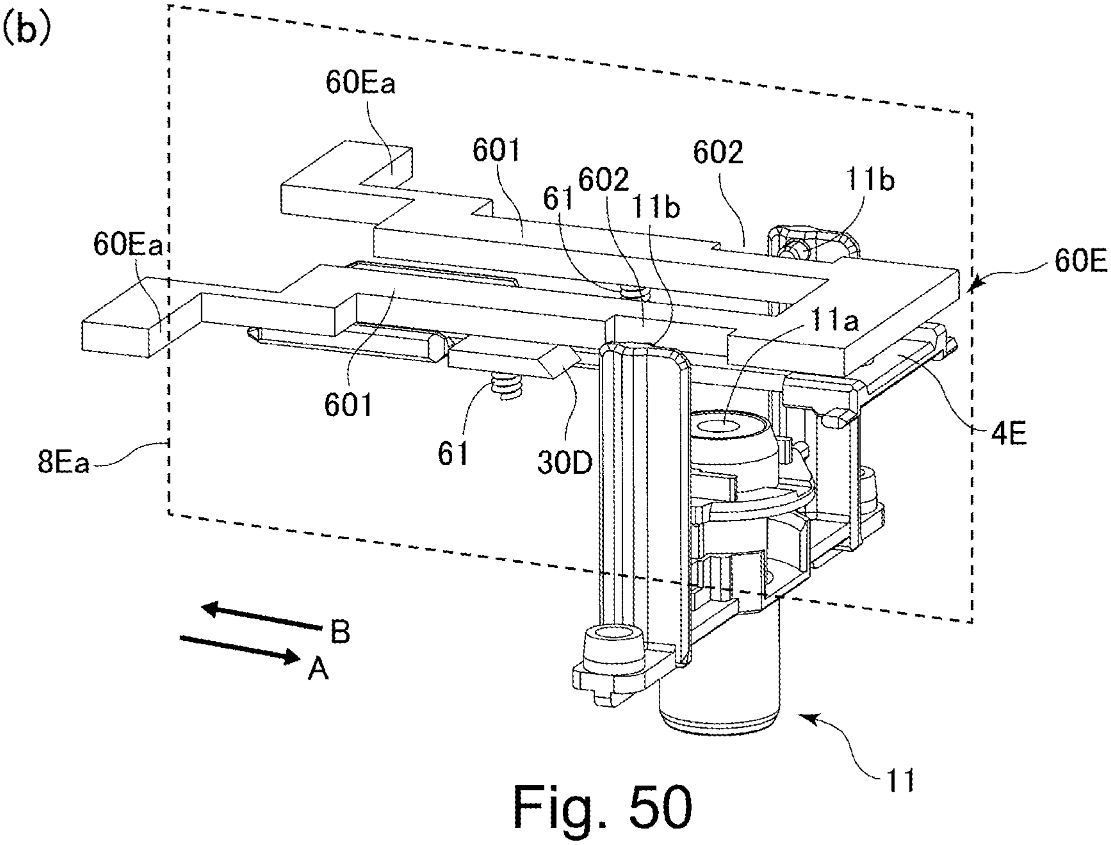

Parts (a) and (b) of FIG. 50 show positions of the lifting portion and the regulating member during the movement, (a) is a perspective view thereof, and (b) is a partially enlarged perspective view thereof.

Figure 51:
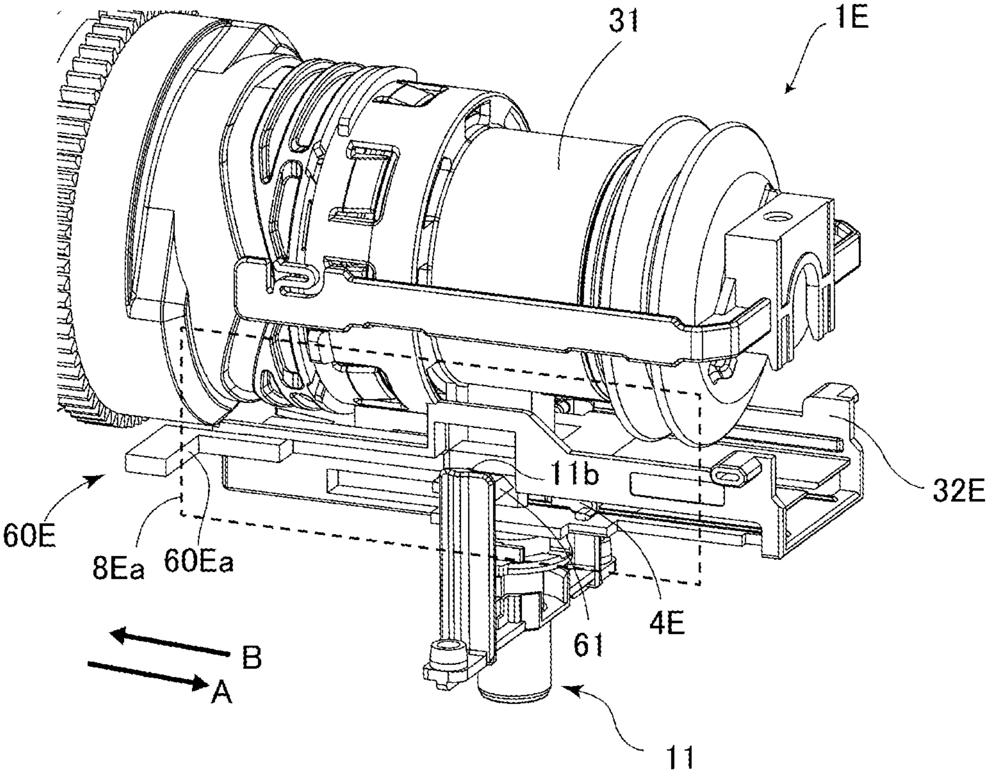
Figure 51:
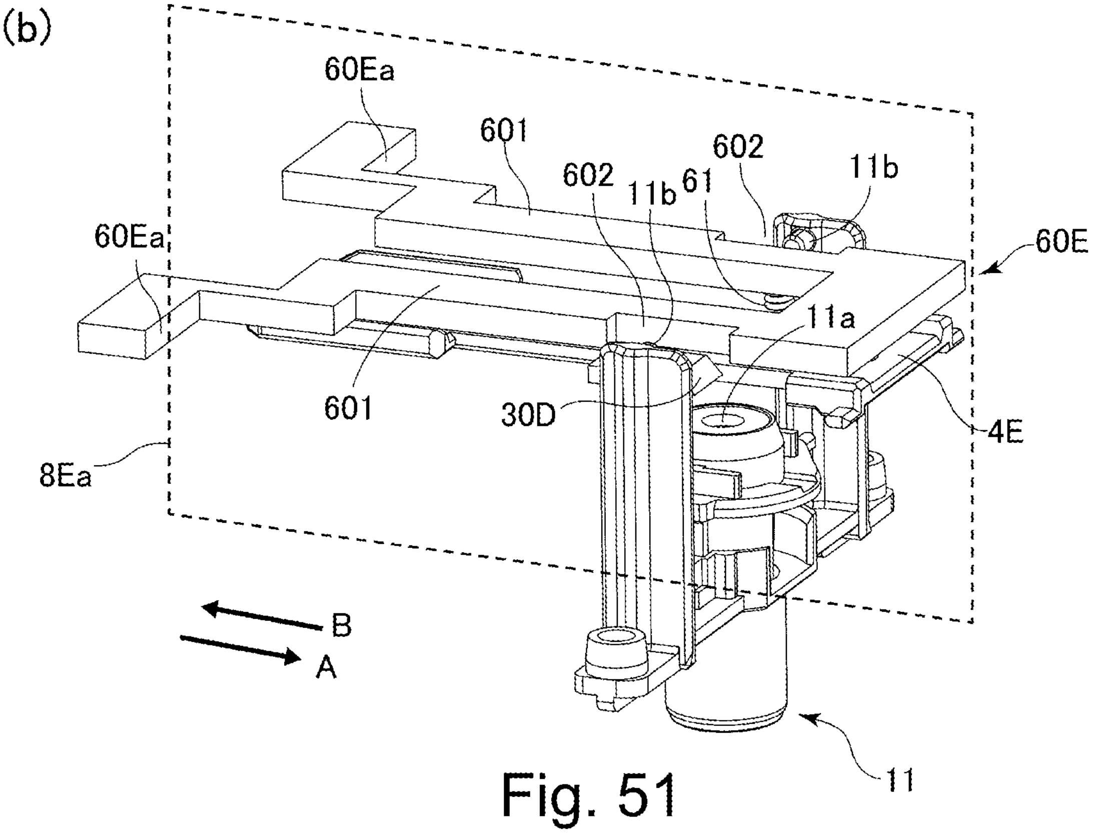

Parts (a) and (b) of FIG. 51 show positions of the lift portion and the regulating member at the start of rising, in which (a) is a perspective view thereof, and (b) is a partially enlarged perspective view thereof.

Figure 52:
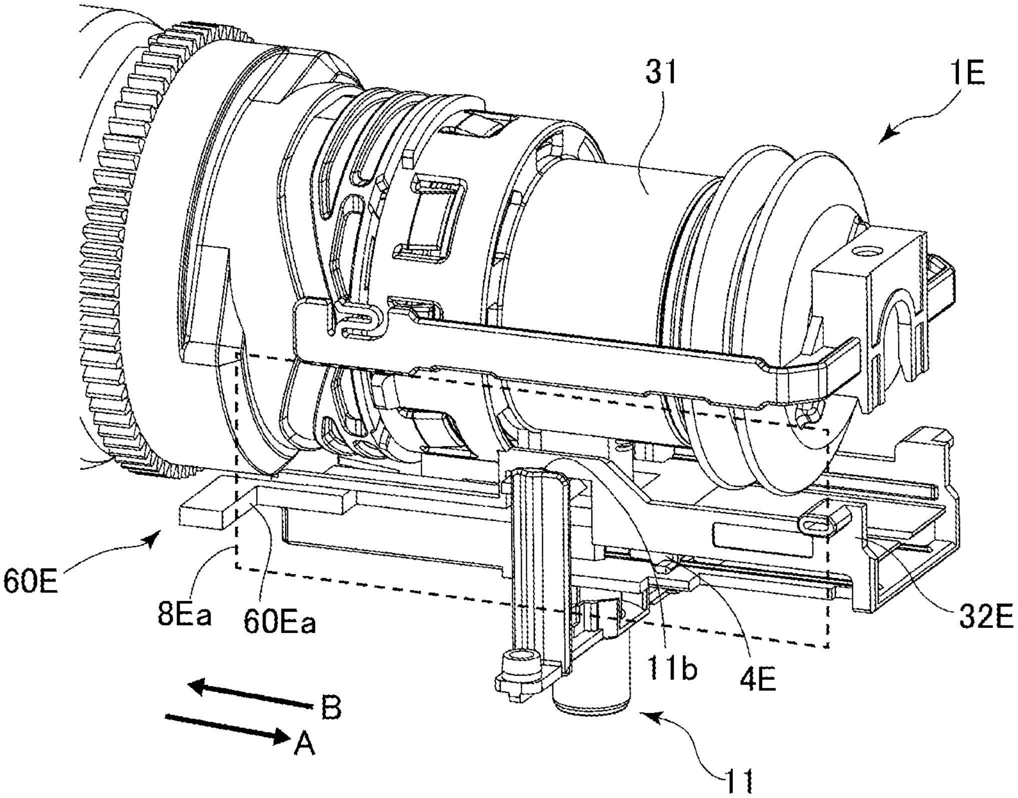
Figure 52:
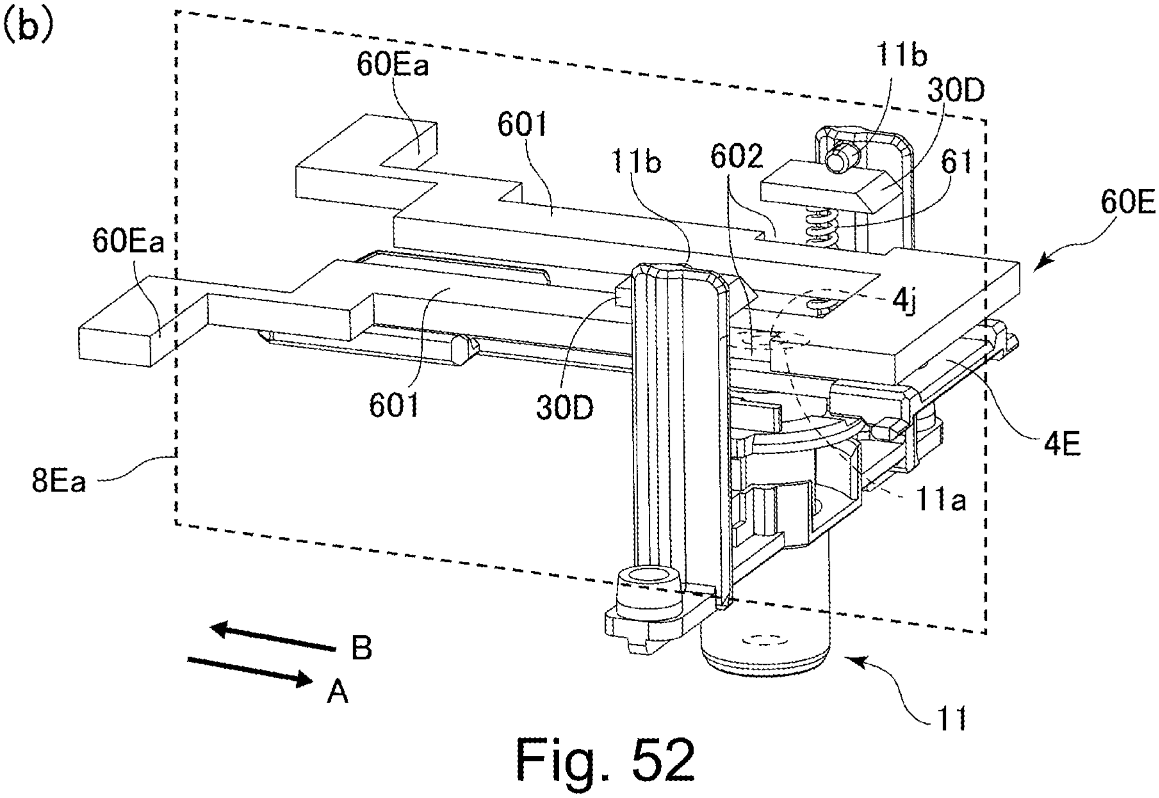

Parts (a) and (b) of FIG. 52 show positions of the lift portion and the regulating member at the completion of mounting, in which (a) is a perspective view, and (b) is a partially enlarged perspective view.

Figure 53:
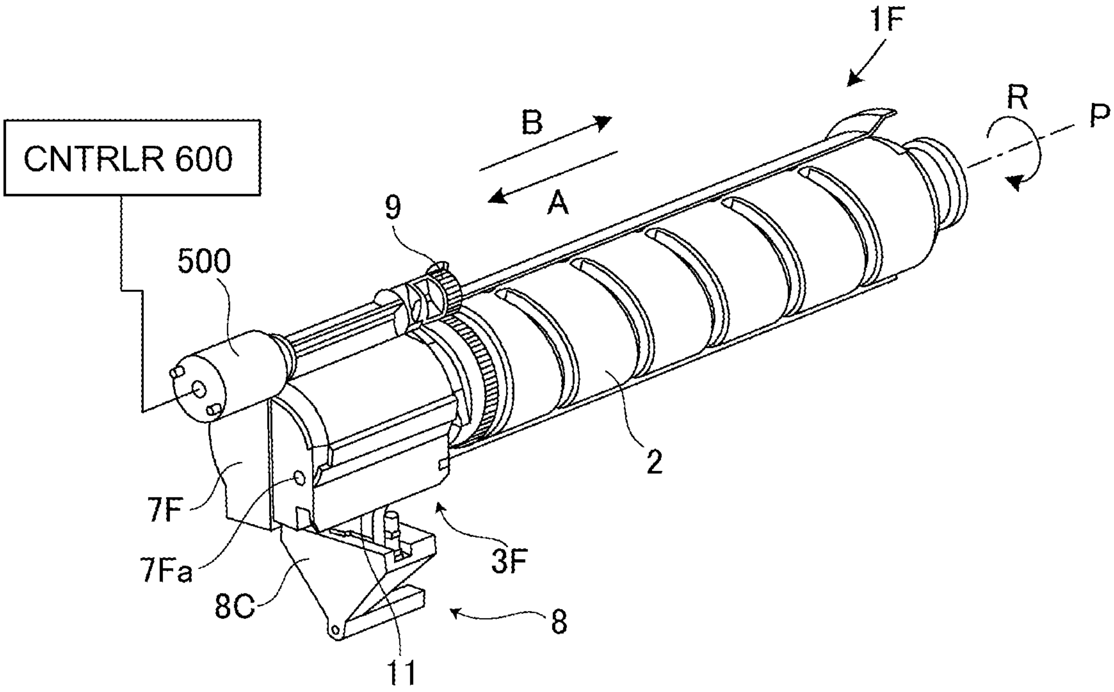
Figure 53:
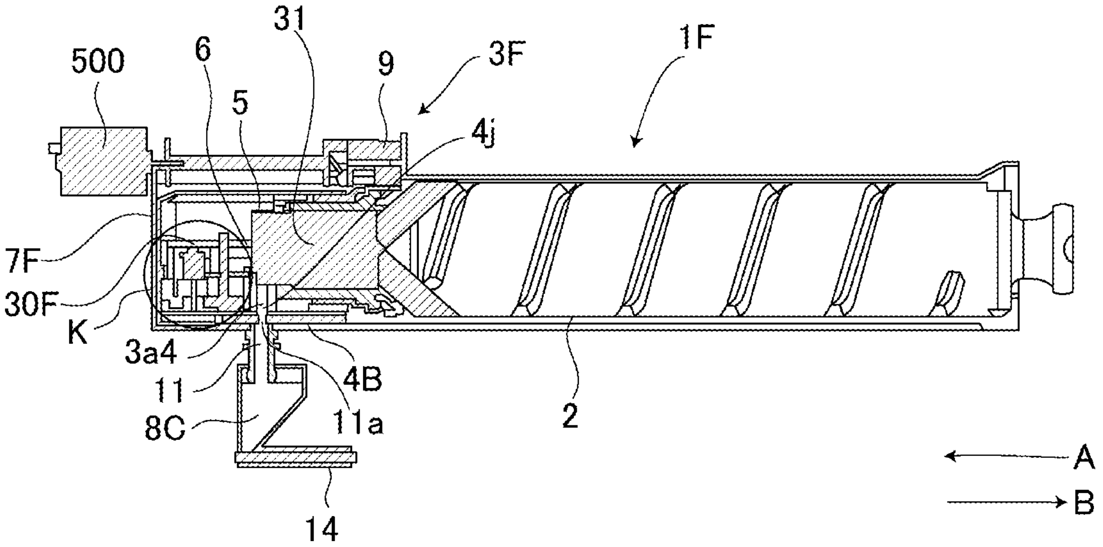

Parts (a) and (b) of FIG. 53 show the supply container according to Embodiment 7, (a) is a perspective view, and (b) is a sectional view.

Figure 54:
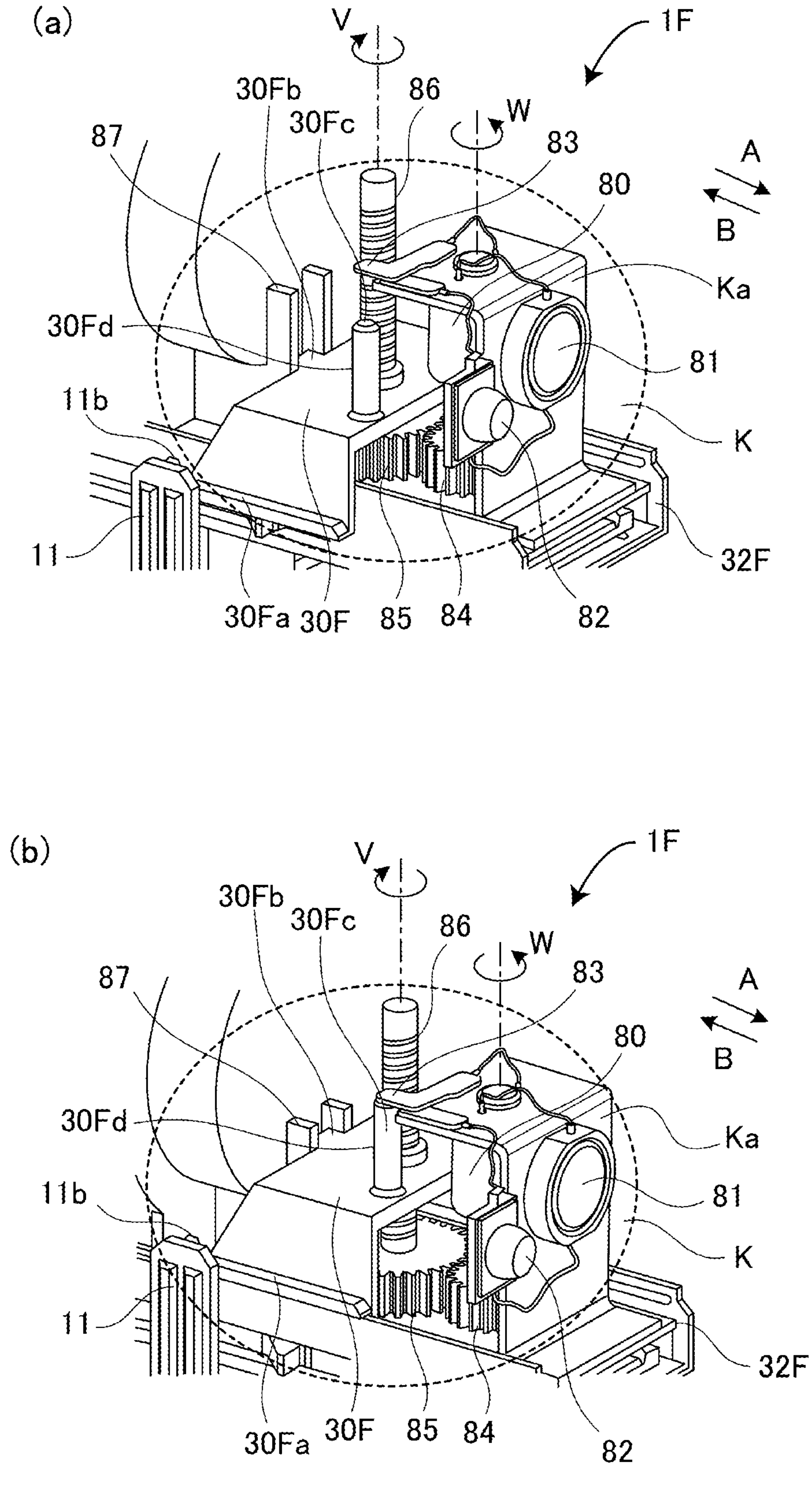

Parts (a) and (b) of FIG. 54 are partially enlarged perspective views showing an elevating mechanism, in which (a) shows a state before lifting of a lift portion, and (b) shows a state after lifting of the lift portion.

Figure 55:
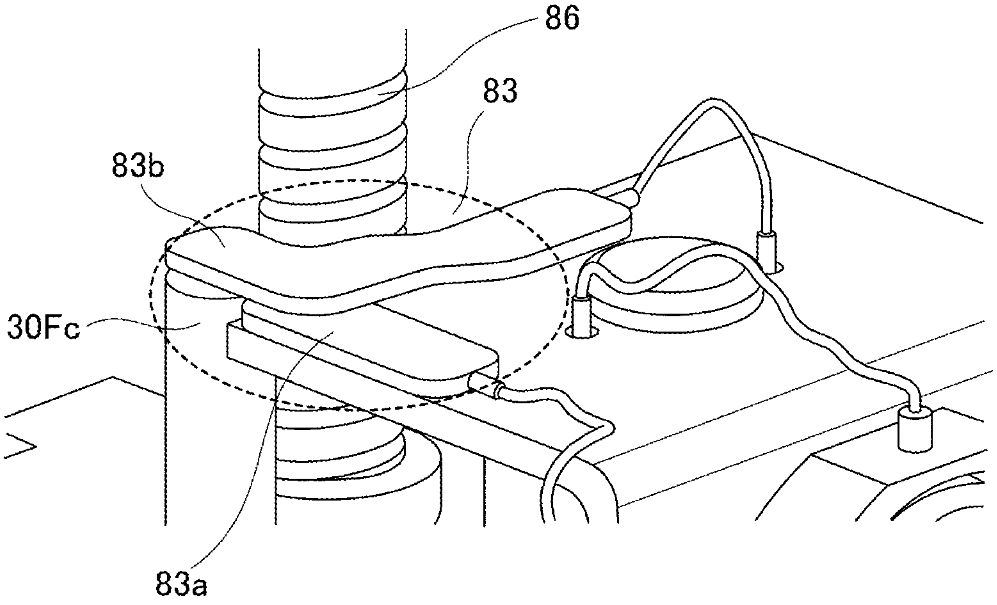

FIG. 55 is a partially enlarged perspective view illustrating the neighborhood of a second switch of a lifting mechanism.

Figure 56:
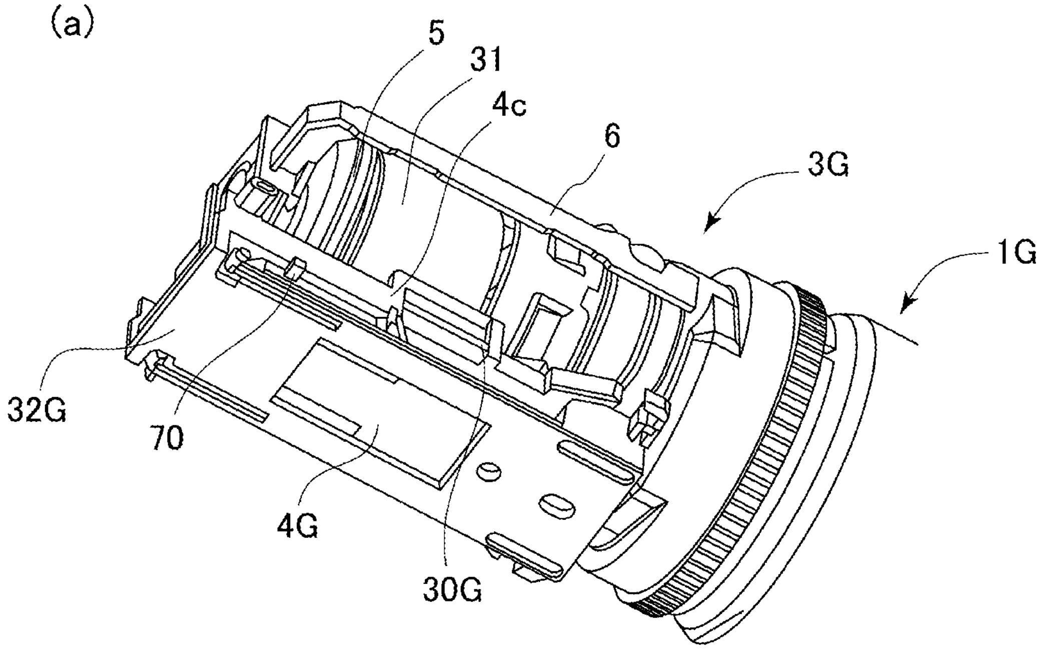
Figure 56:
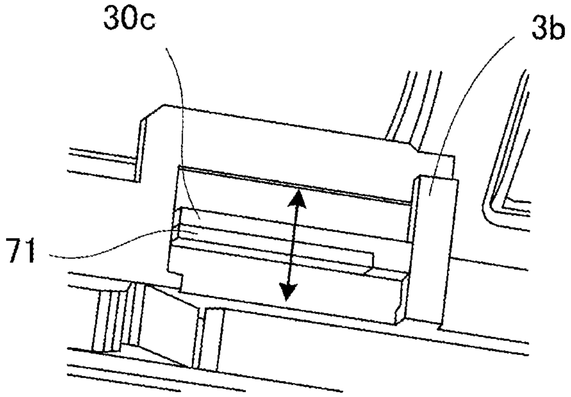

Parts (a) and (b) of FIG. 56 show a flange portion in Embodiment 8, in which (a) is a perspective view as viewed from the bottom, (b) is a partially enlarged perspective view thereof.

Figure 57:
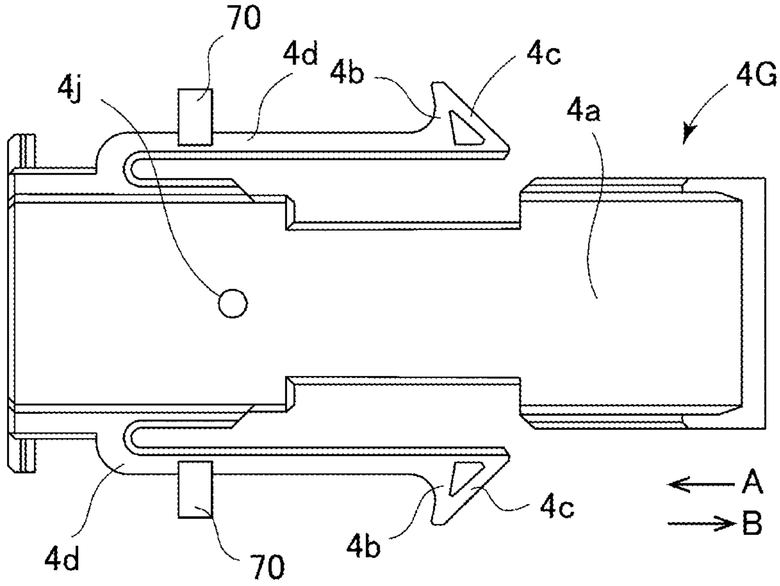
Figure 57:
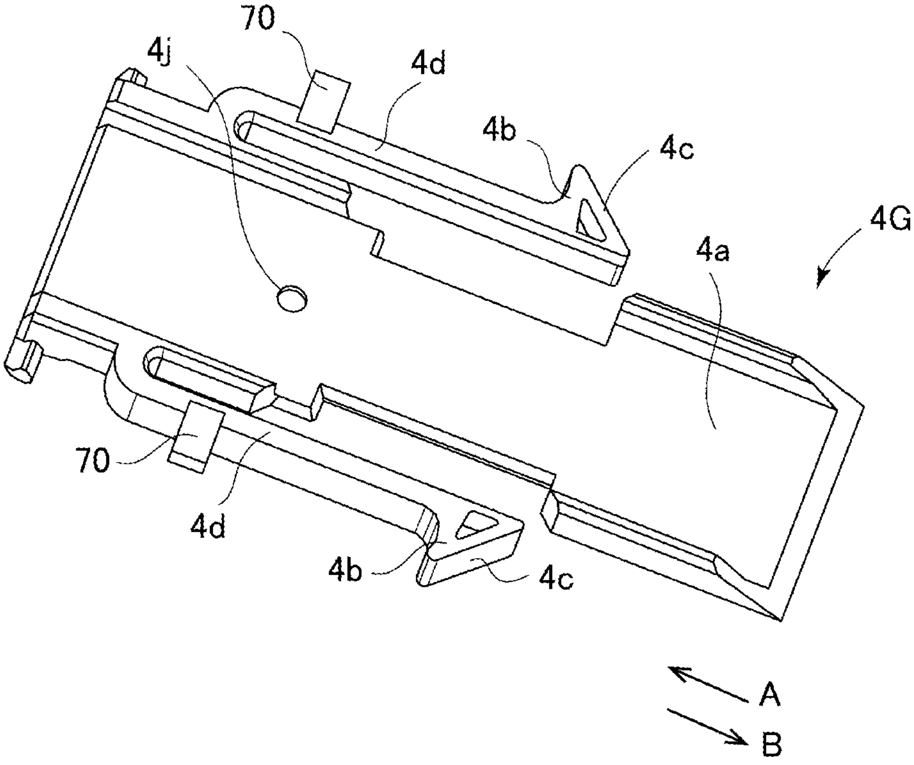

Parts (a) and (b) of FIG. 57 show a shutter in Embodiment 8, in which (a) is a top view thereof, and (b) is a perspective view thereof.

Figure 58:
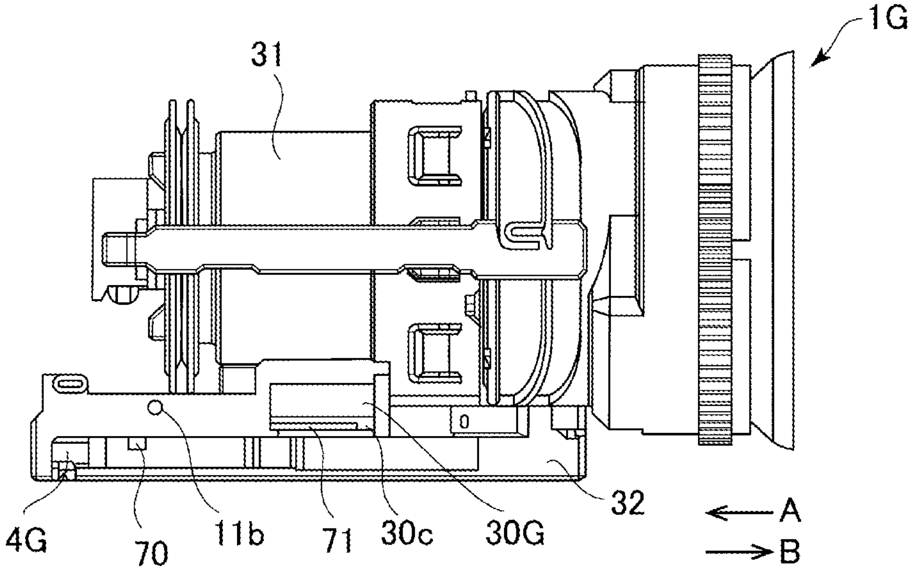
Figure 58:
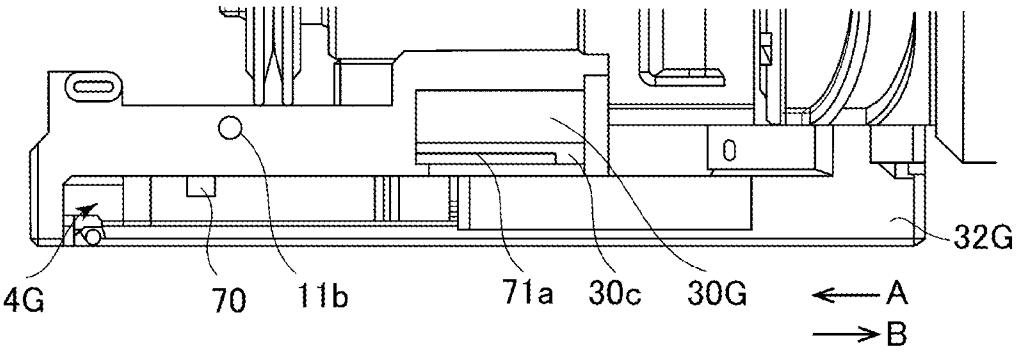

Parts (a) and (b) of FIG. 58 show positions of the lift portion and the supported portion at the start of the mounting operation, in which (a) is a side view, and (b) is a partially enlarged view.

Figure 59:
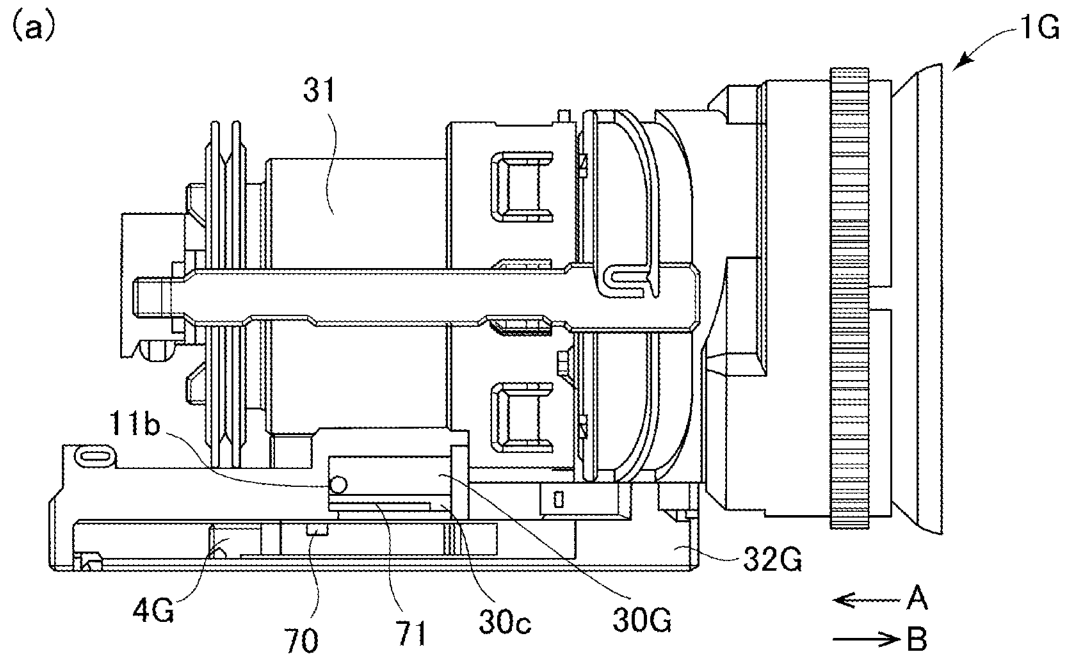
Figure 59:
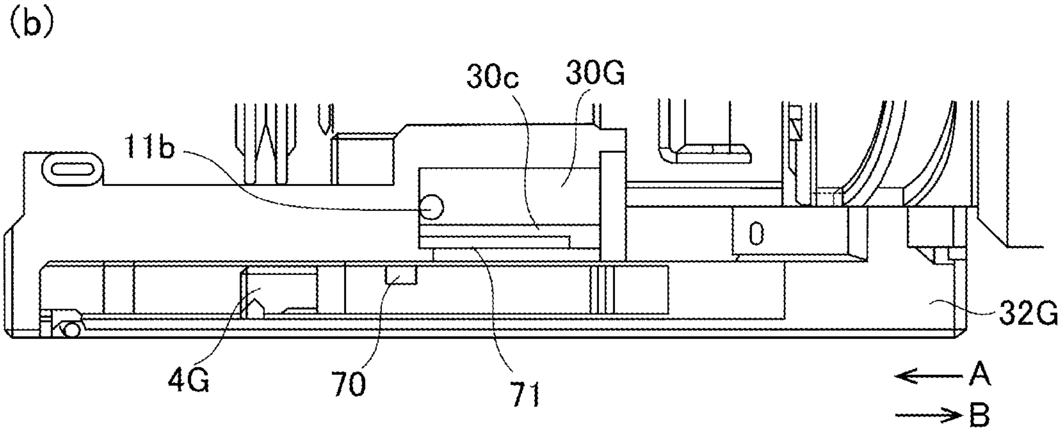

Parts (a) and (b) of FIG. 59 show positions of the lift portion and a supported portion at the start of rising, in which (a) is a side view thereof, and (b) is a partially enlarged view thereof.

Figure 60:
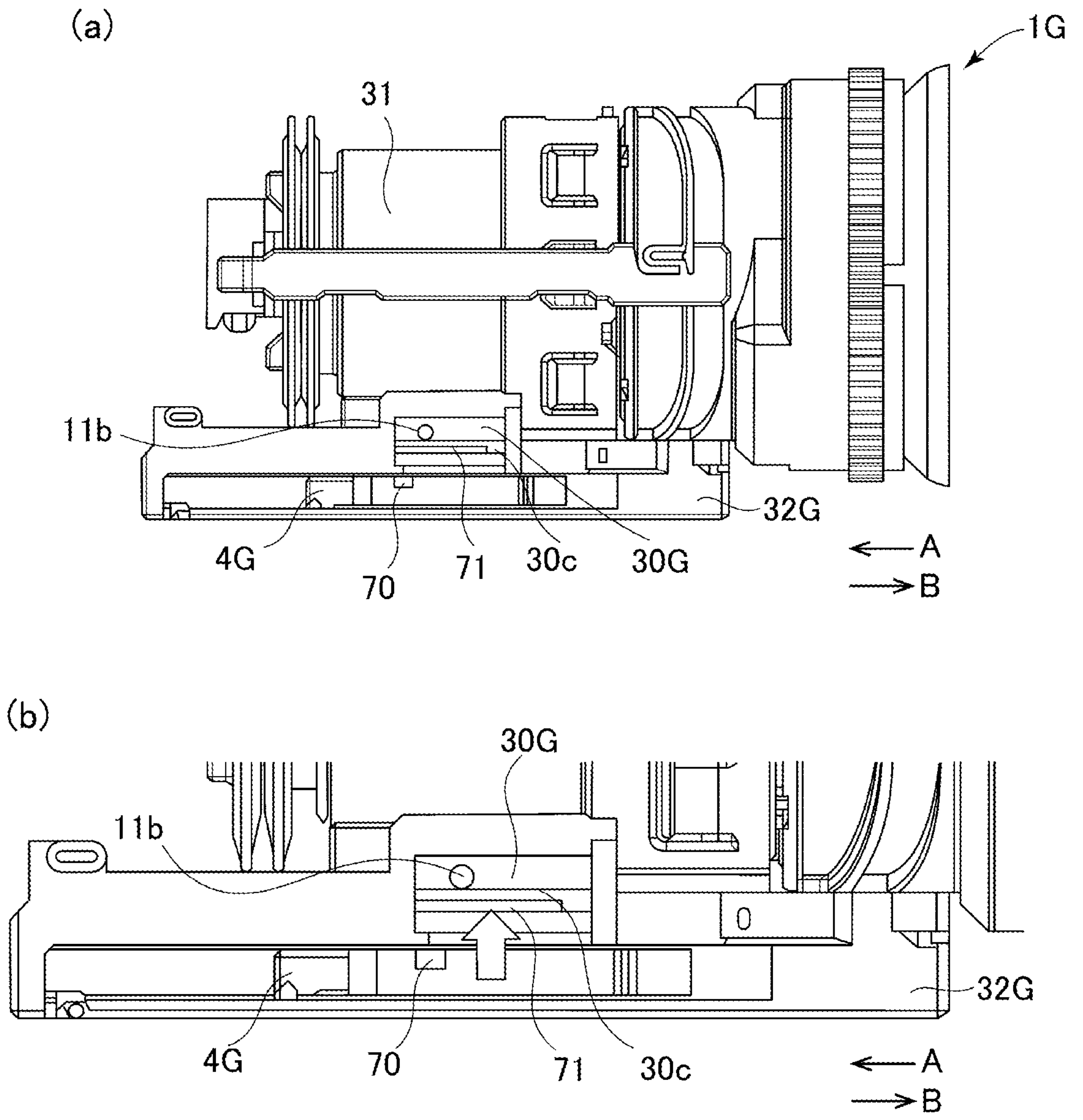

Parts (a) and (b) of FIG. 60 show positions of the lift portion and the supported portion during the rising, in which (a) is a side view thereof, and (b) is a partial enlarged view thereof.

Figure 61:
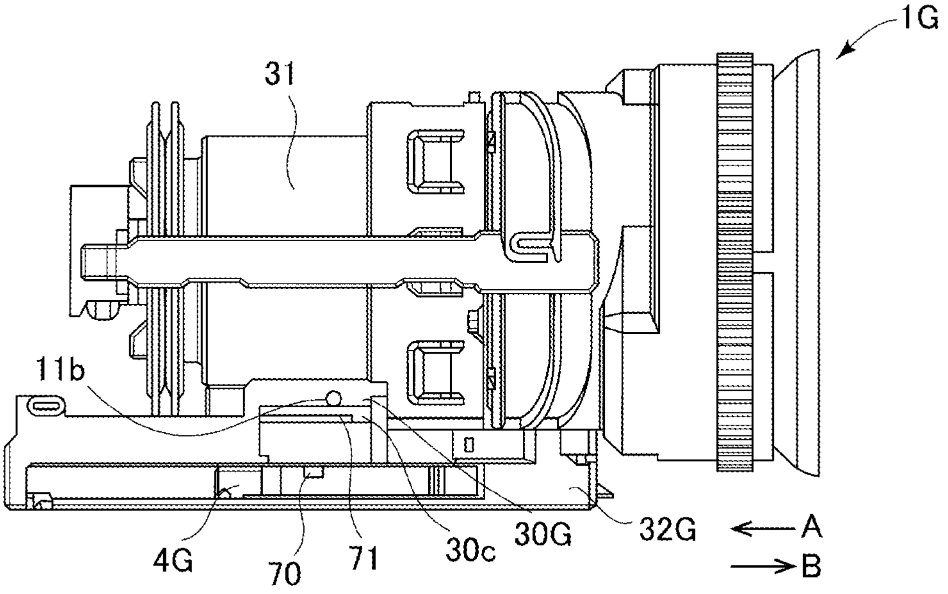
Figure 61:
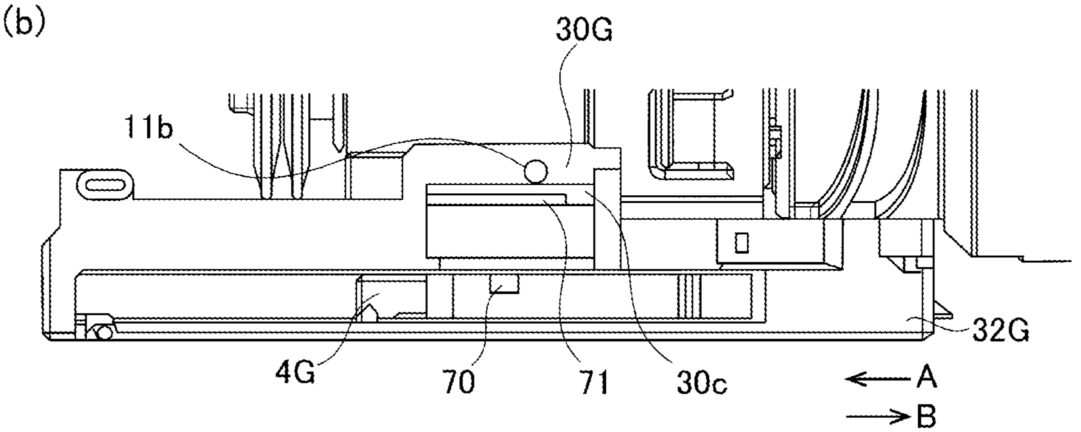

Parts (a) and (b) of FIG. 61 show positions of the lift portion and the supported portion at the completion of mounting, in which (a) is a side view and (b) is a partially enlarged view.

Figure 62:
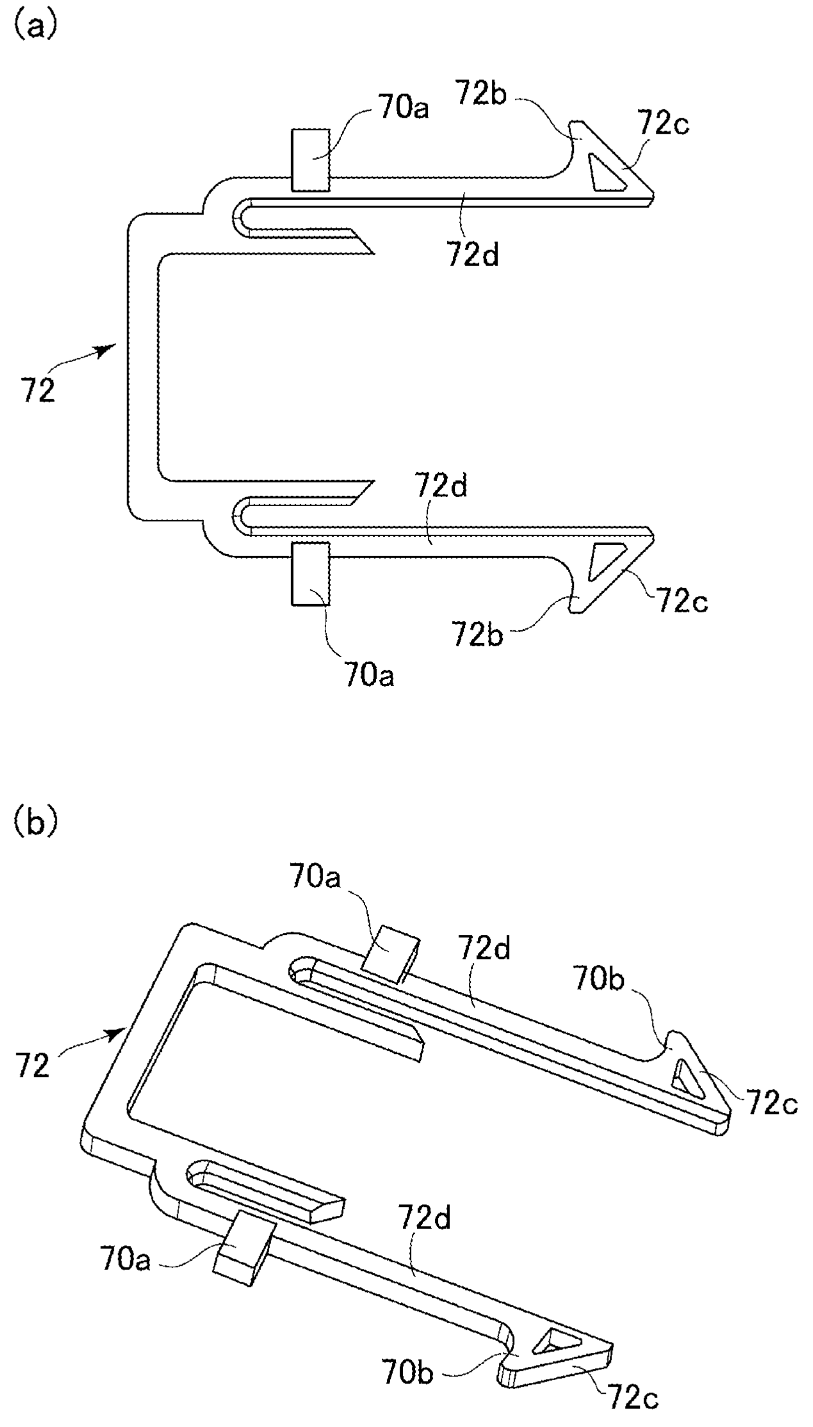

Part (a) and (b) of FIG. 62 show the magnet member in Embodiment 9, in which (a) is a top view thereof, and (b) is a perspective view thereof.

Figure 63:
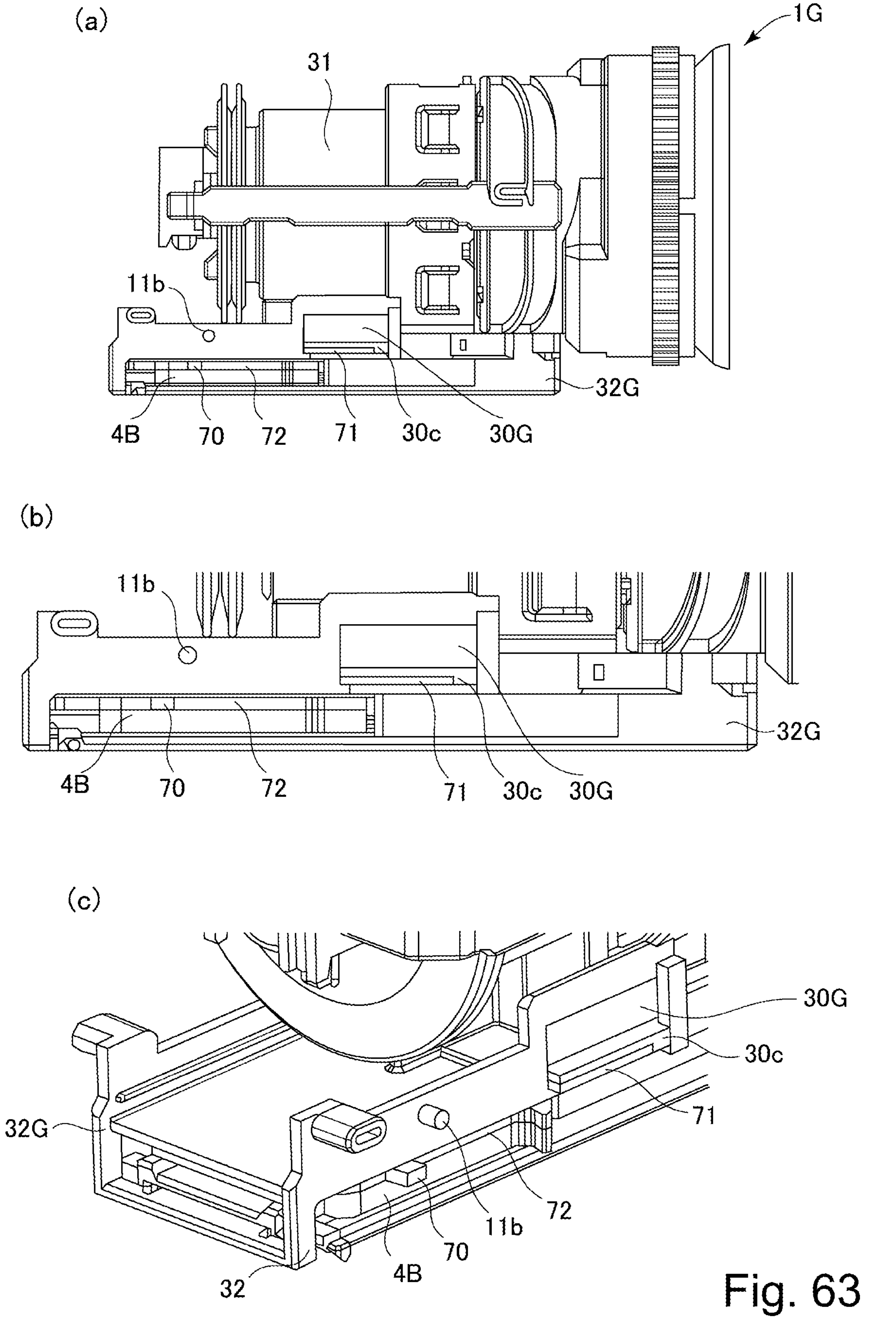

Part (a), (b) and (c) of FIG. 63 show a flange portion in Embodiment 9, in which (a) is a side view thereof, (b) is a partially enlarged view the other, and (c) is a partially enlarged perspective view thereof.

Figure 64:
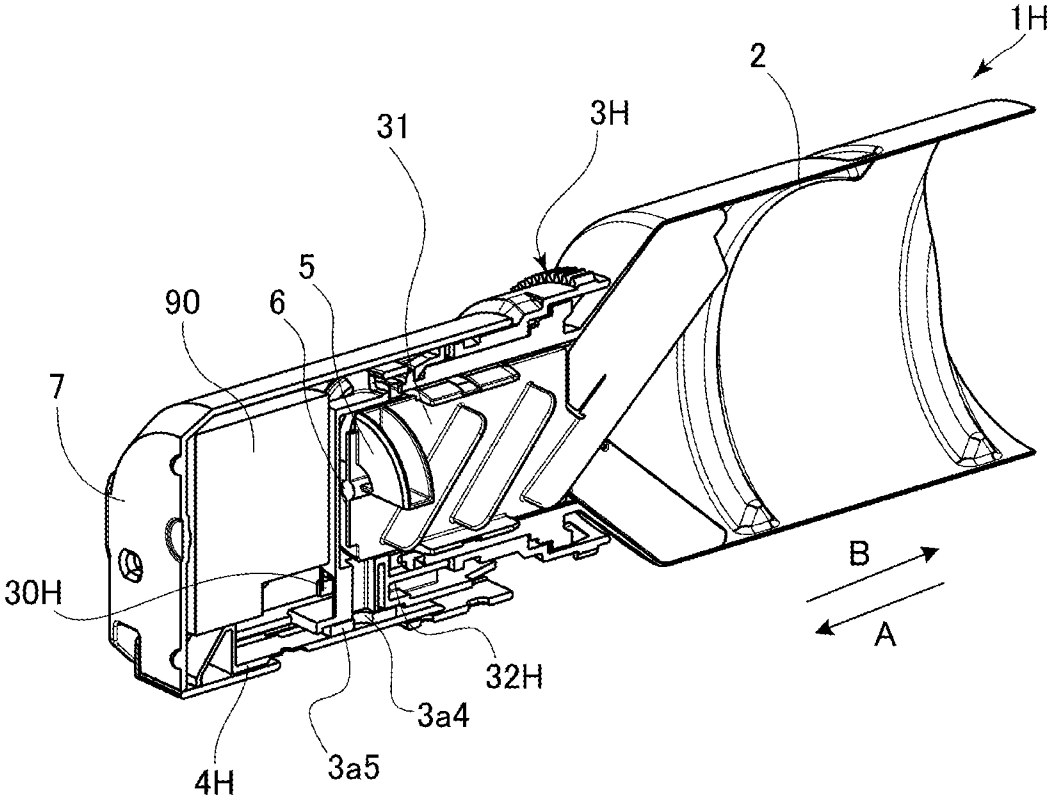

FIG. 64 is a partially enlarged perspective view illustrating a flange portion in Embodiment 10.

Figure 65:
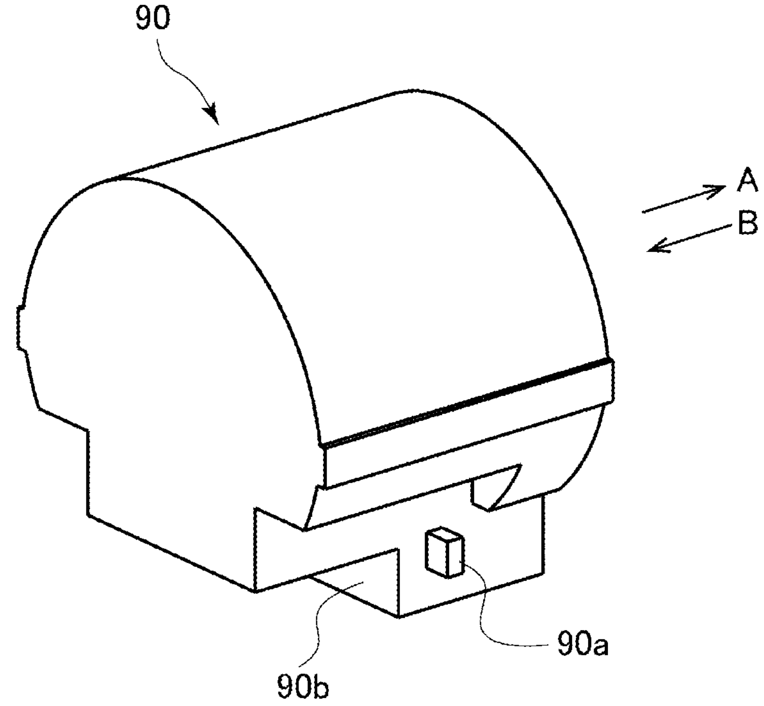
Figure 65:
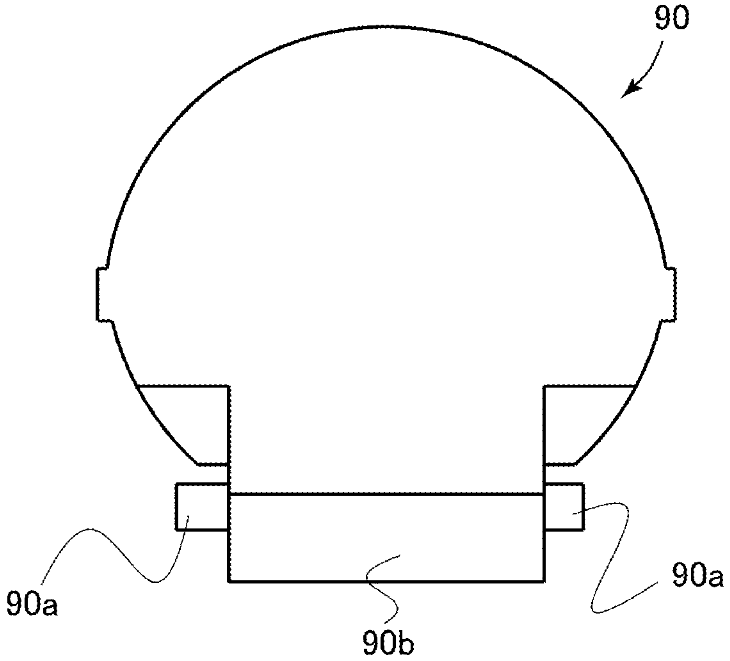

Parts (a) and (b) of FIG. 65 show a weight, in which (a) is a perspective view thereof, and (b) is a front view thereof.

Figure 66:
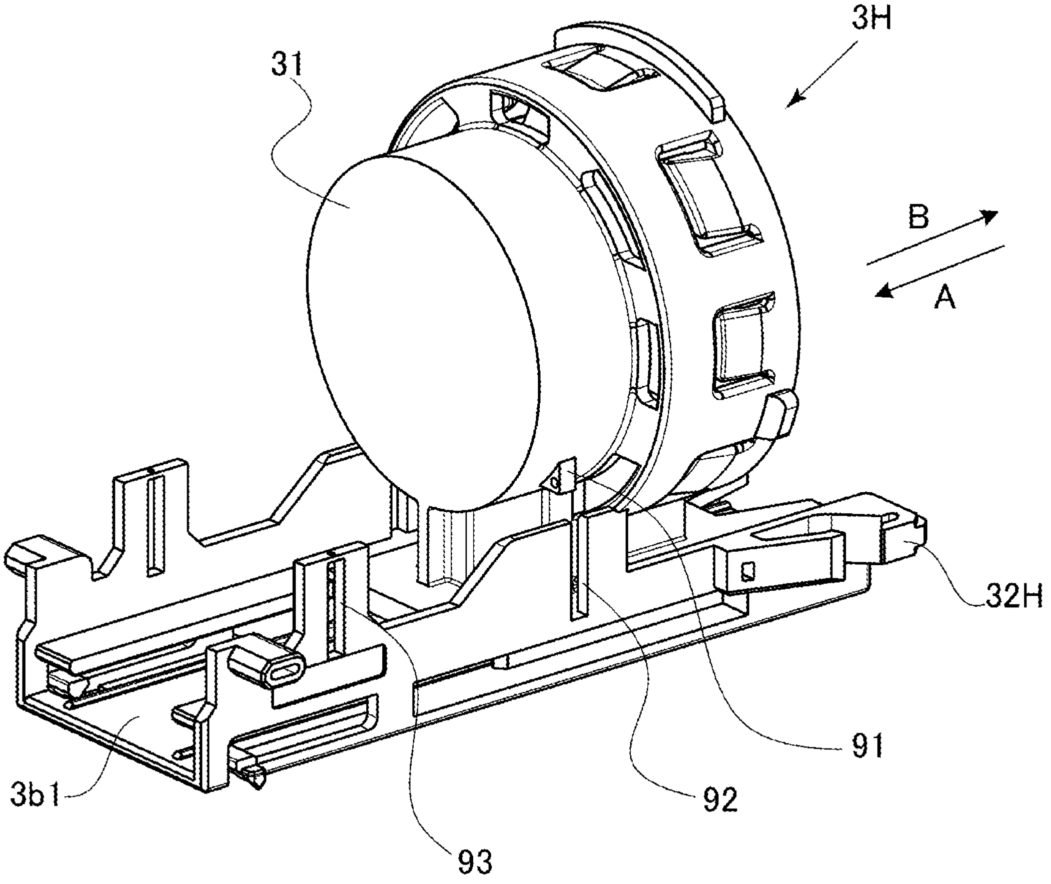

FIG. 66 is a perspective view illustrating a flange portion in Embodiment 10.

Figure 67:
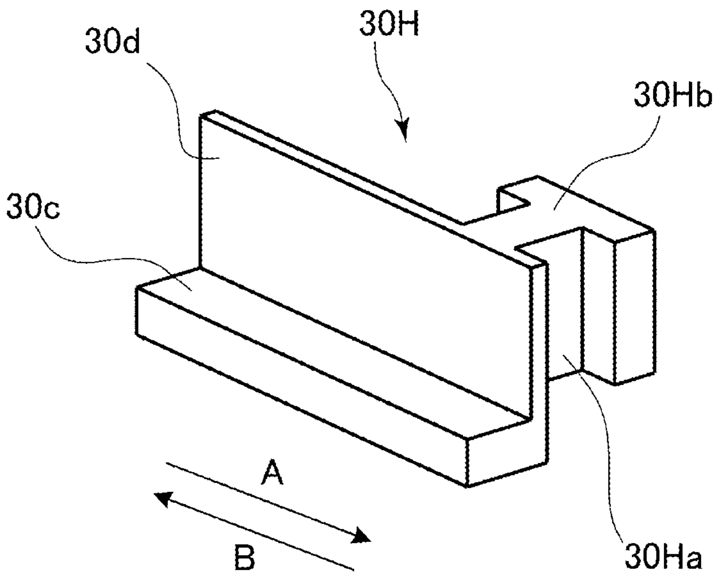

FIG. 67 is a perspective view illustrating a lift portion in Embodiment 10.

Figure 68:
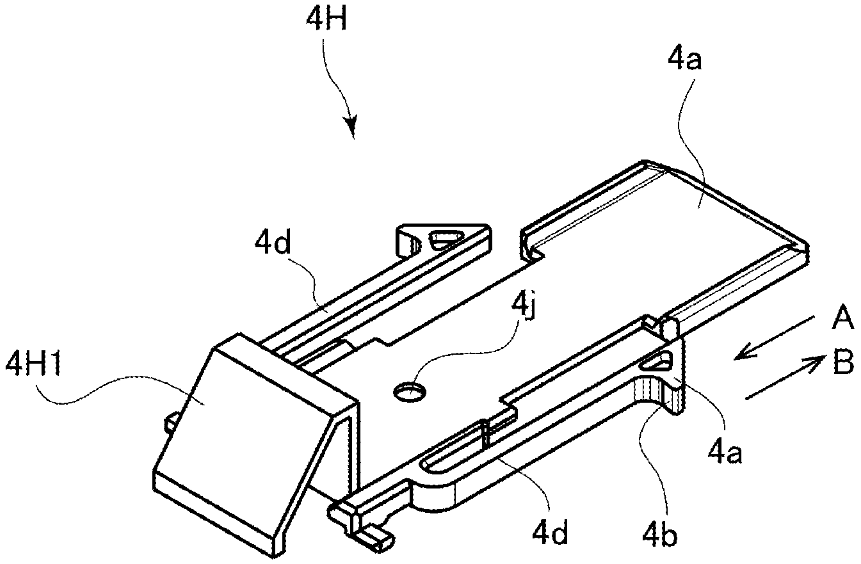

FIG. 68 is a perspective view illustrating a shutter in Embodiment 10.

Figure 69:
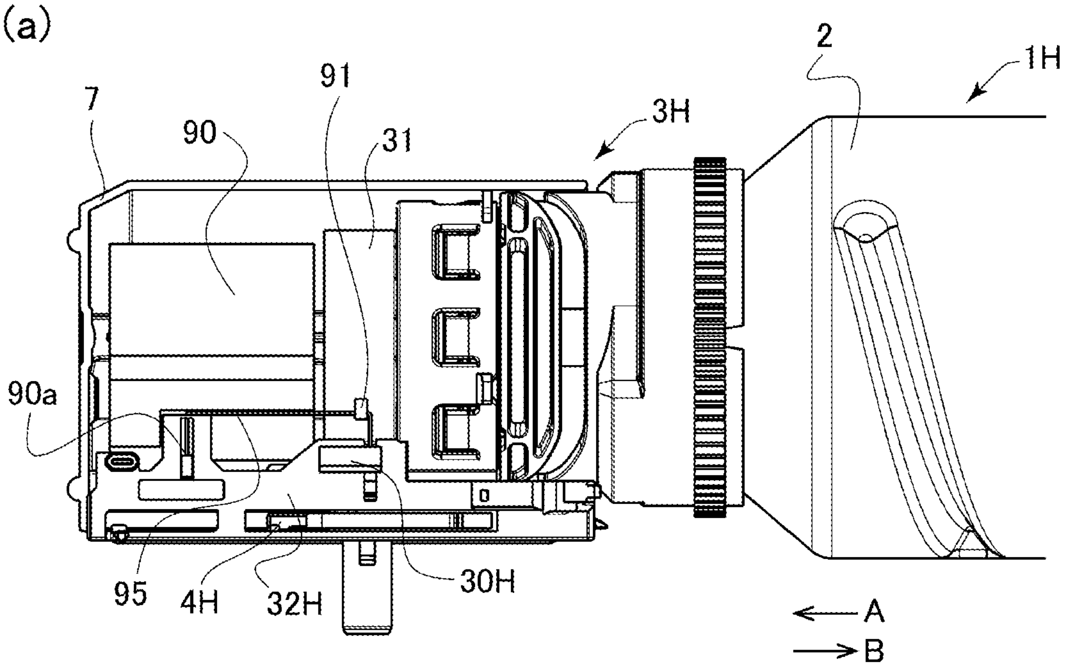
Figure 69:
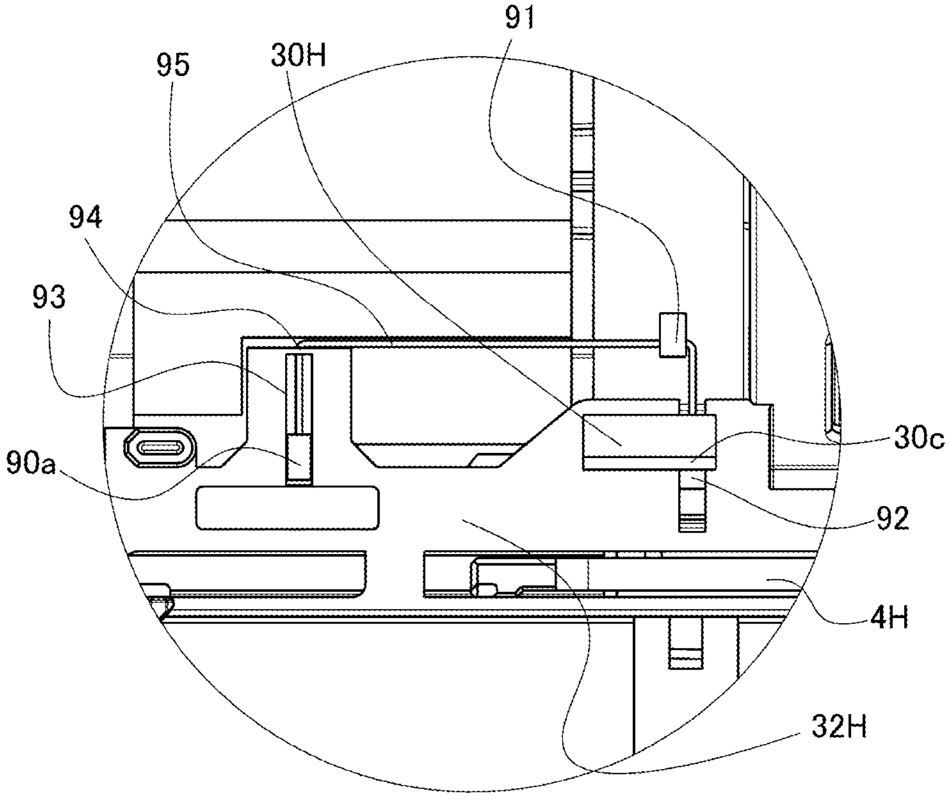

Parts (a) and (b) of FIG. 69 show a flange portion in Embodiment 10, in which (a) is a side view, and (b) is a partially enlarged view.

Figure 70:
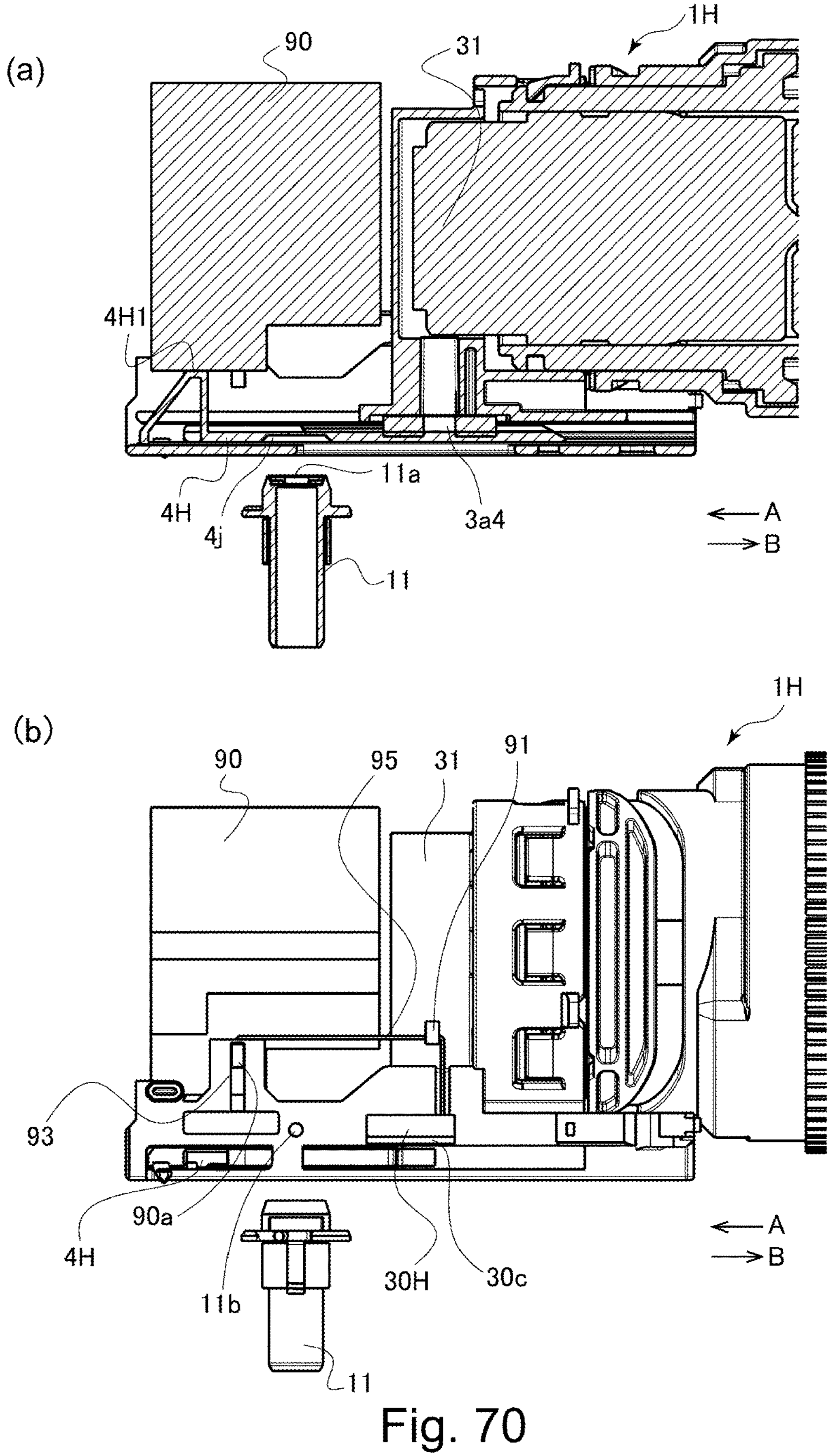

Parts (a) and (b) of FIG. 70 show a state at the time of starting the mounting operation, in which (a) is a sectional view illustrating positions of a weight and a shutter, and (b) is a side view illustrating positions of a lift portion and a developer receiving portion.

Figure 71:
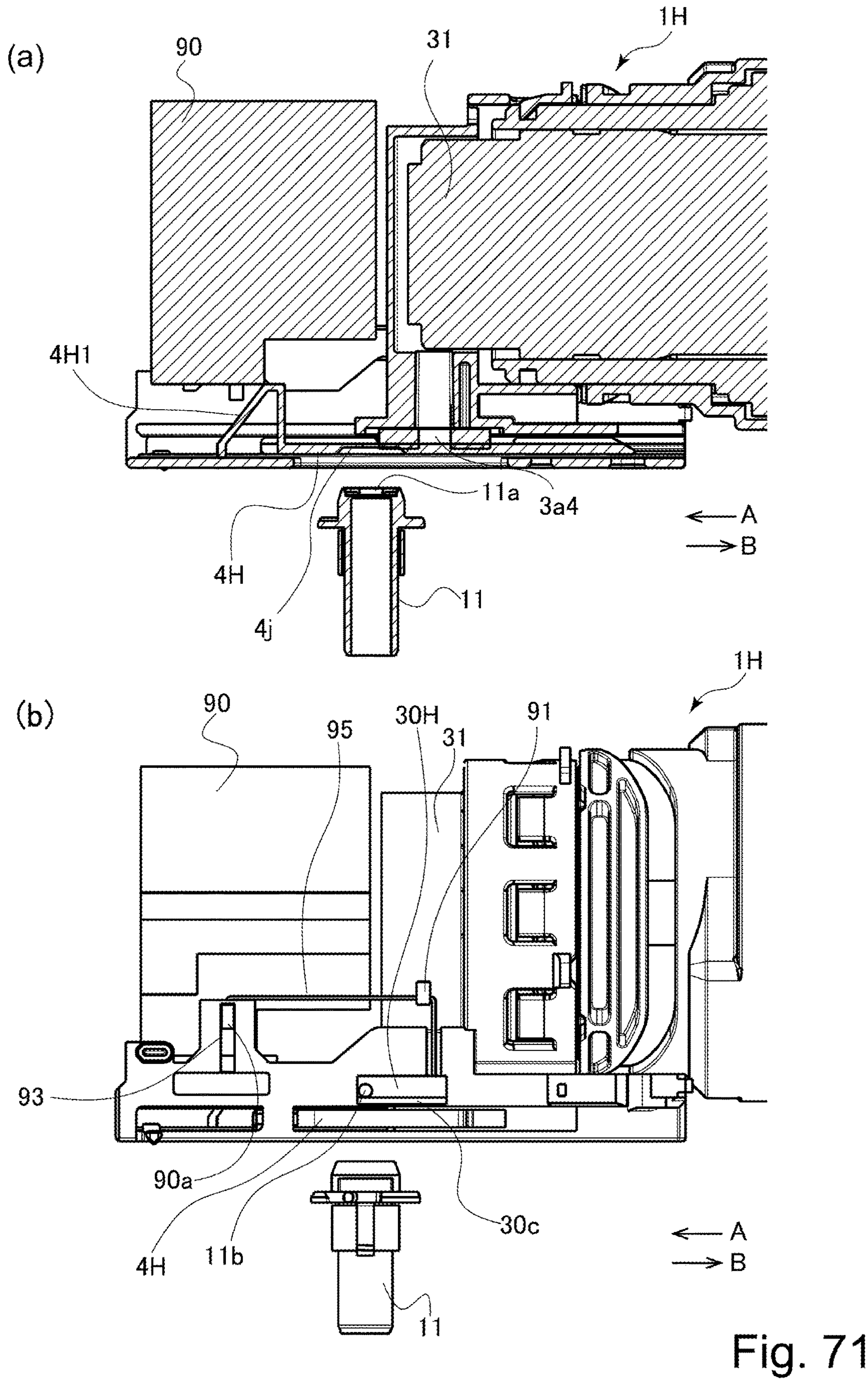

Parts (a) and (b) of FIG. 71 show a state at the start of rising, in which (a) is a sectional view illustrating a position of the weight and the shutter, and (b) is a side view illustrating the positions of the lift portion and a developer receiving portion.

Figure 72:
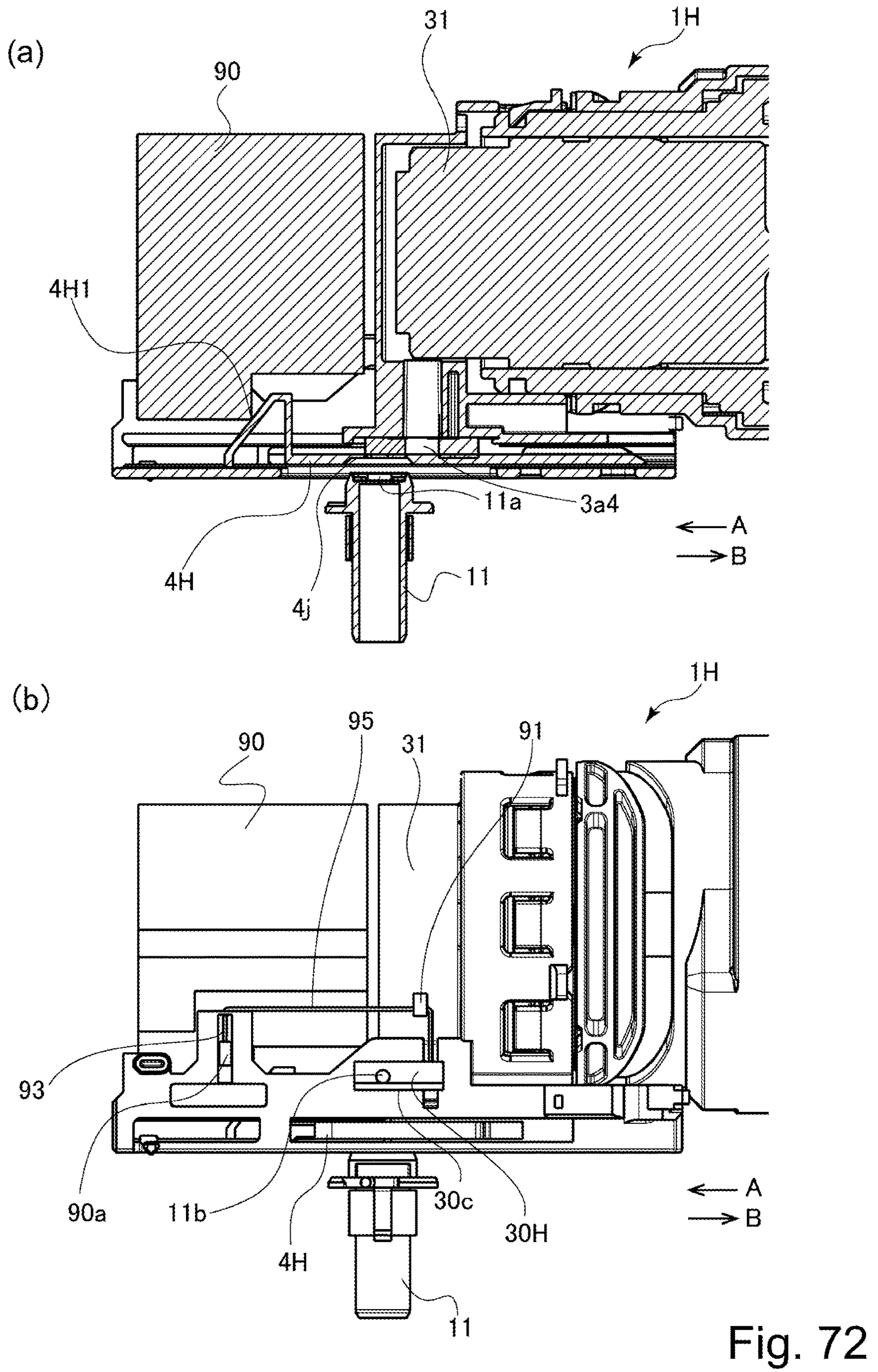

Parts (a) and (b) of FIG. 72 show a state partway of the rising, in which (a) is a sectional view illustrating a position of the weight and the shutter, and (b) is a side view illustrating positions of the lift portion and the developer receiving portion.

Figure 73:
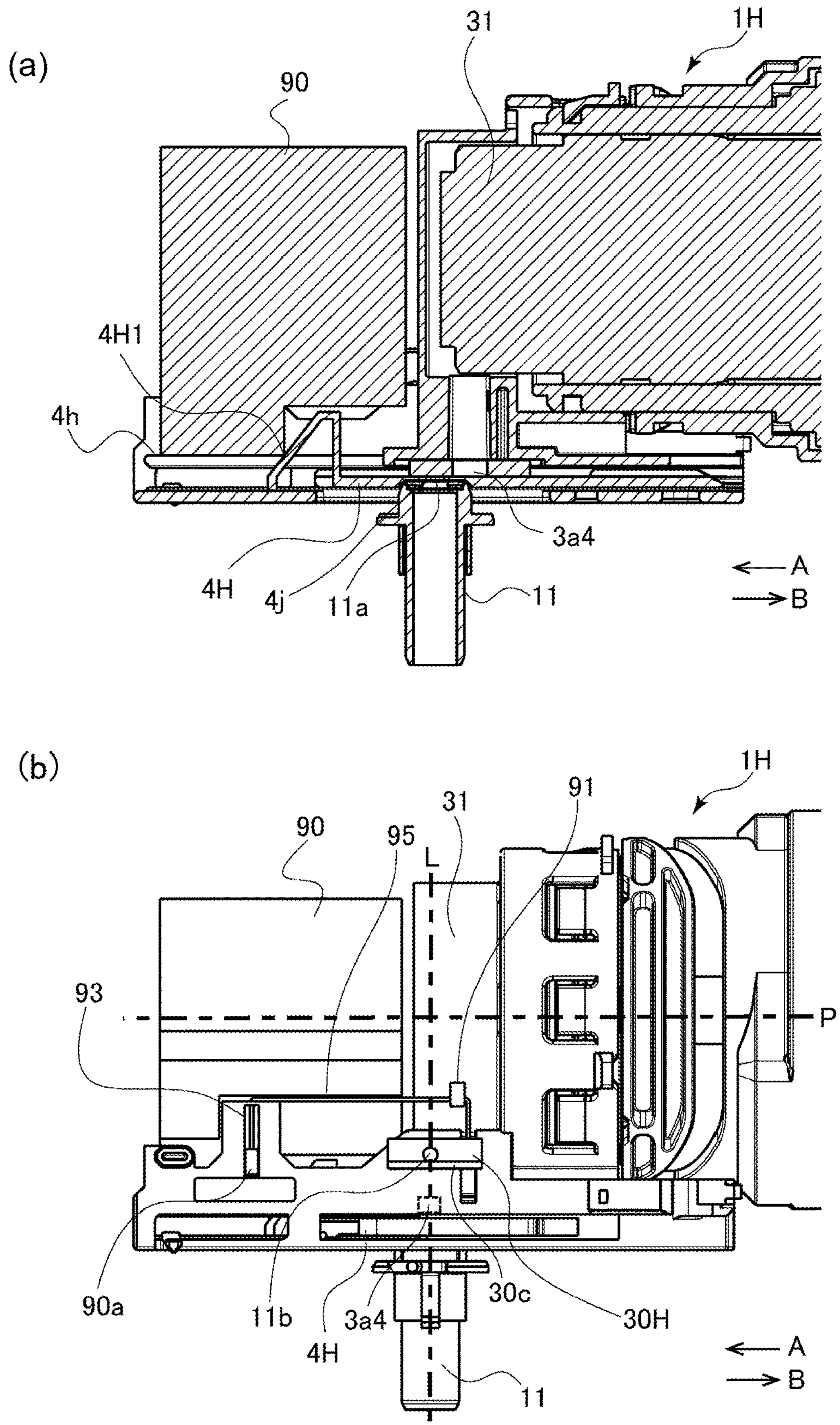

Parts (a) and (b) of FIG. 73 show the state at the completion of the rise, in which (a) is a sectional view illustrating a position of the weight and the shutter, and (b) is a side view illustrating the positions of the lift portion and the developer receiving portion.

Figure 74:
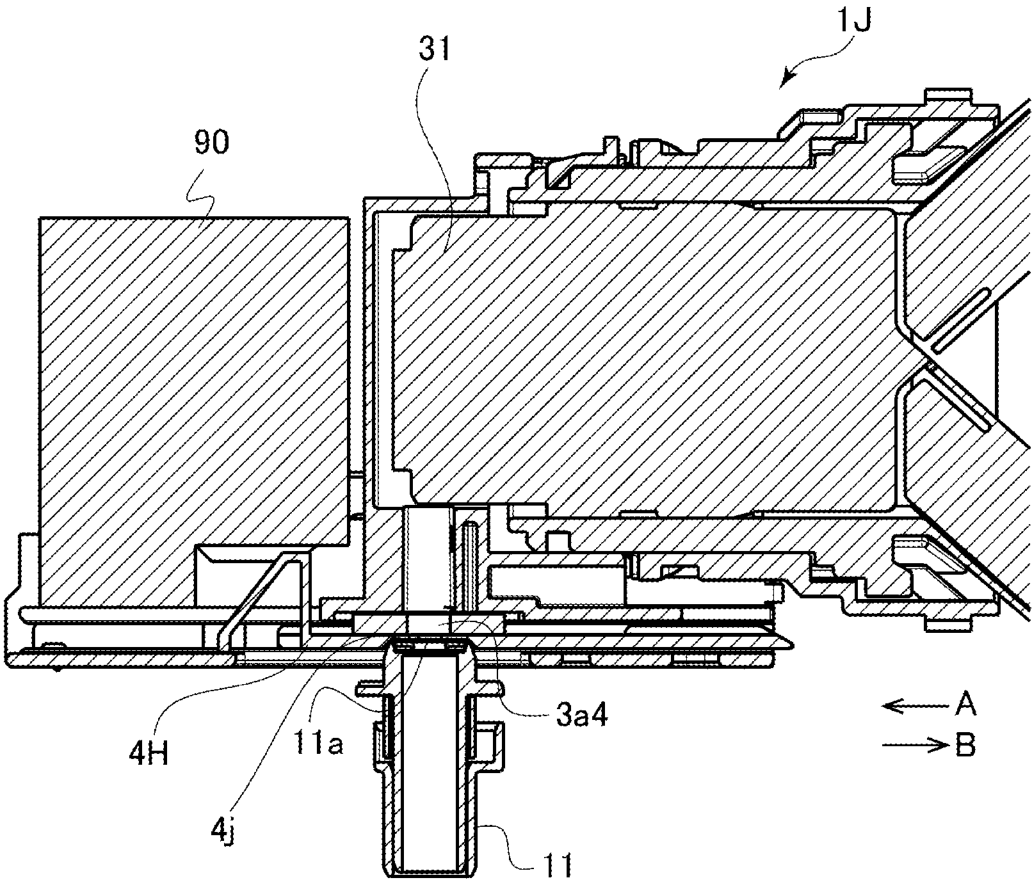

FIG. 74 is a cross-sectional view illustrating the positions of the weight, the shutter, and the developer receiving portion at the completion of mounting.

Figure 75:
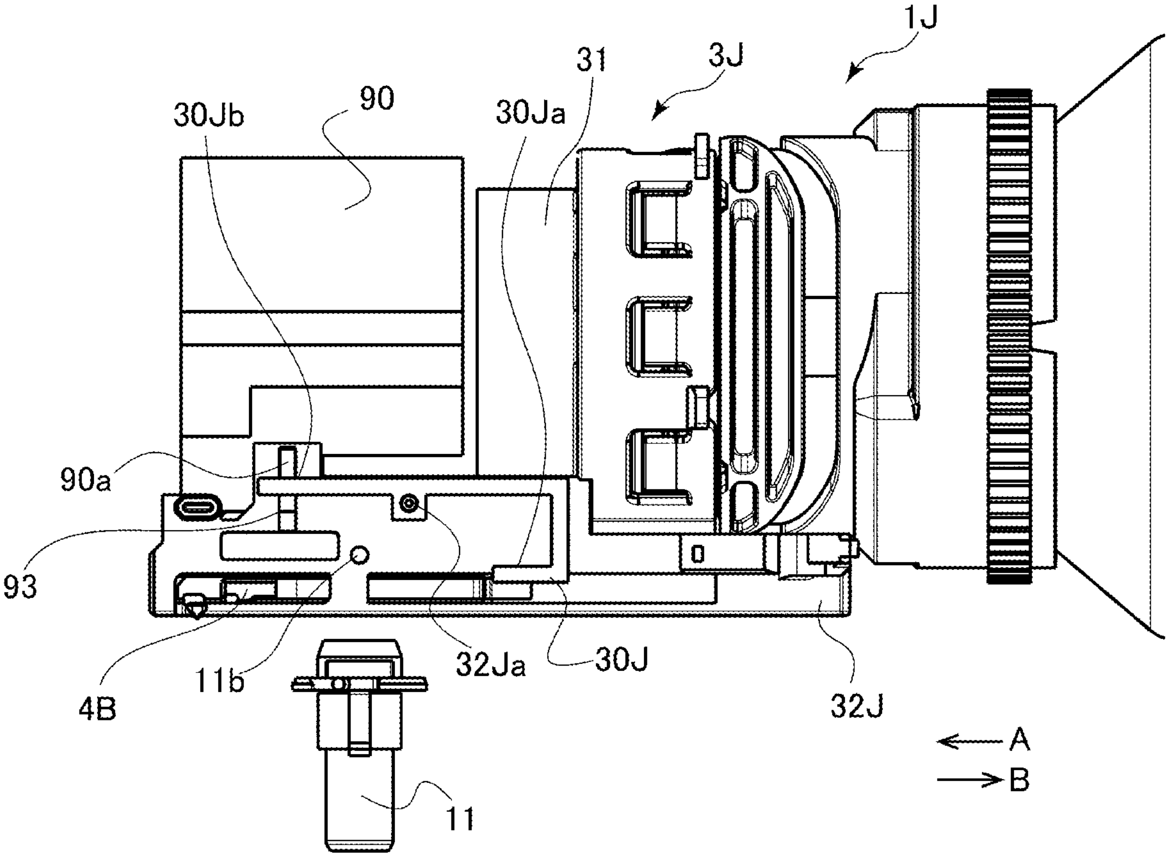

FIG. 75 is a side view illustrating the flange portion in Embodiment 11.

Figure 76:
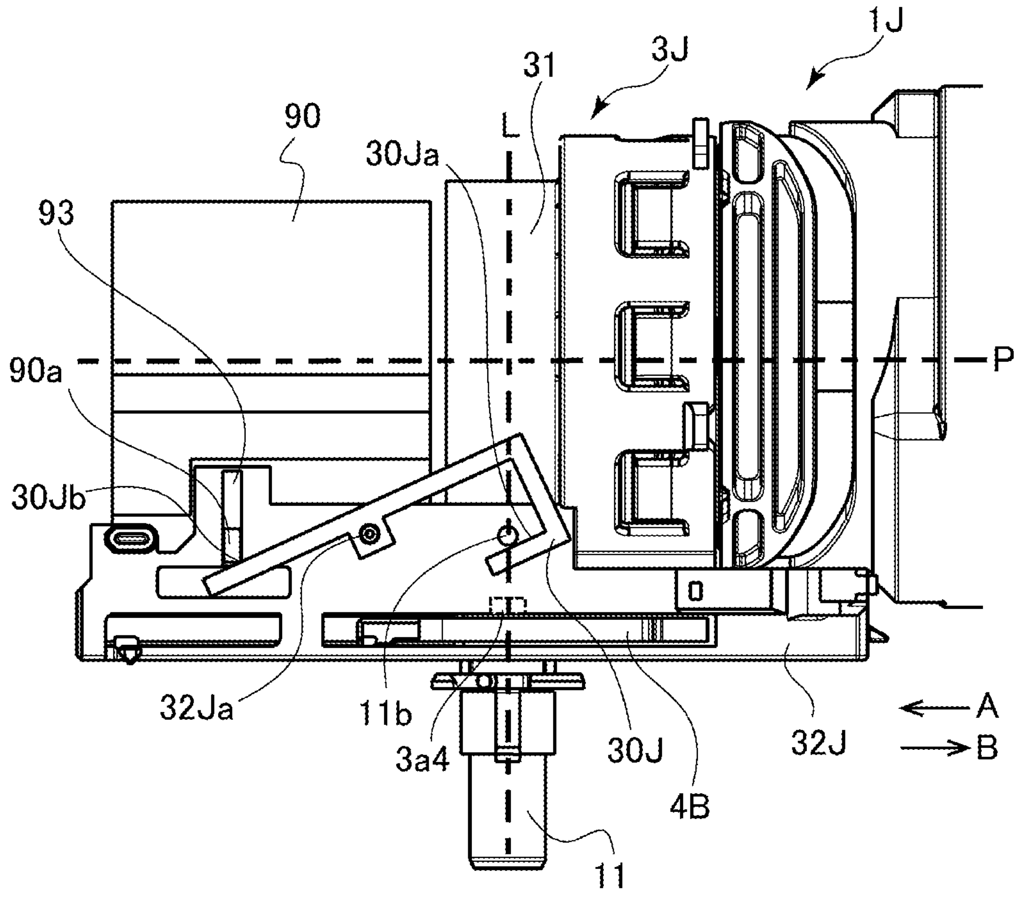

FIG. 76 is a side view illustrating an operation of a lift portion.

Figure 77:
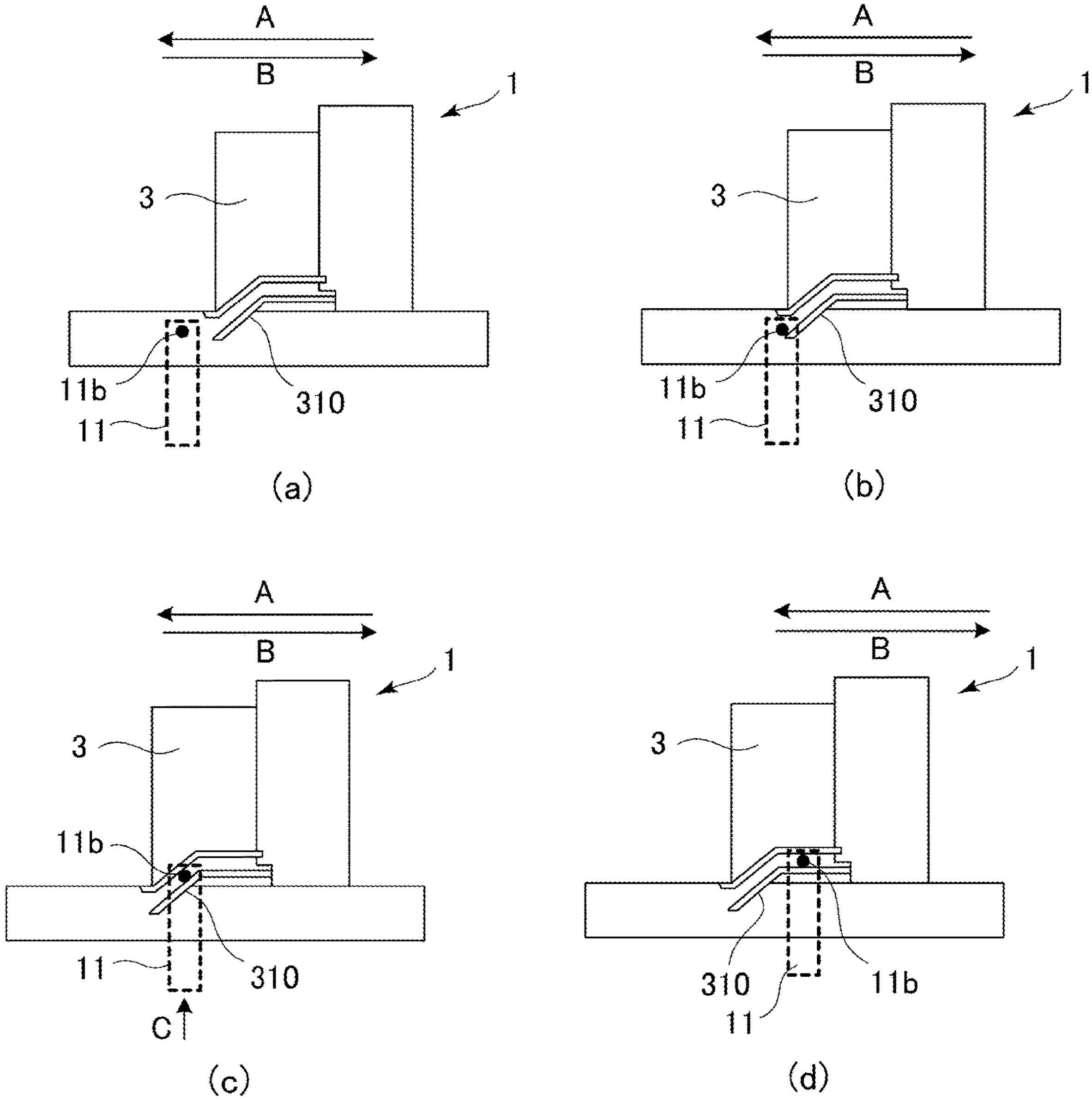

Part (a), (b), (c) and (d) of FIG. 77 show a conventional example, wherein (a) shows a state at the time of start of mounting, (b) shows a state at the start of rising, (c) shows a state partway of rising, and (d) shows a state at the time of mounting completion.

DESCRIPTION OF THE EMBODIMENTS

Embodiment 1

In the following, referring to FIGS. 1-18, Embodiment 1 of the present invention will be described. First, referring to FIG. 1 and FIG. 2, an image forming apparatus with which the present invention is usable.

[Image Forming Apparatus]

Figure 1:
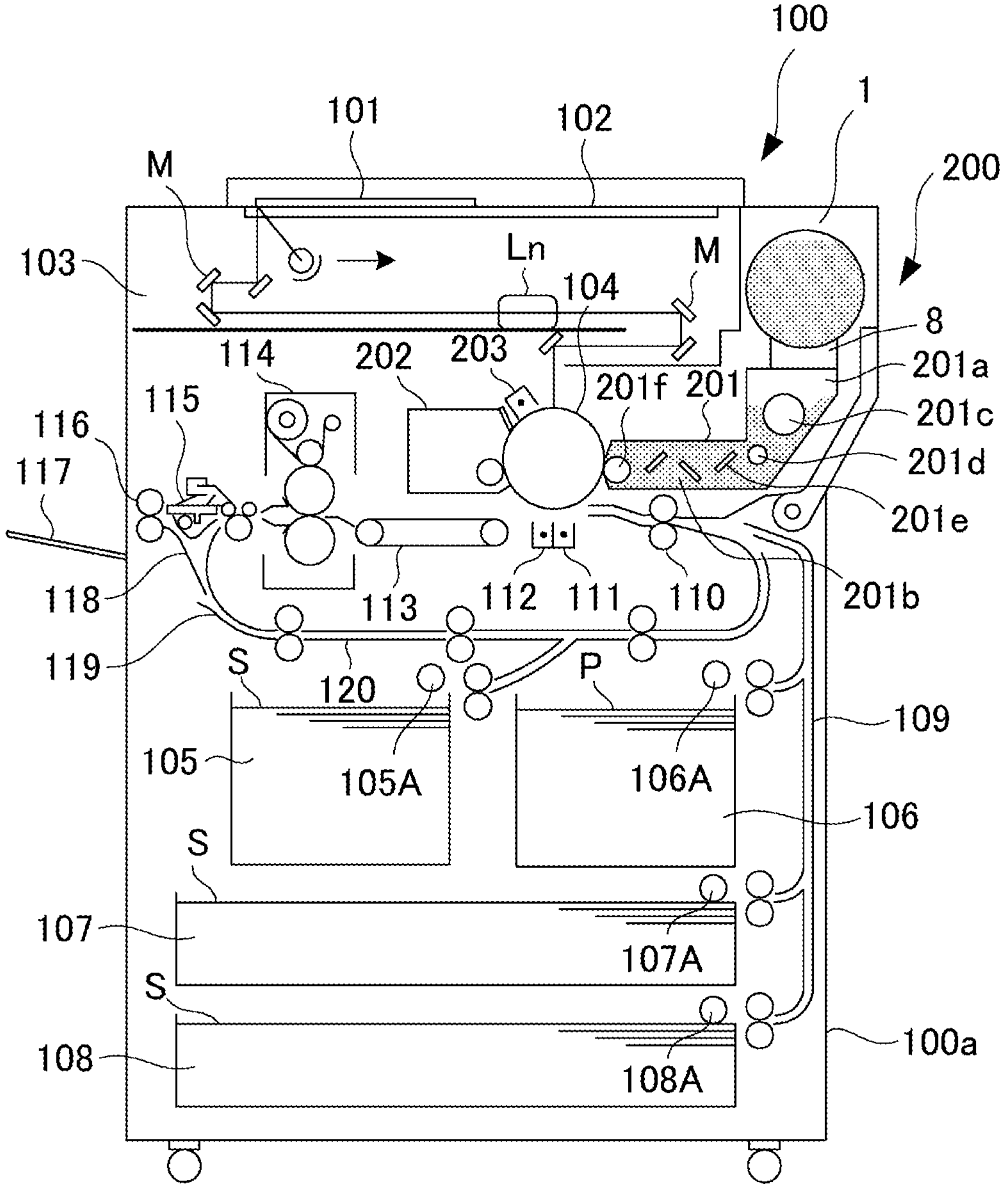
FIG. 1 is a schematic illustration showing an image forming apparatus to which the present invention can be applied.

In FIG. 1, the image forming apparatus 100 includes an original reading device 103 at a top of a main assembly 100*a* of the image forming apparatus. An original 101 is placed on an original platen glass 102. A light image corresponding to image information of the original 101 is imaged, using a plurality of mirrors M and the lens Ln of the original reading device 103, on a photosensitive drum 104 which is a cylindrical photosensitive member as an image bearing member to form an electrostatic latent image. This electrostatic latent image is visualized using toner (one component magnetic toner) as a developer (dry powder) by a dry type developing device (one-component developing device) 201. Here, in this embodiment, a one-component magnetic toner is used as the developer to be supplied from the developer supply container 1 (also referred to as a supply device), but the present invention is not limited to such an example, and it may be of a structure as will be described hereinafter.

More specifically, in the case of using a one-component developing device which performs developing operation with one component nonmagnetic toner, one component nonmagnetic toner is supplied as a developer. In addition, non-magnetic toner is supplied as the developer when using a two-component developer which develops the image using a two component developer prepared by mixing magnetic carrier and nonmagnetic toner. In this case, as the developer, a structure may be employed in which the magnetic carrier is also supplied together with the non-magnetic toner.

As described above, a developing device 201 shown in FIG. 1 develops the electrostatic latent image formed on the photosensitive drum 104 using the toner as the developer based on the image information of the original 101. In addition, a developer supplying system 200 is connected to developing device 201, and the developer supplying system 200 includes a developer supply container 1 and a developer receiving apparatus 8 relative to which the developer supply container 1 is mountable and dismountable. Developer supplying system 200 will be described hereinafter.

The developing device 201 includes a developer hopper portion 201*a* and a developing roller 201*f*. In this developer hopper portion 201*a*, a stirring member 201*c* for stirring the developer supplied from the supply container 1 is provided. The developer stirred by the stirring member 201*c* is fed to a feeding member (201*e*) side by a feeding member 201*d*. And, the developer which has been sequentially fed by the feeding members 201*e* and 201*b* is carried on the developing roller 201*f* and finally supplied to a developing zone where it is opposed to the photosensitive drum 104. In this embodiment, a one-component developer is used, and therefore, toner as a developer from the supply container 1 is supplied to the developing device 201, but when using a two component developer, toner and carrier as a developer may be supplied from the supply container.

Cassettes 105 to 108 contain recording materials S such as sheets of paper. When an image is to be formed, a cassette containing an optimum recording material S among the sheets contained in these cassettes 105 to 108 is selected on the basis of the information inputted by the operator (user) on the operation portion 100*d* (FIG. 2) of the image forming apparatus 100 or on the basis of the size of the original 101. Here, as for the recording material S, it is not limited to sheets of paper, but it may be an OHP sheet or the like as the case may be. One sheet of recording material S fed by the feeding and separating devices 105A to 108A is fed to registration rollers 110 by way of a feeding portion 109. Then, the recording material S is fed in synchronization with the rotation of the photosensitive drum 104 and the scan timing of the original reading device 103.

A transfer charging device 111 and a separation charging device 112 are provided at positions opposing the photosensitive drum 104 on a downstream side of the registration roller 110 in the recording material feeding direction. The image of the developer (toner image) formed on the photosensitive drum 104 is transferred onto the recording material S fed by the registration roller 110, by a transfer charging device 111. And, the recording material S onto which the toner image is transferred is separated from the photosensitive drum 104 by a separation charging device 112. Subsequently, heat and pressure are applied to the recording material S fed by the feeding portion 113 in a fixing portion 114, so that the toner is fixed on the recording material. Thereafter, the recording material S to which the toner image is fixed passes through a discharge/reversing portion 115 and is discharged to the discharge tray 117 by the discharge roller 116, in case of single-sided copy.

On the other hand, in case of double-sided copy, the recording material S passes through the discharge/reversing portion 115, and the recording material S is partly discharged to the outside of the apparatus once by the discharge roller 116. After this, at the timing when a trailing end of the recording material S passes through the switching member 118 and is still nipped by the discharge rollers 116, the position of the switching member 118 is switched, and the discharge roller 116 is rotated counterclockwise, by which the recording material S is fed again into the apparatus. Thereafter, the recording material S is fed to the registration roller 110 by way of the re-feeding and feeding portions 119 and 120, and is discharged to the discharge tray 117 by way of the same path as in the case of single-sided copying.

In the image forming apparatus 100 having the above-described structure, image forming process devices such as a developing device 201, a cleaner portion 202, a primary charging device 203 and the like are provided around the photosensitive drum 104. Here, the developing device 201 supplies the developer to the electrostatic latent image formed on the photosensitive drum 104 on the basis of the image information of the original 101 read by the original reading device 103 so as to develop the electrostatic latent image. In addition, the primary charging device 203 uniformly charges the surface of the photosensitive drum to form a desired electrostatic image on the photosensitive drum 104. Furthermore, the cleaner portion 202 has a function of removing the developer remaining on the photosensitive drum 104.

Figure 2:
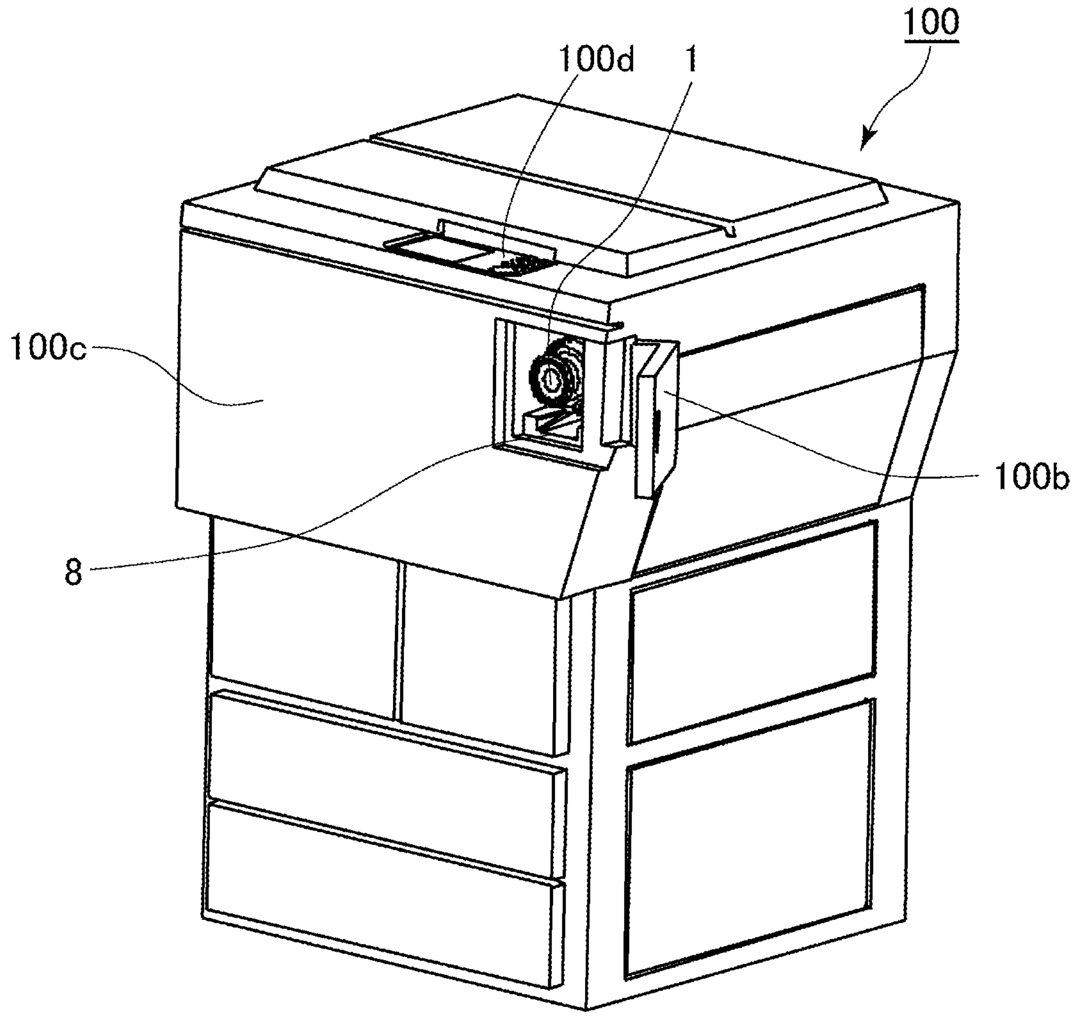
FIG. 2 is an external perspective view showing the image forming apparatus.

As shown in FIG. 2, when the operator opens a replacement cover 100*b* which is a portion of an outer cover of the apparatus main assembly 100*a* of the image forming apparatus 100, a part of the developer receiving apparatus 8 which will be described hereinafter can be seen. And, by inserting the supply container 1 into this developer receiving apparatus 8, the supply container 1 is mounted in a state where it can supply the developer to the developer receiving apparatus 8. On the other hand, when the operator exchanges the supply container 1, it carries out the operation opposite to the loading operation, by which the supply container 1 is dismounted from the developer receiving apparatus 8, and thereafter a new supply container 1 can be mounted. Here, the replacement cover 100*b* is a cover exclusively for mounting/dismounting (exchanging) the supply container 1, and is opened and closed only for dismounting/mounting the developer supply container 1. On the other hand, the maintenance operation for the image forming apparatus 100 is performed by opening/closing a front cover 100*c*. Here, the replacement cover 100*b* and the front cover 100*c* may be integrated. In such a case, the replacement of the supply container 1 and the maintenance of the image forming apparatus 100 are performed by opening and closing the integrated cover (not shown).

[Developer Receiving Apparatus]

Next, referring to part (a) of part (c) of FIG. 4 to FIG. 5, the developer receiving apparatus 8 constituting the developer supplying system 200 will be described. As shown in part (a) of FIG. 3, the developer receiving apparatus 8 is provided with a mounting portion (mounting space) 8*f* to which the supply container 1 is dismountably mounted. The mounting portion 8*f* is provided with an insertion guide 8*e* for guiding the supply container 1 in the mounting and dismounting directions. In the case of this embodiment, the structure is such that the mounting direction of the supply container 1 is the direction indicated by A, and the dismounting direction B of the supply container 1 is opposite to the direction A of mounting the supply container 1, by the insertion guide 8*e*.

As shown in part (a) of FIG. 3 to part (a) of FIG. 4, the developer receiving apparatus 8 has a driving gear 9 which functions as a driving mechanism for driving the supply container 1. A rotational driving force is transmitted to the driving gear 9 from a driving motor 500 by way of a driving gear train (not shown), so that the driving gear 9 applies the rotational driving force to the supply container 1 mounted in the mounting portion 8 *f*. The operation of the driving motor 500 is controlled by the control device 600. In addition to controlling the driving motor 500, the control device 600 controls overall of the image forming apparatus 100. The control device 600 has a CPU (Central Processing Unit), a ROM (Read Only Memory), and a RAM (Random Access Memory). The CPU controls each portion while reading the program corresponding to a control procedure stored in the ROM. In addition, working data and an input data are stored in the RAM, and the CPU executes control while looking up the data stored in the RAM on the basis of the program etc.

In the mounting portion 8*f* of the developer receiving apparatus 8, there is provided a developer receiving portion 11 for receiving the developer discharged out of the supply container 1. The developer receiving portion 11 is connected to a container discharge opening 3*a*4 (part (b) of FIG. 5) of the supply container 1 when the supply container 1 is mounted, and has a receiving opening 11*a* for receiving the developer discharged through the container discharge opening 3*a*4. The developer receiving portion 11 is mounted so as to be movable (displaceable) in the direction in which the receiving opening 11*a* moves toward and away from the container discharge opening 3*a*4 (in this embodiment, in the vertical direction relative to the developer receiving apparatus 8)). In the case of this embodiment, as shown in part (b) of FIG. 3, the developer receiving portion 11 is urged by an urging member (e.g. coil spring) 12 in a direction in which the receiving opening 11*a* moves away from the container discharge opening 3*a*4 (vertically downward). Therefore, when the receiving opening 11*a* moves toward the container discharge opening 3*a*4 (upward in the vertical direction), the developer receiving portion 11 moves against the urging force of the urging member 12.

In addition, as shown in part (a) of FIG. 4, a shutter stopper portions 8*a* and 8*b* are provided on the mounting portion 8*f* of the developer receiving apparatus 8 in the upstream side, in the mounting direction (direction of arrow A), of the developer receiving portion 11. In the supply container 1 which is moving relative to the developer receiving apparatus 8 during mounting and dismounting, the shutter stopper portions 8*a* and 8*b* restrict relative movement of the shutter 4 only (part (a) of FIG. 9 and the like) with respect to the developer receiving apparatus 8, which will be described later. In this case, the shutter 4 moves relative to a portion of the supply container 1 other than the shutter 4, such as the container body 2 and the like which will be described later.

As shown in part (b) of FIG. 3 and part (b) of FIG. 4, below the developer receiving apparatus 8 in the vertical direction, a sub hopper 8*c* for temporarily storing the developer supplied from the supply container 1 is provided. In this sub hopper 8*c*, a feeding screw 14 for feeding the developer to a developer hopper portion 201*a* (FIG. 1) which is a portion of the developing device 201, and an opening 8*d* communicating with the developer hopper portion 201*a* are provided.

As shown in part (c) of FIG. 4, a main assembly seal 13 formed so as to surround the receiving opening 11*a* is provided in the developer receiving portion 11. The main assembly seal 13 comprises an elastic member, foam and so on. With the supply container 1 mounted, the main assembly seal 13 and an opening seal 3*a*5 (part (b) of FIG. 5) surrounding the container discharge opening 3*a*4 of the supply container 1 sandwich the shutter 4 (part (a) of FIG. 13) in close contact therewith. By this, the developer discharged from the container discharge opening 3*a*4 of the supply container 1 through the shutter opening 4*j* of the shutter 4 to the receiving opening 11*a* is prevented from leaking out of the receiving opening 11*a* (developer feed path).

Here, it is desirable that a diameter of the receiving opening 11*a* is substantially the same as or slightly larger than a diameter of the shutter opening 4*j* of the shutter 4, in order to prevent the interior of the mounting portion 8*f* from being contaminated by the developer. This is because if the diameter of the receiving opening 11*a* is smaller than the diameter of the shutter opening 4*j*, the developer discharged from the shutter opening 4*j* is more likely to be deposited on the upper surface of the main assembly seal 13. If the developer is deposited on the lower surface of the supply container 1 at the time of mounting/dismounting operation of the supply container 1, it becomes a cause of contamination by the developer. In view of this point, it is preferable that the diameter of the receiving opening 11*a* is roughly the same as or about 2 mm larger than the diameter of the shutter opening 4*j*. For example, in the case that the diameter of the shutter opening 4*j* of the shutter 4 is a fine hole (pinhole) of about 2 mm in diameter, it is preferable that the diameter of the receiving opening 11*a* is about 3 mm.

In addition, as shown in part (c) of FIG. 4, on the side surface of the developer receiving portion 11, a supported portion (portion to be supported) 11*b* projecting toward the center side is provided. In the case of this embodiment, the supported portion 11*b* is supported by a lifting portion 30 (part (a) of FIG. 8) (which will be described herein after) at the bottom portion. Although the details will be described hereinafter, in this embodiment, the operation of the lifting portion 30 moves the developer receiving portion by way of the supported portion 11*b*. The lifting portion 30 will be described hereinafter.

[Supply Container]

Next, referring to part (a) FIG. 5 to part (b) of FIG. 13, the supply container 1 constituting the developer supplying system 200 will be described. First, referring to parts (a) and (b) of FIG. 5, the overall structure of the supply container 1 will be described. The supply container 1 mainly includes the container body 2, a flange portion 3, the shutter 4, a pump portion 5, a reciprocating member 6, a cover 7, and a lifting portion 30. The supply container body 2 supplies the developer to the developer receiving apparatus 8 by rotating in the developer receiving apparatus 8 (part (a) of FIG. 3) in the direction indicated by an arrow R about the rotation axis P shown in part (a) of FIG. 5. In the following, each element constituting the supply container 1 will be described in detail.

[Container Body]

As shown in FIG. 6, the container body 2 mainly comprises a developer accommodating portion 2*c* for containing the developer. In addition, the container body 2 is provided with a helical feeding groove 2*a* (feeding portion) for feeding the developer in the developer accommodating portion 2*c* by rotating the container body 2 in the direction of the arrow R around the rotation axis P. In addition, as shown in FIG. 6, a cam groove 2*b* and a drive receiving portion (gear) 2*d* for receiving a driving force from the main assembly side are integrally formed over the entire periphery of the outer circumferential surface of the container body 2 on one end side. Here, in this embodiment, the cam groove 2*b* and the drive receiving portion (gear) 2*d* are integrally formed with the container body 2, but the cam groove 2*b* or the drive receiving portion 2*d* may be formed as a separate member and may be integrally mounted to the container body 2. In addition, in this embodiment, for example, a toner including a volume average particle diameter of 5 μm to 6 μm is accommodated in the developer accommodating portion 2*c* as the developer. In addition, in this embodiment, the developer accommodating portion 2*c* includes not only the container body 2 but also the interior spaces of the flange portion 3 and the pump portion 5 which will be described hereinafter.

[Flange Portion]

Referring to part (a) of FIG. 5 through part (b) of FIG. 8, the flange portion 3 will be described. The flange portion 3 is mounted so as to be rotatable relative to the container body 2 about the rotation axis P. And, when the developer supply container 1 is mounted to the developer receiving apparatus 8 (part (a) of FIG. 3), the flange portion 3 is held so as not to rotate in the arrow R direction relative to the mounting portion 8*f* (part (a) of FIG. 3). The flange portion 3 comprises an upper flange portion 31 and a lower flange portion 32 in consideration of ease of assembly, as will be described below, the pump portion 5, the reciprocating member 6, the shutter 4, the cover 7, and the lifting portion are assembled to the flange portion.

As shown in part (a) of FIG. 5, a pump portion 5 is threadedly joined to one end side of the upper flange portion 31, and the container body 2 is joined to the other end side with a seal member (not shown) therebetween. In addition, the reciprocating member 6 is disposed with the pump portion 5 therebetween, and the engaging projection 6*b* (part (a) of FIG. 10) provided on the reciprocating member 6 is fitted into the cam groove 2*b* (FIG. 6) of the container body 2. Also, a shutter 4 is incorporated between the upper flange portion 31 and the lower flange portion 32. In this embodiment, the flange portion 3 and the shutter 4 constitute a discharge portion 700 for discharging the developer accommodated in the developer accommodating portion 2*c*. The surface on which the shutter 4 is provided is the bottom surface of the flange portion 3. And, for the purpose of improving the appearance and for the purpose of protecting the reciprocating member 6 and the pump portion 5, the cover 7 is integrally assembled to cover the flange portion 3, the pump portion 5, and the reciprocating member 6 as a whole, as shown in part (b) of FIG. 5. Here, as shown in part (c) of FIG. 5, the lifting portion 30 described hereinafter is disposed below a plane H including the rotation axis P. This plane H including the axis of rotation P is a horizontal plane and is located below this horizontal plane.

[Top Flange Portion]

The upper flange portion 31 will be described. The upper flange portion 31 shown in part (a) of FIG. 7 is provided with a pump joint portion 3*al* screwed to the pump portion 5, a container main body joint portion 3*a*2 to which the container body 2 is connected, a container body 2, and a storing portion 3*a*3 for storing the developer. In addition, as shown in part (b) of FIG. 7, the upper flange portion 31 is provided with a circular container discharge opening 3*a*4 for discharging the developer of the storing portion 3*a*3 to the developer receiving apparatus 8 on the bottom surface, and an opening seal 3*a*5 disposed so as to surround the container discharge opening 3*a*4. Here, the opening seal 3*a*5 is adhered to the lower surface of the upper flange portion 31 with a double-sided tape or the like, for example, and is sandwiched between the shutter 4 and the upper flange portion 31 which will be described hereinafter, so that leakage of the developer from the container discharge opening 3*a*4 can be prevented.

Here, as mentioned above, the diameter of the container discharge opening 3*a*4 is about 2 mm such that which the developer is unnecessarily discharged at the time of opening and closing the shutter 4 due to the mounting and dismounting operation of the supply container 1 to the developer receiving apparatus 8 by which the surroundings thereof are not contaminated with the developer. Here, in this embodiment, although the container discharge opening 3*a*4 is formed on the lower surface side of the supply container 1, more specifically, on the bottom side of the upper flange portion 31, the present invention is not limited to this example. For example, the container discharge opening 3*a*4 may be formed on a side other than an upstream side end surface or a downstream side end surface in the mounting direction of the supply container 1 to the developer receiving apparatus 8. Even in such a case, the connection structure shown in this embodiment can be applied. When the container discharge opening 3*a*4 is formed on a side surface, the position thereof can be selected in consideration of individual circumstances of the product.

[Lower Flange Part]

The lower flange portion 32 will be described. As shown in part (a) of FIG. 7, the lower flange portion 32 is provided with a shutter insertion portion 3*b*1 into which a shutter 4 (part (a) of FIG. 13) to be described hereinafter is inserted. The lower flange portion 32 is integrated with the upper flange portion 31 in a state in which the shutter 4 is inserted in the shutter insertion portion 3*b*1.

In the case of this embodiment, a pair of lift holding portions 3*b* for holding a later-described lifting portion 30 (part (a) in FIG. 12) are extended from the lower side to the upper side on the respective sides of the lower flange portion 32 in a widthwise direction crossing with the mounting/dismounting direction of the supply container 1 and crossing in the vertical direction. As shown in part (a) of FIG. 8 and part (b) of FIG. 8, a pair of lift holding portions 3*b* arranged to face each other in the mounting direction of the supply container 1 holds the lifting portion 30 so as to be slidable in the vertical direction. In the case of this embodiment, the lift holding portion 3*b* is formed in a recess shape so as to be engageable with the fitting portion 30*a* (part (a) of FIG. 12) of the protrudingly formed lifting portion 30. And, below the pair of lift holding portions 3*b*, a lift stopper portion 3*c* extending from one side to the other side is formed. The lift stopper portion 3*c* falls downward in the vertical direction due to its own weight and abuts to the lifting portion 30 when there is no force to lift the lifting portion 30 upward in the vertical direction is applied.

[Pump Portion]

Referring to parts (a) and (b) of FIG. 9, the pump portion 5 will be described. The pump portion 5 alternately and repeatedly changes the internal pressure of the developer accommodating portion 2*c*, switching between a state lower than the atmospheric pressure and a state higher than atmospheric pressure by the driving force (FIG. 6) received by the drive receiving portion 2*d* of the container body 2. In this embodiment, in order to stably discharge the developer through the small container discharge opening 3*a*4 as described above, the pump portion 5 is provided at a portion of the supply container 1. The pump portion 5 is a displacement type pump in which a volume is changed. More specifically, the pump portion 5 employed in this embodiment has a bellows-like stretchable member capable of expanding and contracting.

The pressure inside the supply container 1 is changed by the expansion and contracting operations of the pump portion 5, and the developer is discharged by utilizing the pressure. More specifically, when the pump portion 5 is contracted, the interior of the supply container 1 is brought into a compressed state, and the developer is pushed out to discharge through the container discharge opening 3*a*4 of the supply container 1. In addition, when the pump portion 5 is expanded, the interior of the supply container 1 is brought into a reduced pressure state, and the air is taken in from the outside through the container discharge opening 3*a*4. By air taken in, the developer in the container discharge opening 3*a*4 and in the neighborhood of the storing portion 3*a*3 (part (a) of FIG. 7) that stores the developer transported from the container body 2 of the flange portion 3 is loosened and smoothly discharged. That is, in the neighborhood of the container discharge opening 3*a*4 of the supply container 1 and the neighborhood of the storing portion 3*a*3, the developer in the supply container 1 may gather due to vibrations imparted when transporting the supply container 1 and so on, with the possible result that the developer is caked in this portion. Therefore, as described above, the air is taken in through the container discharge opening 3*a*4, so that it is possible to loosen the developer that has been caked. In addition, in the usual discharging operation of the developer, as air is taken in as described above, the air and the powder as the developer are mixed with the result that the flowability of the developer is enhanced, and therefore, clogging of the developer does not easily occur, as an additional advantage.

As shown in part (a) of FIG. 9 in the pump portion 5, a joint portion 5*b* is provided so as to be able to be joined with the upper flange portion 31 on the opening end side (dismounting direction B). In this embodiment, screw threads are formed as the joint portion 5*b*. In addition, as shown in part (b) of FIG. 9, the pump portion 5 has a reciprocating member engaging portion 5*c* which engages with the reciprocating member 6 (parts (a) of FIG. 10), which will be described hereinafter, on the other end side.

In addition, as shown in part (b) of FIG. 9, the pump portion 5 has a bellows-shaped expandable portion (bellows portion, expansion and contraction member) 5*a* in which crests and bottoms are alternately formed periodically. The expansion and contraction portion 5*a* is capable by being folded by moving the reciprocating member engaging portion 5*c* in the direction of the arrow B or expanded by moving it in the direction of the arrow B along the folding lines (with folding lines as the base point). Therefore, when the bellows-like pump portion 5 as employed in this embodiment, it is possible to reduce variations in volumetric change with respect to the expansion and contraction amount, and therefore, it is possible to accomplish the stable volumetric change.

Here, in this embodiment, polypropylene resin is used as the material of the pump portion 5, but the present invention is not limited to this example. As for the material (material) of the pump portion 5, any material may be used as long as it has an expansion and contraction function and is capable of changing the internal pressure of the developer accommodating portion 2*c* by changing the volume. For example, ABS (acrylonitrile-butadiene-styrene copolymer), polystyrene, polyester, polyethylene, and so on are usable. Or, rubber, other stretchable materials or the like can also be used.

[Reciprocating Member]

Referring to parts (a) and (b) of FIG. 10, the reciprocating member 6 will be described. As shown in parts (a) and (b) of FIG. 10, in order to change the volume of the pump portion 5, the reciprocating member 6 is provided with a pump engaging portion 6*a* (part (b) of FIG. 9) which engages with the reciprocating member engaging portion 5*c* provided on the pump portion (part (b) of FIG. 10). In addition, the reciprocating member 6 is provided with an engaging projection 6*b* to be engaged with the above-described cam groove 2*b* (FIG. 6) at the time of assembly. The engaging projection 6*b* is provided at the free end portion of the arm 6*c* extending in the mounting and dismounting direction (arrows A and B in the Figure) from the neighborhood of the pump engaging portion 6*a*. In addition, the reciprocating member 6 is regulated in rotation around the rotation axis P (part (a) of FIG. 5) of the arm 6*c* by the reciprocating member holding portion 7*b* (part (b) of FIG. 11) of the cover 7 which will be described hereinafter. Therefore, when the container body 2 is driven by the drive receiving portion 2*d* by the driving gear 9, and the cam groove 2*b* rotates integrally, the reciprocating member 6 reciprocates back and forth in the directions A and B by the urging action of the engaging projection 6*b* fitted in the cam groove 2*b* and the reciprocating member holding portion 7*b* of the cover 7. Accordingly, the pump portion 5 engaged with the pump engaging portion 6*a* of the reciprocating member 6 by way of the reciprocating member engaging portion 5*c* expands and contracts in the direction B and the direction A.

[Cover]

Referring to parts (a) and (b) of FIG. 11, the cover 7 will be described. As described above, the cover 7 is provided as shown in part (b) of FIG. 5 for the purpose of improving the appearance of the supply container 1 and protecting the reciprocating member 6 and the pump portion 5. In more detail, the cover 7 is provided integrally with the upper flange portion 31 and the lower flange portion 32 and so on so as to cover the entirety of the flange portion 3, the pump portion 5, and the reciprocating member 6. As shown in part (a) of FIG. 11, the cover 7 is provided with a guide groove 7*a* to be guided by the insertion guide 8*e* (part (a) of FIG. 3) of the developer receiving apparatus 8. In addition, as shown in part (b) of FIG. 11, the cover 7 is provided with a reciprocating member holding portion 7*b* for restricting rotation of the reciprocating member 6 about the rotation axis P (part (a) of FIG. 5).

[Lift Section]

Referring part (a) of FIG. 12 and part (b) of FIG. 12, the lifting portion 30 will be described. The lifting portion 30 as the support portion is provided with the fitting portion 30*a*, a shutter sliding portion 30*b*, a receiving support portion 30*c*, and the lift body portion 30*d*. The fitting portion 30*a* is formed at each end portion of the lift main assembly portion 30*d* with respect to the mounting and dismounting direction of the supply container 1 and engages with the lift holding portion 3*b* (part (a) of FIG. 8) of the flange portion 3. By this, the lifting portion 30 is held slidably in the vertical direction relative to the flange portion 3.

As shown in part (a) of FIG. 12, the lift main assembly portion 30*d* is formed so that the receiving support portion 30*c* projects in the width direction and extends in the mounting direction (direction of arrow A) of the supply container 1. The receiving support portion 30*c* can support the supported portion (portion to be supported) 11*b* (part (c) of FIG. 4) of the developer receiving portion 11 in the vertical direction. In addition, as shown in part (b) of FIG. 12, on the surface of the lift main assembly portion 30*d* opposite to the receiving support portion 30*c*, the shutter sliding portion 30*b* as a sliding portion projects in the width direction and is extended in the mounting direction of the supply container 1. However, in the mounting direction, the length of the shutter sliding portion 30*b* is shorter than that of the receiving support portion 30*c* and is disposed on the upstream side of the center of the lift main assembly portion 30*d*. Here, in the case of this embodiment, the receiving support portion 30*c* is substantially parallel to the mounting direction or the direction of the rotation axis P (part (a) of FIG. 5), but the present invention is not limited thereto, and the receiving support portion 30*c* may be inclined.

Furthermore, in the shutter sliding portion 30*b*, a leading end surface 30*ba* in the mounting direction (the direction of the arrow A) is formed in an inclined shape. In more detail, as will be described hereinafter, the shutter sliding portion 30*b* slides relative to the shutter inclined portion 4*f* (part (b) of FIG. 13) of the shutter 4 when supplying container 1 is mounted or dismounted. Here, in order to slide smoothly relative to the shutter inclined portion 4*f* at this time, the free end surface 30*ba* of the shutter sliding portion 30*b* is inclined and the inclination angle thereof with respect to the mounting and dismounting direction of the supply container 1 is substantially the same inclination angle as that of the shutter inclined portion 4*f*.

[Shutter]

Referring to part (a) of FIG. 13 and part (b) of FIG. 13, the shutter 4 will be described. The shutter 4 slides on the shutter insertion portion 3*b*1 (part (a) in FIG. 7) of the lower flange portion 32 and is movable relative to a portion (flange portion 3) of the supply container 1. The shutter 4 has a shutter opening 4*j* to open and close the container discharge opening 3*a*4 as the discharge opening of the supply container 1, with the mounting and dismounting operation of the supply container 1. As for the shutter 4, the shutter opening 4*j* and the container discharge opening 3*a*4 communicate with each other by moving relative to the supply container 1 in accordance with the mounting operation of the supply container 1, and furthermore, the opening 11*a* of the developer receiving portion 11 communicates with each other. By this, the developer inside the supply container 1 can be discharged to the receiving opening 11*a*. That is, the discharge portion 700 (part (b) of FIG. 5) for discharging the developer is constituted by the flange portion 3 and the shutter 4, and a shutter opening 4*j* as a discharge opening for discharging the developer is formed in the shutter 4 of the discharge portion 700.

On the other hand, as shown in part (a) of FIG. 13 and part (b) of FIG. 13, a developer sealing portion 4*a* is provided at a position offset from the shutter opening 4*j* of the shutter 4. As the shutter 4 moves relative to the supply container 1 in accordance with the operation of dismounting the supply container 1, the developer sealing portion 4*a* closes the container discharge opening 3*a*4. In addition, when the supply container 1 is not mounted to the mounting portion 8*f* (part (a) of FIG. 3) of the developer receiving apparatus 8, the developer sealing portion 4*a* prevents leakage of the developer through the container discharge opening 3*a*4. A sliding surface slidable on the shutter insertion portion 3*b*1 of the flange portion 3 is provided on the back surface side (the developer receiving portion 11 side) of the developer sealing portion 4*a*. Here, the shutter 4 is engaged with the flange portion 3 with the developer sealing portion 4*a* facing upward.

The shutter 4 includes stopper portions 4*b*, 4*c* held by shutter stopper portions 8*a*, 8*b* (part (a) in FIG. 4) of the developer receiving apparatus 8 so that the supply container 1 can move relative to the shutter 4. The first stopper portion 4*b* of the stopper portions 4*b* and 4*c* is engaged with the first shutter stopper portion 8*a* of the developer receiving apparatus 8 to fix the position of the shutter 4 relative to the developer receiving apparatus 8, during the mounting operation of the supply container 1. The second stopper portion 4*c* is engaged with the second shutter stopper portion 8*b* of the developer receiving apparatus 8, during the dismounting operation of the supply container 1.

In addition, the shutter 4 has a support portion 4*d* which displaceably supports the stopper portions 4*b* and 4*c*. In order to displaceably support the first stopper portion 4*b* and the second stopper portion 4*c*, the supporting portion 4*d* is extended from the developer sealing portion 4*a* and can be elastically deformed. Here, the first stopper portion 4*b* is inclined, and the angle α formed by the first stopper portion 4*b* and the support portion 4*d* is an acute angle. On the contrary, the second stopper portion 4*c* is inclined, and the angle β formed by the second stopper portion 4*c* and the support portion 4*d* is an obtuse angle.

The shutter opening 4*j* is a discharge opening for discharging the developer in the supply container 1 to the outside, and as the shutter 4 slides relative to the flange portion 3, the developer in the supply container 1 becomes capable of being discharged to the outside only when the container discharge opening 3*a*4 and the shutter opening 4*j* communicate with each other. If the container discharge opening 3*a*4 and the shutter opening 4*j* are not communicating with each other, the developer sealing portion 4*a* closes the container discharge opening 3*a*4, and leakage of the developer to the outside of the supply container 1 is prevented.

In this embodiment, the shutter 4 is utilized to operate the lifting portion 30. In order to achieve this, as shown in part (b) of FIG. 13, a shutter inclined portion 4*f* as an inclined portion is provided on the shutter 4 so as to project from the supporting portion 4*d*. The shutter inclined portion 4*f* is inclined such that a length measured in the vertical direction gradually increases from the upstream side (front side) toward the downstream side (back side) in the mounting direction (arrow A direction) of the supply container 1. In other words, the shutter inclined portion 4*f* has an inclined surface that decreases toward the developer receiving portion from the downstream side toward the upstream side in the mounting direction. In more detail, as will be described hereinafter, when the supply container 1 moves relative to the shutter 4, the lifting portion 30 also moves relative to the shutter 4. In that case, as the shutter sliding portion 30*b* of the lifting portion 30 slides relative to the shutter inclined portion 4*f*, the lifting portion 30 is vertically moved along the shutter inclined portion 4*f* in the vertical direction.

Here, the inclined surface of the shutter inclined portion 4*f* is not limited to a straight line as shown in part (b) of FIG. 13. The shape of the shutter inclined portion 4*f* may be a curved shape, for example, as long as the lifting portion 30 can be moved in the vertical direction. However, from the standpoint of making constant the operating force in accordance with the mounting and dismounting operation of the supply container 1, a linear inclined shape is desirable. Here, it is preferable that the inclination angle of the shutter inclined portion 4*f* relative to the mounting/dismounting direction of the supply container 1 is about 10 to 50 degrees, for example. In this embodiment, the angle is about degrees.

[Operation of Developer Receiving Portion]

Referring to part (a) of FIG. 12 to Part (b) of FIG. 13, parts (a) of FIG. 14 to (d) of FIG. 15 and so on, the connecting operation of the developer receiving portion 11 to the supply container 1 by the lifting portion 30 will be described in chronological order of the mounting operation of the supply container 1 to the developer receiving apparatus 8. Part (a) of FIG. 14 and Part (a) of FIG. 15 show the state at the time of starting the mounting of the supply container 1, Part (b) of FIG. 14 and part (b) of FIG. 15 show the state of the rising start of the lifting portion 30. Part (c) of FIG. 14 and part (c) of FIG. 15 show a state of rising of the lifting portion 30, and part (d) of FIG. 14 and part (d) of FIG. 15 show the state when the mounting of the supply container 1 is completed. The parts (a) to (d) of FIG. 14 show the neighborhood of the connection between the supply container 1 and the developer receiving portion 11. The parts (a) to (d) of FIG. 15 are particularly shown in the relationship between the shutter 4 and the lifting portion 30. Here, the mounting operation is an operation until the developer can be supplied from the supply container 1 to the developer receiving apparatus 8.

At the time of starting mounting of the supply container 1 as shown in part (a) of FIG. 14, the first stopper portion 4*b* of the shutter 4 is not yet in contact with the first shutter stopper portion 8*a* of the developer receiving apparatus 8, and therefore, the shutter 4 and the lifting portion 30 move integrally without moving relative to each other in the supply container 1. When the shutter 4 and the lifting portion 30 move integrally, the inclined portion 4*f* of the shutter 4 and the shutter sliding portion 30*b* are maintained in a non-contact state where they are not in contact with each other, as shown in part (a) of FIG. 15. When the inclined portion 4*f* and the shutter sliding portion 30*b* are in a non-contact state, the lifting portion 30 is at the lowermost position abutting against the lift stopper portion 3*c*, and the receiving support portion 30*c* of the lifting portion 30 does not support the supported portion 11*b* of the developer receiving portion 11. As described in the foregoing, the developer receiving portion 11 is urged in a direction away from the supply container 1 by the urging member 12 (part (b) of FIG. 3), and therefore, the receiving opening 11*a* is separated from the container discharge opening 3*a*4 of the supply container 1. Here, the container discharge opening 3*a*4 is sealed by the developer sealing portion 4*a* of the shutter 4.

When the supply container 1 is inserted from the state shown in part (a) of FIG. 14 to the downstream side of the mounting direction, the state becomes as shown in part (b) of FIG. 14. In this case, the first stopper portion 4*b* of the shutter 4 and the first shutter stopper portion 8*a* of the developer receiving apparatus 8 are engaged with each other. By this, the position of the shutter 4 with respect to the developer receiving apparatus 8 is fixed. In this manner, by holding the position of the shutter 4 with respect to the developer receiving apparatus 8, the movement of the shutter 4 in the mounting direction (direction of arrow A) with respect to the developer receiving portion 11 is stopped, but the movement of the supply container 1 in the mounting direction with respect to the developer receiving portion 11 except for the shutter 4 is maintained. In addition, as shown in part (b) of FIG. 15, the shutter inclined portion 4*f* and the shutter sliding portion 30*b* start to contact each other. Also, the supported portion 11*b* of the developer receiving portion 11 starts to be supported from below in the vertical direction by the receiving support portion 30*c* of the lifting portion 30. That is, the lifting portion 30 is moved to a position (or a supportable position) where the receiving support portion 30*c* supports the supported portion 11*b* of the developer receiving portion 11. In this case, the shutter opening 4*j* reaches upward in the vertical direction of the receiving opening 11*a* of the developer receiving portion 11, while the container discharge opening 3*a*4 is maintained in a state sealed by the developer sealing portion 4*a* of the shutter 4. However, the developer receiving portion 11 is not displaced from its initial position, and the receiving opening 11*a* is in a state of being separated from the container discharge opening 3*a*4 (shutter opening 4*j*), as shown in part (b) of FIG. 14.

Subsequently, when the supply container 1 is further inserted from the state shown in part (b) of FIG. 14 to the downstream side of the mounting direction, the supply container 1 moves relative to the shutter 4 in the mounting direction, as shown in part (c) of FIG. 14. In addition, in this case, as shown in part (c) of FIG. 15, the shutter sliding portion 30*b* is moved upward along the inclined portion 4*f* while sliding on the shutter inclined portion 4 *f* in accordance with the mounting operation of the supply container 1. By this, the lifting portion is moved substantially upward in the vertical direction. And, the supported portion 11*b* of the developer receiving portion 11 is supported from below in the vertical direction by the receiving support portion 30*c* of the lifting portion 30, and therefore, the developer receiving portion 11 is moved upward in the vertical direction against the urging force of the urging member 12.

Subsequently, when the supply container 1 is further inserted from the state shown in part (c) of FIG. 14 toward the downstream side the mounting direction, as in the previous case, the supply container 1 moves relative to the shutter 4 in the mounting direction, by which the supply container 1 reaches the mounting completion position, as shown in part (d) of FIG. 14. The positional relationship between the container discharge opening 3*a*4 and the lifting portion at the mounting completion position is such that a plane L passing through the container discharge opening 3*a*4 (a plane perpendicular to the rotation axis P) passes through the lifting portion 30, as shown in part (d) of FIG. 14. In addition, a plane including the receiving support portion 30*c* (part (a) of FIG. 12) of the lifting portion 30 is disposed between the rotation axis P and the container discharge opening 3*a*4. And, as shown in part (d) of FIG. 15, in a state in which the shutter sliding portion 30*b* reaches the top portion of the shutter inclined portion 4*f*, the lifting portion 30 stops moving upward in the vertical direction. In this case, in the developer receiving portion 11 where the supported portion 11*b* is supported by the lifting portion 30, the receiving opening 11*a* is connected to the container discharge opening 3*a*4 of the supply container 1. In this manner, a state in which developer can be supplied is established. In more detail, the developer in the developer accommodating portion 2*c* of the container body 2 can be supplied from the storing portion 3*a*3 to the sub hopper 8 *c* through the container discharge opening 3*a*4 and the receiving opening 11*a* by the reciprocating motion of the pump portion 5 described above.

Here, as shown in part (d) of FIG. 15, when the supply container 1 reaches the mounting completion position with respect to the developer receiving apparatus 8, the supported portion 11*b* of the developer receiving portion 11 is pressed against the receiving support portion 30*c* of the lifting portion 30 by the urging force of the urging member 12. Therefore, the position of the developer receiving portion 11 in the vertical direction is kept in a stable state.

Next, the operation of the lifting portion 30 in accordance with the removal operation of the supply container 1 from the developer receiving apparatus 8 will be described. Here, the removal operation of the supply container 1 is performed in the reverse order of the above-described mounting operation. That is, in accordance with the order from part (d) of FIG. 14 and part (d) of FIG. 15 to part (a) of FIG. 14 and part (a) of FIG. 15, the supply container 1 is dismounted from the developer receiving apparatus 8. Here, the dismounting operation is an operation in which the supply container 1 is ready to be taken out from the developer receiving apparatus 8.

At the mounting completion position shown in part (d) of FIG. 14, when the amount of developer in the supply container 1 decreases, a message prompting the operator to replace the supply container 1 is displayed on a monitor (not shown) provided on the image forming apparatus 100 (FIG. 1). The operator who prepared the new supply container 1 opens the replacement cover 100*b* of the image forming apparatus 100 shown in FIG. 2, and pulls out the supply container 1 from the developer receiving apparatus 8 in the dismounting direction (direction of arrow B). In this process, the second stopper portion 4*c* of the shutter 4 is in contact with the second shutter stopper portion 8*b* of the developer receiving apparatus 8, and therefore, the shutter 4 does not displace in the dismounting direction in accordance with the operation of dismounting the supply container 1. That is, the supply container 1 moves relative to the shutter 4. In this embodiment, until supply container 1 is taken out (from part (d) of FIG. 14 to the position in part (b) in FIG. 14), the shutter 4 cannot be displaced relative to the developer receiving apparatus 8, and the supply container 1 moves relative to the shutter 4.

At this time, as shown in part (d) of FIG. 15 and part (b) of FIG. 15, the developer receiving portion 11 moves downward in the vertical direction in accordance with the dismounting operation of the supply container 1. That is, when the supply container 1 and the shutter 4 relatively move, the shutter sliding portion 30*b* is moved downward along the shutter inclined portion 4*f* so as to slide down the shutter inclined portion 4 *f*, by its own weight of the lifting portion and the urging force of the urging member 12. By this, the lifting portion 30 is substantially moved downward in the vertical direction and the developer receiving portion 11 supported by the supported portion 11*b* by the receiving support portion 30*c* of the lifting portion 30 moves downward in the vertical direction. And, along with further dismounting operation of the supply container 1, the developer receiving portion 11 is moved downward in the vertical direction by the lifting portion 30 and reaches the position shown in part (a) of FIG. 15, by which the separating operation of the developer receiving portion 11 from the supply container 1 by the lifting portion 30 is completed.

Thereafter, when taking the supply container 1 further outward in the dismounting direction, the second stopper portion 4*c* of the shutter 4 abuts to the second shutter stopper portion 8*b* of the developer receiving apparatus 8. By this, the second stopper portion 4*c* of the shutter 4 is elastically deformed along the inclined surface of the second shutter stopper portion 8*b* so that the shutter 4 can be displaced in the dismounting direction relative to the developer receiving apparatus 8 together with the supplying container 1. That is, the shutter 4 seals the container discharge opening 3*a*4. And, when the supply container 1 is taken out of the developer receiving apparatus 8, the shutter 4 is in a state in which the supply container 1 has returned to the position where it was not mounted to the developer receiving apparatus 8. Therefore, the container discharge opening 3*a*4 is reliably sealed by the shutter 4, and the developer is not scattered from the supply container 1 dismounted from the developer receiving apparatus 8.

Conventional Example

Here, referring to part (a) of FIG. 77 to part (d) of FIG. 77, the connecting operation of the developer receiving portion 11 according to the conventional example will be briefly described. As shown in part (a) of FIG. 77 to part (d) of FIG. 77, in the conventional example, a guide portion 310 engaging with the supported portion 11*b* of the developer receiving portion 11 is provided on the side surface of the flange portion 3. Following the mounting operation of the supply container 1 in the direction of the arrow A, the guide portion 310 guides the developer receiving portion 11 to displace toward the supply container 1, so that the state in which they are connected to each other to enable supply of the developer from the supply container 1 to the developer receiving portion 11 is established. In addition, along with the operation of dismounting the supply container 1 in the direction of the arrow B, the guide portion 310 guides the developer receiving portion 11 so as to be displaced in a direction away from the supply container 1, so that the state of connection between the supply container 1 and the developer receiving portion 11 is ceased. To achieve this, the guide portion 310 is inclined so that it gradually ascends in the vertical direction from the downstream side toward the upstream side in the mounting direction of the supply container 1. By this, the developer receiving portion 11 (specifically, the supported portion 11*b*) is moved along the guide portion 310 utilizing the force applied to the supply container 1 at the time of mounting and dismounting. However, in this case, especially during the mounting operation of the supply container 1, the force for displacing in the mounting direction and the force for displacing in the vertical direction by the guide portion 310 are liable to be applied to the supported portion 11*b* of the developer receiving portion 11 at the same time. Therefore, it became a load, tending to hinder the smooth mounting of the supply container 1.

On the other hand, in the case of this embodiment, along with the mounting operation of the supply container 1, as described above, a force to lift the supported portion 11*b* of the developer receiving portion 11 upward in the vertical direction (the supply container side) by the lifting portion 30 is applied. In this case, the force displacing in the mounting direction and acting on the developer receiving portion 11 is extremely small as compared with that in the above-described conventional example. Therefore, when moving the developer receiving portion 11 in the mounting operation of the supply container 1, the load required for the movement of the developer receiving portion 11 is reduced, and therefore the supply container can be smoothly mounted.

Embodiment 2

In Embodiment 1 described above, the shutter inclined portion 4*f* is provided in the shutter 4, the shutter sliding portion 30*b* is provided in the lifting portion 30, and the lifting portion 30 is operated using the shutter 4 relatively moving relative to the lifting portion 30, but the mechanism for operating the lifting portion 30 is not limited to this example. For example, the shutter and the lift portion may be connected by a plurality of gears and these gears may be driven by the relative movement of the lift portion and the shutter so that the lift portion is operated.

Referring to parts (b) of FIGS. 16 to 21, such Embodiment 2 will be described. In this embodiment, as will be described hereinafter, a second rack gear 30*e* is provided in the lifting portion 30A, a first rack gear 4*g* is provided in the shutter 4A, and a pinion gear 40 for connecting the gears is provided in the lower flange portion 32. Other basic structures and operations are the same as those of Embodiment 1 described above, and therefore, the same components are denoted by the same reference numerals and the description thereof will be omitted or simplified, and the following description focuses on portions different from Embodiment 1.

[Flange Part]

FIG. 16 shows the flange portion 3A of Embodiment 2. As shown in FIG. 16, in the flange portion 3A of this embodiment, in addition to the above-described lift holding portion 3*b* and the lift stopper portion 3*c*, a pinion gear holding portion 3*g* is provided on the side surface of the lower flange portion 32 so as to project in the widthwise direction. The pinion gear holding portion 3*g* rotatably holds the pinion gear 40 shown in FIG. 17. As shown in FIG. 17, the pinion gear 40 as a rotatable member has a first gear portion 40*a* and a second gear portion 40*b* having a diameter larger than that of the first gear portion 40*a* and is provided with a through hole 40*c* through which the pinion gear holding portion 3*g* passes.

[Lift Section]

The lifting portion 30A of Embodiment 2 is shown in parts (a) to (b) of FIG. 18. As shown in part (a) of FIG. 18 to part (b) of FIG. 18, as compared with the lifting portion 30 of Embodiment 1, in the lifting portion 30A, a second rack gear 30*e* (lift gear) is provided, instead of the shutter sliding portion 30*b*, on the surface of the lift main assembly portion 30*d* opposite to the receiving support portion 30*c*. The second rack gear 30*e* as a conversion transmission mechanism extends in the vertical direction and is engaged with the first gear portion 40*a* of the above-described pinion gear 40.

[Shutter]

The shutter 4A of Embodiment 2 is shown in FIG. 19. As shown in FIG. 19, as compared with the shutter 4A of Embodiment 1, in the shutter 4A, the supporting portion 4*d* does not have the shutter inclined portion 4*f* (part (b) of FIG. 13), but instead, the first rack gear 4*g* is provided. The first rack gear 4*g* serving as the rotation operating portion extends in the mounting direction of the supply container 1 and is engaged with the second gear portion 40*b* of the pinion gear 40.

FIG. 20 shows the supplying container 1A of this embodiment in which the above-described lifting portion 30A, the shutter 4A and the pinion gear are combined. The pinion gear 40 provided in the discharge portion 700 rotates about the pinion gear holding portion 3*g*. The rotation of the pinion gear occurs when the lifting portion 30A and the shutter 4A move relative to each other. That is, the flange portion 3A (more specifically, the lower flange portion 32) relatively moves relative to the shutter 4A on the first rack gear 4*g* of the shutter 4A which is restricted in the movement, while rotating the pinion gear 40 via the second gear portion 40*b*. Then, the rotation of the pinion gear 40 is transmitted to the second rack gear 30*e* engaged with the first gear portion 40*a*, and the lifting portion 30A is moved in the vertical direction by way of the second rack gear 30*e*. That is, the rotational motion of the pinion gear 40 is converted into linear motion by the second rack gear 30*e* and transmitted to the lifting portion 30A so that the lifting portion 30A is operated.

[Operation of Developer Receiving Portion]

Referring to part (a) of FIG. 21 and part (b) of FIG. 21, the operation of connecting the developer receiving portion 11 with the supply container 1 by the lifting portion 30A will be described. Part (a) of FIG. 21 shows the state of the lifting start of the lifting portion 30A, Part (b) of FIG. 21 shows a state at the time of completion of mounting of the supply container 1A. Here, in part (a) of FIG. 21 and part (b) of FIG. 21, in order to make the illustration easier to understand, the gear which is not seen due to overlapping with the lifting portion 30A is shown.

When the supply container 1 is inserted into the developer receiving apparatus 8 (part (a) in FIG. 3) in the mounting direction after the movement of the shutter 4A in the mounting direction (the direction of the arrow A) is restricted, the lifting portion 30A moves relative to the shutter 4A in the mounting direction. In this case, as shown in part (a) of FIG. 21, the pinion gear 40 is rotated by way of the second gear portion 40*b* by the first rack gear 4*g* of the shutter 4A in accordance with the mounting operation of the supply container 1. And, the rotation thereof is transmitted to the second rack gear 30*e* of the lifting portion 30A by way of the first gear portion 40*a*. By this, the lifting portion 30A starts moving upward in the vertical direction. And, the supported portion 11*b* of the developer receiving portion 11 is supported from below in the vertical direction by the receiving support portion 30*c* of the lifting portion 30A, and therefore, the developer receiving portion 11 is moved upward in the vertical direction. Subsequently, when the supply container 1 is further inserted from the state shown in part (a) of FIG. 21 in the mounting direction, the lifting portion 30A relatively moves relative to the shutter 4A in the same manner as described before, so that the supply container 1 is completely mounted to reach the position shown in part (b) of FIG. 21.

As above, in Embodiment 2, in order to move the developer receiving portion 11, the lifting portion 30 is operated by way of the gear in accordance with the mounting operation of the supply container 1, and the supported portion 11*b* of the developer receiving portion 11 is lifted upward in the vertical direction (toward the supply container side) by the lifting portion 30. According to this, the load on the movement of the developer receiving portion 11 is reduced, and the smooth mounting of the supply container can be achieved as in Embodiment 1.

Furthermore, in the case of Embodiment 2, the lifting portion 30 is operated by utilizing the smooth rotation by the gear, and therefore, the operability at the time of mounting the supply container 1 is improved. Therefore, the operator can mount the supply container 1 smoothly with a lighter force than with the conventional structure.

Here, in the above-described Embodiment 2, a rack and pinion gear is used to operate the lifting portion 30 in accordance with the mounting operation of the supply container 1, but the present invention is not limited thereto. If the linear motion (reciprocating motion) in the mounting direction to the rotary motion can be converted into a rotational motion, and then the rotational motion can be converted into the vertical motion (reciprocal motion), another mechanism such as a slider crank mechanism may be used, for example.

Embodiment 3

In Embodiment 1 and Embodiment 2 described above, although the connecting operation of the developer receiving portion 11 to the supply container is performed by using the shutter, the present invention is not limited to this and the shutter may not be used. Embodiment 3 which makes it possible to perform the connecting operation of the developer receiving portion 11 to the supply container 1 without using a shutter will be described, referring to parts (a) of FIG. 22 through part (b) of FIG. 31. In Embodiment 3, the same reference numerals are given to the same constituent portions as those in the above-described Embodiment 1, and the explanation thereof will be omitted or simplified, and the portions different from Embodiment 1 will be mainly described below.

Referring to part (a) of FIG. 22 and part (b) of FIG. 22, the supply container 1B of Embodiment 3 will be described. The supply container 1B mainly includes a container body 2, a flange portion 3B, a shutter 4B, a pump portion 5, a reciprocating member 6, a cover 7, and a lift unit portion 300. The lift unit portion 300 includes a lifting portion 30B and a lift operation arm portion the lifting portion 300 is disposed in the supply container 1B such that the lift operation arm 45 projects from the cover 7 in the mounting direction (direction of arrow A). As shown in part (b) of FIG. 22, the flange portion 3B comprises an upper flange portion 31 and a lower flange portion 32B, and the upper flange portion 31 and the lower flange portion 32B are integrated in the state that the shutter 4B inserted.

[Flange Part]

Referring to FIG. 23, / the flange portion 3B will be described. As shown in FIG. 23, each of the side walls in the width direction of the lower flange portion 32B constituting the flange portion 3B) is provided with a restriction rib 3*i* a function of holding the lifting portion 30B (part (a) of FIG. 24) to restrict the moving direction of the lifting portion 30B and a function of guiding the lifting portion 30B. In the case of this embodiment, the restricting rib 3*i* as the guide means extends so that the upstream side in the mounting direction (the direction of the arrow A) of the supply container 1B is higher than in the downstream side. Here, in the restriction rib 3*i*, the lifting portion 30B is prevented from disengagement, using a snap fit structure (not shown) in order to hold the lifting portion 30B so as to be obliquely slidable with respect to the vertical direction. In addition, on each of the side walls in the width direction of the lower flange portion 32B, a holding member 3*n* which holds the lifting operation arm portion 45 movably in the mounting and dismounting direction is provided at a position downstream of the restricting rib 3*i* in the mounting direction. The holding member 3*n* is provided with a through hole through which the lift operation arm portion 45 can be passed. Also, the lower flange portion 32B is provided with a placing groove 3*k* for placing a portion of the lift operation arm portion 45 so as to be slidable in the dismounting direction, and a fixing portion 3*p* for fixing one end of an urging member 41 (part (a) of FIG. 24) for urging the lift operation arm portion 45 in the mounting direction. The lift operation arm portion 45 placed in the placing groove 3*k* is prevented from disengaging out of the supply container 1B by the cover 7A (FIG. 27).

[Lift Unit Section]

Referring to part (a) of FIG. 24 to part (b) of FIG. 25, the lifting portion 300 will be described. As shown in part (a) of FIG. 24, the lifting portion 300 includes a lifting portion 30B, a lift operation arm portion 45 as a slide operation unit, and an urging member 41. As shown in part (b) of FIG. 24, the lifting portion 30B includes a receiving support portion 30Ba capable of supporting the developer receiving portion 11 (more specifically, supported portion 11*b*) and a main body portion 30Bb including an engaging hole 30Bd engaged with the restricting rib 3*i* of the lower flange portion 32. Similarly to the restricting rib 3*i* of the lower flange portion 32B, the engaging hole 30Bd as the holding portion is formed such that the upstream side in the mounting direction is higher than the downstream side, and engages with the restricting rib 3*i* to slidably hold the lifting portion 30B. On the other hand, as shown in part (c) of FIG. 24, one end portion of the lift operation arm portion 45 has a shape bifurcated in the width direction. As shown in part (a) of FIG. 24, the pair of bifurcated arms 45*b* are passed through the through holes of the holding member 3*n*, and their end surfaces abut the abutment surface 30Bc of the lifting portion 30B. Here, in the case of this embodiment, the lift operation arm portion 45 and the lifting portion 30B are slidable, but the present invention is not limited this example, and the lift operation arm portion 45 and the lifting portion 30B may be integrally formed. However, in such a case, the lift operation arm portion 45 is formed so as to be elastically deformable, by which the lifting portion 30B can move along the restriction rib 3*i*.

On the other hand, the arm 45*a* which is not bifurcated is partly placed on the placing groove 3*k* and has a step provided by different diameters so as to form the abutment surface 45*d* to be brought into contact with the cover 7A. A thin side of the arm 45*a* projects out of the placing groove 3*k* and projects out of the cover 7A. The arm 45*a* has such a length that the leading end abuts the developer receiving apparatus 8 when the supply container 1 is mounted. At a branching position between the arm 45*a* and the pair of arms 45*b*, a mounting portion 45*c* for mounting the urging member 41 is provided. As shown in part (d) of FIG. 24, the urging member 41 is a coil spring, for example. By the urging force of the urging member 41, the lift motion arm portion 45 is maintained in a state that the abutment surface 45*d* abuts against the cover 7A when the supply container 1 is not mounted to the developer receiving apparatus 8.

Until the leading end portion of the lift operation arm portion 45 abuts to the developer receiving apparatus 8, a force in the mounting direction (the direction of the arrow A) is applied to the lift operation arm portion 45 by the urging force of the urging member 41, when mounting the supply container 1B. In that case, the lifting portion 30B is not pushed in the direction opposite to the mounting direction (the direction of the arrow B) by the lift operation arm portion 45, and therefore, as shown in part (a) of FIG. 25, it is held at the upper end side of the engaging hole 30Bd by the restricting rib 3*i* of the lower flange portion 32B by its own weight. And, when the leading end portion of the lift operation arm portion 45 is brought into contact with the developer receiving apparatus 8, the lift operation arm portion 45 and the supply container 1 excluding the lift operation arm portion 45 relatively move, and a force in the direction opposite to the mounting direction is applied against the urging force of the urging member 41 to the lift operation arm portion 45. As a result, the lifting portion 30B is pushed in the direction opposite to the mounting direction by the lift operation arm portion 45, and is held at the lower end side of the engaging hole 30Bd by the restriction rib 3*i* of the lower flange portion 32B, as shown in part (b) of FIG. 25. That is, the lifting portion 30B rises along the restriction rib 3*i*.

Part (a) of FIG. 26 and part (b) of FIG. 26 show the shutter 4B usable with this embodiment. As compared with the shutter 4 (part (b) of FIG. 13) usable with Embodiment 1 described above, the shutter 4B of this embodiment is different in that it does not have the shutter inclined portion 4*f*. In addition, FIG. 27 shows a cover 7A usable with this embodiment. As compared with the cover 7 (part (a) in FIG.

11) usable with the above-described Embodiment 1, the cover 7A of this embodiment has a hole 7*c* for passing the lift operation arm portion 45 (more specifically, downstream side, in the mounting direction, of the abutment surface 45*d* of the arm 45*a*).

[Operation of Developer Receiving Portion]

Referring to part (a) of FIG. 28 to part (b) of FIG. 31, the connecting operation of the developer receiving portion 11 to the supply container 1B by the lifting portion 30B will be described in chronological order of the mounting operation of the supply container 1B. Part (a) of FIG. 28 and Part (b) of FIG. 28 show the state at the time of starting installation of the supply container 1B, part (a) of FIG. 29 and part (b) of FIG. 29 show the state at the start of ascending of the lifting portion 30B. Part (a) of FIG. 30 and part (b) of FIG. show a state of lifting of the lifting portion 30B. Part (a) of FIG. 31 and Part (b) of FIG. 31 show the state when the mounting of the supply container 1B is completed. Here, the operation of separating the developer receiving portion 11 from the supply container 1B by the lifting portion 30B in accordance with the release operation of the supply container 1B is opposite to the connecting operation described below, and therefore, description thereof will be omitted.

When the supplying container 1B starts to be mounted as shown in part (a) of FIG. 28, the first stopper portion 4*b* of the shutter 4B and the first shutter stopper portion 8*a* of the developer receiving apparatus 8 are not yet in contact with each other. At this time, in the supply container 1B, the lift operation arm portion 45, the lifting portion 30B, and the shutter 4B move integrally without relative movement therebetween. In addition, the lift operation arm portion 45 does not abut to the developer receiving apparatus 8, and therefore, the lifting portion 30B is not pushed in the direction opposite to the mounting direction (the direction of the arrow B) by the lift operation arm portion 45. Therefore, as shown in part (b) of FIG. 28, the lifting portion 30B is held at the upper end side of the engaging hole 30Bd by the restricting rib 3*i* of the lower flange portion 32B by its own weight. At this time, the lifting portion 30B is in the lowermost position, and therefore, the receiving support portion 30Ba of the lifting portion 30B does not support the supported portion 11*b* of the developer receiving portion 11. As described in the foregoing, the developer receiving portion 11 is urged in a direction away from the supply container 1B by the urging member 12, and therefore, the receiving opening 11*a* is separated from the container discharge opening 3*a*4 of the supply container 1B. Here, the container discharge opening 3*a*4 is sealed by the developer sealing portion 4*a* of the shutter 4B.

When the supply container 1B is inserted from the state shown in part (a) of FIG. 28 to the downstream side in the mounting direction, the first stopper portion 4*b* of the shutter 4B and the first shutter stopper portion 8*a* of the developer receiving apparatus 8 are engaged with each other as mentioned above. By this, the position of the shutter 4B relative to the developer receiving apparatus 8 is fixed so that the relative movement of the shutter 4B in the mounting direction (the direction of the arrow A) relative to the developer receiving portion 11 is stopped. On the other hand, the relative movement of the supply container 1B except the shutter 4B to the developer receiving portion 11 in the mounting direction is maintained. And, as shown in part (b) of FIG. 29, the leading end portion of the lift operation arm portion 45 abuts to the developer receiving apparatus 8 and the supported portion 11*b* of the developer receiving portion 11 is engaged with and supported by the receiving support portion 30Ba of the lifting portion 30B. As the free end portion of the lift operation arm portion 45 abuts to the developer receiving apparatus 8, the lift operation arm portion 45 starts to push the lifting portion 30B in the direction opposite to the mounting direction (direction of arrow B). In this case, the shutter opening 4*j* reaches above the receiving opening 11*a* of the developer receiving portion 11 in the vertical direction while the container discharge opening 3*a*4 is kept sealed by the developer sealing portion 4*a* of the shutter 4B. However, at the time when the lift operation arm portion 45 starts abutting, the developer receiving portion 11 is not displaced from the initial position, and the receiving opening 11*a* remains separated from the container discharge opening 3*a*4 (shutter opening 4*j*).

Subsequently, when the supply container 1B is inserted further into the mounting direction from the state shown in part (a) of FIG. 29, the supply container 1B moves relative to the shutter 4B in the mounting direction, as shown in part (a) of FIG. 30. However, the lifting portion 30B is pushed back in the direction opposite to the mounting direction (direction of arrow B) by the lift operation arm portion 45 with the mounting operation of the supply container 1B. It is pushed back to the lift operation arm 45 by which the lifting portion 30B is moved upward along the restriction rib 3*i* while the contact surface 30Bc (part (b) of FIG. 24) is sliding on the lift operation arm portion 45, as shown in part (b) of FIG. 30. By this, the lifting portion 30B is substantially moved upward in the vertical direction. And, the supported portion 11*b* of the developer receiving portion 11 is supported by the receiving support portion 30Ba of the lifting portion 30, and therefore, the developer receiving portion 11 starts to move upward in the vertical direction against the urging force of the urging member 12. However, the receiving opening 11*a* is still separated from the container discharge opening 3*a*4 of the supply container 1B.

When the supply container 1B is further inserted from the state shown in part (a) of FIG. 30 to the downstream side in the mounting direction, the supply container 1B moves relative to the shutter 4B in the mounting direction, by which the supply container 1B reaches the mounting completion position, as shown in part (a) of FIG. 31, as in the previous case. In this case, the lifting portion 30B is further pushed back by the lift operation arm portion 45 in the direction opposite to the mounting direction, and in the state where it is held at the lower end side of the engaging hole 30Bd by the restriction rib 3*i*, the lifting portion 30B in the vertical direction The upward movement is stopped, as shown in part (b) of FIG. 31. And, in the developer receiving portion 11 where the supported portion 11*b* is supported by the lifting portion 30B, the receiving opening 11*a* becomes in a state of being connected to the container discharge opening 3*a*4 of the supply container 1B. In this manner, the developer can be supplied. At this time, as shown in part (b) of FIG. 31, the positional relationship between the container discharge opening 3*a*4 and the lifting portion 30B is such that a plane L passing through the container discharge opening 3*a*4 (a plane perpendicular to the rotation axis P) passes through the lifting portion 30B. In addition, the plane including the receiving support portion 30Ba of the lifting portion 30B is between the rotation axis P and the container discharge opening 3*a*4.

In Embodiment 3, as described above, the developer receiving portion 11 is moved, and therefore, the supported portion 11*b* of the developer receiving portion 11 is raised upward in the vertical direction (the supply container side) by the lifting portion 30B operated by the lift operation arm portion 45 in accordance with the mounting operation of the supply container 1. By this, the load required for the movement of the developer receiving portion 11 is reduced, thereby enabling the smooth mounting of the supply container as in Embodiment 1.

Embodiment 4

Next, Embodiment 4 will be described. In Embodiment 4, it is possible to perform a connecting operation of the developer receiving portion 11 to the supply container without using a shutter unlike Embodiment 3 described above. Here, in Embodiment 4, the same constituent portions as those of the above-described Embodiment 1 are denoted by the same reference numerals and the explanation thereof will be omitted or simplified, and the following description focuses on portions different from Embodiment 1. In addition, in this example, the above-described shutter 4B (part (a) of FIG. 26), for example is used as a shutter.

Part (a) of FIG. 32 and Part (b) of FIG. 32 show the developer receiving apparatus 8A of this embodiment. In the developer receiving apparatus 8A of this embodiment, the pulling member 50 is provided rotatably on the downstream side in the mounting direction opposite to the mounting portion **8*f* across the developer receiving portion 11. The pulling member 50 retracts and holds the supply container 1C to a predetermined mounting completion position in the mounting direction, by rotating in a state that the supply container 1C is engaged in accordance with the mounting operation of the supply container 1**C.

FIG. 33 shows the pulling member 50. The pulling member 50 is provided with a lift holding portion **50*a*, a rotation shaft portion 50*b*, a main body portion 50*c*, and a fixed portion 50*d*. The lift holding portion 50*a* projects from the main body portion 50*c* toward the upstream side in the mounting direction (the direction of the arrow A), and in order to lock the supply container 1C, the free end portion is formed into a claw shape. The pulling member 50 rotates about the rotation shaft portion 50*b*. In this embodiment, the rotation shaft portion 50*b* is provided at the bent portion of the lift holding portion 50*a* so that the free end portion of the lift holding portion 50*a* rotates in the opposite direction to the main body portion 50*c* in accordance with the rotation of the main body portion 50*c*. The pull urging member 51 described later is provided (for example, a coil spring, part (a) of FIG. 37) to obtain a force to pull the pulling member 50 to retract the supply container 1C toward the mounting direction. The fixed portion 50*d* is provided in the main body portion 50*c* so as to fix one end of the pull urging member 51. As described below, in response to the pulling member 50 being pushed in the mounting direction via the cover 7 when the supply container 1C is mounted, the pulling member 50 is rotated by the urging force of the urging member 51 so as to lift the free end of lift holding portion 50*a***.

Referring to FIG. 34, the supply container 1C of Embodiment 4 will be described. The supply container 1C mainly includes a container body 2, a flange portion 3C, a shutter 4B, a pump portion 5, a reciprocating member 6, a cover 7, and a lifting portion 30C. The flange portion 3C comprises an upper flange portion 31 and a lower flange portion 32C, and the upper flange portion 31 and the lower flange portion 32C are integrated with each other in the state that the shutter 4B inserted.

[Flange Portion and Lift Part]

Referring to part (a) through part (a) of FIG. 35, and part (b) of FIG. 36, the flange portion 3C and the lifting portion 30C will be described. Here, part (a) of FIG. 35 and part (b) of FIG. 35 show the state at the time when the mounting of the supply container 1C is completed. In the flange portion 3C of this embodiment, a lifting portion 30C is rotatably provided on the upper surface side of the lower flange portion 32C. The lifting portion 30C is mounted to the lower flange portion 32C so that it can move up and down on the downstream side in the mounting direction starting from the upstream side in the mounting direction (the direction of the arrow A) of the lower flange portion 32C (the side opposite to the pulling member 50 of the developer receiving apparatus 8A). Specifically, the lower flange portion 32C is formed with a fitting portion 32Ca which rotatably supports the lifting portion 30C (which is fitted to the rotation shaft 30Cb of the lifting portion 30C).

As shown in part (a) of FIG. 36, the lifting portion 30C is provided with a pair of body arms 30C1 extending in the mounting direction and connecting portions 30C2 connecting these body arms 30C1. In this embodiment, the lifting portion 30C is provided on the upper surface side of the lower flange portion 32C, and therefore, the pair of body arms 30C1 are opposed to each other with a space therebetween in the width direction so that the container discharge opening **3*a*4 of the supply container 1C is not closed by the lifting portion 30C. The width dimension of the connecting portion 30C2** is selected to meet this.

A rotation shaft 30Cb is formed on the body arm 30C1 which projects from one side to the other on the free end side of the upstream side in the mounting direction (the side opposite to the connecting portion 30C2). In addition, on the body arm 30C1, an locked portion 30Ca as a pivotal movement portion projecting toward the opposite side to the rotation shaft 30Cb is formed at the free end side (on the same side as the connecting portion 30C2) in the mounting direction. As will be detailed hereinafter, the locked portion 30Ca is engaged with the pulling member 50 (more specifically, the lift holding portion **50*a*), and rotates about an axis of the rotation shaft 30Cb in accordance with the pull-in operation of the pulling member 50 to operate a receiving support portion 30**Cc.

Furthermore, in the body arm 30C1, the receiving support portion 30Cc is formed so as to project toward the side opposite to the rotation shaft 30Cb and extend in the mounting direction. The receiving support portion 30Cc is disposed between the locked portion (portion to be locked) 30Ca and the rotation shaft 30Cb with respect to the mounting direction in the body arm 30C1. In other words, in the body arm 30C1, a length from the rotation shaft 30Cb to the locked portion 30Ca is larger than a length from the rotation shaft 30Cb to the receiving support portion 30Cc with respect to the mounting direction. In this case, a fulcrum is the rotation shaft 30Cb, a force point is the receiving support portion 30Cc, and an acting point is the locked portion 30Ca, and a distance from the fulcrum to the force point can be made longer than the distance from the fulcrum to the action point, from the standpoint of moment. In this manner, the force required to move the developer receiving portion 11 upward in the vertical direction is reduced.

The receiving support portion 30Cc can support the supported portion **11*b* (part (a) of FIG. 32) of the developer receiving portion 11 from below in the vertical direction. As shown in part (b) of FIG. 36, this receiving support 30Cc is inclined relative to the body arm 30C1 so that the upper surface thereof is lower on the downstream side than on the upstream side in the mounting direction. However, the inclination angle of the receiving support portion 30Cc with respect to the mounting direction of the supply container 1C is selected so as to be in a substantially horizontal state when the mounting of the supply container 1**C is completed.

[Operation of Developer Receiving Portion]

Referring to part (a) of FIG. 37 to part (b) of FIG. 40, the connecting operation of the developer receiving portion 11 to the supply container 1C by the lifting portion 30C will be described in chronological order of the mounting operation of the supply container 1C. Part (a) of FIG. 37 and part (b) of FIG. 37 show the state at the time of starting mounting of the supply container 1C, and part (a) of FIG. 38 and part (b) of FIG. 38 show the state of the lifting portion 30C at the start of movement. Part (a) of FIG. 39 and part (b) of FIG. 39 show the state during rotation of the lifting portion 30C, and part (a) of FIG. 40 and part (b) of FIG. 40 show the state at the completion of mounting of the supply container 1C. Here, the separating operation of the developer receiving portion 11 from the supply container 1C by the lifting portion 30C in accordance with the release operation of the supply container 1C is opposite to that in the mounting operation described below, and therefore, description will be omitted.

At the time of starting the mounting of the supply container 1C as shown in part (a) of FIG. 37, a first stopper portion 4*b* of the shutter 4B and a first shutter stopper portion 8*a* of the developer receiving apparatus 8 are not yet in contact with each other. In that case, in the supply container 1Cm\, the lifting portion 30C and the shutter 4B integrally move without relative movement therebetween. In addition, the pulling member 50 energized by the pull urging member 51 has not started pivoting, and the lifting portion 30C is not lifted by the pulling member 50. For this reason, as shown in part (b) of FIG. 37, the lifting portion 30C is moved in the mounting direction, while it is maintained in a substantially horizontal state by its own weight. At this time, the lifting portion 30C (more specifically, the receiving support portion 30Cc) is in the lowermost position, and the receiving support portion 30Cc of the lifting portion 30C does not support the supported portion 11*b* of the developer receiving portion 11. As described in the foregoing, the developer receiving portion 11 is urged in a direction away from the supply container 1C by the urging member 12, and therefore, the receiving opening 11*a* is separated from the container discharge opening 3*a*4 of the supply container 1C. Here, the container discharge opening 3*a*4 is sealed by the developer sealing portion 4*a* of the shutter 4B.

When the supply container 1C is inserted from the state shown in part (a) of FIG. 37 toward the downstream side of the mounting direction, the relative movement of the shutter 4B relative to the developer receiving portion 11 in the mounting direction (direction of arrow A) is stopped, as in Embodiment 3 described above. And, in the case of this embodiment, as shown in part (a) of FIG. 38, the cover 7 starts contacting the main body portion 50*c* of the pulling member 50. Thereafter, in response to the supply container 1C being inserted further into the mounting direction, the supply container 1C begins to be drawn in the mounting direction by the pulling member 50. In the case of this embodiment, in addition to it, the pulling member 50 is pushed in the mounting direction by way of the cover 7 and can pivot so as to raise the free end portion of the lift holding portion 50*a* in accordance with the urging force of the pull urging member 51. In addition, at this time, as shown in part (b) of FIG. 38, the leading end portion of the lift holding portion 50*a* of the pulling member 50 reaches the lower portion of the locked portion 30Ca of the lifting portion 30C in the vertical direction. Also, the supported portion 11*b* of the developer receiving portion 11 starts to be supported at the lower portion by the receiving support portion 30Cc of the lifting portion 30C. In this case, the shutter opening 4*j* reaches above, in the vertical direction, the receiving opening 11*a* of the developer receiving portion 11, while the container discharge opening 3*a*4 is kept in a state sealed by the developer sealing portion 4*a* of the shutter 4B. However, as shown in part (a) of FIG. 38, the lifting portion 30C is maintained in a substantially horizontal state, and therefore, the developer receiving portion 11 is not displaced from the initial position and the receiving opening 11*a* is separated from the container discharge opening 3*a*4 of the supply container 1C.

Subsequently, when the supply container 1C is further inserted from the state shown in part (a) of FIG. 38 toward the downstream in the mounting direction, the supply container 1C moves relative to the shutter 4B in the mounting direction, as shown in part (a) of FIG. 39. In addition, the pulling member 50 is pushed in the mounting direction by the supply container 1C by way of the cover 7 and rotated, by which the locked portion 30Ca of the lifting portion 30C is engaged and the lifting portion 30C is lifted, as shown in part (b) of FIG. 39. By this, the receiving support portion 30Cc of the lifting portion 30C is substantially moved upward in the vertical direction. And, the supported portion 11*b* of the developer receiving portion 11 is supported by the receiving support portion 30Cc of the lifting portion 30C, and therefore, the developer receiving portion 11 starts moving upward in the vertical direction against the urging force of the urging member 12. However, as shown in part (a) of FIG. 39, the receiving opening 11*a* is still separated from the container discharge opening 3*a*4 of the supply container 1C.

When the supply container 1C is inserted further into the mounting direction from the state shown in part (a) of FIG. 39, the supply container 1C moves relative to the shutter 4B in the mounting direction in the same manner as described before so that the supply container 1C reaches the mounting completion position, as shown in part (a) of FIG. 40. In this case, as shown in part (b) of FIG. 40, the rotation of the lifting portion 30C by the pulling member 50 is stopped, with the receiving support portion 30Cc lifted to the maximum height position. And, the developer receiving portion 11 supported by the supported portion 11*b* on the receiving support portion 30Cc is connected to the container discharge opening 3*a*4 of the supplying container 1C at the receiving opening 11*a*. In this manner, the developer can be supplied. At this time, as shown in part (a) of FIG. 40, the positional relationship between the container discharge opening 3*a*4 and the lifting portion 30C is such that a plane L passing through the container discharge opening 3*a*4 (a plane perpendicular to the rotation axis P) passes through the lifting portion 30C. In addition, the plane including the receiving support portion 30Cc (part (b) of FIG. 36) of the lifting portion 30C is between the rotation axis P and the container discharge opening 3*a*4.

In Embodiment 4, in order to move the developer receiving portion 11 as described above, the operation of the lifting portion 30C in accordance with the mounting operation of the supply container 1C is performed by the pulling member 50, and the supported portion 11*b* of the developer receiving portion 11 is moved upward in the vertical direction (the supply container side). In the case of this embodiment, the pulling member 50 not only draws the supply container 1C in the mounting direction but also rotates the lifting portion 30C by the urging force of the pull urging member 51. According to this, when the lifting portion 30C moves the developer receiving portion 11 upward in the vertical direction, the urging force of the pull urging member 51 is applied, and therefore, less force is required as compared with the conventional example described above. That is, the load required for moving the developer receiving portion 11 is reduced, and therefore, the smooth mounting of the supply container can be realized.

Here, in the above-described Embodiment 4, the lifting portion 30C is rotated by using the pulling member 50. However, it is not necessary to use the pulling member 50 to rotate the lifting portion 30C. That is, it will suffice if the end surface of the connecting portion 30C2 of the lifting portion 30C is brought into contact with the wall surface on the deep side in the mounting direction of the developer receiving apparatus 8A to cause the lifting portion 30C to slide on the wall surface of the developer receiving apparatus 8A, and the lifting portion 30C is rotated about the rotation shaft 30Cb.

Embodiment 5

Next, referring to parts (b) of FIGS. 41 to 45, Embodiment 5 will be described. In Embodiment 5, it is possible to connect the developer receiving portion 11 to the supply container without using a shutter unlike Embodiment 3 and 4 described above. Here, in Embodiment 5, the same constituent portions as those of the above-described Embodiment 1 are denoted by the same reference numerals, and the explanation thereof will be omitted or simplified. Hereinafter, the description will focus mainly on portions different from Embodiment 1.

[Lift Section]

As shown in FIG. 41, the supply container 1D of Embodiment 5 mainly includes a container body 2, a flange portion 3D, a shutter 4D, a pump portion 5, a reciprocating member 6, a lifting portion 30D, a cover (not shown), a restricting member 60, an urging member 61 as urging means. The flange portion 3D comprises the upper flange portion 31 and the lower flange portion 32D, and the upper flange portion 31 and the lower flange portion 32D are integrated with each other in the state that the shutter 4D is inserted. A lifting portion 30D is mounted to the lower flange portion 32D of this embodiment. The lifting portion 30D moves integrally with the lower flange portion 32D in the mounting/dismounting direction (directions of arrows A and B). On the other hand, the lifting portion 30D is mounted to the lower flange portion 32D by the urging member 61 (for example, a coil spring). The lifting portion 30D is movable in the vertical direction. The urging member 61 is fixed to the lower flange portion 32D at one end and is fixed to the lifting portion 30D at the other end. The urging member 61 urges the lifting portion 30D in the vertical direction (that is, in the direction in which the receiving opening 11*a* of the developer receiving portion 11 communicates with the container discharge opening 3*a*4). In this embodiment, the lifting portion 30D is provided on the upper surface thereof with a supporting portion 30Da which is capable of supporting the supported portion 11*b* (part (c) in FIG. 4) of the developer receiving portion 11 at the bottom.

[Restricting Member]

A restricting member 60 is slidably mounted at the ends in the width direction of the lower flange portion 32D in the manner that the restricting member 60 can slide in the mounting/dismounting direction (directions indicated by arrows A and B), so that the lower flange portion 32D can be moved relative to the lower flange portion 32D To. The restricting member 60 is disposed on the lower flange portion 32D so that the lifting portion 30D can be pressed against the urging force of the urging member 61 from the upper side in the vertical direction. The urging member 61 is in a compressed state while the lifting portion 30D is being pressed by the restricting member 60. In this embodiment, as will be described hereinafter, the lower flange portion 32D moves relative to the restricting member 60 in response to the mounting operation of the supply container 1D, and at this time, the lifting portion 30D is moved in the mounting direction while being slid on the restricting member 60 on the upper surface (receiving and supporting portion 30Da). When the pushing state of the lifting portion 30D by the restricting member 60 is ceased, the lifting force of the urging member 61 moves the lifting portion 30D upward in the vertical direction. A relative movement is caused between the restricting member 60 and the lifting portion 30, and the restricting member 60 is provided with a contact portion 60*a* to be contacted to the developer receiving portion 11 when the supply container 1D is mounted (more specifically, movement restricting portion 11*c* (part (a) of FIG. 42).

[Shutter]

The shutter 4D of this embodiment can also be moved relative to the flange portion 3D. The position of the shutter 4D of this embodiment relative to the developer receiving apparatus is fixed by the developer receiving portion 11, as is different from the shutter with Embodiments 1-4 described above. As will be described hereinafter, as to the shutter 4D of this embodiment, the movement in the mounting direction is restricted by the developer receiving portion 11. In order to achieve this, a stopper portion 4Db is formed on the shutter 4D, and a movement restricting portion 11*c* (part (a) in FIG. 42) is formed on the developer receiving portion 11. The stopper portion 4Db of the shutter 4D is brought into contact with the movement restricting portion 11*c* of the developer receiving portion 11 during the mounting operation of the supplying container 1, so that the movement of the shutter 4D is regulated so that the position with respect to the developer receiving device is fixed.

[Operation of the Developer Receiving Portion]

Using parts (a) to (b) of FIG. 42 and the part (b) of FIG. 45, the operation of connecting the developer receiving portion 11 to the supplying container 1D by the lifting portion 30D will be described in the chronological order of the mounting operation of the developer supply container 1D. Part (A) of FIG. 42 and part (b) of FIG. 42 show a state at the time of starting mounting of the supply container 1D, and part (a) of FIG. 43 and part (b) of FIG. 43 show a state of the lifting portion 30D starting to ascend. Part (a) of FIG. 44 and Part (b) of FIG. 44 show a state during ascending of the lifting portion 30D, and part (a) of FIG. 45 and part (b) of FIG. 45 show a state when the mounting of the supply container 1D is completed.

At the time of starting the mounting of the supply container 1D as shown in part (a) of FIG. 42, the stopper portion 4Db of the shutter 4D and the movement restricting portion 11*c* of the developer receiving portion 11 are not yet in contact with each other. In the case of this embodiment, in the developer receiving portion 11, a movement restricting portion 11*c* is provided which is in the form of a L-shaped arm which extends in a substantially L-shape from a substantial center of a substantially cylindrical base body portion 11*d* including the receiving opening 11*a*, and is provided with a supported portion 11*b* on the free end side in the vertically upward direction. When the stopper portion 4Db and the movement restricting portion 11*c* are not in contact with each other, the lifting portion 30D and the shutter 4D integrally move without relative movement in the supply container 1D. In addition, the lifting portion 30D also moves integrally without moving relative to the restricting member 60, while partly overlapping the restricting member 60 as viewed from the vertical direction, that is, while being kept pressed by the restricting member 60. At this time, the lifting portion 30D is in the lowermost position, and it does not support the supported portion 11*b* of the developer receiving portion 11. As described in the foregoing, the developer receiving portion 11 is urged in a direction away from the supplying container 1D by the urging member 12, and therefore, the receiving opening 11*a* is spaced from the container discharge opening 3*a*4 of the supply container 1D. Here, the container discharge opening 3*a*4 is sealed by the developer sealing portion 4*a* of the shutter 4D.

When the supply container 1D is inserted from the state shown in part (a) of FIG. 42 toward the downstream side of the mounting direction (direction of arrow A), the stopper portion 4Db of the shutter 4D and the movement restricting portion 11*c* of the developer receiving portion 11 come into contact with each other, as shown in part (a) of FIG. 43 and part (b) of FIG. 43. However, the contact portion 60*a* of the restricting member 60 and the movement restricting portion 11*c* are not yet in contact with each other. That is, the contact portion 60*a* of the restricting member 60 comes into contact with the stopper portion 4Db of the shutter 4D later than the stopper portion 4Db to the movement restricting portion 11*c* of the developer receiving portion 11. After this, in response to the supply container 1D being inserted toward the downstream side of the mounting direction, the relative movement of the shutter 4D in the mounting direction with respect to the developer receiving portion 11 is stopped, but the relative movement of the restricting member 60 in the mounting direction with respect to the developer receiving portion 11 is not stopped. In addition, at this time, as shown in part (b) of FIG. 43, the lifting portion 30D reaches a lower portion of the supported portion 11*b* of the developer receiving portion 11 in the vertical direction, and the supported portion 11*b* of the developer receiving portion 11 starts to be supported from below in the vertical direction by the lifting portion 30D. In this case, the shutter opening 4*j* reaches upward in the vertical direction of the receiving opening 11*a* of the developer receiving portion 11 the container discharge opening 3*a*4 is kept in a state sealed by the developer sealing portion 4*a* of the shutter 4D. However, the lifting portion 30D is maintained in a state pressed by the restricting member 60, and therefore, the developer receiving portion 11 is not displaced from the initial position and the receiving opening 11*a* is spaced from the container discharge opening 3*a*4 of the supply container 1.

Subsequently, when the supply container 1D is further inserted from the state shown in part (a) of FIG. 43 toward the downstream side of the mounting direction, the contact portion 60*a* of the restricting member 60 and the movement restricting portion 11*c* of the developer receiving portion 11 abut to each other, as shown in part (a) of FIG. 44 and part (b) of FIG. 44. Thereafter, as the supply container 1D is inserted further into the mounting direction, the relative movement of the restricting member 60 in the mounting direction relative to the developer receiving portion 11 is stopped, but the movement of the lifting portion 30D in the mounting direction relative to the developer receiving portion 11 is continued. That is, the lifting portion 30D relatively moves relative to the restricting member 60 while supporting the supported portion 11*b* of the developer receiving portion 11. Then, the pressed state of the lifting portion 30D by the restricting member 60 is released (that is, the restricting member 60 and the lifting portion 30D are not overlapped as viewed from the vertical direction), and the urging force of the urging member 61 allows the lifting portion 30D to move upward in the vertical direction. The supported portion 11*b* of the developer receiving portion 11 is supported by the lifting portion 30D, and therefore, the developer receiving portion 11 starts to move upward in the vertical direction against the urging force of the urging member 12 in accordance with the upward movement of the lifting portion 30D in the vertical direction.

Part (a) of FIG. 45 and part (b) of FIG. 45 show the state at the time when the mounting of the supply container 1D is completed. As described in the foregoing, the lifting portion 30D released from the pressed state by the restricting member 60 moves upward in the vertical direction. With that operation, the developer receiving portion 11 supported by the supported portion 11*b* in the lifting portion 30D is in a state in which the receiving opening 11*a* is connected to the container discharge opening 3*a*4 of the supplying container 1, that is, it is in a state that the developer supply is enabled. Here, in this embodiment, the upward movement of the lifting portion 30D in the vertical direction by the urging member 61 at the completion of mounting of the supply container 1 D is restricted by the restricting member 60.

As described above, also in Embodiment 5, in order to move the developer receiving portion 11, the lifting portion 30D is operated, and therefore, the load imposed on the movement of the developer receiving portion 11 is reduced, thereby enabling the smooth mounting of the supply container.

In addition, in the case of this embodiment, the sealability between the receiving opening 11*a* and the container discharge opening 3*a*4 can be improved by the urging force of the urging member 61. Also, when the receiving opening 11*a* is connected to the container discharge opening 3*a*4, the receiving opening 11*a* applies a certain degree of impact to the container discharge opening 3*a*4 by the urging force of the urging member 61, and therefore, the developer in the neighborhood of the container discharge opening 3*a*4 can be loosened.

Embodiment 6

In Embodiment 5 described above, the restricting member 60 which moves independently of the shutter 4D presses the lifting portion 30D. However, the present invention is not limited to this example, and the restricting member 60 may be moved together with the shutter to operate the lifting portion 30D. Referring to part (b) of FIG. 46 to part (b) of FIG. 52, such Embodiment 6 will be described. Here, in Embodiment 6, the same components as those in Embodiment 5 described above are denoted by the same reference numerals, and the description thereof will be omitted or simplified. Hereinafter, the description will focus mainly on portions different from Embodiment 5.

Part (a) of FIG. 46 and Part (b) of FIG. 46 show the supply container 1E of Embodiment 6. In the supply container 1E of this embodiment, a portion of a restricting member 60E (FIG. 48) to be described hereinafter, is provided so as to project from the cover 7E in the width direction. The restricting member 60E is slidably mounted to the lower flange portion in the mounting and dismounting direction (direction of arrows A, b), and therefore, a through holes 7Ea for passing a portion of the restricting member 60E is formed on each of the side walls in the width direction of the cover 7E along the mounting direction.

As shown in FIG. 47, in the developer receiving apparatus 8E, a restricting portion 8Ea for regulating the movement of the restricting member 60E in the mounting direction (the direction of the arrow A) during the mounting operation of the supply container 1E is formed, on the upstream side of the developer receiving portion 11 in the mounting direction. The restricting member 60E abuts to the restricting portion 8Ea so that the movement in the mounting direction is restricted by which the position of the restricting member 60E with respect to the developer receiving apparatus 8E is fixed. In this manner, the position of the restricting member 60E is held with respect to the developer receiving apparatus 8E, and the movement of the restricting member 60E in the mounting direction with respect to the developer receiving portion 11 is stopped, but the movement of the supply container 1E except for the restricting member 60E in the mounting direction with respect to the developer receiving portion 11 is maintained. Here, in this embodiment, as will be described hereinafter (FIG. 48), a restricting member 60E is provided on the shutter 4E, and therefore, when the movement of the restricting member 60E is restricted by the restricting portion 8Ea, the position of the shutter 4E with respect to the developer receiving apparatus 8E is fixed.

That is, the restricting member 60E regulates the relative movement of the shutter 4E with respect to the developer receiving apparatus 8E.

[Regulating Member]

FIG. 48 shows the restricting member 60E and the shutter 4E. As shown in FIG. 48, the shutter 4E is provided with a shutter opening 4*j* for discharging the developer and a developer sealing portion 4*a* at a position offset from the shutter opening 4*j* of the shutter 4. In addition, in the case of this embodiment, in order to integrally move the shutter 4E with the restricting member 60E, a fixing hole 4Ea for fixing the restricting member 60E is provided.

The restricting member 60E is provided with a pair of lift operation arm portions 60Eb extending in the mounting direction and a connecting portion 60Ec connecting these lift operation arm portions 60Eb with each other. In this embodiment, the restricting member 60E and the shutter 4E are integrally formed, and therefore, the connecting portion 60Ec is formed with a fixing portion 60Ed to be fixed to the fixing hole 4Ea of the shutter 4E. In addition, the pair of lift operation arm portions 60Eb are arranged to face each other with a space in the width direction so that the shutter opening 4*j* of the shutter 4E is not blocked by the restricting member 60E. In order to achieve this, the width direction dimension of the connecting portion 60Ec is selected.

A stopper portion 60Ea is formed at the free end side of the lift operation arm portion 60Eb on the upstream side in the mounting direction (the opposite side to the connecting portion 60Ec). This stopper portion 60Ea projects from the through hole 7Ea (part (b) in FIG. 46) of the cover 7 E so as to be in contact with the restricting portion 8Ea (FIG. 47) of the developer receiving apparatus 8E during the mounting operation of the supply container 1E in the widthwisely opposite directions. In addition, the lift operation arm portion 60Eb has a shape shown in the drawing, and includes a pressing portion 601 for generating a pressing state of the lifting portion 30D and a releasing portion 602 for releasing the pressing state of the lifting portion 30D. As shown in FIG. 48, the pressing portion 601 is provided on the upstream side, in the mounting direction, of the releasing portion 602, and width direction dimension thereof is longer than the releasing portion 602. In other words, the releasing portion 602 is a recess provided between the pressing portion 601 and the connecting portion 60Ec in the mounting direction.

[Operation of Developer Receiving Portion]

Referring to part (a) of FIG. 49 to part (b) of FIG. 52, the connecting operation of the developer receiving portion 11 to the supply container 1E by the lifting portion 30D will be described in chronological order of the mounting operation of the supply container 1E. Part (a) of FIG. 49 and Part (b) of FIG. 49 show the state at the time of starting the mounting operation of the supply container 1E, and part (a) of FIG. 50 and part (b) of FIG. 50 show the state during the movement of the lifting portion 30D. Part (a) of FIG. 51 and Part (b) of FIG. 51 show the state at the time of the start of ascending of the lifting portion 30D, and part (a) of FIG. 52 and part (b) of FIG. 52 show the state of the completion of mounting of the supply container 1E It shows the state of time. Here, the dismounting operation of the developer receiving portion 11 from the supply container 1E by the lifting portion 30D corresponding to the dismounting operation of the supply container 1E is opposite to the mounting operation described below, and therefore, description thereof will be omitted here.

At the time of starting the mounting operation of the supply container 1E as shown in part (a) of FIG. 49, the stopper portion 60Ea of the restricting member 60E and the restricting portion 8Ea of the developer receiving apparatus 8E are not yet in contact with each other. In that case, in the supply container 1E, the lifting portion 30D integrally moves together with the restricting member 60E while keeping overlapping with the pressing portion 601 of the restricting member 60E as viewed from the vertical direction, that is, while maintaining the pressed state by the restricting member 60E. At this time, the lifting portion 30D is in the lowermost position, and the lifting portion 30D does not support the supported portion 11*b* of the developer receiving portion 11. As described in the foregoing, the developer receiving portion 11 is urged in a direction away from the supply container 1E by the urging member 12, and therefore, the receiving opening 11*a* is separated from the container discharge opening 3*a*4 of the supply container 1E. Here, the container discharge opening 3*a*4 is sealed by the developer sealing portion 4*a* of the shutter 4E.

When the supply container 1E is inserted from the state shown in part (a) of FIG. 49 toward the downstream side of the mounting direction (direction of arrow A), the stopper portion 60Ea of the restricting member 60E and the restricting portion 8Ea of the developer receiving apparatus 8E is brought into contact to each other, as shown in part (a) of FIG. 50 and part (b) of FIG. 50. After this, in response to further insertion of the supply container 1E toward the downstream side of the mounting direction, the relative movement of the restricting member 60E and the shutter 4E in the mounting direction relative to the developer receiving portion 11 is stopped. On the other hand, in the supply container 1E, the lifting portion 30D moves relative to the restricting member 60E in the mounting direction. In this case, while the container discharge opening 3*a*4 is kept in a state sealed by the developer sealing portion 4*a* of the shutter 4E, the shutter opening 4*j* reaches above, in the vertical direction, the receiving opening 11*a* of the developer receiving portion 11. However, the lifting portion 30D overlaps the pressing portion 601 of the restricting member 60E as viewed in the vertical direction. That is, the lifting portion 30D is maintained in a state pressed by the restricting member 60E, and therefore, the developer receiving portion 11 is not displaced from the initial position, and the receiving opening 11*a* is spaced from the container discharge opening 3*a*4 of the supply container 1.

Subsequently, when the supply container 1E is inserted further into the mounting direction from the state shown in part (a) of FIG. 50, the lifting portion 30D making the relative movement reaches the releasing portion 602 of the restricting member 60E, as shown in part (a) of FIG. 51 and part (b) of FIG. 51. Then, the pressing state of the lifting portion 30D by the restricting member 60E is released and the lifting portion 30D can move upward in the vertical direction by the urging force of the urging member 61. In addition, at this time, the lifting portion 30D reaches a lower portion of the supported portion 11*b* of the developer receiving portion 11 in the vertical direction and the supported portion 11*b* of the developer receiving portion 11 starts to be supported at the bottom by the lifting portion 30D. By this, by the upward movement of the lifting portion 30D, the developer receiving portion 11 starts to move upward in the vertical direction against the urging force of the urging member 12.

Part (a) of FIG. 52 and part (b) of FIG. 52 show the state at the time of the completion of the mounting operation of the supply container 1E. As described in the foregoing, the lifting portion 30D which is released from the pressing state by the restricting member 60E moves upward in the vertical direction by the urging force of the urging member 61. With that, in the developer receiving portion 11 where the supported portion 11*b* is supported by the lifting portion 30D, the receiving opening 11*a* is in a state of being connected to the container discharge opening 3*a*4 of the supply container 1, that is, in a state in which developer can be supplied.

In the manner described above, also in Embodiment 6, the lifting portion 30D is operated to move the developer receiving portion 11, and therefore, the load required for the movement of the developer receiving portion 11 is reduced, so that the smooth mounting of the supply container can be achieved.

Embodiment 7

In Embodiments 1-6 described above, the lift is operated to accomplish the connecting operation of the developer receiving portion to the supplying container by the lift portion using the force applied by the operator at the time of mounting the supply container to the developer receiving apparatus 8, but the method of operating the lift portion is not limited to this example. For example, the lift portion may be operated by the driving force of the motor, the magnetic force of the magnet, or the like. Referring to parts (a) of FIG. 53 through FIG. 55 Embodiment 7 in which the lift portion is operated using a motor will first be described. Here, in Embodiment 7, the same reference numerals are given to the same constituent portions as those of the above-described Embodiment 1, and the explanation thereof will be omitted or simplified, and hereinafter the portions different from Embodiment 1 will be mainly described. In addition, in this example, the above-described shutter 4B (part (a) of FIG. 26), for example is used as a shutter. Also, in part (a) of FIG. 53 and part (b) of FIG. 53, for convenience of illustration, a part of the developer receiving apparatus is omitted.

[Supply Container]

As shown in part (a) of FIG. 53 and part (b) of FIG. 53, the supply container 1F of Embodiment 7 mainly comprises a container body 2, a flange portion 3F, a shutter 4B, a pump portion 5, a reciprocating member 6, a cover 7F, a lifting portion 30F, and a lifting mechanism K. Supply container 1F is dismountably mounted to a developer receiving apparatus 8 a part of which part is not shown, and when the supply container 1 is mounted, the receiving opening 11*a* of the developer receiving portion 11 is connected to the container discharge opening 3*a*4 (part (b) of FIG. 5) of the supply container 1. The developer receiving portion 11 is movable in a direction (vertical direction) in which the receiving opening 11*a* moves toward and away from the container discharge opening 3*a*4. A sub hopper 8C for temporarily storing the developer supplied from the supplying container 1 is provided below the developer receiving apparatus 8. In this sub hopper 8*c*, a feeding screw 14 for feeding the developer is provided. In the cover 7F, a hole 7Fa through which a projection (not shown) provided on the developer receiving apparatus 8 passes is formed. The lifting mechanism K as the driving means is disposed on the downstream side of the upper flange portion 31 in the mounting direction (the direction of the arrow A), and is covered with the cover 7F together with the flange portion 3F, the pump portion 5, the reciprocating member 6 and so on.

[Elevating Mechanism]

Referring to parts (a) of FIG. 54 to FIG. 55, the lifting mechanism K will be described. Part (a) of FIG. 54 shows a state before lifting of the lifting portion 30F by the lifting mechanism K, and part (b) of FIG. 54 shows a state after the lifting portion 30F has been moved by the lifting mechanism K. In addition, FIG. 55 shows the neighborhood of a second switch 83 of the lifting mechanism K in an enlarged manner.

As shown in part (a) of FIG. 54 and part (b) of FIG. 54, the lifting mechanism K includes a driving motor 80, a power source 81, a first switch 82, a second switch 83, a motor gear 84, a driving gear 85, and an elevation gear 86. In this embodiment, the driving motor 80, the power source 81, the first switch 82, and the second switch 83 are connected in series by electric wires such as enameled wires. The driving motor 80 is held by a substantially L-shaped motor holding portion Ka standing from the lower flange portion 32F. In addition to the driving motor 80, the power source 81 for supplying electric power for driving the driving motor 80, the first switch 82 for starting driving the driving motor 80, a second switch 83 for stopping driving of the driving motor 80. The second switch 83 is formed by two oppositely disposed elastically deformable conductive metal plates, and the two metal plates are displaceable between a position where they are in contact with each other and a position where they are separated from each other. The motor gear 84 is mounted to a motor shaft of the driving motor 80 and is rotated by the rotation of the driving motor 80. The driving gear 85 is engaged with the motor gear 84 and is rotated by the rotation of the motor gear 84. In addition, the driving gear 85 is provided with a cylindrical elevation gear 86 provided with a helical groove around the rotation axis, and the elevation gear 86 extends upward in the vertical direction and rotates together with the driving gear 85 in the direction of the arrow V. That is, to the elevation gear 86, the rotational force of the driving motor 80 is transmitted by way of the motor gear 84 and the driving gear 85.

In the case of this embodiment, in response to pressing of the first switch 82 when the metal plates of the second switch 83 are in contact with each other, the driving motor 80 is powered from the power source 81 and energization is started by which the rotation is started. And, in response to the displacement of the metal plate of the second switch 83 to the position where the metal plate of the second switch 83 is separated after the power is supplied from the power source 81, the power supply from the power source 81 is stopped and the driving motor 80 stops.

[Lift Portion]

The lifting portion 30F will be described. The lifting portion 30F is provided with a receiving support portion 30Fa, a rotation regulating projecting portion 30Fb, a releasing project portion 30Fc, and a gear fitting hole 30Fd. The receiving support portion 30Fa is formed on each side of the lifting portion 30F in the width direction so as to project in the widthwise direction and extend in the mounting direction (direction of arrow A). The receiving support portion 30Fa can support the supported portion 11*b* of the developer receiving portion 11 from below in the vertical direction. The elevation gear 86 is mounted to the gear fitting hole 30Fd so as to mesh with the helical groove of the elevation gear 86. And, the rotation regulating projection 30Fb is sandwiched between of opposing rotation regulating portions 87 constituting a pair and erected upward in the vertical direction on the lower flange portion 32F. By doing so, the lifting portion 30F can relatively move upward in the vertical direction with respect to the ascending and descending gear 86 without rotating due to the rotation of the ascending and descending gear 86. By this, the lifting portion 30F is moved upward in the vertical direction. And, in the case where the supported portion 11*b* of the developer receiving portion 11 is supported from below in the vertical direction by the receiving support portion 30Fa of the lifting portion 30F, the developer receiving portion 11 is moved upward in the vertical direction against the urging force of the urging member 12.

[Operation of Developer Receiving Portion]

Next, the operation of connecting the developer receiving portion 11 to the supply container 1F by the lifting portion 30F will be described. The lifting mechanism K is not operating at the start of the mounting of the supply container 1F, and the lifting portion 30F is in the lowermost position, and the receiving support portion 30Fa of the lifting portion 30F does not support the supported portion 11*b* of the developer receiving portion 11. As described in the foregoing, the developer receiving portion 11 is urged in a direction away from the supply container 1 by the urging member 12, and therefore, the receiving opening 11*a* is separated from the container discharge opening 3*a*4 of the supply container 1.

Thereafter, when the supply container 1F is further inserted toward the downstream side of the mounting direction, the supported portion 11*b* of the developer receiving portion 11 starts to be supported from below in the vertical direction by the receiving support portion 30Fa of the lifting portion 30F, as shown in part (a) of FIG. 54. However, at this time as well, the lifting mechanism K has not been operated yet. That is, the developer receiving portion 11 is not displaced from the initial position, and the receiving opening 11*a* is separated from the container discharge opening 3*a*4 of the supply container 1F. Here, the container discharge opening 3*a*4 remains sealed by the developer sealing portion 4*a* of the shutter 4B.

When the supply container 1F reaches the mounting completion position, the projection (not shown) of the developer receiving apparatus 8 intrudes into the cover 7F through the hole 7Fa of the cover 7F and pushes the first switch 82. In addition, the shutter opening 4*j* and the container discharge opening 3*a*4 communicate with each other. And, by pressing the first switch 82, the driving motor 80 is supplied with electric power from the power source 81 and starts rotating, so that the elevation gear 86 rotates by way of the motor gear 84 and the driving gear 85, by which the lifting portion 30F moves upward in the vertical direction, as shown in part (b) of FIG. 54. And, the supported portion 11*b* of the developer receiving portion 11 is supported from below in the vertical direction by the receiving support portion 30Fa of the lifting portion 30F, and therefore, the developer receiving portion 11 is moved upward in the vertical direction against the urging force of the urging member 12. Here, the operation of the first switch 82 is not limited to being performed by the projecting portion of the developer receiving apparatus 8 but may be performed by the operator after completion of mounting of the supply container 1.

And, as shown in FIG. 55, in the lifting portion 30F, the releasing project portion 30Fc pushes, upward in the vertical direction, one of the metal plates constituting the second switch 83 (here, the metal plate 83*b* arranged in the upper direction in the vertical direction). When the metal plate 83*b* elastically deforms by pushing up by the lifting portion 30F, the metal plate 83*b* and the metal plate 83*a* are changed from the contact state to the separated state. By this, power supply from the power source 81 to the driving motor 80 is shut off, and therefore, the driving motor 80 stops rotating. When the driving motor 80 stops rotating, the rotation of the motor gear 84, the elevation gear 86 rotating by way of the driving gear 85 also stops, and therefore, the movement of the lifting portion 30F is stopped.

As the lifting portion 30F is moved as described above, the developer receiving portion 11 is moved to a position where the receiving opening 11*a* is connected to the container discharge opening 3*a*4 of the supply container 1F. Here, in that case, the container discharge opening 3*a*4 is exposed from the shutter 4B, and the container discharge opening 3*a*4 and the receiving opening 11*a* communicate with each other. In this manner, the developer can be supplied.

Here, when the supplying container 1F is dismounted in the dismounting direction (direction of arrow B), the support of the supported portion 11*b* of the developer receiving portion 11 by the receiving support portion 30Fa of the lifting portion 30F is ceased. Then, the developer receiving portion 11 is moved downward in the vertical direction by the urging force of the urging member 12.

In the manner described above, in Embodiment 7, in order to move the developer receiving portion 11, the operation of the lifting portion 30F is performed by the driving motor 80 to lift the supported portion 11*b* of the developer receiving portion 11 upward in the vertical direction (the supply container side). According to this, when the lifting portion 30F moves the developer receiving portion 11 upward in the vertical direction, the driving force of the driving motor 80 is added, and therefore, less force is required as compared with the conventional example described above. That is, the load required for the movement of the developer receiving portion 11 is reduced, and therefore, the smooth mounting of the supply container can be achieved.

Embodiment 8

Next, referring to parts (a) to 62 in FIG. 56, Embodiment 8 in which the lift portion is operated by using magnetic force will be described. Here, in Embodiment 8, the same constituent portions as those of the above-described Embodiment 1 are denoted by the same reference numerals, and the explanation thereof will be omitted or simplified. Hereinafter, the description will focus mainly on portions different from Embodiment 1.

Compared with Embodiment 1, the present embodiment is largely different in the following points.

The shutter 4G is provided with a first magnet 70 in place of the shutter inclined portion 4*f*; and a second magnet 71 is provided on the lifting portion 30G supported at one end by the lift holding portion 3*b*.

In the case of this embodiment, the first magnet 70 and the second magnet 71 are provided so that opposing surfaces opposed to each other have the same polarity, when facing each other at the time of mounting the supply container 1G, as will be described hereinafter. That is, the first magnet 70 is arranged so that the lifting portion 30G side (support portion side) of the shutter 4G has a predetermined polarity, and the second magnet 71 is disposed so that the shutter 4G side (the shutter side) of the lifting portion 30G has the same polarity. By this, when the first magnet 70 and the second magnet 71 face each other, the first magnet 70 and the second magnet 71 repel each other. As shown in part (b) of FIG. 56, the second magnet 71 is provided on the lower side of the receiving support portion 30*c* in the vertical direction. On the contrary, as shown in part (a) of FIG. 57 and part (b) of FIG. 57, the first magnet 70 is provided on a support portion 4*d* which displaceably supports the stopper portions 4*b* and 4*c* of the shutter 4G. Here, the shutter 4G is provided with a shutter opening 4*j* for discharging the developer, and the developer sealing portion 4*a* is provided at a position offset from the shutter opening 4*j* of the shutter 4.

[Operation of Developer Receiving Portion]

Referring to part (a) of FIG. 58 to part (b) of FIG. 61, the connecting operation of the developer receiving portion 11 to the supply container 1G by the lifting portion 30G will be described in chronological order of the mounting operation of the supply container 1G. Part (a) of FIG. 58 and Part (b) of FIG. 58 show a state at the time of starting of the mounting of the supply container 1G, and part (a) of FIG. 59 and part (b) of FIG. 59 show a state at the start of lifting by the lifting portion 30G. Part (a) of FIG. 60 and Part (b) of FIG. 60 show a state during lifting by the lifting portion 30G, part (a) of FIG. 61 and part (b) of FIG. 61 show a state at the time when the mounting of the supply container 1G is completed. Here, the operation of separating the developer receiving portion 11 from the supply container 1G by the lifting portion 30G according to the release operation of the supply container 1G is opposite to that of the connecting operation which will be described below, and therefore, the description thereof will be omitted.

When starting to mount the supply container 1G as shown in part (a) of FIG. 58, the shutter 4G and the lifting portion 30G move integrally without moving relative to each other in the supply container 1G. When shutter 4G and lifting portion 30G move together, the distance between the first magnet 70 of the shutter 4G and the second magnet 71 of the lifting portion 30G in the mounting direction (direction of arrow A) is maintained. In that case, the first magnet 70 and the second magnet 71 do not face each other, and therefore, they are hardly affected by mutual magnetic force therebetween, and for this reason, they never repel each other. Therefore, the lifting portion 30G is located at the lowest position a lift stopper portion 3*c*, and the receiving support portion 30*c* of the lifting portion 30G does not support the supported portion 11*b* of the developer receiving portion 11. As described in the foregoing, the developer receiving portion 11 is urged in a direction away from the supply container 1 by the urging member 12, and therefore, the receiving opening 11*a* is separated from the container discharge opening 3*a*4 of the supply container 1G. Here, the container discharge opening 3*a*4 is sealed by the developer sealing portion 4*a* of the shutter 4G.

When the supply container 1G is inserted from the state shown in part (a) of FIG. 58 toward the downstream side of the mounting direction, the first stopper portion 4*b* of the shutter 4G is brought into engagement with the first shutter stopper portion 8*a* of the developer receiving apparatus 8, as mentioned above. By this, the position of the shutter 4G with respect to the developer receiving apparatus 8 is fixed. As the position of the shutter 4G is held relative to the developer receiving apparatus 8, the movement of the shutter 4G in the mounting direction (the direction of arrow A) relative to the developer receiving portion 11 is stopped, but the movement of the supply container 1G in the mounting direction relative to the developer receiving portion 11 except for the shutter 4G is maintained. In addition, in this case, as shown in part (b) of FIG. 59, the supported portion 11*b* of the developer receiving portion 11 starts to be supported from below in the vertical direction by the receiving support portion 30*c* of the lifting portion 30G. In this case, while the container discharge opening 3*a*4 is kept in a state sealed by the developer sealing portion 4*a* of the shutter 4G, and the shutter opening 4*j* reaches above the receiving opening 11*a* of the developer receiving portion 11. However, the first magnet 70 and the second magnet 71 are not opposed to each other, and their influences are weak, and therefore, the developer receiving portion 11 is not displaced from the initial position, and the receiving opening 11*a* is separated from the container discharge opening 3*a*4 of the supply container 1G.

Subsequently, when the supply container 1G is further inserted from the state shown in part (a) of FIG. 59 Toward the downstream side of the mounting direction, the supply container 1G moves relative to the shutter 4G in the mounting direction, as shown in part (a) of FIG. 60. At this time, the container discharge opening 3*a*4 is not exposed from the shutter 4G and remains sealed by the developer sealing portion 4*a*. In addition, in this case, as shown in part (b) of FIG. 60, the first magnet 70 and the second magnet 71 face each other, and therefore, the first magnet 70 and the second magnet 71 including the same polarity repel each other. By this, the lifting portion 30G is moved upward in the vertical direction. And, the supported portion 11*b* of the developer receiving portion 11 is supported from below in the vertical direction by the receiving support portion 30*c* of the lifting portion 30G, and therefore, the developer receiving portion 11 is moved upward in the vertical direction against the urging force of the urging member 12. Here, the first magnet 70 and the second magnet 71 repel each other, and therefore, a downward force is also applied to the shutter 4G in the vertical direction. However, the shutter 4G is held by the mounting portion 8*f* of the developer receiving apparatus 8, and therefore, even though the shutter 4G is affected by the magnetic force, the position in the vertical direction is maintained.

When the supply container 1G is further inserted from the state shown in part (a) of FIG. 60 toward the downstream side of the mounting direction, the supply container 1G moves relative to the shutter 4G in the mounting direction and reaches the mounting completion position in the same manner as described before, as shown in part (a) of FIG. 61. In addition, as shown in part (b) of FIG. 60, the first magnet 70 reaches substantially the center in the vertical direction of the second magnet 71, and the repulsive force between the first magnet 70 and the second magnet 71 is maximized, and therefore, the movement of the lifting portion 30G is stopped at the maximum reachable position in the vertical direction. In this case, the developer receiving portion 11, where the supported portion 11*b* is supported by the lifting portion 30G, is in a state of being connected to the container discharge opening 3*a*4 of the supply container 1G at the receiving opening 11*a*. So, a state capable of supplying the developer is established.

As described above, in Embodiment 8, the movement of the lifting portion 30G for moving the developer receiving portion 11 is performed by the first magnet 70 and the second magnet 71 so that the supported portion 11*b* of the developer receiving portion 11 is lifted upward in the vertical direction (the supply container side). According to this, when the lifting portion 30G moves the developer receiving portion 11 upward in the vertical direction, a repulsive force of the magnetic force emitted from the first magnet 70 and the second magnet 71 is added, and therefore, the necessary force is small as compared with the conventional example described above. That is, the load required and four the movement of the developer receiving portion 11 is reduced, and therefore, the smooth mounting of the supply container can be achieved.

In addition, in the case of this embodiment, the supported portion 11*b* supported by the receiving support portion 30*c* moves on the upper surface (substantially horizontal surface) of the receiving support portion 30*c*. As compared with the case where the supported portion 11*b* as in the conventional example described above slides on the inclined guide portion 310, in the case where the supported portion 11*b* slides on the horizontal plane as in this embodiment, it is possible to reduce the load applied in the horizontal direction (mounting direction) when mounting the supply container 1G. By this, it is possible to accomplish a smoother mounting of the supply container.

Embodiment 9

In the above-described Embodiment 8, the first magnet 70 is integrally formed with the shutter 4G. However, the present invention is not limited to this, and a magnet member separate from the shutter may be provided in order to easily add the first magnet 70 to the existing shutter. Referring to part (a) of FIG. 62 to part (c) of FIG. 63, such Embodiment 9 will be described. Here, in Embodiment 9, the same components as those in Embodiment 8 are denoted by the same reference numerals, and the explanation thereof will be omitted or simplified, and the differences from Embodiment 8 will be mainly described below.

Part (a) of FIG. 62 and part (b) of FIG. 62 show the mounting member 72 of this embodiment. The mounting member 72 is used by being overlapped with the shutter 4B (part (a) of FIG. 26) described above, which includes stopper portions 72*b*, 72*c* including the same shape as the stopper portions 4*b*, 4*c* of the shutter 4B, and the support portion 72*b* having the same shape as the support portion 4*d*. That is, it is formed to substantially coincide with the shutter 4B as viewed from above in the vertical direction in appearance in a state that the mounting member 72 is superimposed on the shutter 4B. By this, similarly to the shutter 4B, the mounting member 72 is held in the shutter stopper portions 8*a*, 8*b* (part (a) of FIG. 4) of the developer receiving apparatus 8 so as to be movable relative to a portion of the supply container 1G along with the shutter 4B. That is, as shown in part (a) of FIG. 63 to part (c) of FIG. 63, in the supply container 1G, the mounting member 72 is mounted to the shutter 4B in a state of being superposed on the vertical direction of the shutter 4B. And, upon mounting to and dismounting from the developer receiving apparatus 8, the stopper portions 72*b*, 72*c* of the mounting member 72 are engaged with the shutter stopper portions 8*a*, 8*b* of the developer receiving apparatus 8, and the position of the mounting member 72 with respect to the developer receiving apparatus 8 is fixed. At this time, the stopper portions 4*b* and 4*c* of the shutter 4B also engage with the shutter stopper portions 8*a* and 8*b*, and the shutter 4B is also fixed to the developer receiving apparatus 8.

The first magnet 70 is provided on the stopper portions 72*b* and 72*c*. In this embodiment, when the mounting member 72 is superimposed on the shutter 4B, the first magnet 70 is disposed so as to substantially coincide with the arrangement position of the first magnet 70 in the shutter 4G described above. By doing so, the positional relationship between the first magnet 70 and the second magnet 71 of the lifting portion 30G is the same as that in the above-described Embodiment 8 in a state where the mounting member 72 is fixed to the developer receiving apparatus 8. According to this, when mounting the supply container 1G, it is possible to move the lifting portion 30G upward in the vertical direction using magnetic force so that the developer receiving portion 11 is in a state where the receiving opening 11*a* is connected to the container discharge opening 3*a*4 of the supply container 1G.

Here, the mounting member 72 of this embodiment can be applied to the structure, in which the shutter is not provided, and the container discharge opening 3*a*4 (part (b) of FIG. 5) of the supply container 1G is sealed with a film-like sealing member (not shown) which turns into a shutter.

In this case, the seal member is pulled out by the operator after the supply container 1G is mounted to the developer receiving apparatus 8, by which the developer in the supply container 1G can be supplied. Also with such a structure, by providing the mounting member 72 described above, it is possible to operate the lifting portion 30G using the magnetic force and connect the developer receiving portion 11 to the supply container 1G. As described above, the above-described Embodiment 9 can be applied irrespective of the presence or absence of a shutter.

Embodiment 10

Furthermore, the lift portion may be operated by using gravity. Referring to FIGS. 64 to 74, such Embodiment 10 will be described. Here, in Embodiment 10, the same reference numerals are assigned to the same constituent portions as those in the above-described Embodiment 1, and the explanation thereof will be omitted or simplified, and the portions different from Embodiment 1 will be mainly described below.

FIG. 64 shows the supply container 1H of Embodiment 10. The supply container 1H mainly comprises a container body 2, a flange portion 3H, a shutter 4H, a pump portion 5, a reciprocating member 6, a cover 7, a lifting portion 30H, and a weight 90. The weight 90 is disposed on the downstream side of the upper flange portion 31 in the mounting direction (the direction of the arrow A) and above the shutter 4H in the vertical direction, and it is covered with the cover 7 together with the flange portion 3H, the pump portion 5, the reciprocating member 6, and so on. As will be described later the weight 90 is provided movably in the vertical direction within the cover 7, and is supported by the shutter 4H.

[Weight]

Part (a) of FIG. 65 and part (b) of FIG. 65 show the weight 90. The weight 90 has projections 90*a* on each of the end sides in the width direction. The projection 90*a* is formed in a vertically elongated shape. One end of a wire described later is fixed to the projection 90*a*. In addition, the weight 90 is provided with a shutter supported portion 90*b* projecting downward in the vertical direction from the bottom surface on the upstream side at a position on the downstream side from the center portion with respect to the mounting direction (direction of arrow A). By the shutter 4H abutting to the shutter supported portion 90*b*, the weight 90 is supported by the shutter 4H. In addition, the widthwise direction dimension of the weight 90 in the vertically lower side including the shutter supported portion 90*b* is shorter than the width direction size on the upper side in the vertical direction. This is to secure a space through which wires and the like to be described hereinafter are to be passed on both widthwise ends of the weight 90.

[Flange Part]

Referring to FIG. 66, / the flange portion 3H will be described. The lower flange portion 32H includes a shutter insertion portion 3*b*1 into which a shutter 4H which will be described hereinafter is inserted. The lower flange portion 32H is integrated with the upper flange portion 31 in the state that the shutter 4H is inserted in the shutter insertion portion 3*b*1. On each side in the width direction of the lower flange portion 32H, a lift holding portion 92 which slidably holds a later-described lifting portion 30H (FIG. 67) so as to be slidable in the vertical direction is formed in a slit shape. On the downstream side of the lift holding portion 92 in the mounting direction, a weight holding portion 93 which holds the projection 90*a* of the weight 90 so as to be slidable in the vertical direction is formed in a slit shape. That is, the movement of the lifting portion 30H in the mounting/dismounting direction (the directions of the arrows A and B) is restricted by the lift holding portion 92, and the movement of the weight 90 in the same direction is restricted by the weight holding portion 93, respectively. In addition, on each side in the width direction of the upper flange portion 31, a wire holding portion 91 for holding a wire to be described hereinafter is provided.

[Lift Portion]

FIG. 67 shows the lifting portion 30H. The lifting portion 30H has a fitting portion 30Ha, a wire connecting portion 30Hb, a receiving support portion 30*c*, and a lift main assembly portion 30*d*. In the lift main assembly portion 30*d*, a receiving support portion 30*c* capable of supporting the supported portion 11*b* (part (c) of FIG. 4) of the developer receiving portion 11 from below in the vertical direction is formed. On the opposite side of the lift main assembly portion 30*d* from the receiving support portion 30*c*, a wire connecting portion 30Hb for fixing one end of a wire to be described hereinafter is provided. The fitting portion 30Ha projects from the side opposite to the receiving support portion 30*c* of the lift main assembly portion 30*d* and connects the lift main assembly portion 30*d* and the wire connecting portion 30Hb to each other. As shown, in the mounting direction (direction of arrow A), the fitting portion 30Ha is shorter than the length of the lift main assembly portion 30*d* and the wire connecting portion 30Hb. In the case of this embodiment, by fitting this fitting portion 30Ha to the lift holding portion 92 of the lower flange portion 32H, the lifting portion 30H is slidable in the vertical direction relative to the flange portion 3H.

[Shutter]

FIG. 68 shows the shutter 4H. In this embodiment, the shutter 4H is used to operate the lifting portion 30H by the weight 90 moving by the gravity. In other words, a weight support 4H1 is provided on the shutter 4H. As shown in FIG. 68, in the case of this embodiment, the weight supporting portion 4H1 as the moving member is formed so as to project toward the supply container side over the entire region in the width direction at the downstream end portion in the mounting direction (direction of arrow A). In addition, the weight supporting portion 4H1 is inclined so that the length in the vertical direction gradually decreases from the upstream side to the downstream side in the mounting direction. In other words, the weight supporting portion 4H1 has an inclined surface which is inclined toward the developer receiving portion side from the upstream side to the downstream side in the mounting direction. In more detail, as will be described hereinafter, when the supply container 1H moves relative to the shutter 4H, the weight 90 also moves relative to the shutter 4H. In such a case, the weight 90 moves while sliding on the weight supporting portion 4H1 by the gravity, so that the lifting portion 30H connected by the wire to the weight 90 is moved in the vertical direction.

[Wire]

In this embodiment, as shown in part (a) of FIG. 69 and part (b) of FIG. 69, the weight 90 and the lifting portion 30H are connected by a wire 95. One end of a wire 95 which is a moving member and is a string member is fixed to the projection 90*a* of the weight 90, and the other end is fixed to the wire connecting portion 30Hb (FIG. 67) of the lifting portion 30H. In addition, the wire 95 is extending through the first wire holding portion 91 of the upper flange portion 31 and the second wire holding portion 94 formed in the weight holding portion 93 of the lower flange portion 32H so that it is does not sag. By this, the displacement amount of the weight 90 and the displacement amount of the lifting portion 30H are substantially the same. Here, the length of the wire 95 is such that when the weight 90 is located at the uppermost position in the vertical direction, the lifting portion 30H is positioned at the lowest position in the vertical direction, and when the weight 90 is located at the lowest position in the vertical direction, the lifting portion 30H is located at the uppermost position in the vertical direction.

[Operation of Developer Receiving Portion]

Referring to parts (a) to 74 of FIG. 70, the operation of connecting the developer receiving portion 11 to the supply container 1H by the lifting portion 30H will be described in the chronological order of the mounting operation of the supply container 1H to the developer receiving apparatus 8. Part (a) of FIG. 70 and the part (b) of FIG. 70 show the state at the time of starting the mounting of the supply container 1H. Part (a) of FIG. 71 and part (b) of FIG. 71 show the state after start of lifting of the lifting portion 30H. In addition, part (a) of FIG. 72 and part (b) of FIG. 72 show the state of lifting of the lifting portion 30H, Part (a) of FIG. 73 and part (b) of FIG. 73 show the state at the completion of lifting of the lifting portion 30H, FIG. 74 shows the state at the time when the mounting of the supply container 1H is completed.

At the time of starting mounting of the supply container 1H as shown in part (a) of FIG. 70, the shutter 4H and the lifting portion 30H move integrally without moving relative to each other in the supply container 1H. When shutter 4H and lifting portion 30H move together the weight 90 is supported by the shutter 4H on the uppermost surface of the weight supporting portion 4H1. In this case, as shown in part (b) of FIG. 70, the weight 90 is positioned at the uppermost position in the vertical direction, and therefore, the lifting portion 30H is located at the lowest position against the lift stopper portion 3*c*. In addition, the receiving support portion 30*c* of the lifting portion 30H does not support the supported portion 11*b* of the developer receiving portion 11. As described in the foregoing, the developer receiving portion 11 is urged in a direction away from the supply container 1 by the urging member 12 (part (b) of FIG. 3), and therefore, the receiving opening 11*a* is separated from the container discharge opening 3*a*4 of the supply container 1. Here, the container discharge opening 3*a*4 is sealed by the developer sealing portion 4*a* of the shutter 4H.

When the supply container 1H is inserted from the state shown in part (a) of FIG. 70 toward the downstream side in the mounting direction, the position of the shutter 4H relative to the developer receiving apparatus 8 is fixed, as has already been mentioned. By this, the relative movement of the supply container 1H except the shutter 4H in the mounting direction (direction of arrow A) relative to the developer receiving portion 11 is maintained. Therefore, the container discharge opening 3*a*4 is kept sealed by the developer sealing portion 4*a* of the shutter 4H. And, as shown in part (b) of FIG. 71, the supported portion 11*b* of the developer receiving portion 11 is supported by the receiving support portion 30*c* of the lifting portion 30H. However, the weight 90 is maintained in a state of being positioned at the uppermost position in the vertical direction supported by the uppermost surface of the weight supporting portion 4H1. Therefore, the lifting portion 30H remains positioned at the lowest position in the vertical direction, and therefore, the developer receiving portion 11 has not displaced from the initial position, and the receiving opening 11*a* remains separated from the container discharge opening 3*a*4 of the supply container 1H.

Subsequently, when the supply container 1H is further inserted from the state shown in part (a) of FIG. 71 toward the downstream side of the mounting direction, the supply container 1H moves relative to the shutter 4H in the mounting direction, as shown in part (a) of FIG. 72. At this time, the container discharge opening 3*a*4 is not exposed from the shutter 4H and is still sealed by the developer sealing portion 4*a*. In addition, in this case, in accordance with the mounting operation of the supply container 1H, the weight 90 moves downward in the vertical direction while sliding on the weight supporting portion 4H1 by the gravity. Then, as shown in part (b) of FIG. 72, the lifting portion 30H is pulled by the weight 90 by way of the wire 95 and is moved upward in the vertical direction. And, the supported portion 11*b* of the developer receiving portion 11 is supported from below in the vertical direction by the receiving support portion 30*c* of the lifting portion 30H, and therefore, the developer receiving portion 11 is moved upward in the vertical direction against the urging force of the urging member 12. At this time, as the weight 90 moves downward in the vertical direction along the weight supporting portion 4H1, the lifting portion 30H moves upward in the vertical direction by a displacement equal to the displacement amount of the weight 90. However, the receiving opening 11*a* is still separated from the container discharge opening 3*a*4 of the supply container 1H. Here, in this case, the container discharge opening 3*a*4 is not exposed from the shutter 4H and is still sealed by the developer sealing portion 4*a*.

As an example, the weight 90 is made of brass to have a volume of 43 cm^3, for example. In that case, the mass of the weight 90 is 360 g. And, the urging force of the urging member 12 for urging the developer receiving portion 11 in a direction away from the supply container 1H is 300 g, for example. The urging force of the urging member 12 is lower than the sum of the mass of the weight 90 and the mass (for example, 10 g) of the lifting portion 30H. Therefore, as the weight 90 moves, the lifting portion 30H can be moved by the wire 95. Here, the volume and the material of the weight 90 are not limited to these examples and any weight may be used as long as the added value of the weight and the weight of the lifting portion 30H exceeds the urging force of the urging member 12.

When the supply container 1H is further inserted from the state shown in part (a) of FIG. 72 toward the downstream side in the mounting direction, the supply container 1H moves relative to the shutter 4H in the mounting direction, and therefore, the weight 90 moves downward in the vertical direction by the gravity, as shown in part (a) of FIG. 73. So, when the weight 90 moves to the lowest position in the vertical direction in accordance with the mounting operation of the supply container 1H, the portion 30H moves to the uppermost position in the vertical direction and stops there. In the case of this embodiment, in the developer receiving portion 11 where the supported portion 11*b* is supported by the lifting portion 30H, the receiving opening 11*a* is in a state of being connected to the shutter opening 4*j*, but the container discharge opening 3*a*4 is not exposed from the shutter 4H and remains sealed by the developer sealing portion 4*a*.

And, as the supply container 1H is further inserted from the state shown in part (a) of FIG. 73 toward the downstream side in the mounting direction, the supply container 1H moves relative to the shutter 4H in the mounting direction, so that the supply container 1H reaches the mounting completion position. In this embodiment, at this time, as shown in FIG. 74, the container discharge opening 3*a*4 is exposed from the shutter 4H, and the container discharge opening 3*a*4 and the receiving opening 11*a* communicate with each other. In this manner, the developer can be supplied. At this time, as shown in part (b) of FIG. 73, the positional relationship between the container discharge opening 3*a*4 and the lifting portion 30H is such that a plane L passing through the container discharge opening 3*a*4 (a plane perpendicular to the rotation axis P) passes through the lifting portion 30H. In addition, the plane including the receiving support portion 30*c* of the lifting portion 30H is between the rotation axis P and the container discharge opening 3*a*4.

On the contrary, when the supply container 1H is dismounted, weight 90 moves upward in the vertical direction so that the weight 90 is lifted by the shutter 4H, with the dismounting operation of the supply container 1H. As the weight 90 moves upward in the vertical direction, the lifting portion 30H moves downward in the vertical direction by its own weight and the urging force of the urging member 12 urging the developer receiving portion 11. In this manner, the developer receiving portion 11 moves to the side opposite to the supply container 1H, that is, it separates.

As described above, in Embodiment 10, in order to move the developer receiving portion 11, the operation of the lifting portion 30H is performed by the movement of the weight 90 and lifts the supported portion 11*b* of the developer receiving portion 11 upward in the vertical direction (the supply container side). According to this, when the lifting portion 30H moves the developer receiving portion 11 upward in the vertical direction, a tensile force by the weight 90 is added, and therefore, less force is required as compared with the conventional example described above. That is, the load required for the movement of the developer receiving portion 11 is reduced, and therefore, the smooth mounting of the supply container can be achieved.

In addition, by changing the inclination angle of the weight supporting portion 4H1 of the shutter 4H and the arrangement position of the weight supporting portion 4H1 in the mounting direction, lifting timing and lifting speed can be changed, and therefore, the latitude in the design is high.

Here, in this embodiment, the weight supporting portion 4H1 which holds the weight 90 is integrally formed on the shutter 4H has been described, but the present invention is not limited such an example. The above-described weight supporting portion 4H1 may be provided on a member separate from the shutter 4H, For example, the member may be mounted to the shutter 4B (part (a) of FIG. 26) which does not have the weight supporting portion 4H1.

Embodiment 11

In the above-described Embodiment 10, the displacement of the weight 90 is transmitted to the lifting portion 30H using the wire 95 in order to operate the lift portion using gravity, but the present invention is not limited such an example. For example, it may have a structure in which the displacement of the weight 90 is transmitted to the lift portion using the rotating member without using the wire 95. Referring to FIGS. 75 and 76, such Embodiment 11 will be described. FIG. 75 shows the state at the time of starting mounting of the supply container 1J of this embodiment, FIG. 76 shows a state at the time of completion of mounting of the supply container 1J of this embodiment. Here, in Embodiment 11, the same components as those in the above-described Embodiment 10 are denoted by the same reference numerals, and the explanation thereof will be omitted or simplified, and the differences from Embodiment 10 will be mainly described below.

As shown in FIG. 75, in the flange portion 3J of the supply container is 1J according to this embodiment, the lifting portion 30J is rotatably provided to each of the rotation shaft 32Ja provided at each of the end portions in the width direction of the lower flange portion 32J. In the lifting portion 30J of this embodiment, the receiving support portion 30Ja which can support the supported portion 11*b* of the developer receiving portion 11 from below in the vertical direction is formed on the lifting body 30Jb which is rotatable around the rotation shaft 32Ja.

In the case of this embodiment, the receiving support portion 30Ja is provided integrally with the lifting body 30Jb as the rotation operating portion on the upstream side in the mounting direction (the direction of the arrow A). The lifting body 30Jb is formed in an elongated shape and is disposed in the lower flange portion 32J such that on the downstream side in the mounting direction, it can come into contact with the projection 90*a* of the weight 90, and on the upstream side, the supported portion 11*b* of the developer receiving portion 11 can be supported by the receiving support portion 30Ja.

In this embodiment, when the weight 90 moves downward in the vertical direction along the weight supporting portion 4H1 (FIG. 68) of the shutter 4H by the gravity in accordance with the mounting operation of the supply container 1J, one end side of the lifting body 30Jb where the receiving support portion 30Ja is not formed is pushed down by the projection 90*a*. Then, as shown in FIG. 76, the lifting body 30Jb rotates about the rotation shaft 32Ja to lift the receiving support portion 30Ja which has already supported the supported portion 11*b* of the developer receiving portion 11. And, when the weight 90 moves to the lowermost position in the vertical direction according to the mounting operation of the supply container 1J, the receiving support portion 30Ja moves to the uppermost position in the vertical direction. By this, the developer receiving portion 11 is moved upward in the vertical direction toward the supply container 1J side, and therefore, the container discharge opening 3*a*4 of the supply container 1J and the receiving opening 11*a* of the developer receiving portion 11 can be brought into a connected state relative to each other. In this manner, the developer can be supplied. At this time, as shown in FIG. 76, the positional relationship between the container discharge opening 3*a*4 and the lifting portion 30J is such that a plane L passing through the container discharge opening 3*a*4 (a plane perpendicular to the rotation axis P) passes through the lifting portion 30J. In addition, the plane including the receiving support portion 30Ja of the lifting portion 30J is between the rotation axis P and the container discharge opening 3*a*4.

Conversely, when the supplying container 1J is dismounted, the weight 90 moves upward in the vertical direction by being lifted by the shutter 4H, with the dismounting operation of the supply container 1J. When the weight 90 moves upward in the vertical direction, the other end side of the lifting body 30Jb on which the receiving support portion 30Ja is formed is lowered downward by the weight of the receiving support portion 30Ja and the urging force of the urging member 12 urging the developer receiving portion 11. In this manner, the developer receiving portion 11 moves to the side opposite to the supply container 1J, that is, moves away.

In the above-described the manner, also in Embodiment 11, the operation of the lifting portion 30J is performed by the movement of the weight 90 to lift the supported portion 11*b* of the developer receiving portion 11 upward in the vertical direction (the supply container side). By this, the load required for the movement of the developer receiving portion 11 is reduced, and therefore, the smooth mounting of the supply container can be achieved.

In addition, in this embodiment, the principle of leverage is used, and therefore, it is easy to change such as lowering the mass of the weight 90 to increase the displacement amount, or on the contrary, the weight 90 is made heavier to reduce the displacement amount or the like, by changing the position of the fulcrum, that is, the pivot center.

INDUSTRIAL APPLICABILITY

According to the present invention, a developer supply container and a developer supply system suitable for an electrophotographic image forming apparatus and so on are provided.

DESCRIPTION OF SYMBOLS

1=developer supply container (supply container): 2*c*=developer accommodating portion: 3*a*4=discharge opening (container outlet): 3*i*=guide means (restriction rib): 4 (4A, 4B, 4D, 4E, 4G, 4H)=shutter: 4*f*=inclined portion (moving mechanism, shutter inclined portion): 4*g*=rotation operating portion (first rack gear): 4H1=moving member (weight support portion): 8=developer receiving apparatus: 11=developer receiving portion: 11*a*=receiving opening: 11*b*=supported portion (portion to be supported): 30 (30A to 30H, 30J)=support portion (lifting portion): 30*b*=sliding portion (moving mechanism, shutter sliding portion): 30*e*=conversion transfer mechanism (second rack gear): 30Bd=guide means (holding portion, engaging hole): 30Ca=rotating operation portion (moving mechanism, lock portion (portion to be locked)): 30Cb=rotation axis (movement mechanism): 30Jb=rotation operating portion (lifting body): 32Ja=rotating shaft (moving member): 40=rotatable member (pinion gear): 45=slide operation portion (lift operation arm portion): 50=retracting member: 60=regulating member (moving mechanism): 61=urging means (moving mechanism, urging member): 70=first magnet (moving mechanism): 71=second magnet (moving mechanism): 72=mounting member:

90=weight (moving mechanism): 95=moving member (string member, wire): 200=Developer supplying system: 700=discharge portion: K=driving means (lifting mechanism)

The invention claimed is:

1. A developer supply container detachably mountable to a developer receiving apparatus that includes a developer receiving portion provided with a receiving opening for receiving developer and a supported portion integrally displaceable with the developer receiving portion, the developer supply container comprising:

a developer accommodating portion accommodating the developer;

a discharging portion provided with a discharge opening in a bottom side of the discharging portion for discharging the developer accommodated in the developer accommodating portion;

a supporting portion provided at the discharging portion and capable of supporting the supported portion, wherein the supporting portion is movable relative to the discharging portion, and wherein in the developer supply container includes a moving mechanism for moving the supporting portion upwardly relative to the discharging portion while supporting the supported portion to move the developer receiving portion toward the developer supply container so as to bring the receiving opening into communication with the discharge opening with a mounting operation of the developer supply container to the developer receiving apparatus.

2. A developer supply container according to claim 1, further comprising a shutter movable relative to the supporting portion with the mounting operation, wherein the moving mechanism includes a sliding portion provided on the supporting portion and an inclined portion which is provided on the shutter so as to be contactable to the sliding portion with relative movement of the shutter and which is inclined so as to move the supporting portion upwardly.

3. A developer supply container according to claim 1, further comprising a shutter movable relative to the supporting portion with the mounting operation, wherein the moving mechanism includes a rotatable member provided on the discharging portion, a rotating operation portion for rotating the rotatable member with relative movement of the shutter, and a conversion transmitting mechanism for converting a rotational motion into a linear motion and transmitting the linear motion to the supporting portion.

4. A developer supply container according to claim 3, wherein the rotatable member includes a pinion gear provided on the supporting portion, the rotation operation portion includes a first rack gear provided extended in a mounting direction of the developer supply container during the mounting operation, and the conversion transmitting mechanism includes a second rack gear engaging with the pinion gear.

5. A developer supply container according to claim 1, wherein the moving mechanism includes a guiding means for guiding the supporting portion in a direction of bringing the receiving opening into communication with the discharge opening and a sliding operation portion for moving the supporting portion along the guiding means with the mounting operation.

6. A developer supply container according to claim 5, wherein the guiding means includes a rib provided on one of the discharging portion and the supporting portion, and a holding portion provided on the other of the discharging portion and the supporting portion and engaged with the rib to slidably support the supporting portion.

7. A developer supply container according to claim 1, wherein the developer receiving apparatus includes a pulling member for pulling the developer supply container toward a downstream side in a mounting direction of the developer supply container during the mounting operation, and wherein the moving mechanism includes a rotational shaft rotatably supporting the supporting portion and a rotation operating portion rotatable about an axis of the rotational shaft to operate the supporting portion with a pulling operation of the pulling member.

8. A developer supply container according to claim 5, wherein the moving mechanism includes urging means for urging in a direction of bringing the receiving opening into communication with the discharge opening and a restricting member contactable with the supporting portion to restrict movement of the supporting portion by the urging means, and wherein the restricting member is movable relative to the supporting portion to release the supporting portion from the restricting member with the mounting operation.

9. A developer supply container according to claim 8, further comprising a shutter movable relative to the supporting portion with the mounting operation, wherein the restricting member is provided integrally with the shutter and moves relative to the supporting portion with relative movement of the shutter.

10. A developer supply container according to claim 1, further comprising a shutter movable relative to the supporting portion with the mounting operation, wherein the moving mechanism includes (i) a first magnet provided on the shutter, the first magnet having a predetermined polarity at a side closer to the supporting portion, and (ii) a second magnet provided on the supporting portion, the second magnet having the predetermined polarity at a side closer to the shutter, and wherein the supporting portion is operated by a repelling force produced between the first magnet and the second magnet with a relative movement of the shutter.

11. A developer supply container according to claim 10, wherein the first magnet is provided on a mounting member mountable to the shutter.

12. A developer supply container according to claim 1, further comprising a shutter movable relative to the supporting portion with the mounting operation, wherein the moving mechanism includes (i) a weight supported by the shutter and movable by gravity with the relative movement of the shutter, and (ii) a movable member for moving the supporting portion by the movement of the weight in a direction of bringing the receiving opening into communication with the discharge opening.

13. A developer supply container according to claim 12, wherein the movable member is a string connecting the weight and the supporting portion to each other.

14. A developer supply container detachably mountable to a developer receiving apparatus that includes a developer receiving portion provided with a receiving opening for receiving developer and a supported portion integrally displaceable with the developer receiving portion, the developer supply container comprising:

a developer accommodating portion accommodating the developer;

a discharging portion provided with a discharge opening at a bottom side of the discharging portion for discharging the developer accommodated in the developer accommodating portion;

a supporting portion provided at the discharging portion and capable of supporting the supported portion, wherein the supporting portion is movable relative to the discharging portion, and wherein the developer supply container includes a moving mechanism for moving the supporting portion upwardly relative to the discharging portion while supporting the supported portion to move the developer receiving portion toward the developer supply container so as to bring the receiving opening into communication with the discharge opening after mounting the developer supply container to the developer receiving apparatus.

15. A developer supply container according to claim 14, wherein the moving mechanism includes driving means for driving the supporting portion by energization started by supply of electric power.

16. A developer supply container according to claim 14, wherein the driving means starts the supply of electric power with a mounting operation to the developer receiving apparatus, and the supply of the electric power is stopped in response to displacement of the developer receiving portion to a position in which the receiving opening communicates with the discharge opening.

17. A developer supplying system comprising:

a developer receiving apparatus including a developer receiving portion provided with a receiving opening for receiving developer and a supported portion integrally displaceable with the developer receiving portion; and a developer supply container according to claim 1.

* * * * *